United States Patent
Beri

(10) Patent No.: US 12,472,188 B1
(45) Date of Patent: Nov. 18, 2025

(54) METHOD AND COMPOSITION FOR AN IMPROVED BIOAVAILABILITY DELIVERY SYSTEM

(71) Applicant: Americana Pharma LLC, Houston, TX (US)

(72) Inventor: Aman Beri, Buena Park, CA (US)

(73) Assignee: AMERICANA PHARMA LLC, Houston, TX (US)

( * ) Notice: Subject to any disclaimer, the term of this patent is extended or adjusted under 35 U.S.C. 154(b) by 0 days.

(21) Appl. No.: 18/976,941

(22) Filed: Dec. 11, 2024

(51) Int. Cl.
| | |
|---|---|
| *A61K 9/50* | (2006.01) |
| *A61K 9/51* | (2006.01) |
| *A61K 31/05* | (2006.01) |
| *A61K 31/19* | (2006.01) |
| *A61K 31/4415* | (2006.01) |
| *A61K 31/56* | (2006.01) |
| *A61K 31/592* | (2006.01) |
| *A61K 31/593* | (2006.01) |
| *A61K 31/724* | (2006.01) |
| *A61K 36/258* | (2006.01) |
| *A61K 36/81* | (2006.01) |

(52) U.S. Cl.
CPC ............ *A61K 31/56* (2013.01); *A61K 9/5089* (2013.01); *A61K 9/5123* (2013.01); *A61K 9/5161* (2013.01); *A61K 31/05* (2013.01); *A61K 31/19* (2013.01); *A61K 31/4415* (2013.01); *A61K 31/592* (2013.01); *A61K 31/593* (2013.01); *A61K 31/724* (2013.01); *A61K 36/258* (2013.01); *A61K 36/81* (2013.01)

(58) Field of Classification Search
None
See application file for complete search history.

(56) References Cited

U.S. PATENT DOCUMENTS

2005/0008690 A1 * 1/2005 Miller .................... A61K 45/06
424/451

OTHER PUBLICATIONS

Technology Scientific, Biopolymer Technologies Green and Smart, Published Jul. 16, 2024, Retrieved from Internet <https://web.archive.org/web/20240716115747/https://technologyscientific.com/en/micronization-what-does-it-do-for-supplements/> (Year: 2024).*
C Ahlem, D Auci, F Nicoletti, R Pieters, M Kennedy, T Page, C Reading, E Enioutina, J Frincke, Pharmacology and immune modulating properties of 5-androstene-3β,7β, 17β-triol, a DHEA metabolite in the human metabolome, (2011) The Journal of Steroid Biochemistry and Molecular Biology, vol. 126, pp. 87-94.*
Hashemzadeh, H., Hanafi-Bojd, M.Y., Iranshahy, M. et al. The combination of polyphenols and phospholipids as an efficient platform for delivery of natural products. Sci Rep 13, 2501 (2023). https://doi.org/10.1038/s41598-023-29237-0 (Year: 2023).*
Khorram O, Vu L, Yen SS. Activation of immune function by dehydroepiandrosterone (DHEA) in age-advanced men. J Gerontol A Biol Sci Med Sci. Jan. 1997;52(1):M1-7. doi: 10.1093/gerona/52a.1.m1. PMID: 9008662. https://academic.oup.com/biomedgerontology/article-abstract/52A/1/M1/550201?redirectedFrom=fulltext&login=false.
Prall SP, Muehlenbein MP. DHEA Modulates Immune Function: A Review of Evidence. Vitam Horm. 2018;108:125-144. doi: 10.1016/bs.vh.2018.01.023. Epub Mar. 9, 2018. PMID: 30029724. https://sprall.github.io/pubs/Prall%20and%20Muehlenbein%20ch%202018.pdf.
Mora PC, Cirri M, Guenther S, Allolio B, Carli F, Mura P. Enhancement of dehydroepiandrosterone solubility andbioavailability by ternary complexation with alpha-cyclodextrin and glycine. J Pharm Sci. Nov. 2003; 92(11):2177-84. doi: 10.1002/jps.10485. Erratum in: J Pharm Sci. May 2004;93(5):1374. PMID: 14603503. https://www.academia.edu/87472727/Enhancement_of_dehydroepiandrosterone_solubility_and_bioavailability_by_ternary_complexation_with_cyclodextrin_.
Badihi A, Debotton N, Frušić-Zlotkin M, Soroka Y, Neuman R, Benita S. Enhanced cutaneous bioavailability of dehydroepiandrosterone mediated by nano-encapsulation. J Control Release. Sep. 10, 2014;189:65-71. doi: 10.1016/j.jconrel.2014.06.019. Epub Jun. 21, 2014. PMID: 24956487. https://www.sciencedirect.com/science/article/abs/pii/S0168365914004180?via%3Dihub.
Casson PR, Straughn AB, Umstot ES, Abraham GE, Carson SA, Buster JE. Delivery of dehydroepiandrosterone to premenopausal women: effects of micronization and nonoral administration. Am J Obstet Gynecol. Feb. 1996; 174(2):649-53. doi: 10.1016/s0002-9378(96)70444-1. PMID: 8623801. https://www.ajog.org/article/S0002-9378(96)70444-1/abstract.
Leblanc M, Labrie C, Bélanger A, Candas B, Labrie F. Bioavailability and pharmacokinetics of dehydroepiandrosterone in the cynomolgus monkey. J Clin Endocrinol Metab. Sep. 2003;88(9):4293-302. doi: 10.1210/jc.2003-022012. PMID: 12970301. https://academic.oup.com/jcem/article-abstract/88/9/4293/2845758?redirectedFrom=fulltext&login=false.
Panjari M, Davis SR. DHEA therapy for women: effect on sexual function and wellbeing. Hum Reprod Update. May-Jun. 2007;13(3):239-48. doi: 10.1093/humupd/dml055. Epub Jan. 5, 2007. PMID: 17208951. https://academic.oup.com/humupd/article-abstract/13/3/239/2457836?redirectedFrom=fulltext.

(Continued)

*Primary Examiner* — Ali Soroush
*Assistant Examiner* — Afua Bamfoaa Boateng
(74) *Attorney, Agent, or Firm* — Trojan Law Offices

(57) ABSTRACT

A method of forming a DHEA derivative supplement including adaptogens, modified stilbenoids complex, non-esterified omega-3 fatty acids, essential amino acids, HMB free acid, vitamins, L-arginine, creatine, green tea extracts, and chelated minerals, in a multi-bioavailability delivery system, based on the nature of the constituents, formed as an encapsulated micronized material having a phytosomal delivery system which reduces supplements dosage while increasing active nutrients efficacy and bioavailability by providing a targeted delivery system for nutritional effects.

11 Claims, 25 Drawing Sheets

(16 of 25 Drawing Sheet(s) Filed in Color)

(56) References Cited

OTHER PUBLICATIONS

Srinivas-Shankar U, Roberts SA, Connolly MJ, O'Connell MD, Adams JE, Oldham JA, Wu FC. Effects of testosterone on muscle strength, physical function, body composition, and quality of life in intermediate-frail and frail elderly men: a randomized, double-blind, placebo-controlled study. J Clin Endocrinol Metab. Feb. 2010;95(2):639-50. doi: 10.1210/jc.2009-1251. Epub Jan. 8, 2010. PMID: 20061435. https://www.researchgate.net/.

Gutiérrez G, Mendoza C, Zapata E, Montiel A, Reyes E, Montaño LF, López-Marure R. Dehydroepiandrosterone inhibits the TNF-alpha-induced inflammatory response in human umbilical vein endothelial cells. Atherosclerosis. Jan. 2007;190(1):90-9. doi: 10.1016/j.atherosclerosis.2006.02.031. Epub Mar. 30, 2006. PMID: 16574124. https://www.researchgate.net/publication/356091764_Effect_of_dehydroepiandrosterone_on_atherosclerosis_in_postmenopausal_women.

López-Marure R, Contreras PG, Dillon JS. Effects of dehydroepiandrosterone on proliferation, migration, and death of breast cancer cells. Eur J Pharmacol. Jun. 25, 2011;660(2-3):268-74. doi: 10.1016/j.ejphar.2011.03.040. Epub Apr. 9, 2011. PMID: 21497598. https://www.academia.edu/55464558/Effects_of_dehydroepiandrosterone_on_proliferation_migration_and_death_of_breast_cancer_cells.

Cochrane Database Syst Rev. Oct. 18, 2006;2006(4):CD006221. doi: 10.1002/14651858.CD006221. PMID: 17054283; PMCID: PMC8988513. https://pmc.ncbi.nlm.nih.gov/articles/PMC8988513/.

Von Mühlen D, Laughlin GA, Kritz-Silverstein D, Bergstrom J, Bettencourt R. Effect of dehydroepiandrosterone supplementation on bone mineral density, bone markers, and body composition in older adults: the DAWN trial. Osteoporos Int. May 2008;19(5):699-707. doi: 10.1007/s00198-007-0520-z. Epub Dec. 15, 2007. PMID: 18084691; Pmcid: PMC2435090. https://pmc.ncbi.nlm.nih.gov/articles/PMC2435090/.

Catherine M. Jankowski, Wendolyn S. Gozansky, Robert S. Schwartz, Daniel J. Dahl, John M. Kittelson, Stephen M. Scott, Rachael E. Van Pelt, Wendy M. Kohrt, Effects of Dehydroepiandrosterone Replacement Therapy on Bone Mineral Density in Older Adults: A Randomized, Controlled Trial, The Journal of Clinical Endocrinology & Metabolism, vol. 91, Issue 8, Aug. 1, 2006, pp. 2986-2993, https://doi.org/10.1210/jc.2005-2484 https://scispace.com/pdf/effects-of-dehydroepiandrosterone-replacement-therapy-on-1ciwbccoio.pdf.

Wang F, He Y, O Santos H, Sathian B, C Price J, Diao J. The effects of dehydroepiandrosterone (DHEA) supplementation on body composition and blood pressure: A meta-analysis of randomized clinical trials. Steroids. Nov. 2020;163: 108710. doi: 10.1016/j.steroids.2020.108710. Epub Jul. 31, 2020. PMID: 32745490. https://magistralbr.caldic.com/storage/product-files/470038185.pdf.

Bhasin S. The dose-dependent effects of testosterone on sexual function and on muscle mass and function. Mayo Clin Proc. Jan. 2000;75 Suppl: S70-5; discussion S75-6. PMID: 10959221. https://www.tandfonline.com/doi/epdf/10.1080/13685530008500358?needAccess=true.

Bhasin S. Testosterone supplementation for aging-associated sarcopenia. J Gerontol A Biol Sci Med Sci. Nov. 2003;58(11):1002-8. doi: 10.1093/gerona/58.11.m1002. PMID: 14630881. https://academic.oup.com/biomedgerontology/article-abstract/58/11/M1002/640336#no-access-message https://link.springer.com/chapter/10.1007/978-3-662-07019-2_12.

Stares A, Bains M. The Additive Effects of Creatine Supplementation and Exercise Training in an Aging Population: A Systematic Review of Randomized Controlled Trials. J Geriatr Phys Ther. Apr./Jun. 2020;43(2):99-112. doi: 10.1519/JPT.0000000000000222. PMID: 30762623. https://journals.lww.com/jgpt/abstract/2020/04000/the_additive_effects_of_creatine_supplementation.7.aspx.

Branch JD. Effect of creatine supplementation on body composition and performance: a meta-analysis. Int J Sport Nutr Exerc Metab. Jun. 2003; 13(2):198-226. doi: 10.1123/ijsnem.13.2.198. PMID: 12945830. https://www.researchgate.net/publication/10591062_Effect_of_Creatine_Supplementation_on_Body_Composition_and_Performance_A_Meta-analysis.

Rawson ES, Clarkson PM. Acute creatine supplementation in older men. Int J Sports Med. Jan. 2000;21(1):71-5. doi: 10.1055/s-2000-8859. PMID: 10683103. https://www.thieme-connect.com/products/ejournals/abstract/10.1055/s-2000-8859.

Murat Gürbüz, Şule Aktaç, Understanding the role of vitamin A and its precursors in the immune system,Nutrition Clinique et Métabolisme, vol. 36, Issue 2,2022, pp. 89-98, ISSN 0985-0562,https://doi.org/10.1016/j.nupar.2021.10.002. (https://www.sciencedirect.com/science/article/pii/S0985056221002156) https://www.researchgate.net/publication/359504926_Understanding_the_role_of_vitamin_A_and_its_precursors_in_the_immune_system.

Holick MF. The vitamin D deficiency pandemic: Approaches for diagnosis, treatment and prevention. Rev Endocr Metab Disord. Jun. 2017;18(2):153-165. doi: 10.1007/s11154-017-9424-1. PMID: 28516265. https://link.springer.com/article/10.1007/s11154-017-9424-1.

Farrokhyar F, Tabasinejad R, Dao D, Peterson D, Ayeni OR, Hadioonzadeh R, Bhandari M. Prevalence of vitamin D inadequacy in athletes: a systematic-review and meta-analysis. Sports Med. Mar. 2015;45(3):365-78. doi: 10.1007/s40279-014-0267-6. PMID: 25277808. https://www.researchgate.net/publication/266391675_Prevalence_of_Vitamin_D_Inadequacy_in_Athletes_A_Systematic-Review_and_Meta-.

Prasad AS, Mantzoros CS, Beck FW, Hess JW, Brewer GJ. Zinc status and serum testosterone levels of healthy adults. Nutrition. May 1996;12(5):344-8. doi: 10.1016/s0899-9007(96)80058-x. PMID: 8875519. https://www.sciencedirect.com/science/article/abs/pii/S089990079680058X?via%3Dihub.

Kim BG, Adams JM, Jackson BA, Lindemann MD. Effects of chromium(III) picolinate on cortisol and DHEAs secretion in H295R human adrenocortical cells. Biol Trace Elem Res. Feb. 2010;133(2):171-80. doi: 10.1007/s12011-009-8433-7. Epub Jun. 24, 2009. PMID: 19554276. https://link.springer.com/article/10.1007/s12011-009-8433-7.

Sorwell KG, Urbanski HF. Dehydroepiandrosterone and age-related cognitive decline. Age (Dordr). Mar. 2010;32(1):61-7. doi: 10.1007/s11357-009-9113-4. Epub Aug. 27, 2009. PMID: 19711196; PMCID: PMC2829637 https://pmc.ncbi.nlm.nih.gov/articles/PMC2829637/.

Anna Kiersztan, Kongorzul Gaanga, Apolonia Witecka, Adam K. Jagielski, DHEA-pretreatment attenuates oxidative stress in kidney-cortex and liver of diabetic rabbits and delays development of the disease, Biochimie, vol. 185, 2021, pp. 135-145, ISSN 0300-9084, https://doi.org/10.1016/j.biochi.2021.03.010. (https://www.sciencedirect.com/science/article/pii/S0300908421000808) https://www.sciencedirect.com/science/article/abs/pii/S0300908421000808?via%3Dihub.

Bhat, S., Sarkar, S., Zaffar, D et al. Omega-3 Fatty Acids in Cardiovascular Disease and Diabetes: a Review of Recent Evidence. Curr Cardiol Rep 25, 51-65 (2023). https://doi.org/10.1007/s11886-022-01831-0.

Zehr KR, Walker MK. Omega-3 polyunsaturated fatty acids improve endothelial function in humans at risk foratherosclerosis: A review. Prostaglandins Other Lipid Mediat. Jan. 2018;134:131-140. doi: 10.1016/j.prostaglandins.2017.07.005. Epub Aug. 9, 2017. PMID: 28802571; PMCID: PMC5803420. https://www.researchgate.net/publication/319023994_Omega-3_polyunsaturated_fatty_acids_improve_endothelial_function_in_humans_at_risk_for_.

Perrini S, Laviola L, Natalicchio A, Giorgino F. Associated hormonal declines in aging: DHEAS. J Endocrinol Invest. 2005;28(3 Suppl):85-93. PMID: 16042365. https://www.researchgate.net/publication/7703934_Associated_hormonal_declines_in_aging_DHEAS.

Mai K, Bobbert T, Kullmann V, Andres J, Rochlitz H, Osterhoff M, Weickert MO, Bähr V, Möhlig M, Pfeiffer AF, Diederich S, Spranger J. Free fatty acids increase androgen precursors in vivo. J Clin Endocrinol Metab. Apr. 2006;91(4):1501-7. doi: 10.1210/jc.2005-2069. Epub Jan. 24, 2006. PMID: 16434463. https://academic.oup.com/jcem/article-abstract/91/4/1501/2843531?redirectedFrom=fulltext&login=false#no-access-message.

D.M. ter Horst, A.H. Schene, C.A. Figueroa, J. Assies, A. Lok, C.L.H. Bockting, H.G. Ruhe, R.J.T. Mocking, Cortisol,

(56) References Cited

OTHER PUBLICATIONS dehydroepiandrosterone sulfate, fatty acids, and their relation in recurrent, depression, Psychoneuroendocrinology, vol. 100, 2019,pp. 203-212, ISSN 0306-4530, https://doi.org/10.1016/j.psyneuen.2018.10.012. https://repository.ubn.ru.nl/handle/2066/201332.

Madison AA, Belury MA, Andridge R, Renna ME, Rosie Shrout M, Malarkey WB, Lin J, Epel ES, Kiecolt-Glaser JK. Omega-3 supplementation and stress reactivity of cellular aging biomarkers: an ancillary substudy of a randomized, controlled trial in midlife adults. Mol Psychiatry. Jul. 2021;26(7):3034-3042. doi: 10.1038/s41380-021-01077-2. Epub Apr. 20, 2021. PMID: 33875799; PMCID: PMC8510994. https://pmc.ncbi.nlm.nih.gov/articles/PMC8510994/.

Mai K, Bobbert T, Kullmann V, Andres J, Rochlitz H, Osterhoff M, Weickert MO, Bähr V, Mohlig M, Pfeiffer AF, Diederich S, Spranger J. Free fatty acids increase androgen precursors in vivo. J Clin Endocrinol Metab. Apr. 2006;91(4):1501-7. doi: 10.1210/jc.2005-2069. Epub Jan. 24, 2006. PMID: 16434463. https://www.researchgate.net/publication/7339960_Free_Fatty_Acids_Increase_Androgen_Precursors_in_Vivo.

Negin Parsamanesh, Arghavan Asghari, Saeed Sardari, Aida Tasbandi, Tannaz Jamialahmadi, Suowen Xu, Amirhossein Sahebkar, Resveratrol and endothelial function: A literature review,Pharmacological Research, vol. 170,2021, 105725, ISSN 1043-6618, https://doi.org/10.1016/j.phrs.2021.105725. https://www.sciencedirect.com/science/article/abs/pii/S1043661821003091 (https://www.sciencedirect.com/science/article/pii/S1043661821003091).

Marques BCAA, Trindade M, Aquino JCF, Cunha AR, Gismondi RO, Neves MF, Oigman W. Beneficial effects of acute trans-resveratrol supplementation in treated hypertensive patients with endothelial dysfunction. Clin Exp Hypertens. 2018;40(3):218-223. doi: 10.1080/10641963.2017.1288741. Epub Feb. 12, 2018. PMID: 29431520. https://www.tandfonline.com/doi/full/10.1080/10641963.2017.1288741.

Damian Mikulski, Marcin Molski, Quantitative structure—antioxidant activity relationship of trans-resveratrol oligomers, trans-4,4'-dihydroxystilbene dimer, trans-resveratrol-3-O-glucuronide, glucosides: Trans-piceid, cis-piceid, trans-astringin and trans-resveratrol-4'-O-β-D-glucopyranoside, European Journal of Medicinal Chemistry, vol. 45, Issue 6,2010, pp. 2366-2380, ISSN 0223-5234, https://doi.org/10.1016/j.ejmech.2010.02.016.

Tekleab Teka, Lele Zhang, Xiaoyan Ge, Yanjie Li, Lifeng Han, Xiaohui Yan, Stilbenes: Source plants, chemistry, biosynthesis, pharmacology, application and problems related to their clinical Application—A comprehensive review, Phytochemistry,vol. 197,2022, 113128,ISSN 0031-9422, https://doi.org/10.1016/j.phytochem.2022.113128. (https://www.sciencedirect.com/science/article/pii/S0031942222000449).

Babu PV, Liu D. Green tea catechins and cardiovascular health: an update. Curr Med Chem. 2008;15(18):1840-50. doi: 10.2174/092986708785132979. PMID: 18691042; PMCID: PMC2748751. https://pmc.ncbi.nlm.nih.gov/articles/pmid/18691042/.

Abe SK, Inoue M. Green tea and cancer and cardiometabolic diseases: a review of the current epidemiological evidence. Eur J Clin Nutr. Jun. 2021; 75(6):865-876. doi: 10.1038/s41430-020-00710-7. Epub Aug. 20, 2020. PMID: 32820240; PMCID: PMC8189915.https://pmc.ncbi.nlm.nih.gov/articles/PMC8189915/.

Chen D, Wan SB, Yang H, Yuan J, Chan TH, Dou QP. EGCG, green tea polyphenols and their synthetic analogs and prodrugs for human cancer prevention and treatment. Adv Clin Chem. 2011; 53:155-77. doi: 10.1016/b978-0-12-385855-9.00007-2. PMID: 21404918; PMCID: PMC3304302. https://pmc.ncbi.nlm.nih.gov/articles/pmid/21404918/.

Randolph AC, Markofski MM, Rasmussen BB, Volpi E. Effect of essential amino acid supplementation and aerobic exercise on insulin sensitivity in healthy older adults: A randomized clinical trial. Clin Nutr. May 2020;39(5):1371-1378. doi: 10.1016/j.clnu.2019.06.017. Epub Jun. 28, 2019. PMID: 31307843; PMCID: PMC6934924. https://pmc.ncbi.nlm.nih.gov/articles/pmid/31307843/.

Jia-Yi Dong, Li-Qiang Qin, Zengli Zhang, Youyou Zhao, Junkuan Wang, Fabrizio Arigoni, Weiguo Zhang, Effect of oral l-arginine supplementation on blood pressure: A meta-analysis of randomized, double-blind, placebo-controlled trials, American Heart Journal, vol. 162, Issue 6, 2011, pp. 959-965, ISSN 0002-8703, https://doi.org/10.1016/j.ahj.2011.09.012. (https://www.sciencedirect.com/science/article/pii/S0002870311006971).

Rhim HC, Kim MS, Park YJ, Choi WS, Park HK, Kim HG, Kim A, Paick SH. The Potential Role of Arginine Supplements on Erectile Dysfunction: A Systemic Review and Meta-Analysis. J Sex Med. Feb. 2019;16(2):223-234. doi: 10.1016/j.jsxm.2018.12.002. Erratum in: J Sex Med. Mar. 2020;17(3):560. doi: 10.1016/j.jsxm.2020.01.021. PMID: 30770070. https://www.researchgate.net/publication/331065420_The_Potential_Role_of_Arginine_Supplements_on_Erectile_Dysfunction_A_Systemic_Review.

Bémeur C, Butterworth RF. Nutrition in the management of cirrhosis and its neurological complications. J Clin Exp Hepatol. Jun. 2014;4(2):141-50. doi: 10.1016/j.jceh.2013.05.008. Epub Jun. 11, 2013. PMID: 25755550; PMCID: PMC4116712. https://pmc.ncbi.nlm.nih.gov/articles/pmid/25755550/.

Chen YS, Lee HF, Tsai CH, Hsu YY, Fang CJ, Chen CJ, Hung YH, Hu FW. Effect of Vitamin B2 supplementation on migraine prophylaxis: a systematic review and meta-analysis. Nutr Neurosci. Sep. 2022;25(9):1801-1812. doi: 10.1080/1028415X.2021.1904542. Epub Mar. 29, 2021. PMID: 33779525 https://www.tandfonline.com/doi/10.1080/1028415X.2021.1904542?url_ver=Z39.88-2003&rfr_id=ori:rid:crossref.org&rfr_dat=cr_pub%20%200pubmed.

Agnew-Blais JC, Wassertheil-Smoller S, Kang JH, Hogan PE, Coker LH, Snetselaar LG, Smoller JW. Folate, vitamin B-6, and vitamin B-12 intake and mild cognitive impairment and probable dementia in the Women's Health Initiative Memory Study. J Acad Nutr Diet. Feb. 2015;115(2):231-241. doi: 10.1016/j.Jan. 2014.07.006. Epub Sep. 8, 2014. PMID: 25201007; PMCID: PMC4312724. https://pmc.ncbi.nlm.nih.gov/articles/pmid/25201007/.

"Niacin and its effects on the management of dyslipidemia (2013) A clinical review." Current Atherosclerosis Reports. This study reviews niacin's role in lipid management and its cardiovascular benefits. https://doi.org/10.1177/1074248413514481.

Ganji SH, Kamanna VS, Kashyap ML. Niacin and cholesterol: role in cardiovascular disease (review). J Nutr Biochem. Jun. 2003;14(6):298-305. doi: 10.1016/s0955-2863(02)00284-x. PMID: 12873710. https://www.sciencedirect.com/science/article/abs/pii/S095528630200284X?via%3Dihub.

"Folic acid supplementation and prevention of neural tube defects: A meta-analysis." American Journal of Obstetrics and Gynecology. This meta-analysis confirms the effectiveness of folic acid in reducing neural tube defects in pregnancies. https://pubmed.ncbi.nlm.nih.gov/19414843/.

Chambial S, Dwivedi S, Shukla KK, John PJ, Sharma P. Vitamin C in disease prevention and cure: an overview. Indian J Clin Biochem. Oct. 2013;28(4):314-28. doi: 10.1007/s12291-013-0375-3. Epub Sep. 1, 2013. PMID: 24426232; PMCID: PMC3783921.https://pmc.ncbi.nlm.nih.gov/articles/pmid/24426232/.

Inflammatory processes in muscle injury and repair James G. Tidball Feb. 1, 2005https://doi.org/10.1152/ajpregu.00454.2004.

Granulocyte-colony stimulating factor enhances muscle proliferation and strength following skeletal muscle injury in rats. Ioannis Stratos et. al., 2007, https://doi.org/10.1152/japplphysiol.00066.2007.

Vitamin D supplementation attenuates oxidative stress in paraspinal skeletal muscles in patients with low back pain. Jan. 2018 European Journal of Applied 118(2) DOI: 10.1007/s00421-017-3755-1 https://www.researchgate.net/publication/321083896_Vitamin_D_supplementation_attenuates_oxidative_stress_in_paraspinal_skeletal_muscles_in_patients_with_low_back_pain.

Owens, D. J., Fraser, W. D., & Close, G. L. (2014). Vitamin D and the athlete: Emerging insights. European Journal of Sport Science, 15(1), 73-84. https://doi.org/10.1080/17461391.2014.944223.

Huang Z, Liu Y, Qi G, Brand D, Zheng SG. Role of Vitamin A in the Immune System. J Clin Med. Sep. 6, 2018;7(9):258. doi: 10.3390/jcm7090258. PMID: 30200565; PMCID: PMC6162863.

(56) References Cited

OTHER PUBLICATIONS

Milosheska D, Roškar R. Use of Retinoids in Topical Antiaging Treatments: A Focused Review of Clinical Evidence for Conventional and Nanoformulations. Adv Ther. Dec. 2022;39(12):5351-5375. doi: 10.1007/s12325-022-02319-7. Epub Oct. 11, 2022. PMID: 36220974; PMCID: PMC9618501.

Mukherjee S, Date A, Patravale V, Korting HC, Roeder A, Weindl G. Retinoids in the treatment of skin aging: an overview of clinical efficacy and safety. Clin Interv Aging. 2006;1(4):327-48. doi: 10.2147/ciia.2006.1.4.327. PMID: 18046911; PMCID: PMC2699641.

Institute of Medicine (US) Panel on Dietary Antioxidants and Related Compounds. Dietary Reference Intakes for Vitamin C, Vitamin E, Selenium, and Carotenoids. Washington (DC): National Academies Press (US); 2000. PMID: 25077263.

Imdad A, Mayo-Wilson E, Herzer K, Bhutta ZA. Vitamin A supplementation for preventing morbidity and mortality in children from six months to five years of age. Cochrane Database Syst Rev. Mar. 11, 2017;3(3):CD008524. doi: 10.1002/14651858.CD008524.pub3. Update in: Cochrane Database Syst Rev. Mar. 16, 2022;3:CD008524. doi: 10.1002/14651858.CD008524.pub4. PMID: 28282701; PMCID: PMC6464706.

Kreider, R.B., Kalman, D.S., Antonio, J. et al. International Society of Sports Nutrition position stand: safety and efficacy of creatine supplementation in exercise, sport, and medicine. J Int Soc Sports Nutr 14, 18 (2017). https://doi.org/10.1186/s12970-017-0173-z.

Mielgo-Ayuso J, Calleja-Gonzalez J, Marqués-Jiménez D, Caballero-García A, Córdova A, Fernández-Lázaro D. Effects of Creatine Supplementation on Athletic Performance in Soccer Players: A Systematic Review and Meta-Analysis. Nutrients. Mar. 31, 2019;11(4):757. doi: 10.3390/nu11040757. PMID: 30935142; PMCID: PMC6520963.

Buford TW, Kreider RB, Stout JR, Greenwood M, Campbell B, Spano M, Ziegenfuss T, Lopez H, Landis J, Antonio J. International Society of Sports Nutrition position stand: creatine supplementation and exercise. J Int Soc Sports Nutr. Aug. 30, 2007;4:6. doi: 10.1186/1550-2783-4-6. PMID: 17908288; PMCID: PMC2048496.

Avgerinos KI, Spyrou N, Bougioukas KI, Kapogiannis D. Effects of creatine supplementation on cognitive function of healthy individuals: A systematic review of randomized controlled trials. Exp Gerontol. Jul. 15, 2018;108:166-173. doi: 10.1016/j.exger.2018.04.013. Epub Apr. 25, 2018. PMID: 29704637; PMCID: PMC6093191.

Kreider RB, Stout JR. Creatine in Health and Disease. Nutrients. Jan. 29, 2021;13(2):447. doi: 10.3390/nu13020447. PMID: 33572884; PMCID: PMC7910963.

Chilibeck PD, Kaviani M, Candow DG, Zello GA. Effect of creatine supplementation during resistance training on lean tissue mass and muscular strength in older adults: a meta-analysis. Open Access J Sports Med. Nov. 2, 2017;8:213-226. doi: 10.2147/OAJSM.S123529. PMID: 29138605; PMCID: PMC5679696.

Gordji-Nejad, A., Matusch, A., Kleedörfer, S. et al. Single dose creatine improves cognitive performance and induces changes in cerebral high energy phosphates during sleep deprivation. Sci Rep 14, 4937 (2024). https://doi.org/10.1038/s41598-024-54249-9.

Snyder PJ, Bhasin S, Cunningham GR, Matsumoto AM, Stephens-Shields AJ, Cauley JA, Gill TM, Barrett-Connor E, Swerdloff RS, Wang C, Ensrud KE, Lewis CE, Farrar JT, Cella D, Rosen RC, Pahor M, Crandall JP, Molitch ME, Cifelli D, Dougar D, Fluharty L, Resnick SM, Storer TW, Anton S, Basaria S, Diem SJ, Hou X, Mohler ER 3rd, Parsons JK, Wenger NK, Zeldow B, Landis JR, Ellenberg SS; Testosterone Trials Investigators. Effects of Testosterone Treatment in Older Men. N Engl J Med. Feb. 18, 2016;374(7):611-24. doi: 10.1056/NEJMoa1506119. PMID: 26886521; PMCID:.

Grimley Evans J, Malouf R, Huppert F, van Niekerk JK. Dehydroepiandrosterone (DHEA) supplementation for cognitive function in healthy elderly people.

Tang J, Chen LR, Chen KH. The Utilization of Dehydroepiandrosterone as a Sexual Hormone Precursor in Premenopausal and Postmenopausal Women: An Overview. Pharmaceuticals (Basel). Dec. 29, 2021;15(1):46. doi: 10.3390/ph15010046. PMID: 35056103; PMCID: PMC8781653.

Aziz A. Alkatib, Mihaela Cosma, Mohamed B. Elamin, Dana Erickson, Brian A. Swiglo, Patricia J. Erwin, Victor M. Montori, A Systematic Review and Meta-Analysis of Randomized Placebo-Controlled Trials of DHEA Treatment Effects on Quality of Life in Women with Adrenal Insufficiency, The Journal of Clinical Endocrinology & Metabolism, vol. 94, Issue 10, Oct. 1, 2009, pp. 3676-3681, https://doi.org/10.1210/jc.2009-0672.

Arlt W, Callies F, van Vlijmen JC, Koehler I, Reincke M, Bidlingmaier M, Huebler D, Oettel M, Ernst M, Schulte HM, Allolio B. Dehydroepiandrosterone replacement in women with adrenal insufficiency. N Engl J Med. Sep. 30, 1999;341(14):1013-20. doi: 10.1056/NEJM199909303411401. PMID: 10502590.

Prescribing testosterone and DHEA: The role of androgens in women Taryn Smith, Et. Al, Cleveland Clinic Journal of Medicine Jan. 2021, 88 (1) 35-43; DOI: https://doi.org/10.3949/ccjm.88a.20030.

Finckh A, Berner IC, Aubry-Rozier B, So AK. A randomized controlled trial of dehydroepiandrosterone in postmenopausal women with fibromyalgia. J Rheumatol. Jul. 2005;32(7):1336-40. PMID: 15996074.

El-Sakka AI. Dehydroepiandrosterone and Erectile Function: A Review. World J Mens Health. Sep. 2018;36(3):183-191. doi: 10.5534/wjmh.180005. Epub May 11, 2018. PMID: 29756417; PMCID: PMC6119841.

Schwartz AG. Dehydroepiandrosterone, Cancer, and Aging. Aging Dis. Apr. 1, 2022;13(2):423-432. doi: 10.14336/AD.2021.0913. PMID: 35371612; PMCID: PMC8947821.

Endo K, Ichinose M, Kobayashi E, Ueno T, Hirai N, Nakanishi Y, Kondo S, Yoshizaki T. Head and Neck Cancer and Sarcopenia: An Integrative Clinical and Functional Review. Cancers (Basel). Oct. 12, 2024;16(20):3460. doi: 10.3390/cancers16203460. PMID: 39456555; PMCID: PMC11506384.

López-Marure R, Zapata-Gómez E, Rocha-Zavaleta L, Aguilar MC, Espinosa Castilla M, Meléndez Zajgla J, Meraz-Cruz N, Huesca-Gómez C, Gamboa-Ávila R, Gómez-González EO. Dehydroepiandrosterone inhibits events related with the metastatic process in breast tumor cell lines. Cancer Biol Ther. Sep. 2016;17(9):915-24. doi: 10.1080/15384047.2016.1195047. Epub Jun. 3, 2016. PMID: 27260851; PMCID: PMC5036408.

Webb SJ, Geoghegan TE, Prough RA, Michael Miller KK. The biological actions of dehydroepiandrosterone involves multiple receptors. Drug Metab Rev. 2006;38(1-2):89-116. doi: 10.1080/03602530600569877. PMID: 16684650; PMCID: PMC2423429. https://www.ncbi.nlm.nih.gov/pmc/articles/PMC2423429/.

Ortega-Calderón YN, López-Marure R. Dehydroepiandrosterone inhibits proliferation and suppresses migration of human cervical cancer cell lines. Anticancer Res. Aug. 2014;34(8):4039-44. PMID: 25075027.

Girón RA, Montaño LF, Escobar ML, López-Marure R. Dehydroepiandrosterone inhibits the proliferation and induces the death of HPV-positive and HPV-negative cervical cancer cells through an androgen- and estrogen-receptor independent mechanism. FEBS J. Oct. 2009;276(19):5598-609. doi: 10.1111/j.1742-4658.2009.07253.x. Epub Aug. 21, 2009. PMID: 19702826.

Sokolov MN, Rozhkov VV, Uspenskaya ME, Ulchenko DN, Shmygarev VI, Trukhan VM, Churakov AV, Shimanovsky NL, Fedotcheva TA. The Effects of the Steroids 5-Androstenediol and Dehydroepiandrosterone and Their Synthetic Derivatives on the Viability of K562, HeLa, and Wi-38 Cells and the Luminol-Stimulated Chemiluminescence of Peripheral Blood Mononuclear Cells from Healthy Volunteers. Biomolecules. Mar. 19, 2024;14(3):373. doi: 10.3390/biom14030373. PMID: 38540791; PMCID: PMC10967766.

Mendoza-Milla C, Valero Jiménez A, Rangel C, Lozano A, Morales V, Becerril C, Chavira R, Ruiz V, Barrera L, Montaño M, Pardo A, Selman M. Dehydroepiandrosterone has strong antifibrotic effects and is decreased in idiopathic pulmonary fibrosis. Eur Respir J. Nov. 2013;42(5):1309-21. doi: 10.1183/09031936.00027412. Epub Nov. 8, 2012. PMID: 23143540.

(56) References Cited

OTHER PUBLICATIONS

Liu L, Wang D, Li L, Ding X, Ma H. Dehydroepiandrosterone inhibits cell proliferation and improves viability by regulating S phase and mitochondrial permeability in primary rat Leydig cells. Mol Med Rep. Jul. 2016;14(1):705-14. doi: 10.3892/mmr.2016.5343. Epub May 24, 2016. PMID: 27220727; PMCID: PMC4918596.

Elgar K. (2021) Resveratrol: A review of clinical use and efficacy. Nutr. Med. J., 1 (2): 37-53.

Powrie YSL, Smith C. Central intracrine DHEA synthesis in ageing-related neuroinflammation and neurodegeneration: therapeutic potential? J Neuroinflammation. Oct. 16, 2018;15(1):289. doi: 10.1186/s12974-018-1324-0. PMID: 30326923; PMCID: PMC6192186.

Skare TL, Hauz E, de Carvalho JF. Dehydroepiandrosterone (DHEA) Supplementation in Rheumatic Diseases: A Systematic Review. Mediterr J Rheumatol. Aug. 25, 2023;34(3):292-301. doi: 10.31138/mjr.20230825.dd. PMID: 37941864; PMCID: PMC10628885.

Blatkiewicz M, Sielatycka K, Piotrowska K, Kilańczyk E. DHEA and Its Metabolites Reduce the Cytokines Involved in the Inflammatory Response and Fibrosis in Primary Biliary Cholangitis. Int J Mol Sci. Mar. 10, 2023;24(6):5301. doi: 10.3390/ijms24065301. PMID: 36982376; PMCID: PMC10049419.

Buendía-Gonzalez FO, Legorreta-Herrera M. The Similarities and Differences between the Effects of Testosterone and DHEA on the Innate and Adaptive Immune Response. Biomolecules. Nov. 27, 2022; 12(12):1768. doi: 10.3390/biom12121768. PMID: 36551196; PMCID: PMC9775255.

Suitters AJ, Shaw S, Wales MR, Porter JP, Leonard J, Woodger R, Brand H, Bodmer M, Foulkes R. Immune enhancing effects of dehydroepiandrosterone and dehydroepiandrosterone sulphate and the role of steroid sulphatase. Immunology. Jun. 1997;91(2):314-21. doi: 10.1046/j.1365-2567.1997.00254.x. PMID: 9227333; PMCID: PMC1363863.

Nguyen C, Savouret JF, Widerak M, Corvol MT, Rannou F. Resveratrol, Potential Therapeutic Interest in Joint Disorders: A Critical Narrative Review. Nutrients. Jan. 6, 2017;9(1):45. doi: 10.3390/nu9010045. PMID: 28067817; PMCID: PMC5295089.

Savjani KT, Gajar AK, Savjani JK. Drug solubility: importance and enhancement techniques. ISRN Pharm. 2012;2012:195727. doi: 10.5402/2012/195727. Epub Jul. 5, 2012. PMID: 22830056; PMCID: PMC3399483.

Sarabia-Vallejo Á, Caja MDM, Olives AI, Martín MA, Menéndez JC. Cyclodextrin Inclusion Complexes for Improved Drug Bioavailability and Activity: Synthetic and Analytical Aspects. Pharmaceutics. Sep. 19, 2023;15(9):2345. doi: 10.3390/pharmaceutics15092345. PMID: 37765313; PMCID: PMC10534465.

Jiang Y, Cheng Y, Xia M, Zhang B, Ding Q, Lu L, Wang JR, Mei X. Dehydroepiandrosterone Cocrystals with Improved Solubility and Bioavailability. Pharmaceutics. Nov. 16, 2022;14(11):2478. doi: 10.3390/pharmaceutics 14112478. PMID: 36432669; PMCID: PMC9699216.

Cyclodextrin Complexes: An Approach to Improve the Physicochemical Properties of Drugs and Applications of Cyclodextrin Complexes Yadav Vikas, B. Dutt et. al Mar. 2018, Asian Journal of Pharmaceutics http://www.asiapharmaceutics.info/index.php/ajp/article/view/2367/888.

Rabijewski M, Papierska L, Binkowska M, Maksym R, Jankowska K, Skrzypulec-Plinta W, Zgliczynski W. Supplementation of dehydroepiandrosterone (DHEA) in pre- and postmenopausal women—position statement of expert panel of Polish Menopause and Andropause Society. Ginekol Pol. 2020;91(9):554-562. doi: 10.5603/GP.2020.0091. PMID: 33030737.

Alemany M. The Roles of Androgens in Humans: Biology, Metabolic Regulation and Health. Int J Mol Sci. Oct. 8, 2022;23(19):11952. doi: 10.3390/ijms231911952. PMID: 36233256; PMCID: PMC9569951.

Csiszar A. Anti-inflammatory effects of resveratrol: possible role in prevention of age-related cardiovascular disease. Ann N Y Acad Sci. Jan. 2011;1215:117-22. doi: 10.1111/j.1749-6632.2010.05848.x. PMID: 21261649; PMCID: PMC3058481.

Nair KS, Rizza RA, O'Brien P, Dhatariya K, Short KR, Nehra A, Vittone JL, Klee GG, Basu A, Basu R, Cobelli C, Toffolo G, Dalla Man C, Tindall DJ, Melton LJ 3rd, Smith GE, Khosla S, Jensen Md. Dhea in elderly women and DHEA or testosterone in elderly men. N Engl J Med. Oct. 19, 2006;355(16):1647-59. doi: 10.1056/NEJMoa054629. PMID: 17050889.

Nissen S, Sharp RL, Panton L, Vukovich M, Trappe S, Fuller JC Jr. beta-hydroxy-beta-methylbutyrate (HMB) supplementation in humans is safe and may decrease cardiovascular risk factors. J Nutr. Aug. 2000;130(8):1937-45. doi: 10.1093/jn/130.8.1937. PMID: 10917905.

Hilary J Powers, Riboflavin (vitamin B-2) and health12, The American Journal of Clinical Nutrition, vol. 77, Issue 6, 2003, pp. 1352-1360, ISSN 0002-9165, https://doi.org/10.1093/ajcn/77.6.1352. (https://www.sciencedirect.com/science/article/pii/S0002916523057945).

Powers HJ, Hill MH, Mushtaq S, Dainty JR, Majsak-Newman G, Williams EA. Correcting a marginal riboflavin deficiency improves hematologic status in young women in the United Kingdom (RIBOFEM). Am J Clin Nutr. Jun. 2011;93(6):1274-84. doi: 10.3945/ajcn.110.008409. Epub Apr. 27, 2011. PMID: 21525198.

Clarke R, Halsey J, Lewington S, Lonn E, Armitage J, Manson JE, Bønaa KH, Spence JD, Nygård O, Jamison R, Gaziano JM, Guarino P, Bennett D, Mir F, Peto R, Collins R; B-Vitamin Treatment Trialists' Collaboration. Effects of lowering homocysteine levels with B vitamins on cardiovascular disease, cancer, and cause-specific mortality: Meta-analysis of 8 randomized trials involving 37 485 individuals. Arch Intern Med. Oct. 11, 2010;170(18):1622-31. doi: 10.1001/archinternmed.2010.348. PMID: 20937919.

Song Y, Cook NR, Albert CM, Van Denburgh M, Manson JE. Effect of homocysteine-lowering treatment with folic Acid and B vitamins on risk of type 2 diabetes in women: a randomized, controlled trial. Diabetes. Aug. 2009;58(8):1921-8. doi: 10.2337/db09-0087. Epub Jun. 2, 2009. PMID: 19491213; PMCID: PMC2712772.

Smith AD, Smith SM, de Jager CA, Whitbread P, Johnston C, Agacinski G, Oulhaj A, Bradley KM, Jacoby R, Refsum H. Homocysteine-lowering by B vitamins slows the rate of accelerated brain atrophy in mild cognitive impairment: a randomized controlled trial. PLoS One. Sep. 8, 2010;5(9):e12244. doi: 10.1371/journal.pone.0012244. PMID: 20838622; PMCID: PMC2935890.

Zeman M, Vecka M, Perlík F, Hromádka R, Staňková B, Tvrzická E, Žák A. Niacin in the Treatment of Hyperlipidemias in Light of New Clinical Trials: Has Niacin Lost its Place? Med Sci Monit. Jul. 25, 2015;21:2156-62. doi: 10.12659/MSM.893619. PMID: 26210594; PMCID: PMC4523006.

Viswanathan M, Urrutia RP, Hudson KN, Middleton JC, Kahwati LC. Folic Acid Supplementation to Prevent Neural Tube Defects: Updated Evidence Report and Systematic Review for the US Preventive Services Task Force. JAMA. Aug. 1, 2023;330(5):460-466. doi: 10.1001/jama.2023.9864. PMID: 37526714.

Shipton MJ, Thachil J. Vitamin B12 deficiency—A 21st century perspective . Clin Med (Lond). Apr. 2015;15(2):145-50. doi: 10.7861/clinmedicine.15-2-145. PMID: 25824606; PMCID: PMC4953733.

Carr AC, Maggini S. Vitamin C and Immune Function. Nutrients. Nov. 3, 2017;9(11):1211. doi: 10.3390/nu9111211. PMID: 29099763; PMCID: PMC5707683.

Xu Ze See, Wan Sieng Yeo, Agus Saptoro, A comprehensive review and recent advances of vitamin C: Overview, functions, sources, applications, market survey and processes, Chemical Engineering Research and Design, vol. 206, 2024, pp. 108-129, ISSN 0263-8762, https://doi.org/10.1016/j.cherd.2024.04.048. https://www.sciencedirect.com/science/article/pii/S026387622400251X).

Aksu T, Ünal Ş. Iron Deficiency Anemia in Infancy, Childhood, and Adolescence. Turk Arch Pediatr. Jul. 2023;58(4):358-362. doi: 10.5152/TurkArchPediatr.2023.23049. PMID: 37357449; PMCID: PMC10440944.

Skolmowska, D.; Głąbska, D. Effectiveness of Dietary Intervention with Iron and Vitamin C Administered Separately in Improving Iron Status in Young Women. Int. J. Environ. Res. Public Health 2022, 19, 11877. https://doi.org/10.3390/ijerph191911877.

Kocot J, Luchowska-Kocot D, Kiełczykowska M, Musik I, Kurzepa J. Does Vitamin C Influence Neurodegenerative Diseases and Psychiatric Disorders? Nutrients. Jun. 27, 2017;9(7):659. doi: 10.3390/nu9070659. PMID: 28654017; PMCID: PMC5537779.

(56) References Cited

OTHER PUBLICATIONS

Shastak, Y.; Pelletier, W. Pet Wellness and Vitamin A: A Narrative Overview. Animals 2024, 14, 1000. https://doi.org/10.3390/ani14071000.
Salma, Ahmad SS, Karim S, Ibrahim IM, Alkreathy HM, Alsieni M, Khan MA. Effect of Vitamin K on Bone Mineral Density and Fracture Risk in Adults: Systematic Review and Meta-Analysis. Biomedicines. May 1, 2022;10(5):1048. doi: 10.3390/biomedicines10051048. PMID: 35625785; PMCID: PMC9138595.
Rodríguez-Olleros Rodríguez C, Diaz Curiel M. Vitamin K and Bone Health: A Review on the Effects of Vitamin K Deficiency and Supplementation and the Effect of Non-Vitamin K Antagonist Oral Anticoagulants on Different Bone Parameters. J Osteoporos. Dec. 31, 2019; 2019:2069176. doi: 10.1155/2019/2069176. PMID: 31976057; PMCID: PMC6955144.
Dupuy M, Radavelli-Bagatini S, Zhong L, Dalla Via J, Zhu K, Blekkenhorst LC, Bondonno NP, Linneberg A, Bellinge JW, Schultz C, Courtney W, Prince RL, Hodgson JM, Lewis JR, Sim M. Vitamin K1 intake is associated with lower risk for all-cause and cardiovascular disease mortality in community-dwelling older Australian women. Nutr Metab Cardiovasc Dis. May 2024;34(5):1189-1197. doi: 10.1016/j.numecd.2023.12.007. Epub Dec. 16, 2023. PMID: 38342722.
Hariri E, Kassis N, Iskandar JP, Schurgers LJ, Saad A, Abdelfattah O, Bansal A, Isogai T, Harb SC, Kapadia S. Vitamin K2—a neglected player in cardiovascular health: a narrative review. Open Heart. Nov. 2021;8(2):e001715. doi: 10.1136/openhrt-2021-001715. PMID: 34785587; PMCID: PMC8596038.
Fusaro M, Cianciolo G, Brandi ML, Ferrari S, Nickolas TL, Tripepi G, Plebani M, Zaninotto M, Iervasi G, La Manna G, Gallieni M, Vettor R, Aghi A, Gasperoni L, Giannini S, Sella S, M Cheung A. Vitamin K and Osteoporosis. Nutrients. Nov. 25, 2020;12(12):3625. doi: 10.3390/nu12123625. PMID: 33255760; PMCID: PMC7760385.
Akbari S, Rasouli-Ghahroudi AA. Vitamin K and Bone Metabolism: A Review of the Latest Evidence in Preclinical Studies. Biomed Res Int. Jun. 27, 2018; 2018:4629383. doi: 10.1155/2018/4629383. PMID: 30050932; PMCID: PMC6040265.
Rizvi S, Raza ST, Ahmed F, Ahmad A, Abbas S, Mahdi F. The role of vitamin e in human health and some diseases. Sultan Qaboos Univ Med J. May 2014;14(2):e157-65. Epub Apr. 7, 2014. PMID: 24790736; PMCID: PMC3997530.
Ramanathan N, Tan E, Loh LJ, Soh BS, Yap WN. Tocotrienol is a cardioprotective agent against ageing-associated cardiovascular disease and its associated morbidities. Nutr Metab (Lond). Jan. 19, 2018;15:6. doi: 10.1186/s12986-018-0244-4. PMID: 29387138; PMCID: PMC5775572.
Xu W, Mi Y, He P, He S, Niu L. γ-Tocotrienol Inhibits Proliferation and Induces Apoptosis Via the Mitochondrial Pathway in Human Cervical Cancer Hela Cells. Molecules. Aug. 4, 2017;22(8):1299. doi: 10.3390/molecules22081299. PMID: 28777347; PMCID: PMC6152108.
Aggarwal V, Kashyap D, Sak K, Tuli HS, Jain A, Chaudhary A, Garg VK, Sethi G, Yerer MB. Molecular Mechanisms of Action of Tocotrienols in Cancer: Recent Trends and Advancements. Int J Mol Sci. Feb. 2, 2019;20(3):656. doi: 10.3390/ijms20030656. PMID: 30717416; PMCID: PMC6386883.
Ismail M, Alsalahi A, Imam MU, Ooi J, Khaza'ai H, Aljaberi MA, Shamsudin MN, Idrus Z. Safety and Neuroprotective Efficacy of Palm Oil and Tocotrienol-Rich Fraction from Palm Oil: A Systematic Review. Nutrients. Feb. 18, 2020;12(2):521. doi: 10.3390/nu12020521. PMID: 32085610; PMCID: PMC7071496.
Fu JY, Che HL, Tan DM, Teng KT. Bioavailability of tocotrienols: evidence in human studies. Nutr Metab (Lond). Jan. 13, 2014;11(1):5. doi: 10.1186/1743-7075-11-5. PMID: 24410975; PMCID: PMC3895660.
Ghazali NI, Mohd Rais RZ, Makpol S, Chin KY, Yap WN, Goon JA. Effects of tocotrienol on aging skin: A systematic review. Front Pharmacol. Oct. 10, 2022;13:1006198. doi: 10.3389/fphar.2022.1006198. PMID: 36299879; PMCID: PMC9588953.
La Fata G, Weber P, Mohajeri MH. Effects of vitamin E on cognitive performance during ageing and in Alzheimer's disease. Nutrients. Nov. 28, 2014;6(12):5453-72. doi: 10.3390/nu6125453. PMID: 25460513; PMCID: PMC4276978.
Dziedziak J, Kasarełło K, Cudnoch-Jdrzejewska A. Dietary Antioxidants in Age-Related Macular Degeneration and Glaucoma. Antioxidants (Basel). Oct. 30, 2021;10(11):1743. doi: 10.3390/antiox10111743. PMID: 34829613; PMCID: PMC8614766.
Vitamin E: Vitamin and Mineral Safety 3rd Edition (2013) Council for Responsible Nutrition, https://www.crnusa.org/sites/default/files/files/resources/08-CRNVMS3-VITAMINE.pdf.
Bikle DD. Vitamin D metabolism, mechanism of action, and clinical applications. Chem Biol. Mar. 20, 2014;21(3):319-29. doi: 10.1016/j.chembiol.2013.12.016. Epub Feb. 13, 2014. PMID: 24529992; PMCID: PMC3968073.
Ramasamy I. Vitamin D Metabolism and Guidelines for Vitamin D Supplementation. Clin Biochem Rev. Dec. 2020;41(3):103-126. doi: 10.33176/AACB-20-00006. PMID: 33343045; PMCID: PMC7731935.
Malik MZ, Latiwesh OB, Nouh F, Hussain A, Kumar S, Kaler J. Response of Parathyroid Hormone to Vitamin D Deficiency in Otherwise Healthy Individuals. Cureus. Aug. 15, 2020;12(8):e9764. doi: 10.7759/cureus.9764. PMID: 32821633; PMCID: PMC7430694.
Bikle, D. D. (2000). "Vitamin D: Production, Metabolism, and Mechanisms of Action." Endocrinology and Metabolism Clinics of North America. https://www.endotext.org/wp-content/uploads/pdfs/vitamin-d-production-metabolism-and-mechanisms-of-action.pdf.
Vitamin A and its Derivatives—Retinoic Acid and Retinoid Pharmacology George Zhu et al. 2019, DOI: 10.34297/AJBSR.2019.03.000656.
Pojednic RM, Ceglia L. The emerging biomolecular role of vitamin D in skeletal muscle. Exerc Sport Sci Rev. Apr. 2014;42(2):76-81. doi: 10.1249/JES.0000000000000013. PMID: 24508736; PMCID: PMC4369924.
Institute of Medicine (US) Committee to Review Dietary Reference Intakes for Vitamin D and Calcium; Ross AC, Taylor CL, Yaktine AL, et al., editors. Dietary Reference Intakes for Calcium and Vitamin D. Washington (DC): National Academies Press (US); 2011. Available from: https://www.ncbi.nlm.nih.gov/books/NBK56070/ doi: 10.17226/13050.
Ginde AA, Liu MC, Camargo CA Jr. Demographic differences and trends of vitamin D insufficiency in the US population, 1988-2004. Arch Intern Med. Mar. 23, 2009;169(6):626-32. doi: 10.1001/archinternmed.2008.604. PMID: 19307527; PMCID: PMC3447083.
Wacker M, Holick MF. Sunlight and Vitamin D: A global perspective for health. Dermatoendocrinol. Jan. 1, 2013;5(1):51-108. doi: 10.4161/derm.24494. PMID: 24494042; PMCID: PMC3897598.
Shastak Y and Pelletier W (2023) The role of vitamin A in non-ruminant immunology. Front. Anim. Sci. 4:1197802. doi: 10.3389/fanim.2023.1197802.
Latham CM, Brightwell CR, Keeble AR, Munson BD, Thomas NT, Zagzoog AM, Fry CS, Fry JL. Vitamin D Promotes Skeletal Muscle Regeneration and Mitochondrial Health. Front Physiol. Apr. 14, 2021;12:660498. doi: 10.3389/fphys.2021.660498. PMID: 33935807; PMCID: PMC8079814.
Ames BN, Grant WB, Willett WC. Does the High Prevalence of Vitamin D Deficiency in African Americans Contribute to Health Disparities? Nutrients. Feb. 3, 2021;13(2):499. doi: 10.3390/nu13020499. PMID: 33546262; PMCID: PMC7913332.
Sahay M, Sahay R. Rickets-vitamin D deficiency and dependency. Indian J Endocrinol Metab. Mar. 2012;16(2):164-76. doi: 10.4103/2230-8210.93732. PMID: 22470851; PMCID: PMC3313732.
Holick MF. Resurrection of vitamin D deficiency and rickets. J Clin Invest. Aug. 2006;116(8):2062-72. doi: 10.1172/JCI29449. PMID: 16886050; PMCID: PMC1523417.
Nair R, Maseeh A. Vitamin D: The "sunshine" vitamin. J Pharmacol Pharmacother. Apr. 2012;3(2):118-26. doi: 10.4103/0976-500X.95506. PMID: 22629085; PMCID: PMC3356951.
Houston DK, Marsh AP, Neiberg RH, Demons JL, Campos CL, Kritchevsky SB, Delbono O, Tooze JA. Vitamin D Supplementation and Muscle Power, Strength and Physical Performance in Older Adults: A Randomized Controlled Trial. Am J Clin Nutr. Jun. 2023;117(6):1086-1095. doi: 10.1016/j.ajcnut.2023.04.021. Epub

(56) References Cited

OTHER PUBLICATIONS

Apr. 19, 2023. Erratum in: Am J Clin Nutr. Aug. 2023;118(2):486. doi: 10.1016/j.ajcnut.2023.06.004. PMID: 37084814; PMCID: PMC10447505.

Barker T, Henriksen VT, Martins TB, Hill HR, Kjeldsberg CR, Schneider ED, Dixon BM, Weaver LK. Higher serum 25-hydroxyvitamin D concentrations associate with a faster recovery of skeletal muscle strength after muscular injury. Nutrients. Apr. 17, 2013;5(4):1253-75. doi: 10.3390/nu5041253. PMID: 23595134; PMCID: PMC3705346.

Darr D, Combs S, Dunston S, Manning T, Pinnell S. Topical vitamin C protects porcine skin from ultraviolet radiation-induced damage. Br J Dermatol. Sep. 1992;127(3):247-53. doi: 10.1111/j.1365-2133.1992.tb00122.x. PMID: 1390169. https://www.dr-jetskeultee.nl/download/common/artikel-vitamine-c-2.pdf.

Padayatty SJ, Katz A, Wang Y, Eck P, Kwon O, Lee JH, Chen S, Corpe C, Dutta A, Dutta SK, Levine M. Vitamin C as an antioxidant: evaluation of its role in disease prevention. J Am Coll Nutr. Feb. 2003;22(1):18-35. doi: 10.1080/07315724.2003.10719272. PMID: 12569111. https://www.researchgate.net/publication/10916278_Vitamin_C_as_an_Antioxidant_Evaluation_of_Its_Role_in_Disease_Prevention.

Knapen MH, Drummen NE, Smit E, Vermeer C, Theuwissen E. Three-year low-dose menaquinone-7 supplementation helps decrease bone loss in healthy postmenopausal women. Osteoporos Int. Sep. 2013;24(9):2499-507. doi: 10.1007/s00198-013-2325-6. Epub Mar. 23, 2013. PMID: 23525894. https://www.researchgate.net/publication/236077775_Three-year_low-dose_menaquinone-7_supplementation_helps_decrease_bone_loss_in_healthy_postmenopausal_women.

Chen HG, Sheng LT, Zhang YB, Cao AL, Lai YW, Kunutsor SK, Jiang L, Pan A. Association of vitamin K with cardiovascular events and all-cause mortality: a systematic review and meta-analysis. Eur J Nutr. Sep. 2019;58(6):2191-2205. doi: 10.1007/s00394-019-01998-3. Epub May 22, 2019. PMID: 31119401. https://research-information.bris.ac.uk/ws/portalfiles/portal/196102033/Manuscript_clear_version_EJON_D_18_00980_20190520.pdf.

Esfandiari, M., Bagheri, H., Mirarab-Razi, V., Mirarab Razi, S., Rashidinejad, A. (2023). Vitamin E. In: Jafari, S.M., Rashidinejad, A., Simal-Gandara, J. (eds) Handbook of Food Bioactive Ingredients. Springer, Cham. https://doi.org/10.1007/978-3-031-28109-9_24 https://dokumen.pub/qdownload/handbook-of-food-bioactive-ingredients-properties-and-applications-1nbsped-9783031281082-9783031281099.html.

Prasad K. Tocotrienols and cardiovascular health. Curr Pharm Des. 2011;17(21):2147-54. doi: 10.2174/138161211796957418. PMID: 21774782. https://www.eurekaselect.com/article/19696.

Zaaboul F, Liu Y. Vitamin E in foodstuff: Nutritional, analytical, and food technology aspects. Compr Rev Food Sci Food Saf. Mar. 2022;21(2):964-998. doi: 10.1111/1541-4337.12924. Epub Feb. 18, 2022. PMID: 35181987. https://www.researchgate.net/publication/358724225_Vitamin_E_in_foodstuff_Nutritional_analytical_and_food_technology_aspects.

Meydani SN, Barklund MP, Liu S, Meydani M, Miller RA, Cannon JG, Morrow FD, Rocklin R, Blumberg JB. Vitamin E supplementation enhances cell-mediated immunity in healthy elderly subjects. Am J Clin Nutr. Sep. 1990;52(3):557-63. doi: 10.1093/ajcn/52.3.557. PMID: 2203257. https://www.researchgate.net/publication/20953316_Vitamin_E_supplementation_enhances_cell-mediated_immunity_in_healthy_elderly.

Christen WG, Glynn RJ, Chew EY, Buring JE. Vitamin E and age-related macular degeneration in a randomized trial of women. Ophthalmology. Jun. 2010;117(6):1163-8. doi: 10.1016/j.ophtha.2009.10.043. Epub Feb. 13, 2010. PMID: 20153900; PMCID: PMC2881167.https://pmc.ncbi.nlm.nih.gov/articles/PMC2881167/.

Lauter K, Arnold A. Analysis of CYP27B1, encoding 25-hydroxyvitamin D-1alpha-hydroxylase, as a candidate tumor suppressor gene in primary and severe secondary/tertiary hyperparathyroidism. J Bone Miner Res. Jan. 2009;24(1):102-4. doi: 10.1359/jbmr.080903. PMID: 18767934; PMCID: PMC2689078. https://pmc.ncbi.nlm.nih.gov/articles/pmid/18767934/.

Pike JW, Meyer MB. The vitamin D receptor: new paradigms for the regulation of gene expression by 1,25-dihydroxyvitamin D(3). Endocrinol Metab Clin North Am. Jun. 2010;39(2):255-69, table of contents. doi: 10.1016/j.ecl.2010.02.007. PMID: 20511050; PMCID: PMC2879406. https://pmc.ncbi.nlm.nih.gov/articles/pmid/20511050/.

Jimenez-Lara AM, Aranda A. The vitamin D receptor binds in a transcriptionally inactive form and without a defined polarity on a retinoic acid response element. FASEB J. Jun. 1999;13(9):1073-81. doi: 10.1096/fasebj.13.9.1073. PMID: 10336890. https://www.academia.edu/4897854/The_vitamin_D_receptor_binds_in_a_transcriptionally_inactive_form_and_without_a_defined_polarity_on_a_retinoic_acid_response_element.

Ross AC, Manson JE, Abrams SA, Aloia JF, Brannon PM, Clinton SK, Durazo-Arvizu RA, Gallagher JC, Gallo RL, Jones G, Kovacs CS, Mayne ST, Rosen CJ, Shapses SA. The 2011 report on dietary reference intakes for calcium and vitamin D from the Institute of Medicine: what clinicians need to know. J Clin Endocrinol Metab. Jan. 2011;96(1):53-8. doi: 10.1210/jc.2010-2704. Epub Nov. 29, 2010. PMID: 21118827; PMCID: PMC3046611. https://www.sciencedirect.com/science/article/abs/pii/S0002822311000058.

Houston DK, Cesari M, Ferrucci L, Cherubini A, Maggio D, Bartali B, Johnson MA, Schwartz GG, Kritchevsky SB. Association between vitamin D status and physical performance: the InCHIANTI study. J Gerontol A Biol Sci Med Sci. Apr. 2007;62(4):440-6. doi: 10.1093/gerona/62.4.440. PMID: 17452740; PMCID: PMC2645652. https://pmc.ncbi.nlm.nih.gov/articles/PMC2645652/.

The Journals of Gerontology Series A: Biological Sciences and Medical Sciences. Ginde, A. A., Liu, M. C., & Camargo, C. A. Jr. (2012)."Demographic Differences and Trends of Vitamin D Insufficiency in the US Population, 1988-2004." Archives of Internal Medicine https://pmc.ncbi.nlm.nih.gov/articles/pmid/19307527/.

Christakos S, Dhawan P, Porta A, Mady LJ, Seth T. Vitamin D and intestinal calcium absorption. Mol Cell Endocrinol. Dec. 5, 2011;347(1-2):25-9. doi: 10.1016/j.mce.2011.05.038. Epub Jun. 1, 2011. PMID: 21664413; PMCID: PMC3405161.https://pmc.ncbi.nlm.nih.gov/articles/pmid/21664413/.

Lips P, van Schoor NM. The effect of vitamin D on bone and osteoporosis. Best Pract Res Clin Endocrinol Metab. Aug. 2011;25(4):585-91. doi: 10.1016/j.beem.2011.05.002. PMID: 21872800. https://www.sciencedirect.com/science/article/abs/pii/S1521690X11000418.

Tomlinson PB, Joseph C, Angioi M. Effects of vitamin D supplementation on upper and lower body muscle strength levels in healthy individuals. A systematic review with meta-analysis. J Sci Med Sport. Sep. 2015;18(5):575-80. doi: 10.1016/j.jsams.2014.07.022. Epub Aug. 11, 2014. PMID: 25156880. https://www.sciencedirect.com/science/article/abs/pii/S1440244014001637.

McGeachie JK, Grounds MD. Initiation and duration of muscle precursor replication after mild and severe injury to skeletal muscle of mice. An autoradiographic study. Cell Tissue Res. Apr. 1987;248(1):125-30. doi: 10.1007/BF01239972. PMID: 3568112. https://www.academia.edu/24341952/Initiation_and_duration_of_muscle_precursor_replication_after_mild_and_severe_injury_to_skeletal_muscle_of_mice.

Skeletal Muscle Satellite Cell Characteristics in Young and Older Men and Women After Heavy Resistance Strength Training, S.M. Roth, G.F. Martel, F.M. Ivey, J.T. Lemmer, B.L. Tracy, E.J. Metter, B.F. Hurley, M.A. Rogers https://paulogentil.com/pdf/TREINO%20DE%20FORA/Hipertrofia/Muscle%20Satellite%20Cell%20Characteristics%20in%20Young%20and%20Older%20Men%20and%20Women%20After%20RT.pdf.

Damas F, Phillips S, Vechin FC, Ugrinowitsch C. A review of resistance training-induced changes in skeletal muscle protein synthesis and their contribution to hypertrophy. Sports Med. Jun. 2015;45(6):801-7. doi: 10.1007/s40279-015-0320-0. PMID: 25739559.

Mori R, Yokokawa T, Fujita S. Modified expression of vitamin D receptor and CYP27B1 in denervation-induced muscle atrophy. Biochem Biophys Res Commun. Aug. 27, 2020;529(3):733-739. doi: 10.1016/j.bbrc.2020.05.205. Epub Jul. 19, 2020. PMID: 32736700. https://www.sciencedirect.com/science/article/abs/pii/S0006291X20311529?via%3Dihub.

(56) References Cited

OTHER PUBLICATIONS

Damas F, Phillips SM, Libardi CA, Vechin FC, Lixandrão ME, Jannig PR, Costa LA, Bacurau AV, Snijders T, Parise G, Tricoli V, Roschel H, Ugrinowitsch C. Resistance training-induced changes in integrated myofibrillar protein synthesis are related to hypertrophy only after attenuation of muscle damage. J Physiol. Sep. 15, 2016;594(18):5209-22. doi: 10.1113/JP272472. Epub Jul. 9, 2016. PMID: 27219125; PMCID: PMC5023708. https://pmc.ncbi.nlm.nih.gov/articles/PMC5023708/.

Stephanie Hody, Jean-Louis Croisier, Thierry Bury, Bernard Rogister and Pierre Leprince, Eccentric Muscle Contractions: Risks and Benefits 2019, doi: 10.3389/fphys.2019.00536 https://www.frontiersin.org/journals/physiology/articles/10.3389/fphys.2019.00536/full.

Fridén J, Sjöström M, Ekblom B. Myofibrillar damage following intense eccentric exercise in man. Int J Sports Med. Aug. 1983;4(3):170-6. doi: 10.1055/s-2008-1026030. PMID: 6629599. https://www.researchgate.net/publication/16565929_Myofibrillar_Damage_Following_Intense_Eccentric_Exercise_in_Man.

Zammit PS, Golding JP, Nagata Y, Hudon V, Partridge TA, Beauchamp JR. Muscle satellite cells adopt divergent fates: a mechanism for self-renewal? J Cell Biol. Aug. 2, 2004;166(3):347-57. doi: 10.1083/jcb.200312007. Epub Jul. 26, 2004. PMID: 15277541; PMCID: PMC2172269. https://pmc.ncbi.nlm.nih.gov/articles/pmid/15277541/.

Girgis CM, Mokbel N, Cha KM, Houweling PJ, Abboud M, Fraser DR, Mason RS, Clifton-Bligh RJ, Gunton JE. The vitamin D receptor (VDR) is expressed in skeletal muscle of male mice and modulates 25-hydroxyvitamin D (25OHD) uptake in myofibers. Endocrinology. Sep. 2014;155(9):3227-37. doi: 10.1210/en.2014-1016. Epub Jun. 20, 2014. PMID: 24949660; PMCID: PMC4207908. https://www.researchgate.net/.

S.Welle et. al., Myofibrillar protein synthesis in young and old men May 1, 1993 https://doi.org/10.1152/ajpendo.1993.264.5.E693 https://journals.physiology.org/doi/abs/10.1152/ajpendo.1993.264.5.E693?rfr_dat=cr_pub++0pubmed&url_ver=Z39.88-2003&rfr_id=ori%3Arid%3Acrossref.org.

Chabi B, Ljubicic V, Menzies KJ, Huang JH, Saleem A, Hood DA. Mitochondrial function and apoptotic susceptibility in aging skeletal muscle. Aging Cell. Jan. 2008;7(1):2-12. doi: 10.1111/j.1474-9726.2007.00347.x. Epub Nov. 19, 2007. PMID: 18028258. https://hal.inrae.fr/hal-02665183v1/document.

Gouspillou G, Sgarioto N, Kapchinsky S, Purves-Smith F, Norris B, Pion CH, Barbat-Artigas S, Lemieux F, Taivassalo T, Morais JA, Aubertin-Leheudre M, Hepple RT. Increased sensitivity to mitochondrial permeability transition and myonuclear translocation of endonuclease G in atrophied muscle of physically active older humans. FASEB J. Apr. 2014;28(4):1621-33. doi: 10.1096/fj.13-242750. Epub Dec. 26, 2013. PMID: 24371120. https://www.researchgate.net/.

Conboy IM, Conboy MJ, Smythe GM, Rando TA. Notch-mediated restoration of regenerative potential to aged muscle. Science. Nov. 28, 2003;302(5650):1575-7. doi: 10.1126/science.1087573. PMID: 14645852. https://glennfoundation.org/pdf/Conboy-et-al-(2003)-Science.pdf.

Van Langenberg DR, Gibson PR. Factors associated with physical and cognitive fatigue in patients with Crohn's disease: a cross-sectional and longitudinal study. Inflamm Bowel Dis. Jan. 2014;20(1):115-25. doi: 10.1097/01.MIB.0000437614.91258.70. PMID: 24297056. https://academic.oup.com/ibdjournal/article-abstract/20/1/115/4578866?redirectedFrom=fulltext&login=false.

Lulu Ren et. al., Vitamin D supplementation rescues simvastatin induced myopathy in mice via improving mitochondrial cristae shape, Toxicology and Applied Pharmacology, vol. 401, 2020, 115076,ISSN 0041-008X,https://doi.org/10.1016/j.taap.2020.115076. (https://www.sciencedirect.com/science/article/pii/S0041008X20302003) https://www.sciencedirect.com/science/article/abs/pii/S0041008X20302003?via%3Dihub.

Lykstad J, Sharma S. Biochemistry, Water Soluble Vitamins. [Updated Mar. 6, 2023]. In: StatPearls [Internet]. Treasure Island (FL): StatPearls Publishing; Jan. 2024. Available from: https://www.ncbi.nlm.nih.gov/books/NBK538510/ (No Article for 2024) 2019 https://www.researchgate.net/publication/331425417_Biochemistry_Water_Soluble_Vitamins.

Abdal Dayem A, Choi HY, Yang GM, Kim K, Saha SK, Cho SG. The Anti-Cancer Effect of Polyphenols against Breast Cancer and Cancer Stem Cells: Molecular Mechanisms. Nutrients. Sep. 21, 2016;8(9):581. doi: 10.3390/nu8090581. PMID: 27657126; PMCID: PMC5037565.

Akinwumi BC, Bordun KM, Anderson HD. Biological Activities of Stilbenoids. Int J Mol Sci. Mar. 9, 2018;19(3):792. doi: 10.3390/ijms19030792. PMID: 29522491; PMCID: PMC5877653.

Salehi B, Mishra AP, Nigam M, Sener B, Kilic M, Sharifi-Rad M, Fokou PVT, Martins N, Sharifi-Rad J. Resveratrol: A Double-Edged Sword in Health Benefits. Biomedicines. Sep. 9, 2018;6(3):91. doi: 10.3390/biomedicines6030091. PMID: 30205595; PMCID: PMC6164842.

Esatbeyoglu T, Ewald P, Yasui Y, Yokokawa H, Wagner AE, Matsugo S, Winterhalter P, Rimbach G. Chemical Characterization, Free Radical Scavenging, and Cellular Antioxidant and Anti-Inflammatory Properties of a Stilbenoid-Rich Root Extract of Vitis vinifera. Oxid Med Cell Longev. 2016;2016:8591286. doi: 10.1155/2016/8591286. Epub Dec. 14, 2015. PMID: 26788254; PMCID: PMC4691607.

Gal R, Deres L, Toth K, Halmosi R, Habon T. The Effect of Resveratrol on the Cardiovascular System from Molecular Mechanisms to Clinical Results. Int J Mol Sci. Sep. 21, 2021;22(18):10152. doi: 10.3390/ijms221810152. PMID: 34576315; PMCID: PMC8466271.

Swanson D, Block R, Mousa SA. Omega-3 fatty acids EPA and DHA: health benefits throughout life. Adv Nutr. Jan. 2012;3(1):1-7. doi: 10.3945/an.111.000893. Epub Jan. 5, 2012. PMID: 22332096; PMCID: PMC3262608.

Malaguarnera L. Influence of Resveratrol on the Immune Response. Nutrients. Apr. 26, 2019;11(5):946. doi: 10.3390/nu11050946. PMID: 31035454; PMCID: PMC6566902.

Rahman MH, Akter R, Bhattacharya T, Abdel-Daim MM, Alkahtani S, Arafah MW, Al-Johani NS, Alhoshani NM, Alkeraishan N, Alhenaky A, Abd-Elkader OH, El-Seedi HR, Kaushik D, Mittal V. Resveratrol and Neuroprotection: Impact and Its Therapeutic Potential in Alzheimer's Disease. Front Pharmacol. Dec. 30, 2020;11:619024. doi: 10.3389/fphar.2020.619024. PMID: 33456444; PMCID: PMC7804889.

Arbo BD, André-Miral C, Nasre-Nasser RG, Schimith LE, Santos MG, Costa-Silva D, Muccillo-Baisch AL, Hort MA. Resveratrol Derivatives as Potential Treatments for Alzheimer's and Parkinson's Disease. Front Aging Neurosci. Apr. 17, 2020;12:103. doi: 10.3389/fnagi.2020.00103. PMID: 32362821; PMCID: PMC7180342.

Lee, I.H. Mechanisms and disease implications of sirtuin-mediated autophagic regulation.Exp Mol Med 51, 1-11 (2019). https://doi.org/10.1038/s12276-019-0302-7.

Carter LG, D'Orazio JA, Pearson KJ. Resveratrol and cancer: focus on in vivo evidence. Endocr Relat Cancer. May 6, 2014;21(3):R209-25. doi: 10.1530/ERC-13-0171. PMID: 24500760; PMCID: PMC4013237.

Boxu Ren, Marabeth Xin-Yi Kwah, Cuiliu Liu, Zhaowu Ma, Muthu K. Shanmugam, Lingwen Ding, Xiaoqiang Xiang, Paul Chi-Lui Ho, Lingzhi Wang, Pei Shi Ong, Boon Cher Goh, Resveratrol for cancer therapy: Challenges and future perspectives, Cancer Letters, vol. 515, 2021, pp. 63-72, ISSN 0304-3835, https://doi.org/10.1016/j.canlet.2021.05.001. (https://www.sciencedirect.com/science/article/pii/S030438352100197X).

Hong, Y., Kang, H., Kim, H. et al. Inhibition of cell proliferation by a resveratrol analog in human pancreatic and breast cancer cells. Exp Mol Med 41, 151-160 (2009). https://doi.org/10.3858/emm.2009.41.3.018.

Dempsey M, Rockwell MS, Wentz LM. The influence of dietary and supplemental omega-3 fatty acids on the omega-3 index: A scoping review. Front Nutr. Jan. 19, 2023;10:1072653. doi: 10.3389/fnut.2023.1072653. PMID: 36742439; PMCID: PMC9892774.

Dyck GJB, Raj P, Zieroth S, Dyck JRB, Ezekowitz JA. The Effects of Resveratrol in Patients with Cardiovascular Disease and Heart Failure: A Narrative Review. Int J Mol Sci. Feb. 19, 2019;20(4):904. doi: 10.3390/ijms20040904. PMID: 30791450; PMCID: PMC6413130.

(56) References Cited

OTHER PUBLICATIONS

Shaito A, Posadino AM, Younes N, Hasan H, Halabi S, Alhababi D, Al-Mohannadi A, Abdel-Rahman WM, Eid AH, Nasrallah GK, Pintus G. Potential Adverse Effects of Resveratrol: A Literature Review. Int J Mol Sci. Mar. 18, 2020;21(6):2084. doi: 10.3390/ijms21062084. PMID: 32197410; PMCID: PMC7139620.

Koushki M, Amiri-Dashatan N, Ahmadi N, Abbaszadeh HA, Rezaei-Tavirani M. Resveratrol: A miraculous natural compound for diseases treatment. Food Sci Nutr. Oct. 26, 2018;6(8):2473-2490. doi: 10.1002/fsn3.855. PMID: 30510749; PMCID: PMC6261232.

Krysiak R, Szkróbka W, Okopień B. Dehydroepiandrosterone potentiates the effect of vitamin D on thyroid autoimmunity in euthyroid women with autoimmune thyroiditis: A pilot study. Clin Exp Pharmacol Physiol. Feb. 2021;48(2):195-202. doi: 10.1111/1440-1681.13410. Epub Oct. 16, 2020. PMID: 33007106. https://onlinelibrary.wiley.com/doi/10.1111/1440-1681.13410.

Berman, A.Y., Motechin, R.A., Wiesenfeld, M.Y. et al. The therapeutic potential of resveratrol: a review of clinical trials. npj Precision Onc 1, 35 (2017). https://doi.org/10.1038/s41698-017-0038-6.

Bradamante S, Barenghi L, Villa A. Cardiovascular protective effects of resveratrol. Cardiovasc Drug Rev. 2004 Fall;22(3):169-88. doi: 10.1111/j.1527-3466. 2004. Tb 00139.x. PMID: 15492766.

U.S.U. Din, M.S. Brook et.al, A double-blind placebo controlled trial into the impacts of HMB supplementation and exercise on free-living muscle protein synthesis, muscle mass and function, in older adults, Clinical Nutrition, vol. 38, Issue 5, 2019, pp. 2071-2078, ISSN 0261-5614, https://doi.org/10.1016/j.clnu.2018.09.025.

Lin MH, Hung CF, Sung HC, Yang SC, Yu HP, Fang JY. The bioactivities of resveratrol and its naturally occurring derivatives on skin. J Food Drug Anal. Mar. 15, 2021;29(1):15-38. doi: 10.38212/2224-6614.1151. PMID: 35696226; PMCID: PMC9261849.

Calder PC. Omega-3 fatty acids and inflammatory processes: from molecules to man. Biochem Soc Trans. Oct. 15, 2017;45(5):1105-1115. doi: 10.1042/BST20160474. Epub Sep. 12, 2017. PMID: 28900017. https://eprints.soton.ac.uk/415428/1/Calder_BST_Revision.pdf.

Songlan Gao, Honglei Zhang, Na Li, Lijuan Zhang, Zhe Zhu, Changlu Xu, Pterostilbene: A natural neuroprotective stilbene with anti-Alzheimer's disease properties, Journal of Pharmaceutical Analysis, 2024, 101043, ISSN 2095-1779, https://doi.org/10.1016/j.jpha.2024.101043. (https://www.sciencedirect.com/science/article/pii/S2095177924001400).

Lahiani, A.; Brand-Yavin, A.; Yavin, E.; Lazarovici, P. Neuroprotective Effects of Bioactive Compounds and MAPK Pathway Modulation in "Ischemia"-Stressed PC12 Pheochromocytoma Cells. Brain Sci. 2018, 8, 32. https://doi.org/10.3390/brainsci8020032.

Pervin M, Unno K, Ohishi T, Tanabe H, Miyoshi N, Nakamura Y. Beneficial Effects of Green Tea Catechins on Neurodegenerative Diseases. Molecules. May 29, 2018;23(6):1297. doi: 10.3390/molecules23061297. PMID: 29843466; PMCID: PMC6099654.

Yan Z, Zhong Y, Duan Y, Chen Q, Li F. Antioxidant mechanism of tea polyphenols and its impact on health benefits. Anim Nutr. Jun. 2020;6(2):115-123. doi: 10.1016/j.aninu.2020.01.001. Epub Jan. 23, 2020. PMID: 32542190; PMCID: PMC7283370.

Zamani M, Kelishadi MR, Ashtary-Larky D, Amirani N, Goudarzi K, Torki IA, Bagheri R, Ghanavati M, Asbaghi O. The effects of green tea supplementation on cardiovascular risk factors: A systematic review and meta-analysis. Front Nutr. Jan. 10, 2023;9:1084455. doi: 10.3389/fnut.2022.1084455. PMID: 36704803; PMCID: PMC9871939.

Chung M, Zhao N, Wang D, Shams-White M, Karlsen M, Cassidy A, Ferruzzi M, Jacques PF, Johnson EJ, Wallace TC. Dose-Response Relation between Tea Consumption and Risk of Cardiovascular Disease and All-Cause Mortality: A Systematic Review and Meta-Analysis of Population-Based Studies. Adv Nutr. Jul. 1, 2020;11(4):790-814. doi: 10.1093/advances/nmaa010. PMID: 32073596.

Nagao T, Komine Y, Soga S, Meguro S, Hase T, Tanaka Y, Tokimitsu I. Ingestion of a tea rich in catechins leads to a reduction in body fat and malondialdehyde-modified LDL in men. Am J Clin Nutr. Jan. 2005;81(1):122-9. doi: 10.1093/ajcn/81.1.122. PMID: 15640470.

Malar DS, Prasanth MI, Brimson JM, Sharika R, Sivamaruthi BS, Chaiyasut C, Tencomnao T. Neuroprotective Properties of Green Tea (*Camellia sinensis*) in Parkinson's Disease: A Review. Molecules. Aug. 27, 2020;25(17):3926. doi: 10.3390/molecules25173926. PMID: 32867388; PMCID: PMC7504552.

Yu J, Song P, Perry R, Penfold C, Cooper AR. The Effectiveness of Green Tea or Green Tea Extract on Insulin Resistance and Glycemic Control in Type 2 Diabetes Mellitus: A Meta-Analysis. Diabetes Metab J. Aug. 2017;41(4):251-262. doi: 10.4093/dmj.2017.41.4.251. PMID: 28868822; PMCID: PMC5583402.

Cao SY, Zhao CN, Gan RY, Xu XY, Wei XL, Corke H, Atanasov AG, Li HB. Effects and Mechanisms of Tea and Its Bioactive Compounds for the Prevention and Treatment of Cardiovascular Diseases: An Updated Review. Antioxidants (Basel). Jun. 6, 2019;8(6):166. doi: 10.3390/antiox8060166.

Prasanth MI, Sivamaruthi BS, Chaiyasut C, Tencomnao T. A Review of the Role of Green Tea (*Camellia sinensis*) in Antiphotoaging, Stress Resistance, Neuroprotection, and Autophagy. Nutrients. Feb. 23, 2019;11(2):474. doi: 10.3390/nu11020474. PMID: 30813433; PMCID: PMC6412948.

National Research Council (US) Subcommittee on the Tenth Edition of the Recommended Dietary Allowances. Recommended Dietary Allowances: 10th Edition. Washington (DC): National Academies Press (US); 1989. 6, Protein and Amino Acids. Available from: https://www.ncbi.nlm.nih.gov/books/NBK234922/.

Waskiw-Ford M, Hannaian S, Duncan J, Kato H, Abou Sawan S, Locke M, Kumbhare D, Moore D. Leucine-Enriched Essential Amino Acids Improve Recovery from Post-Exercise Muscle Damage Independent of Increases in Integrated Myofibrillar Protein Synthesis in Young Men. Nutrients. Apr. 11, 2020;12(4):1061. doi: 10.3390/nu12041061. PMID: 32290521; PMCID: PMC7231404.

Ferrando AA, Wolfe RR, Hirsch KR, Church DD, Kviatkovsky SA, Roberts MD, Stout JR, Gonzalez DE, Sowinski RJ, Kreider RB, Kerksick CM, Burd NA, Pasiakos SM, Ormsbee MJ, Arent SM, Arciero PJ, Campbell BI, VanDusseldorp TA, Jager R, Willoughby DS, Kalman DS, Antonio J. International Society of Sports Nutrition Position Stand: Effects of essential amino acid supplementation on exercise and performance. J Int Soc Sports Nutr. Dec. 2023;20(1):2263409. doi: 10.1080/15502783.2023.2263409. Epub Oct. 6, 2023. PMID: 37800468; PMCID: PMC10561576.

Morales AJ, Nolan JJ, Nelson JC, Yen SS. Effects of replacement dose of dehydroepiandrosterone in men and women of advancing age. J Clin Endocrinol Metab. Jun. 1994;78(6):1360-7. doi: 10.1210/jcem.78.6.7515387. Erratum in: J Clin Endocrinol Metab Sep. 1995;80(9):2799. PMID: 7515387. https://www.researchgate.net/publication/15684493_Effects_of_replacement_dose_DHEA_in_men_and_women_of_advancing_age.

Frank Q Nuttall.; Diet and the Diabetic Patient. Diabetes Care Mar. 1, 1983; 6 (2): 197-207. https://doi.org/10.2337/diacare.6.2.197.

Pahlavani N, Jafari M, Sadeghi O, Rezaei M, Rasad H, Rahdar HA, Entezari MH. L-arginine supplementation and risk factors of cardiovascular diseases in healthy men: a double-blind randomized clinical trial. F1000Res. Dec. 12, 2014;3:306. doi: 10.12688/f1000research.5877.2. PMID: 28751963; PMCID: PMC5510020.

Kiani AK, Bonetti G, Medori MC, Caruso P, Manganotti P, Fioretti F, Nodari S, Connelly ST, Bertelli M. Dietary supplements for improving nitric-oxide synthesis. J Prev Med Hyg. Oct. 17, 2022;63(2 Suppl 3):E239-E245. doi: 10.15167/2421-4248/jpmh2022.63.2S3.2766. PMID: 36479475; PMCID: PMC9710401.

Abukhodair AW, Abukhudair W, Algarni MS. The Effects of L-Arginine in Hypertensive Patients: A Literature Review. Cureus. Dec. 17, 2021;13(12):e20485. doi: 10.7759/cureus.20485. PMID: 35070535; PMCID: PMC8761475.

Viribay A, Burgos J, Fernández-Landa J, Seco-Calvo J, Mielgo-Ayuso J. Effects of Arginine Supplementation on Athletic Performance Based on Energy Metabolism: A Systematic Review and Meta-Analysis. Nutrients. May 2, 2020;12(5):1300. doi: 10.3390/nu12051300. PMID: 32370176; PMCID: PMC7282262.

Blum A, Hathaway L, Mincemoyer R, Schenke WH, Kirby M, Csako G, Waclawiw MA, Panza JA, Cannon RO 3rd. Oral L-argi-

(56) References Cited

OTHER PUBLICATIONS nine in patients with coronary artery disease on medical management. Circulation. May 9, 2000;101(18):2160-4. doi: 10.1161/01.cir.101.18.2160. PMID: 10801756.

Szondi DC, Wong JK, Vardy LA, Cruickshank SM. Arginase Signalling as a Key Player in Chronic Wound Pathophysiology and Healing. Front Mol Biosci. Oct. 29, 2021;8: 773866. doi: 10.3389/fmolb.2021.773866. PMID: 34778380; PMCID: PMC8589187.

Hanna M, Jaqua E, Nguyen V, Clay J. B Vitamins: Functions and Uses in Medicine. Perm J. Jun. 29, 2022;26(2):89-97. doi: 10.7812/TPP/21.204. Epub Jun. 17, 2022. PMID: 35933667; PMCID: PMC9662251.

Day E, Bentham PW, Callaghan R, Kuruvilla T, George S. Thiamine for prevention and treatment of Wernicke-Korsakoff Syndrome in people who abuse alcohol. Cochrane Database Syst Rev. Jul. 1, 2013;2013(7):CD004033. doi: 10.1002/14651858.CD004033.pub3. PMID: 23818100; PMCID: PMC7163251.

Yamanaka G, Suzuki S, Morishita N, Takeshita M, Kanou K, Takamatsu T, Morichi S, Ishida Y, Watanabe Y, Go S, Oana S, Kawashima H. Experimental and Clinical Evidence of the Effectiveness of Riboflavin on Migraines. Nutrients. Jul. 29, 2021;13(8):2612. doi: 10.3390/nu13082612. PMID: 34444772; PMCID: PMC8401857.

Homocysteine Lowering with Folic Acid and B Vitamins in Vascular Disease Author: The Heart Outcomes Prevention Evaluation (HOPE) 2 Investigators*Author Info & Affiliations, Published Apr. 13, 2006, N Engl J Med 2006; 354:1567-1577 DOI: 10.1056/NEJMoa060900 vol. 354 No. 15.

Wiciński M, Adamkiewicz D, Adamkiewicz M, Śniegocki M, Podhorecka M, Szychta P, Malinowski B. Impact of Vitamin D on Physical Efficiency and Exercise Performance—A Review. Nutrients. Nov. 19, 2019;11(11):2826. doi: 10.3390/nu11112826. PMID: 31752277; PMCID: PMC6893541.

Chiang CM, Ismaeel A, Griffis RB, Weems S. Effects of Vitamin D Supplementation on Muscle Strength in Athletes: A Systematic Review. J Strength Cond Res. Feb. 2017;31(2):566-574. doi: 10.1519/JSC.0000000000001518. PMID: 27379960.

Alterations in myocardial signal transduction due to aging and chronic dynamic exercise, David A. Roth, Cynthia D. White, Deborah A. Podolin, and Robert S. Mazzeo Jan. 1, 1998 https://doi.org/10.1152/jappl.1998.84.1.177.

Mackey AL, Kjaer M. Connective tissue regeneration in skeletal muscle after eccentric contraction-induced injury. J Appl Physiol (1985). Mar. 1, 2017;122(3):533-540. doi: 10.1152/japplphysiol.00577.2016. Epub Aug. 25, 2016. PMID: 27562842.

Kuroda, S., Adachi, N., Kusakabe, R. et al. Developmental fates of shark head cavities reveal mesodermal contributions to tendon progenitor cells in extraocular muscles.Zoological Lett 7, 3 (2021). https://doi.org/10.1186/s40851-021-00170-2.

Hardy D, Besnard A, Latil M, Jouvion G, Briand D, Thepenier C, Pascal Q, Guguin A, Gayraud-Morel B, Cavaillon JM, Tajbakhsh S, Rocheteau P, Chrétien F. Comparative Study of Injury Models for Studying Muscle Regeneration in Mice. PLoS One. Jan. 25, 2016;11(1):e0147198. doi: 10.1371/journal.pone.0147198. PMID: 26807982; PMCID: PMC4726569.

Traber MG, Stevens JF. Vitamins C and E: beneficial effects from a mechanistic perspective. Free Radic Biol Med. Sep. 1, 2011;51(5):1000-13. doi: 10.1016/j.freeradbiomed.2011.05.017. Epub May 25, 2011. PMID: 21664268; PMCID: PMC3156342.

Tieland M, Trouwborst I, Clark BC. Skeletal muscle performance and ageing. J Cachexia Sarcopenia Muscle. Feb. 2018;9(1):3-19. doi: 10.1002/jcsm.12238. Epub Nov. 19, 2017. PMID: 29151281; PMCID: PMC5803609.

Chen W, Chen Y, Liu Y, Wang X. Autophagy in muscle regeneration: potential therapies for myopathies. J Cachexia Sarcopenia Muscle. Jun. 2022;13(3):1673-1685. doi: 10.1002/jcsm.13000. Epub Apr. 17, 2022. PMID: 35434959; PMCID: PMC9178153.

Yang W, Hu P. Skeletal muscle regeneration is modulated by inflammation. J Orthop Translat. Feb. 7, 2018;13:25-32. doi: 10.1016/j.jot.2018.01.002. PMID: 29662788; PMCID: PMC5892385.

Chen YF, Lee CW, Wu HH, Lin WT, Lee OK. Immunometabolism of macrophages regulates skeletal muscle regeneration. Front Cell Dev Biol. Sep. 6, 2022;10:948819. doi: 10.3389/fcell.2022.948819. PMID: 36147742; PMCID: PMC9485946.

Mackey AL, Kjaer M. The breaking and making of healthy adult human skeletal muscle in vivo. Skelet Muscle. Nov. 7, 2017;7(1):24. doi: 10.1186/s13395-017-0142-x. PMID: 29115986; PMCID: PMC5688812.

Forcina L, Cosentino M, Musarò A. Mechanisms Regulating Muscle Regeneration: Insights into the Interrelated and Time-Dependent Phases of Tissue Healing. Cells. May 22, 2020;9(5):1297. doi: 10.3390/cells9051297. PMID: 32456017; PMCID: PMC7290814.

Morroni, J., Benedetti, A., Esposito, L. et al. Injury-experienced satellite cells retain long-term enhanced regenerative capacity. Stem Cell Res Ther 14, 246 (2023). https://doi.org/10.1186/s13287-023-03492-4.

McCarthy JJ, Mula J, Miyazaki M, Erfani R, Garrison K, Farooqui AB, Srikuea R, Lawson BA, Grimes B, Keller C, Van Zant G, Campbell KS, Esser KA, Dupont-Versteegden EE, Peterson CA. Effective fiber hypertrophy in satellite cell-depleted skeletal muscle. Development. Sep. 2011;138(17):3657-66. doi: 10.1242/dev.068858. PMID: 21828094; PMCID: PMC3152923.

Manole, E.; Gaina, G.; Ceafalan, L.C.; Hinescu, M.E. Skeletal Muscle Stem Cells in Aging: Asymmetric/Symmetric Division Switching. Symmetry 2022, 14, 2676. https://doi.org/10.3390/sym14122676.

Srikuea R, Zhang X, Park-Sarge OK, Esser KA. VDR and CYP27B1 are expressed in C2C12 cells and regenerating skeletal muscle: potential role in suppression of myoblast proliferation. Am J Physiol Cell Physiol. Aug. 15, 2012;303(4):C396-405. doi: 10.1152/ajpcell.00014.2012. Epub May 30, 2012. PMID: 22648952; PMCID: PMC3422988.

Srikuea R, Hirunsai M. Effects of intramuscular administration of 1α,25(OH)2D3 during skeletal muscle regeneration on regenerative capacity, muscular fibrosis, and angiogenesis. J Appl Physiol (1985). Jun. 15, 2016;120(12):1381-93. doi: 10.1152/japplphysiol.01018.2015. Epub Mar. 31, 2016. PMID: 27032903.

Tillin NA, Pain MT, Folland JP. Short-term training for explosive strength causes neural and mechanical adaptations. Exp Physiol. May 2012;97(5):630-41. doi: 10.1113/expphysiol.2011.063040. Epub Feb. 3, 2012. PMID: 22308164.

Janssen I, Heymsfield SB, Wang ZM, Ross R. Skeletal muscle mass and distribution in 468 men and women aged 18-88 yr. J Appl Physiol (1985). Jul. 2000;89(1):81-8. doi: 10.1152/jappl.2000.89.1.81. Erratum in: J Appl Physiol (1985). May 15, 2014;116(10):1342. PMID: 10904038.

Wilkinson DJ, Piasecki M, Atherton PJ. The age-related loss of skeletal muscle mass and function: Measurement and physiology of muscle fibre atrophy and muscle fibre loss in humans. Ageing Res Rev. Nov. 2018;47:123-132. doi: 10.1016/j.arr.2018.07.005. Epub Jul. 23, 2018. PMID: 30048806; PMCID: PMC6202460.

Chen, W., Zhao, H. & Li, Y. Mitochondrial dynamics in health and disease: mechanisms and potential targets. Sig Transduct Target Ther 8, 333 (2023). https://doi.org/10.1038/s41392-023-01547-9.

Chen X, Ji Y, Liu R, Zhu X, Wang K, Yang X, Liu B, Gao Z, Huang Y, Shen Y, Liu H, Sun H. Mitochondrial dysfunction: roles in skeletal muscle atrophy. J Transl Med. Jul. 26, 2023;21(1):503. doi: 10.1186/s12967-023-04369-z. PMID: 37495991; PMCID: PMC10373380.

Leduc-Gaudet JP, Picard M, St-Jean Pelletier F, Sgarioto N, Auger MJ, Vallée J, Robitaille R, St-Pierre DH, Gouspillou G. Mitochondrial morphology is altered in atrophied skeletal muscle of aged mice. Oncotarget. Jul. 20, 2015;6(20):17923-37. doi: 10.18632/oncotarget.4235. PMID: 26053100; PMCID: PMC4627226.Liu et al., 2020.

Bengal E, Perdiguero E, Serrano AL, Muñoz-Cánoves P. Rejuvenating stem cells to restore muscle regeneration in aging. F1000Res. Jan. 25, 2017;6:76. doi: 10.12688/f1000research.9846.1. PMID: 28163911; PMCID: PMC5271918.

Enhanced Satellite Cell Activity in Aging Skeletal Muscle after Manual Acupuncture-Induced Injury, Sonya K. Sobrian et.al. 2014, DOI: 10.4236/cm.2014.51004.

Shefer G, Van de Mark DP, Richardson JB, Yablonka-Reuveni Z. Satellite-cell pool size does matter: defining the myogenic potency

(56) References Cited

OTHER PUBLICATIONS of aging skeletal muscle. Dev Biol. Jun. 1, 2006;294(1):50-66. doi: 10.1016/j.ydbio.2006.02.022. Epub Mar. 22, 2006. PMID: 16554047; PMCID: PMC2710453.

Stearns-Reider KM, D'Amore A, Beezhold K, Rothrauff B, Cavalli L, Wagner WR, Vorp DA, Tsamis A, Shinde S, Zhang C, Barchowsky A, Rando TA, Tuan RS, Ambrosio F. Aging of the skeletal muscle extracellular matrix drives a stem cell fibrogenic conversion. Aging Cell. Jun. 2017;16(3):518-528. doi: 10.1111/acel.12578. Epub Mar. 30, 2017. PMID: 28371268; PMCID: PMC5418187.

Guntarat Chinvattanachot, Daniel Rivas, Gustavo Duque, Mechanisms of muscle cells alterations and regeneration decline during aging, Ageing Research Reviews, vol. 102, 2024, 102589, ISSN 1568-1637, https://doi.org/10.1016/j.arr.2024.102589.

Careccia G, Mangiavini L, Cirillo F. Regulation of Satellite Cells Functions during Skeletal Muscle Regeneration: A Critical Step in Physiological and Pathological Conditions. Int J Mol Sci. Dec. 29, 2023;25(1):512. doi: 10.3390/ijms25010512. PMID: 38203683; PMCID: PMC10778731.

Agoncillo M, Yu J, Gunton JE. The Role of Vitamin D in Skeletal Muscle Repair and Regeneration in Animal Models and Humans: A Systematic Review. Nutrients. Oct. 16, 2023;15(20):4377. doi: 10.3390/nu15204377. PMID: 37892452; PMCID: PMC10609905.

Srikuea R, Hirunsai M, Charoenphandhu N. Regulation of vitamin D system in skeletal muscle and resident myogenic stem cell during development, maturation, and ageing. Sci Rep. May 19, 2020;10(1):8239. doi: 10.1038/s41598-020-65067-0. PMID: 32427932; PMCID: PMC7237670.

Fujita S, Volpi E. Nutrition and sarcopenia of ageing. Nutr Res Rev. Jun. 2004;17(1):69-76. doi: 10.1079/NRR200481. PMID: 19079916; PMCID: PMC3183822.

Rejnmark L. Effects of vitamin d on muscle function and performance: a review of evidence from randomized controlled trials. Ther Adv Chronic Dis. Jan. 2011;2(1):25-37. doi: 10.1177/2040622310381934. PMID: 23251739; PMCID: PMC3513873.

Wei, J., Zhu, A. & Ji, J.S. A Comparison Study of Vitamin D Deficiency among Older Adults in China and the United States. Sci Rep 9, 19713 (2019). https://doi.org/10.1038/s41598-019-56297-y.

Gunton JE, Girgis CM. Vitamin D and muscle. Bone Rep. Apr. 18, 2018;8:163-167. doi: 10.1016/j.bonr.2018.04.004. PMID: 29963601; PMCID: PMC6021354.

Almurdhi MM, Reeves ND, Bowling FL, Boulton AJ, Jeziorska M, Malik RA. Reduced Lower-Limb Muscle Strength and vol. in Patients With Type 2 Diabetes in Relation to Neuropathy, Intramuscular Fat, and Vitamin D Levels. Diabetes Care. Mar. 2016;39(3):441-7. doi: 10.2337/dc15-0995. Epub Jan. 6, 2016. PMID: 26740641; PMCID: PMC5317239.

Matta Reddy A, Iqbal M, Chopra H, Urmi S, Junapudi S, Bibi S, Kumar Gupta S, Nirmala Pangi V, Singh I, Abdel-Daim MM. Pivotal role of vitamin D in mitochondrial health, cardiac function, and human reproduction. Excli J. Jul. 20, 2022;21:967-990. doi: 10.17179/excli2022-4935. PMID: 36110560; PMCID: PMC9441677.

Salles, J., Chanet, A., Guillet, C. et al. Vitamin D status modulates mitochondrial oxidative capacities in skeletal muscle: role in sarcopenia. Commun Biol 5, 1288 (2022). https://doi.org/10.1038/s42003-022-04246-3.

Chang-Chien, J., Huang, JL., Tsai, HJ. et al. Vitamin D ameliorates particulate matter induced mitochondrial damages and calcium dyshomeostasis in BEAS-2B human bronchial epithelial cells. Respir Res 25, 321 (2024). https://doi.org/10.1186/s12931-024-02951-7.

Henry C Lukaski, Magnesium, zinc, and chromium nutriture and physical activity 123,The American Journal of Clinical Nutrition, vol. 72, Issue 2,2000, pp. 585S-593S,ISSN 0002-9165, https://doi.org/10.1093/ajcn/72.2.585S.

Vitamin D: Metabolism, Molecular Mechanism of Action, and Pleiotropic Effects, Sylvia Christakos. Et. al. Dec. 17, 2015https://doi.org/10.1152/physrev.00014.2015.

Cristina Russo Et. al,Antioxidative effects of vitamin D in muscle dysfunction,Redox Experimental Medicine, vol. 2023, Issue 1,2023,ISSN 2755-158X,https://doi.org/10.1530/REM-23-0013. (https://www.sciencedirect.com/science/article/pii/S2755158X23000118).

Barbieri E, Sestili P. Reactive oxygen species in skeletal muscle signaling. J Signal Transduct. 2012;2012:982794. doi: 10.1155/2012/982794. Epub Dec. 5, 2011. PMID: 22175016; PMCID: PMC3235811.

Han YY, Hsu SH, Su TC. Association between Vitamin D Deficiency and High Serum Levels of Small Dense LDL in Middle-Aged Adults. Biomedicines. Apr. 24, 2021;9(5):464. doi: 10.3390/biomedicines9050464. PMID: 33923190; PMCID: PMC8145029.

Rosa AC, Corsi D, Cavi N, Bruni N, Dosio F. Superoxide Dismutase Administration: A Review of Proposed Human Uses. Molecules. Mar. 25, 2021;26(7):1844. doi: 10.3390/molecules26071844. PMID: 33805942; PMCID: PMC8037464.

Lian D, Chen MM, Wu H, Deng S, Hu X. The Role of Oxidative Stress in Skeletal Muscle Myogenesis and Muscle Disease. Antioxidants (Basel). Apr. 11, 2022;11(4):755. doi: 10.3390/antiox11040755. PMID: 35453440; PMCID: PMC9026549.

Esteca MV, Severino MB, Silvestre JG, Palmeira Dos Santos G, Tamborlin L, Luchessi AD, Moriscot AS, Gustafsson ÅB, Baptista IL. Loss of Parkin Results in Altered Muscle Stem Cell Differentiation during Regeneration. Int J Mol Sci. Oct. 28, 2020;21(21):8007. doi: 10.3390/ijms21218007. PMID: 33126429; PMCID: PMC7662548.

Grimley Evans J, Malouf R, Huppert F, van Niekerk JK. Dehydroepiandrosterone (DHEA) supplementation for cognitive function in healthy elderly people. Cochrane Database Syst Rev. Oct. 18, 2006;2006(4):CD006221. doi: 10.1002/14651858. CD006221. PMID: 17054283; PMCID: PMC8988513.

Weiss EP, Shah K, Fontana L, Lambert CP, Holloszy JO, Villareal DT. Dehydroepiandrosterone replacement therapy in older adults: 1- and 2-y effects on bone. Am J Clin Nutr. May 2009;89(5):1459-67. doi: 10.3945/ajcn.2008.27265. Epub Mar. 25, 2009. PMID: 19321570; PMCID: PMC2677000.

Wang Y, Zeng D, Wei L, Chen J, Li H, Wen L, Huang G, Dai Z, Luo J, Sun J, Xi Q, Zhang Y, Chen T. Effects of emulsifiers on lipid metabolism and performance of yellow-feathered broilers. BMC Vet Res. Jun. 7, 2024;20(1):246. doi: 10.1186/s12917-024-04095-8. PMID: 38849831; PMCID: PMC11157903.

Therapeutic Use of Citrulline in Cardiovascular Disease, M J Romero et. al, Sep. 2006Cardiovascular Drug Reviews 24(3-4):275-90 DOI: 10.1111/j.1527-3466.2006.00275.x, Source PubMed.

Tipton KD, Rasmussen BB, Miller SL, Wolf SE, Owens-Stovall SK, Petrini BE, Wolfe RR. Timing of amino acid-carbohydrate ingestion alters anabolic response of muscle to resistance exercise. Am J Physiol Endocrinol Metab. Aug. 2001;281(2):E197-206. doi: 10.1152/ajpendo.2001.281.2.E197. PMID: 11440894.

Wilson, G.J., Wilson, J.M. & Manninen, A.H. Effects of beta-hydroxy-beta-methylbutyrate (HMB) on exercise performance and body composition across varying levels of age, sex, and training experience: A review. Nutr Metab (Lond) 5, 1 (2008). https://doi.org/10.1186/1743-7075-5-1.

Wilson, J. M., Fitschen, P. J., Campbell, B., Wilson, G. J., Zanchi, N., Taylor, L., . . . Antonio, J. (2013). International Society of Sports Nutrition Position Stand: beta-hydroxy-beta-methylbutyrate (HMB). Journal of the International Society of Sports Nutrition, 10(1). https://doi.org/10.1186/1550-2783-10-6.

Chandrasekhar (2012) highlighted Ashwagandha's stress-relieving effects but noted that bioavailability remained a limiting factor (Indian Journal of Psychological Medicine, DOI: 10.4103/0253-7176.106022). https://pubmed.ncbi.nlm.nih.gov/23439798/.

Todorova V, Ivanov K, Delattre C, Nalbantova V, Karcheva-Bahchevanska D, Ivanova S. Plant Adaptogens—History and Future Perspectives. Nutrients. Aug. 20, 2021;13(8):2861. doi: 10.3390/nu13082861. PMID: 34445021; PMCID: PMC8398443.

Muhamad R, Akrivaki A, Papagiannopoulou G, Zavridis P, Zis P. The Role of Vitamin B6 in Peripheral Neuropathy: A Systematic Review. Nutrients. Jun. 21, 2023;15(13):2823. doi: 10.3390/nu15132823. PMID: 37447150; PMCID: PMC10343656.

Larry E. Johnson et. al Vitamin B6 Toxicity (Pyridoxine Toxicity) https://www.merckmanuals.com/professional/nutritional-disorders/vitamin-deficiency-dependency-and-toxicity/vitamin-b6-toxicity.

(56) References Cited

OTHER PUBLICATIONS

Hemminger A, Wills BK. Vitamin B6 Toxicity. [Updated Feb. 7, 2023]. In: StatPearls [Internet]. Treasure Island (FL): StatPearls Publishing; Jan. 2024. Available from: https://www.ncbi.nlm.nih.gov/books/NBK554500/.
Francien H. van Nederveen et. al (2007) Dietary Supplement-Induced Vitamin D Intoxication, https://www.nejm.org/doi/pdf/10.1056/NEJMc063341. N Engl J Med 2007; 357:308-309 DOI: 10.1056/NEJMc063341.
Andrès E, Lorenzo-Villalba N, Terrade JE, Mendez-Bailon M. Fat-Soluble Vitamins A, D, E, and K: Review of the Literature and Points of Interest for the Clinician. J Clin Med. Jun. 21, 2024;13(13):3641. doi: 10.3390/jcm13133641. PMID: 38999209; PMCID: PMC11242131.
HMB supplementation helps preserve muscle mass and strength in older adults, effectively addressing sarcopenia, as detailed in the Journal of Nutrition, Health & Aging. Oktaviana, J., Zanker, J., Vogrin, S. et al. The Effect of β-Hydroxy- β-Methylbutyrate (HMB) on Sarcopenia and Functional Frailty in Older Persons: A Systematic Review. J Nutr Health Aging 23, 145-150 (2019). https://doi.org/10.1007/s12603-018-1153-y.
Nissen SL, Sharp RL. Effect of dietary supplements on lean mass and strength gains with resistance exercise: a meta-analysis. J Appl Physiol (1985). Feb. 2003;94(2):651-9. doi: 10.1152/japplphysiol.00755.2002. Epub Oct. 25, 2002. PMID: 12433852.
Wilson GJ, Wilson JM, Manninen AH. Effects of beta-hydroxy-beta-methylbutyrate (HMB) on exercise performance and body composition across varying levels of age, sex, and training experience: A review. Nutr Metab (Lond). Jan. 3, 2008;5:1. doi: 10.1186/1743-7075-5-1. PMID: 18173841; PMCID: PMC2245953.
Wittholz, K., Fetterplace, K., Ali Abdelhamid, Y. et al. β-Hydroxy-β-methylbutyrate (HMB) supplementation and functional outcomes in multi-trauma patients: a study protocol for a pilot randomised clinical trial (BOOST trial). Pilot Feasibility Stud 8, 21 (2022). https://doi.org/10.1186/s40814-022-00990-9.
Wilson, J.M., Fitschen, P.J., Campbell, B. et al. International Society of Sports Nutrition Position Stand: beta-hydroxy-beta-methylbutyrate (HMB). J Int Soc Sports Nutr 10, 6 (2013). https://doi.org/10.1186/1550-2783-10-6.
Vachharajani VT, Liu T, Wang X, Hoth JJ, Yoza BK, McCall CE. Sirtuins Link Inflammation and Metabolism. J Immunol Res. 2016;2016:8167273. doi: 10.1155/2016/8167273. Epub Jan. 20, 2016. PMID: 26904696; PMCID: PMC4745579.
Lopresti AL, Smith SJ, Malvi H, Kodgule R. An investigation into the stress-relieving and pharmacological actions of an ashwagandha (*Withania somnifera*) extract: A randomized, double-blind, placebo-controlled study. Medicine (Baltimore). Sep. 2019;98(37):e17186. doi: 10.1097/MD.0000000000017186. PMID: 31517876; PMCID: PMC6750292.
Duncan MJ, Clarke ND. The Effect of Acute Rhodiola rosea Ingestion on Exercise Heart Rate, Substrate Utilisation, Mood State, and Perceptions of Exertion, Arousal, and Pleasure/Displeasure in Active Men. J Sports Med (Hindawi Publ Corp). 2014;2014:563043. doi: 10.1155/2014/563043. Epub Apr. 27, 2014. PMID: 26464892; PMCID: PMC4590898.
Dimpfel W, Schombert L, Panossian AG. Assessing the Quality and Potential Efficacy of Commercial Extracts of Rhodiola rosea L. by Analyzing the Salidroside and Rosavin Content and the Electrophysiological Activity in Hippocampal Long-Term Potentiation, a Synaptic Model of Memory. Front Pharmacol. May 24, 2018;9:425. doi: 10.3389/fphar.2018.00425. PMID: 29881348; PMCID: PMC5976749.
Bernatoniene J, Jakstas V, Kopustinskiene DM. Phenolic Compounds of Rhodiola rosea L. as the Potential Alternative Therapy in the Treatment of Chronic Diseases. Int J Mol Sci. Jul. 31, 2023;24(15):12293. doi: 10.3390/ijms241512293. PMID: 37569669; PMCID: PMC10418374.
Wang S, Feng Y, Zheng L, He P, Tan J, Cai J, Wu M, Ye X. Rosavin: Research Advances in Extraction and Synthesis, Pharmacological Activities and Therapeutic Effects on Diseases of the Characteristic Active Ingredients of Rhodiola rosea L. Molecules. Nov. 3, 2023;28(21):7412. doi: 10.3390/molecules28217412. PMID: 37959831; PMCID: PMC10648587.
Gou Ping Ma et.al Front. Pharmacol., Dec. 3, 2018, Rhodiola rosea L. Improves Learning and Memory Function: Preclinical Evidence and Possible Mechanisms Sec. Ethnopharmacology vol. 9—2018 | https://doi.org/10.3389/fphar.2018.01415.
Zhong, Z., Han, J., Zhang, J., Xiao, Q., Hu, J., & Chen, L. (2018). Pharmacological activities, mechanisms of action, and safety of salidroside in the central nervous system. Drug Design, Development and Therapy, 12, 1479-1489. https://doi.org/10.2147/DDDT.S160776.
Palmeri A, Mammana L, Tropea MR, Gulisano W, Puzzo D. Salidroside, a Bioactive Compound of Rhodiola Rosea, Ameliorates Memory and Emotional Behavior in Adult Mice. J Alzheimers Dis. Feb. 26, 2016;52(1):65-75. doi: 10.3233/JAD-151159. PMID: 26967223.
Ting Zhu, Hui Liu, Shiman Gao et al. Brain Network Homeostasis and Plasticity of Salidroside for Achieving Neuroprotection and Treating Psychiatric Sequelae Stemming from Stress, Mar. 17, 2023, Preprint (Version 1) available at Research Square [https://doi.org/10.21203/rs.3.rs-2408379/v1].
Salidroside, a Bioactive Compound of Rhodiola Rosea, Ameliorates Memory and Emotional Behavior in Adult Mice, Agostino Palmeri et. al, : 26967223 DOI: 10.3233/JAD-151159.
Phenolic Compounds of Rhodiola rosea L. as the Potential Alternative Therapy in the Treatment of Chronic Diseases, Jurga Bernatoniene, PMCID: PMC10418374 PMID: 37569669, https://pmc.ncbi.nlm.nih.gov/articles/PMC10418374/.
Panossian et al. (2007), a review in Phytomedicine, discussing various adaptogens and their effects on stress resilience, including rhodionin's role. https://doi.org/10.1016/j.phymed.2018.09.204.
Ivanova Stojcheva E, Quintela JC. The Effectiveness of Rhodiola rosea L. Preparations in Alleviating Various Aspects of Life-Stress Symptoms and Stress-Induced Conditions—Encouraging Clinical Evidence. Molecules. Jun. 17, 2022;27(12):3902. doi: 10.3390/molecules27123902. PMID: 35745023; PMCID: PMC9228580.
Chiang, H.-M.; Chen, H.-C.; Wu, C.-S.; Wu, P.-Y .; and Wen, K.-C. (2015) "Rhodiola plants: Chemistry and biological activity," Journal of Food and Drug Analysis: vol. 23 : Iss. 3 , Article 17.https://doi.org/10.1016/j.jfda.2015.04.007.
Rhodiola rosea: A Therapeutic Candidate on Cardiovascular Diseases, Yingqing Chen et. al Feb. 2022(2):1-14 DOI: 10.1155/2022/1348795 https://www.researchgate.net/publication/358902379_Rhodiola_rosea_A_Therapeutic_Candidate_on_Cardiovascular_Diseases.
The Clinical Efficacy and Safety of Tulsi in Humans: A Systematic Review of the Literature, Negar Jamshidi et.al, https://onlinelibrary.wiley.com/doi/10.1155/2017/9217567.
Ocimum sanctum Linn. A reservoir plant for therapeutic applications: An overview Priyabrata Pattanayak et al. PMCID: PMC3249909 PMID: 22228948, https://pmc.ncbi.nlm.nih.gov/articles/PMC3249909/.
Holy Basil (*Ocimum sanctum*)—A Comprehensive Review of Traditional Uses, Phytochemical Composition, Medicinal Properties and Future Directions Jul. 2023The Journal of Agricultural Education and Extension 3(11):136-151.
Lin, Ming-Hsien; Hung, Chi-Feng; Sung, Hsin-Ching; Yang, Shih-Chun; Yu, Huang-Ping; and Fang, Jia-You (2021) "The Bioactivities of Resveratrol and Its Naturally Occurring Derivatives on Skin," Journal of Food and Drug Analysis: vol. 29 : Iss. 1 , Article 2. Available at: https://doi.org/10.38212/2224-6614.1151.
Ravishankar B, Shukla VJ. Indian systems of medicine: a brief profile. Afr J Tradit Complement Altern Med. Feb. 16, 2007;4(3):319-37. doi: 10.4314/ajtcam.v4i3.31226. PMID: 20161896; PMCID: PMC2816487.
A randomized, double-blind, placebo-controlled trial investigating the effects of an *Ocimum tenuiflorum* (Holy Basil) extract (HolixerTM) on stress, mood, and sleep in adults experiencing stress. Clinical Trial article, Front. Nutr., Sep. 1, 2022, Sec. Nutrition, Psychology and Brain Health vol. 9—2022 | https://doi.org/10.3389/fnut.2022.965130.

(56) References Cited

OTHER PUBLICATIONS

Effect of Ocimum Sanctum Linn. In Stress Induced Gastric Ulcers in Rats, Ayesha Vaseem et. al., ISSN: 2319-5886, International Journal of Medical Research & Health Sciences © 2012-202410. 5958/2319-5886.2015.00098.3.

Roumanille, R., Vernus, B., Brioche, T. et al. Acute and chronic effects of Rhaponticum carthamoides and Rhodiola rosea extracts supplementation coupled to resistance exercise on muscle protein synthesis and mechanical power in rats. J Int Soc Sports Nutr 17, 58 (2020). https://doi.org/10.1186/s12970-020-00390-5.

Plant Adaptogens History and Future Perspectives, Velislava Todorova et. al, Nutrients, 2021 DOI: 10.3390/nu13082861.

Wysokińska H, Śliwiński T. The Essential Oils of Rhaponticum carthamoides Hairy Roots and Roots of Soil-Grown Plants: Chemical Composition and Antimicrobial, Anti-Inflammatory, and Antioxidant Activities. Oxid Med Cell Longev. 2016; 2016:8505384. doi: 10.1155/2016/8505384. Epub Dec. 18, 2016. PMID: 28074117; PMCID: PMC5203915. https://pmc.ncbi.nlm.nih.gov/articles/PMC5203915/.

"Some immunotropic effects of Rhaponticum carthamoides" Ewa Skopińska-Różewska, Aleksander Wasiutyński, Krzysztof Pastewka, et al.Central-European Journal of Immunology, 2010, https://www.termedia.pl/Journal/-10/pdf-15408-40?filename=Some+immunotropic.pdf.

Ecdysterone and Turkesterone—Compounds with Prominent Potential in Sport and Healthy Nutrition, Velislava Todorova et.al 2024 doi No. 10.3390/nu16091382 , https://www.mdpi.com/2775730.

Skała E, Rijo P, Garcia C, Sitarek P, Kalemba D, Toma M, Szemraj J, Pytel D, Wysokińska H, Śliwiński T. The Essential Oils of Rhaponticum carthamoides Hairy Roots and Roots of Soil-Grown Plants: Chemical Composition and Antimicrobial, Anti-Inflammatory, and Antioxidant Activities. Oxid Med Cell Longev. 2016; 2016:8505384. doi: 10.1155/2016/8505384. Epub Dec. 18, 2016. PMID: 28074117; PMCID: PMC5203915.

Edyta Biskup 2013, Journal of Medicinal Plants Research vol. 7(11), pp. 687-695, Mar. 17, 2013 Available online at http://www.academicjournals.org/JMPR DOI:10.5897/JMPR012.1061 ISSN 1996-0875 © 2013 Academic Journals.

Skała E, Sitarek P, Różalski M, Krajewska U, Szemraj J, Wysokińska H, Śliwiński T. Antioxidant and DNA Repair Stimulating Effect of Extracts from Transformed and Normal Roots of Rhaponticum carthamoides against Induced Oxidative Stress and DNA Damage in CHO Cells. Oxid Med Cell Longev. 2016; 2016:5753139. doi: 10.1155/2016/5753139. Epub Feb. 29, 2016. PMID: 27034736; PMCID: PMC4789442.

Dibenzocyclooctadiene Lignans from Schisandra chinensis with Anti-Inflammatory and Antioxidant Activity, Michal Rybnikar et al., Published in: International Journal of Molecular 2024, DOI: 10.3390/ijms2506346, https://www.mdpi.com/1422-0067/25/6/3465.

Antioxidant Effects of Schisandra chinensis Fruits and Their Active Constituents Dalia M. Kopustinskiene et. al, Antioxidants 2021, 10(4), 620; https://doi.org/10.3390/antiox10040620.

Essential Nutrients for Bone Health and a Review of their Availability in the Average North American Diet, Charles T. Price et al., The Open Orthopaedics Journal • Apr. 5, 2012 Ψ Research Article Ψ DOI: 10.2174/1874325001206010143.

Villareal DT, Holloszy JO, Kohrt WM. Effects of DHEA replacement on bone mineral density and body composition in elderly women and men. Clin Endocrinol (Oxf). Nov. 2000;53(5):561-8. doi: 10.1046/j.1365-2265.2000.01131.x. PMID: 11106916. https://onlinelibrary.wiley.com/doi/epdf/10.1046/j.1365-2265.2000.01131.x.

Zinc is an Antioxidant and Anti-Inflammatory Agent: Its Role in Human Health, Ananda S Prasad et. al, DOI: 10.3389/fnut.2014.00014 PMID: 25988117, PMCID: PMC4429650.

Pelczyńska, M., Moszak, M., & Bogdański, P. (2022). The Role of Magnesium in the Pathogenesis of Metabolic Disorders. Nutrients, 14(9), 1714. DOI: 10.3390/nu14091714 PMID: 35565682 | PMCID: PMC9103223.

Essential Nutrient Interactions: Does Low or Suboptimal Magnesium Status Interact with Vitamin D and/or Calcium Status? Andrea Rosanoff et.al , Advances in Nutrition vol. 7, Issue 1, Jan. 2016, pp. 25-43. https://doi.org/10.3945/an.115.008631.

DiNicolantonio, J. J., Liu, J., & O'Keefe, J. H. (2018). Magnesium for the prevention and treatment of cardiovascular disease. Open Heart, 5(2), e000775.DOI: 10.1136/openhrt-2018-000775 PMCID: PMC6045762 | PMID: 30018772.

Skolmowska D, Głąbska D. Effectiveness of Dietary Intervention with Iron and Vitamin C Administered Separately in Improving Iron Status in Young Women. Int J Environ Res Public Health. Sep. 20, 2022; 19(19):11877. doi: 10.3390/ijerph191911877. PMID: 36231177; PMCID: PMC9564482.

Wessels I, Maywald M, Rink L. Zinc as a Gatekeeper of Immune Function. Nutrients. Nov. 25, 2017;9(12):1286. doi: 10.3390/nu9121286. PMID: 29186856; PMCID: PMC5748737.

Chemek M, Kadi A, Merenkova S, Potoroko I, Messaoudi I. Improving Dietary Zinc Bioavailability Using New Food Fortification Approaches: A Promising Tool to Boost Immunity in the Light of COVID-19. Biology (Basel). Mar. 29, 2023;12(4):514. doi: 10.3390/biology12040514. PMID:.

Groenendijk I, van Delft M, Versloot P, van Loon LJC, de Groot LCPGM. Impact of magnesium on bone health in older adults: A systematic review and meta-analysis. Bone. Jan. 2022;154:116233. doi: 10.1016/j.bone.2021.116233. Epub Oct. 16, 2021. PMID: 34666201.

Uberti F, Morsanuto V, Ruga S, Galla R, Farghali M, Notte F, Bozzo C, Magnani C, Nardone A, Molinari C. Study of Magnesium Formulations on Intestinal Cells to Influence Myometrium Cell Relaxation. Nutrients. Feb. 22, 2020;12(2):573. doi: 10.3390/nu12020573. PMID: 32098378; PMCID: PMC7071389.

Piskin E, Cianciosi D, Gulec S, Tomas M, Capanoglu E. Iron Absorption: Factors, Limitations, and Improvement Methods. ACS Omega. Jun. 10, 2022;7(24):20441-20456. doi: 10.1021/acsomega.2c01833. PMID: 35755397; PMCID: PMC9219084.

Hallberg, L., & Hulthén, L. (2000). "Prediction of dietary iron absorption: an algorithm for calculating absorption and bioavailability of dietary iron." The American Journal of Clinical Nutrition, 71(5), 1147-1160. DOI: 10.1093/ajcn/71.5.1147. ScienceDirect link.

Jacob, R.H., Afify, A.S., Shanab, S.M. et al. Chelated amino acids: biomass sources, preparation, properties, and biological activities. Biomass Conv. Bioref. 14, 2907-2921 (2024). https://doi.org/10.1007/s13399-022-02333-3.

Sarah Anderson, Elizabeth Farrington,Magnesium Treatment in Pediatric Patients, Journal of Pediatric Health Care, vol. 35, Issue 5, 2021, pp. 564-571,ISSN 0891-5245, https://doi.org/10.1016/j.pedhc.2021.03.003. (https://www. sciencedirect.com/science/article/pii/S0891524521000511).

Maggio M, De Vita F, Lauretani F, Nouvenne A, Meschi T, Ticinesi A, Dominguez LJ, Barbagallo M, Dall'aglio E, Ceda GP. The Interplay between Magnesium and Testosterone in Modulating Physical Function in Men. Int J Endocrinol. 2014;2014:525249. doi: 10.1155/2014/525249. Epub Mar. 3, 2014. PMID: 24723948; PMCID: PMC3958794.

Wu CC, Li CJ, Lin LT, Wen ZH, Cheng JT, Tsui KH. Examining the Effects of Nutrient Supplementation on Metabolic Pathways via Mitochondrial Ferredoxin in Aging Ovaries. Nutrients. May 13, 2024;16(10): 1470. doi: 10.3390/nu16101470. PMID: 38794708; PMCID: PMC11123998.

Howard JM. Ginseng enhances the effectiveness of DHEA. CMAJ. Apr. 11, 2006;174(8):1134. doi: 10.1503/cmaj.1050252. PMID: 16606968; PMCID: PMC1421460.

Dominguez, L.J.; Veronese, N.; Barbagallo, M. Magnesium and the Hallmarks of Aging. Nutrients 2024, 16, 496. https://doi.org/10.3390/nu16040496.

Barbagallo M, Veronese N, Dominguez LJ. Magnesium in Aging, Health and Diseases. Nutrients. Jan. 30, 2021;13(2):463. doi: 10.3390/nu13020463. PMID: 33573164; PMCID: PMC7912123.

Mohammadizad T, Taherpour K, Ghasemi HA, Shirzadi H, Tavakolinasab F, Nazaran MH. Potential benefits of advanced chelate-based trace minerals in improving bone mineralization, antioxidant status, immunity, and gene expression modulation in

(56) References Cited

OTHER PUBLICATIONS heat-stressed broilers. PLoS One. Oct. 2, 2024;19(10):e0311083. doi: 10.1371/journal.pone.0311083. PMID: 39356694; PMCID: PMC11446444.

Razavi M, Jamilian M, Kashan ZF, Heidar Z, Mohseni M, Ghandi Y, Bagherian T, Asemi Z. Selenium Supplementation and the Effects on Reproductive Outcomes, Biomarkers of Inflammation, and Oxidative Stress in Women with Polycystic Ovary Syndrome. Horm Metab Res. Mar. 2016;48(3):185-90. doi: 10.1055/s-0035-1559604. Epub Aug. 12, 2015. PMID: 26267328.

Kim K, Wactawski-Wende J, Michels KA, et al. Dietary minerals, reproductive hormone levels and sporadic anovulation: associations in healthy women with regular menstrual cycles. British Journal of Nutrition. 2018;120(1):81-89. doi:10.1017/S0007114518000818.

Wei BZ, Li L, Dong CW, Tan CC; Alzheimer's Disease Neuroimaging Initiative; Xu W. The Relationship of Omega-3 Fatty Acids with Dementia and Cognitive Decline: Evidence from Prospective Cohort Studies of Supplementation, Dietary Intake, and Blood Markers. Am J Clin Nutr. Jun. 2023;117(6):1096-1109. doi:.

Bradberry JC, Hilleman DE. Overview of omega-3 Fatty Acid therapies. P T. Nov. 2013;38(11):681-91. PMID: 24391388; PMCID: PMC3875260.

Larrieu T, Layé S. Food for Mood: Relevance of Nutritional Omega-3 Fatty Acids for Depression and Anxiety. Front Physiol. Aug. 6, 2018;9:1047. doi: 10.3389/fphys.2018.01047. PMID: 30127751; PMCID: PMC6087749.

The Anti-Inflammatory Role of Omega-3 Polyunsaturated Fatty Acids Metabolites in Pre-Clinical Models of Psychiatric, Neurodegenerative, and Neurological Disorders, Juliette Giacobbe et. al Front. Psychiatry, Feb. 27, 2020 Sec. Molecular Psychiatry vol. 11—2020 | https://doi.org/10.3389/fpsyt.2020.00122.

Reimers A, Ljung H. The emerging role of omega-3 fatty acids as a therapeutic option in neuropsychiatric disorders. Ther Adv Psychopharmacol. Jun. 24, 2019;9:2045125319858901. doi: 10.1177/2045125319858901. PMID: 31258889; PMCID: PMC6591664.

Stoian A, Vinereanu D, Penson PE, von Haehling S. The role of nutraceuticals in heart failure muscle wasting as a result of inflammatory activity. The International Lipid Expert Panel (ILEP) Position Paper. Arch Med Sci. Jun. 9, 2023;19(4):841-864. doi: 10.5114/aoms/167799. PMID: 37560745; PMCID: PMC10408027.

The Impact of Long-Chain Omega-3 Polyunsaturated Fatty Acid Supplementation on Body Composition, Strength, and Power in Collegiate Athletes. (2022). Journal of Exercise and Nutrition, 5(1). https://doi.org/10.53520/jen2022.103116.

Reinisalo M, Karlund A, Koskela A, Kaarniranta K, Karjalainen RO. Polyphenol Stilbenes: Molecular Mechanisms of Defence against Oxidative Stress and Aging-Related Diseases. Oxid Med Cell Longev. 2015;2015:340520. doi: 10.1155/2015/340520. Epub Jun. 9, 2015. PMID: 26180583; PMCID: PMC4477219.

Sousa C, Mendes AF. Monoterpenes as Sirtuin-1 Activators: Therapeutic Potential in Aging and Related Diseases. Biomolecules. Jun. 30, 2022;12(7):921. doi: 10.3390/biom12070921. PMID: 35883477; PMCID: PMC9313249.

Li X, Feng Y, Wang XX, Truong D, Wu YC. The Critical Role of SIRT1 in Parkinson's Disease: Mechanism and Therapeutic Considerations. Aging Dis. Dec. 1, 2020;11(6):1608-1622. doi: 10.14336/AD.2020.0216. PMID: 33269110; PMCID: PMC7673849.

Bonnefont-Rousselot D. Resveratrol and Cardiovascular Diseases. Nutrients. May 2, 2016;8(5):250. doi: 10.3390/nu8050250. PMID: 27144581; PMCID: PMC4882663.

Cicero AFG, Ruscica M, Banach M. Resveratrol and cognitive decline: a clinician perspective. Arch Med Sci. Jul. 2019;15(4):936-943. doi: 10.5114/aoms.2019.85463. Epub Jun. 19, 2019. PMID: 31360188; PMCID: PMC6657254.

Nagarajan S, Mohandas S, Ganesan K, Xu B, Ramkumar KM. New Insights into Dietary Pterostilbene: Sources, Metabolism, and Health Promotion Effects. Molecules. Sep. 25, 2022;27(19):6316. doi: 10.3390/molecules27196316. PMID: 36234852; PMCID: PMC9571692.

Cao Y, Yan Z, Zhou T, Wang G. SIRT1 Regulates Cognitive Performance and Ability of Learning and Memory in Diabetic and Nondiabetic Models. J Diabetes Res. 2017;2017:7121827. doi: 10.1155/2017/7121827. Epub Oct. 15, 2017. PMID: 29164153; PMCID: PMC5661098.

McCormack D, McFadden D. A review of pterostilbene antioxidant activity and disease modification. Oxid Med Cell Longev. 2013;2013:575482. doi: 10.1155/2013/575482. Epub Apr. 4, 2013. PMID: 23691264; PMCID: PMC3649683.

Tian R, Miao L, Cheang WS. Effects of Pterostilbene on Cardiovascular Health and Disease. Curr Issues Mol Biol. Aug. 30, 2024;46(9):9576-9587. doi: 10.3390/cimb46090569. PMID: 39329921; PMCID: PMC11430207.

Al-Dujaili EAS, Abu Hajleh MN, Chalmers R. Effects of Ginseng Ingestion on Salivary Testosterone and DHEA Levels in Healthy Females: An Exploratory Study. Nutrients. May 28, 2020;12(6):1582. doi: 10.3390/nu12061582. PMID: 32481563; PMCID: PMC7352699.

Beaudart C, Rabenda V, Simmons M, Geerinck A, Araujo De Carvalho I, Reginster JY, Amuthavalli Thiyagarajan J, Bruyère O. Effects of Protein, Essential Amino Acids, B-Hydroxy B-Methylbutyrate, Creatine, Dehydroepiandrosterone and Fatty Acid Supplementation on Muscle Mass, Muscle Strength and Physical Performance in Older People Aged 60 Years and Over. A Systematic Review on the Literature. J Nutr Health Aging. 2018;22(1):117-130. doi: 10.1007/s12603-017-0934-z. PMID: 29300431.

E-Stilbenes: General Chemical and Biological Aspects, Potential Pharmacological Activity, Based on the Nrf2 Pathway, Elaine Mendonca et. al, Pharmaceuticals 2024, 17(2), 232; https://doi.org/10.3390/ph17020232.

Eshita Sharma et.al, Front. Cell Dev. Biol., Sep. 28, 2022 Sec. Cancer Cell Biologyvol. 10—2022 | https://doi.org/10.3389/fcell.2022.1005910.

Holeček M. Beta-hydroxy-beta-methylbutyrate supplementation and skeletal muscle in healthy and muscle-wasting conditions. J Cachexia Sarcopenia Muscle. Aug. 2017;8(4):529-541. doi: 10.1002/jcsm.12208. Epub May 10, 2017. PMID: 28493406; PMCID: PMC5566641.

Liao LY, He YF, Li L, Meng H, Dong YM, Yi F, Xiao PG. A preliminary review of studies on adaptogens: comparison of their bioactivity in TCM with that of ginseng-like herbs used worldwide. Chin Med. Nov. 16, 2018;doi: 10.1186/s13020-018-0214-9. PMID: 30479654; PMCID: PMC6240259.

Panossian A, Wikman G. Effects of Adaptogens on the Central Nervous System and the Molecular Mechanisms Associated with Their Stress-Protective Activity. Pharmaceuticals (Basel). Jan. 19, 2010;3(1):188-224. doi: 10.3390/ph3010188. PMID: 27713248; PMCID: PMC3991026.

Oliynyk S, Oh S. Actoprotective effect of ginseng: improving mental and physical performance. J Ginseng Res. Apr. 2013;37(2):144-66. doi: 10.5142/jgr.2013.37.144. PMID: 23717168; PMCID: PMC3659633.

Irfan M, Kwak YS, Han CK, Hyun SH, Rhee MH. Adaptogenic effects of Panax ginsengon modulation of cardiovascular functions. J Ginseng Res. Jul. 2020;44(4):538-543. doi: 10.1016/j.jgr.2020.03.001. Epub Mar. 28, 2020. PMID: 32617033; PMCID: PMC7322748.

Understanding adaptogenic activity: specificity of the pharmacological action of adaptogens and other phytochemicals Alexander Panossian, Jun. 22, 2017, https://doi.org/10.1111/nyas.13399.

Lee R, Kim JH, Kim WW, Hwang SH, Choi SH, Kim JH, Cho IH, Kim M, Nah SY. Emerging evidence that ginseng components improve cognition in subjective memory impairment, mild cognitive impairment, and early Alzheimer's disease dementia. J Ginseng Res. May 2024;48(3):245-252. doi: 10.1016/j.jgr.2024.02.002. Epub Feb. 17, 2024. PMID: 38707644; PMCID: PMC11068985.

Laird E, Ward M, McSorley E, Strain JJ, Wallace J. Vitamin D and bone health: potential mechanisms. Nutrients. Jul. 2010;2(7):693-724. doi: 10.3390/nu2070693. Epub Jul. 5, 2010. PMID: 22254049; PMCID: PMC3257679.

Church DD, Hirsch KR, Park S, Kim IY, Gwin JA, Pasiakos SM, Wolfe RR, Ferrando AA. Essential Amino Acids and Protein Synthesis: Insights into Maximizing the Muscle and Whole-Body Response to Feeding. Nutrients. Dec. 2, 2020;12(12):3717. doi: 10.3390/nu12123717. PMID: 33276485; PMCID: PMC7760188.

(56) References Cited

OTHER PUBLICATIONS

Wax B, Kerksick CM, Jagim AR, Mayo JJ, Lyons BC, Kreider RB. Creatine for Exercise and Sports Performance, with Recovery Considerations for Healthy Populations. Nutrients. Jun. 2, 2021;13(6):1915. doi: 10.3390/nu13061915. PMID: 34199588; PMCID: PMC8228369.
Cooper R, Naclerio F, Allgrove J, Jimenez A. Creatine supplementation with specific view to exercise/sports performance: an update. J Int Soc Sports Nutr. Jul. 20, 2012;9(1):33. doi: 10.1186/1550-2783-9-33. PMID: 22817979; PMCID: PMC3407788.
Kreider RB, Kalman DS, Antonio J, Ziegenfuss TN, Wildman R, Collins R, Candow DG, Kleiner SM, Almada AL, Lopez HL. International Society of Sports Nutrition position stand: safety and efficacy of creatine supplementation in exercise, sport, and medicine. J Int Soc Sports Nutr. Jun. 13, 2017;14:18. doi: 10.1186/s12970-017-0173-z. PMID: 28615996; PMCID: PMC5469049.
Fernández-Lázaro D, Arribalzaga S, Gutiérrez-Abejon E, Azarbayjani MA, Mielgo-Ayuso J, Roche E. Omega-3 Fatty Acid Supplementation on Post-Exercise Inflammation, Muscle Damage, Oxidative Response, and Sports Performance in Physically Healthy Adults—A Systematic Review of Randomized Controlled Trials. Nutrients. Jun. 27, 2024;16(13):2044. doi: 10.3390/nu16132044. PMID: 38999792; PMCID: PMC11243702.
Calder PC. Omega-3 fatty acids and inflammatory processes. Nutrients. Mar. 2010;2(3):355-374. doi: 10.3390/nu2030355. Epub Mar. 18, 2010. PMID: 22254027; PMCID: PMC3257651.
DiNicolantonio JJ, Bhutani J, O'Keefe JH. The health benefits of vitamin K. Open Heart. Oct. 6, 2015;2(1):e000300. doi: 10.1136/openhrt-2015-000300. PMID: 26468402; PMCID: PMC4600246.
Schurgers LJ, Teunissen KJ, Hamulyak K, Knapen MH, Vik H, Vermeer C. Vitamin K-containing dietary supplements: comparison of synthetic vitamin K1 and natto-derived menaquinone-7. Blood. Apr. 15, 2007;109(8):3279-83. doi: 10.1182/blood-2006-08-040709. Epub Dec. 7, 2006. PMID: 17158229.
Higgins MR, Izadi A, Kaviani M. Antioxidants and Exercise Performance: With a Focus on Vitamin E and C Supplementation. Int J Environ Res Public Health. Nov. 15, 2020;17(22):8452. doi: 10.3390/ijerph17228452. PMID: 33203106; PMCID: PMC7697466.
Traber MG, Atkinson J. Vitamin E, antioxidant and nothing more. Free Radic Biol Med. Jul. 1, 2007;43(1):4-15. doi: 10.1016/j.freeradbiomed.2007.03.024. Epub Mar. 31, 2007. PMID: 17561088; PMCID: PMC2040110.
Tardy AL, Pouteau E, Marquez D, Yilmaz C, Scholey A. Vitamins and Minerals for Energy, Fatigue and Cognition: A Narrative Review of the Biochemical and Clinical Evidence. Nutrients. Jan. 16, 2020;12(1):228. doi: 10.3390/nu12010228. PMID: 31963141; PMCID: PMC7019700.
Hursel R, Viechtbauer W, Westerterp-Plantenga MS. The effects of green tea on weight loss and weight maintenance: a meta-analysis. Int J Obes (Lond). Sep. 2009;33(9):956-61. doi: 10.1038/ijo.2009.135. Epub Jul. 14, 2009. PMID: 19597519. https://www.researchgate.net/publication/26666169_Effects_of_green_tea_on_weight_loss_and_weight_maintenance_A_meta-analysis.
Legrain, S., Girard, L. Pharmacology And Therapeutic Effects of Dehydroepiandrosterone In Older Subjects. Drugs Aging 20, 949-967 (2003). https://doi.org/10.2165/00002512-200320130-00001.
Kastelein, J. J. P., et al. (2014). Omega-3 free fatty acids improve triglyceride levels in patients with severe hypertriglyceridemia: Findings from the EVOLVE trial. DOI: 10.1194/jlr.P044736. Access the study here: https://lipidworld.biomedcentral.com/articles/10.1186/s12944-016-0286-4.
Dillon EL, Sheffield-Moore M, Paddon-Jones D, Gilkison C, Sanford AP, Casperson SL, Jiang J, Chinkes DL, Urban RJ. Amino acid supplementation increases lean body mass, basal muscle protein synthesis, and insulin-like growth factor-I expression in older women. J Clin Endocrinol Metab. May 2009;94(5):1630-7. doi: 10.1210/jc.2008-1564. Epub Feb. 10, 2009. PMID: 19208731; PMCID: PMC2684480. (Endrocrinol) https://academic.oup.com/jcem/article-abstract/94/5/1630/2598217?redirectedFrom=fulltext&login=false.
Walle et. al (2004) found that resveratrol is rapidly metabolized, limiting its systemic effects Thomas Walle, Faye Hsieh, Mark H. DeLegge, John E. Oatis and U. Kristina Walle Drug Metabolism and Disposition Aug. 27, 2004, DOI: DOI: 10.1124/dmd.104.000885 https://www.medicinacomplementar.com.br/biblioteca/pdfs/Cancer/resveratrol-alta-absorcao-mas.pdf.
Johnson JJ, Nihal M, Siddiqui IA, Scarlett CO, Bailey HH, Mukhtar H, Ahmad N. Enhancing the bioavailability of resveratrol by combining it with piperine. Mol Nutr Food Res. Aug. 2011;55(8):1169-76. doi: 10.1002/mnfr.201100117. Epub Jun. 29, 2011. PMID: 21714124; PMCID: PMC3295233. https://pmc.ncbi.nlm.nih.gov/articles/pmid/21714124/.
Cottart CH, Nivet-Antoine V, Laguillier-Morizot C, Beaudeux JL. Resveratrol bioavailability and toxicity in humans. Mol Nutr Food Res. Jan. 2010;54(1):7-16. doi: 10.1002/mnfr.200900437. PMID: 20013887. https://onlinelibrary.wiley.com/doi/pdf/10.1002/mnfr.200900437.
Rathmacher JA, Pitchford LM, Khoo P, Angus H, Lang J, Lowry K, Ruby C, Krajek AC, Fuller JC, Sharp RL. Long-term Effects of Calcium β-Hydroxy-β-Methylbutyrate and Vitamin D3 Supplementation on Muscular Function in Older Adults With and Without Resistance Training: A Randomized, Double-blind, Controlled Study. J Gerontol A Biol Sci Med Sci. Oct. 15, 2020;75(11):2089-2097. doi: 10.1093/gerona/glaa218. PMID: 32857128; PMCID: PMC7566440. https://academic.oup.com/biomedgerontology/article/75/11/2089/5898559?login=false.
Hernández-García D, Granado-Serrano AB, Martin-Gari M, Naudi A, Serrano JC. Efficacy of Panax ginseng supplementation on blood lipid profile. A meta-analysis and systematic review of clinical randomized trials. J Ethnopharmacol. Oct. 28, 2019;243:112090. doi: 10.1016/j.jep.2019.112090. Epub Jul. 14, 2019. PMID: 31315027. https://c.coek.info/pdf-efficacy-of-panax-ginseng-supplementation-on-blood-lipid-profile-a-meta-analysis.html.
Panossian A, Wikman G, Sarris J. Rosenroot (*Rhodiola rosea*): traditional use, chemical composition, pharmacology and clinical efficacy. Phytomedicine. Jun. 2010;17(7):481-93. doi: 10.1016/j.phymed.2010.02.002. Epub Apr. 7, 2010. PMID: 20378318. https://www.researchgate.net/publication/43079654_Rosenroot_Rhodiola_rosea_Traditional_use_chemical_composition_pharmacology_and_clinica.
Darbinyan V, Kteyan A, Panossian A, Gabrielian E, Wikman G, Wagner H. Rhodiola rosea in stress induced fatigue—a double blind cross-over study of a standardized extract SHR-5 with a repeated low-dose regimen on the mental performance of healthy physicians during night duty. Phytomedicine. Oct. 2000;7(5):365-71. doi: 10.1016/S0944-7113 (00)80055-0. PMID: 11081987. https://www.academia.edu/3827256/.
Zhang L, Yu H, Zhao X, Lin X, Tan C, Cao G, Wang Z. Neuroprotective effects of salidroside against beta-amyloid-induced oxidative stress in SH-SY5Y human neuroblastoma cells. Neurochem Int. Nov. 2010;57(5):547-55. doi: 10.1016/j.neuint.2010.06.021. Epub Jul. 6, 2010. PMID: 20615444 https://www.sciencedirect.com/science/article/abs/pii/S0197018610002160?via%3Dihub.
Ginkgolides and Neuroprotective Effects, Omar, S.H. (2013). Ginkgolides and Neuroprotective Effects. In: Ramawat, K., Merillon, JM. (eds) Natural Products. Springer, Berlin, Heidelberg. https://doi.org/10.1007/978-3-642-22144-6_146 https://www.researchgate.net/publication/255947504_Ginkgolides_and_Neuroprotective_Effects.
Javier Moran. Design of an Effective Nutraceutical (HR15) for Physical Performance and Endurance. Ann Med Health Sci Res. 2024; S2: 930-937Chemistry and pharmacology of Rhaponticum carthamoides: 2009 Ladislav Kokoska a, Dagmar Janovska https://www.sciencedirect.com/science/article/abs/pii/S0031942209001459 https://www.amhsr.org/articles/design-of-an-effective-nutraceutical-hr15-for-physical--performance-and-endurance.pdf.
Kamal, M., Arif, M. & Jawaid, T. Adaptogenic medicinal plants utilized for strengthening the power of resistance during chemotherapy—a review. Orient Pharm Exp Med 17, 1-18 (2017). https://doi.org/10.1007/s13596-016-0254-6.
Mattson LA, Cullberg G, Tangkeo P, Zador G, Samsioe G. Administration of dehydroepiandrosterone enanthate to oophorectomized

(56) References Cited

OTHER PUBLICATIONS women—effects on sex hormones and lipid metabolism. Maturitas. Dec. 1980;2(4):301-9. doi: 10.1016/0378-5122(80)90032-8. PMID: 6453267. https://www.sciencedirect.com/science/article/pii/0378512280900328.

Performance Enhancement and Urinary Detection After Short-term Testosterone Enanthate Use: 2249 May 2006, Medicine and Science in Sports and Exercise 38(Supplement):S405 DOI: 10.1249/00005768-200605001-02583 https://www.researchgate.net/publication/323097925_Performance_Enhancement_and_Urinary_Detection_After_Short-term_Testosterone_Enanthate_Use_2249.

Lykstad J, Sharma S. Biochemistry, Water Soluble Vitamins. [Updated Mar. 6, 2023]. In: StatPearls [Internet]. Treasure Island (FL): StatPearls Publishing; Jan. 2024. Available from: https://www.ncbi.nlm.nih.gov/books/NBK538510/2019 https://www.researchgate.net/publication/331425417_Biochemistry_Water_Soluble_Vitamins.

"Effect of Cs-4 (Cordyceps sinensis) on Exercise Performance in Healthy Older Subjects: A Double-Blind, Placebo-Controlled Trial" Authors: Chen, S., Li, Z., Krochmal, R., Abrazado, M., Kim, W., & Cooper, C. B, Published in: Journal of Alternative and Complementary Medicine, 2010 DOI: 10.1089/acm.2009.0226, Weblink: https://www.liebertpub.com/doi/10.1089/acm.2009.0226 https://pmc.ncbi.nlm.nih.gov/articles/pmid/20804368/.

Mattar G, Haddarah A, Haddad J, Pujola M, Sepulcre F. New approaches, bioavailability and the use of chelates as a promising method for food fortification. Food Chemistry. Mar. 2022;373(Pt A):131394. DOI: 10.1016/j.foodchem.2021.131394. PMID: 34710689. https://www.sciencedirect.com/science/article/abs/pii/S0308814621024006?via%3Dihub.

Viegas, M.N., Salgado, M.A., Aguiar, C et al. Effect of Dietary Inorganic and Chelated Trace Mineral Supplementation on the Growth Performance and Skeletal Deformities of European Seabass and Senegalese Sole Post-larvae. Biol Trace Elem Res 201, 5389-5400 (2023). https://doi.org/10.1007/s12011-023-03581-8 https://link.springer.com/article/10.1007/s12011-023-03581-8.

Kulkarni, A., Khade, M., Arun, S., Badami, P., Kumar, G. R. K., Dattaroy, T., . . . Dasgupta, S. (2021). An overview on mechanism, cause, prevention and multi-nation policy level interventions of dietary iron deficiency. Critical Reviews in Food Science and Nutrition, 62(18), 4893-4907. https://doi.org/10.1080/10408398.2021.1879005.

Brazão V, Santello FH, Caetano LC, Del Vecchio Filipin M, Toldo MP, do Prado JC Jr. Immunomodulatory effects of zinc and DHEA on the Th-1 immune response in rats infected with Trypanosoma cruzi. Immunobiology. May 2010;215(5):427-34. doi: 10.1016/j.imbio.2009.05.005. Epub Jul. 5, 2009. PMID: 19581019. https://www.sciencedirect.com/science/article/pii/S0171298514001661.

Te L, Liu J, Ma J, Wang S. Correlation between serum zinc and testosterone: A systematic review. J Trace Elem Med Biol. Mar. 2023;76:127124. doi: 10.1016/j.jtemb.2022.127124. Epub Dec. 23, 2022. PMID: 36577241. https://www.sciencedirect.com/science/article/abs/pii/S0946672X22002048?via%3Dihub.

* cited by examiner

Orientin 2-(3,4-dihydroxyphenyl)-5,7-dihydroxy-8-
[(2S,3R,4R,5S,6R)-3,4,5-trihydroxy-6-
(hydroxymethyl)oxan-2-yl]chromen-4-one Vicenin-2

5,7-Dihydroxy-2-(4-hydroxyphenyl)-6,8-
bis[(2S,3R,4R,5S,6R)-3,4,5-trihydroxy-6-
(hydroxymethyl)oxan-2-yl]chromen-4-one Ursolic acid Carvacrol 2-methyl-5-(propan-2-yl)phenol

Chemical Structure of Ginkgolide B.

| Ginkgolides | | | |
|---|---|---|---|
| Name | R¹ | R² | R³ |
| Ginkgolide A | OH | H | H |
| Ginkgolide B | OH | OH | H |
| Ginkgolide C | OH | OH | OH |
| Ginkgolide J | OH | H | OH |
| Ginkgolide M | H | OH | OH |

Chemical structure of chelated minerals

Chemical structure of magnesium glycinate

ALA           EPA           DHA

α-HBCD          β-HBCD          γ-HBCD

METHOD AND COMPOSITION FOR AN IMPROVED BIOAVAILABILITY DELIVERY SYSTEM

FIELD OF THE INVENTION

The present invention relates to the bioavailability of dietary supplements. More specifically, the present invention relates to a modified composition and method of use of adaptogens, modified stilbenoid complexes, non-esterified omega fatty acids (NEFAs), essential amino acids (EAAs) and β-hydroxy-β-methylbutyrate-free (HMB-free) acid, water-soluble vitamins (B and C), fat-soluble vitamins (D, E, K, and A), L-arginine, creatine, green tea extracts, and chelated forms of minerals with dehydroepiandrosterone (DHEA) derivatives.

The invention represents a novel approach to utilizing a multi-bioavailability system based on the nature of the constituents, and reduces supplements dosage while increasing active ingredients efficacy and bioavailability by providing a targeted delivery system promoting nutritional effects for muscular hypertrophy, physical performance, stamina improvement, muscle strength, and bone mineral density. The delivery system supports anti-aging, weight loss, libido and sexual function improvement, hormonal regulation, anti-inflammation, muscle preservation, cognitive function enhancement, reproductive health, and cardiovascular endurance.

BACKGROUND

In order to optimize their health, individuals frequently turn to a variety of dietary supplements. However, many commonly used supplements, including DHEA derivatives, HMB Free Acids, NEFAs, L-arginine, creatine, chelated minerals, essential amino acids, trans-resveratrol, green tea extract, and adaptogens such as ashwagandha (*Withania somnifera*), *Rhodiola rosea*, and stilbenoids, as well as water-soluble and fat-soluble vitamins, face significant challenges related to poor bioavailability and low efficacy when taken individually. This disclosure discusses the limitations of these supplements and introduces an innovative bioavailability delivery system designed to enhance absorption, efficacy, and nutritional effects of these supplements, particularly when the supplements are combined to achieve synergistic benefits.

The following supplement limitations and toxicities are related to poor bioavailability and high dosages:

DHEA derivatives: DHEA is commonly used for its anti-aging and hormonal balance benefits, but suffers from poor bioavailability due to rapid liver metabolism, limiting its systemic effects. High doses of DHEA can cause hormonal imbalances, acne, liver toxicity, and mood swings. While DHEA supplementation can improve bone density, its systemic benefits are limited. A minimal effect on body composition has also been noted, underscoring the need for more bioavailable DHEA formulations.

NEFAs: Omega-3s are essential for cardiovascular and neurological health, but exhibit poor absorption, unless taken with fat, which limits their efficacy. High doses of omega-3 NEFAs can lead to gastrointestinal discomfort, increased bleeding risk, and have a fishy aftertaste. Omega-3 fatty acid absorption improved significantly when taken with dietary fat, and including emulsifiers when taken can further enhance bioavailability.

L-arginine: L-arginine presents bioavailability challenges due to gastrointestinal degradation, which results in limited absorption. High doses of L-arginine can cause gastrointestinal issues such as bloating and diarrhea, and have been shown to exacerbate asthma symptoms. While L-arginine improves endothelial function, its low bioavailability hinders its effectiveness. Additionally, L-citrulline, a precursor to L-arginine, has been shown to offer a more sustained benefit.

EAAs: EAAs are vital for muscle recovery, but their rapid metabolism limits their effectiveness. Overconsumption can lead to digestive issues and increased ammonia levels. EAA supplementation has been found to improve muscle protein synthesis when paired with insulin, and the timing of EAA ingestion plays a critical role in maximizing its anabolic effects.

HMB free acids: HMB (β-hydroxy β-methylbutyrate) is effective for muscle preservation, but its absorption can be inconsistent, with high doses leading to gastrointestinal discomfort. HMB supplementation significantly improves muscle mass and strength in resistance training, although absorption variability remained an issue. Combining HMB with other agents like creatine can help mitigate some of the bioavailability challenges.

Trans-resveratrol: Resveratrol is known for its antioxidant properties, but its rapid metabolism and elimination limit its bioavailability. High doses can cause gastrointestinal discomfort and headaches. Resveratrol is also rapidly metabolized, limiting its systemic effects. Additionally, combining resveratrol with absorption-enhancing agents like piperine improves its effectiveness.

Adaptogens: Adaptogens, such as ashwagandha (*Withania somnifera*), *Rhodiola rosea*, and holy basil), are valued for their stress-reducing properties but have poor bioavailability due to low solubility and absorption issues. Large doses can lead to gastrointestinal upset and drowsiness. Although ashwagandha has stress-relieving effects, bioavailability remains a limiting factor, and improved delivery systems are needed to enhance adaptogen efficacy.

Water-soluble vitamins: B vitamins are quickly excreted in urine, limiting their sustained bioavailability. And high doses, particularly of B6, can lead to nerve damage and gastrointestinal issues. B vitamin supplementation improves energy metabolism but requires frequent intake for any sustained benefit. Additionally, the bioavailability of these vitamins can be enhanced when paired with whole food sources.

Fat-soluble vitamins: Fat-soluble vitamins such as A, D, E, and K require dietary fat for optimal absorption, and excessive intake can lead to toxicity. For example, Vitamin A can cause liver damage, while high doses of vitamin D may result in hypercalcemia. Vitamin D absorption is improved when paired with dietary fat, and vitamins E and K show similar results when administered with fats.

The limited bioavailability of these supplements can reduce their efficacy, and high doses may lead to adverse effects, including gastrointestinal distress, organ damage, and hormonal imbalances. Innovative multi bioavailability delivery systems that enhance absorption and efficacy are crucial to maximizing the nutritional potential of these supplements.

For these reasons there is a need to enhance the nutritional effects of supplements using multiple-bioavailability delivery systems to overcome poor bioavailability, and combining supplements for enhanced efficacy. These and other objects of the invention are more fully described in the following specification and drawings.

SUMMARY

In accordance with a first embodiment of the invention, a method of use and a composition of constituents and their modifications is disclosed, including adaptogens, modified stilbenoids complex, NEFAs, EAAs, HMB free acid, water-soluble vitamins (B and C), fat-soluble vitamins (D, E, K, and A), L-arginine, creatine, green tea extracts, and chelated form of minerals with DHEA derivatives. This represents a novel approach to utilizing a multi-bioavailability system, based on the nature of the constituents, aims to reduce dosage while increasing supplements efficacy and bioavailability by providing a targeted delivery system to promote nutritional effects for muscular hypertrophy, physical performance, improvement of stamina, muscle strength, and bone mineral density, supports anti-aging, weight loss, improvement of libido and sexual function, hormonal regulation, anti-inflammation, muscle preservation, cognitive function enhancement, reproductive health, and cardiovascular endurance.

The following more detailed description of various preferred embodiments the present invention provides a significant advance in current methods of use and compositions of constituents.

A first embodiment daily wellness capsule to support overall wellness, stress adaptation, muscle hypertrophy, enhancing physical performance and increasing bone mineral density, with multiple bioavailability delivery system (Micronizing, Phytosome, Micronized-cyclodextrin complex) is disclosed.

Formulation includes preparing a supplement with micronized DHEA derivatives, specifically 4-androstene-3b-ol-one propionate, mixed with cyclodextrin, alongside a separate blend containing micronized ergocalciferol or cholecalciferol, ashwagandha or *ginseng*, free fatty acids, HMB free acid, and a phytosome delivery system. The first step in the process is micronizing the DHEA derivatives, ensuring that the compound is in a dry and free-flowing powder form. Jet milling or ball milling is employed to reduce the particle size to less than 10 microns. Quality control measures, including sieve analysis, microscopy, and stability testing, are then used to ensure that the desired particle size is achieved and that no chemical degradation has occurred.

Cyclodextrin is micronized similarly, with the dry, free-flowing powder being reduced to a fine form through jet or cryogenic milling, the latter using liquid nitrogen for finer milling. Quality control involves particle size analysis and functionality testing to confirm that the cyclodextrin retains its capacity to form inclusion complexes. The micronization of ergocalciferol or cholecalciferol follows, ensuring the vitamins are processed into fine particles to enhance absorption, and ball milling can also be used if mechanical methods are feasible. Quality control tests ensure the vitamins remain stable and within the desired particle size range.

Ashwagandha or *ginseng* herbs are dried and powdered before undergoing micronization through jet or ball milling, preserving the active compounds. For free fatty acids, essential amino acids, and HMB-free acid, the same techniques are applied, with rigorous particle size and consistency testing to ensure uniformity.

Phytosome complexes are prepared by dissolving phospholipids in a solvent and adding the active ingredients, such as ashwagandha or *ginseng*, to form the complex. After drying the complex via rotary evaporation, jet milling may be applied if further size reduction is needed. Quality control involves testing encapsulation efficiency through HPLC and verifying particle size and morphology using microscopy.

The mixing procedure involves blending the micronized DHEA derivative with HPBCD cyclodextrin using a high-shear mixer. After ensuring both substances are of the same particle size, they are blended for 10-15 minutes at moderate speed to avoid heat buildup. The separate blend, including micronized ergocalciferol or cholecalciferol, ashwagandha or *ginseng*, free fatty acids, HMB free acid, and the phytosome complex, is mixed in a similar manner, with testing for uniformity and consistency throughout the process.

The following weight calculations are intended for 10,000 capsules, with a recommended dosage per capsule of 25 mg micronized DHEA derivative (4-Androstene-3b-ol-one Propionate), 50 mg micronized HPBCD cyclodextrin, 10 mg micronized ergocalciferol or cholecalciferol, 100 mg micronized ashwagandha or *ginseng,* 50 mg free fatty acids, 500 mg micronized HMB free acid, and 50 mg phytosome complex.

In such an arrangement, the total weight for 10,000 capsules is 250 mg micronized DHEA derivative, 500 g micronized HPBCD Cyclodextrin, 100 g micronized ergocalciferol or cholecalciferol, 1 kg micronized ashwagandha or *ginseng,* 500 g free fatty acids, 5 kg micronized HMB free acid, and 500 g phytosome complex. The sum of each ingredient per capsule results in a total weight per capsule of 785 mg.

Regarding microcrystalline cellulose (filler), assuming microcrystalline cellulose makes up 25% of the total capsule weight, the weight of microcrystalline cellulose per capsule is 196.25 mg. Thus, the total weight for 10,000 capsules is 1.96 kg. Regarding the magnesium stearate (anti-caking agent) calculation, assuming magnesium stearate makes up 2% of the total capsule weight, the weight of magnesium stearate per capsule is 15.7 mg. Thus, the total weight for 10,000 capsules is 157 grams.

In preferred embodiments, the capsule type is 00 or 000 capsules, depending on the total volume of the powder blend. Regarding the filling process, a capsule filling machine is used to ensure uniform filling to achieve consistent dosage per capsule. Excipients are preferably included, such as fillers (e.g., microcrystalline cellulose), binders (e.g., hypromellose), and anti-caking agents (e.g., magnesium stearate) if necessary to facilitate the encapsulation process.

Quality control procedures ensure the accuracy of the micronized powders and capsules. Particle size analysis is performed using laser diffraction or sieve analysis, and uniformity testing checks for consistent distribution across the blend. The filled capsules undergo content uniformity tests, dissolution testing, and stability studies to ensure that they release the active ingredients properly and remain stable over time. Encapsulation efficiency and particle size are tested within the phytosome complex to confirm its compatibility with other ingredients.

A second embodiment daily wellness capsule for anti-aging, muscle preservation, improved metabolic function, anti-inflammation, and hormone regulation is disclosed. A supplement is prepared with micronized DHEA derivative (androst-5-ene-3β,7β,17β-triol) mixed with cyclodextrin, and a separate blend of micronized vitamin B6, NEFAs, HMB free acids and a phytosomes with Siberian *ginseng*, a multiple bioavailability technology to increase bioavailability and increase supplements' efficacy. All ingredients are micronized, including phytosome, NEFAs, and a cyclodextrin complex.

Androst-5-ene-3β,7β,17β-triol at 25 mg offers several benefits, including modulating inflammation through androgen receptors, preserving muscle mass, influencing metabolism and body composition, indirectly impacting immune function through hormonal balance, supporting muscle and bone health for anti-aging, and regulating testosterone metabolism and activity. Siberian *ginseng* (eleuthero)

extract at 25 mg reduces inflammation through adaptogenic compounds, supports health and recovery, enhances energy and adrenal function, boosts immune response, helps manage stress for anti-aging, and supports adrenal health and hormonal balance.

Omega-3 Fatty Acids at 25 mg reduce systemic inflammation and oxidative stress, support muscle health, improve lipid profiles and insulin sensitivity, enhance immune response, support cardiovascular and cognitive health for anti-aging, and balance hormone levels while reducing inflammation. Vitamin B6 at 25 mg reduces inflammation, is vital for amino acid metabolism and protein synthesis, supports neurotransmitter production and metabolism, enhances immune responses, supports skin and nerve health for anti-aging, and aids in hormone synthesis and balance.

Trans-resveratrol at 25 mg is a potent antioxidant with anti-inflammatory properties, may influence muscle function and recovery, improves insulin sensitivity and metabolic health, enhances immune response, activates longevity pathways for anti-aging, and influences estrogen receptors. HMB free acids at 25 mg reduce muscle inflammation and damage, support muscle mass and strength, help maintain muscle mass and metabolic health, support immune function and reduce muscle breakdown, contribute to muscle preservation and overall vitality for anti-aging, and may influence muscle-related hormone levels.

The preparation details involve the micronization process, aimed at increasing the surface area and enhancing the bioavailability of the ingredients, using equipment such as a jet mill or ball mill to achieve particle sizes less than 10 micrometers for each ingredient. The phytosome application improves absorption and bioavailability for herbal extracts like Siberian *ginseng* by combining the extract with phospholipids, such as lecithin, to form a phytosome complex, with the same method applicable to other herbal extracts if needed. Cyclodextrin complexation increases the solubility and stability of Androst-5-ene-3β,7β, 17β-triol by mixing the micronized compound with cyclodextrins, such as β-cyclodextrin, in a 1:1 ratio to form an inclusion complex.

The formulation consists of micronized ingredients, including Androst-5-ene-3β,7β,17β-triol complexed with cyclodextrin, Siberian *ginseng* extract phytosome-encapsulated, and, where possible, micronized Omega-3 fatty acids, Vitamin B6, Trans-Resveratrol, and HMB Free Acids. The micronized ingredients are blended thoroughly to ensure uniform distribution, with excipients incorporated as needed. Finally, the blend is encapsulated into size 0 or 00 capsules, depending on the final blend volume.

Regarding weight and quantity calculations, the total capsules in a batch are 10,000, with 50 capsules per bottle, and a total bottle count of 200. The capsule content (per capsule) is as follows: Androst-5-ene-3β,7β,17β-triol (25 mg), Siberian *ginseng* extract (25 mg), omega-3 fatty acids (25 mg), vitamin B6 (25 mg), trans-resveratrol (25 mg), and HMB free acids (25 mg). The active total ingredient quantities per batch are as follows: Androst-5-ene-3β,7β,17β-triol (250 g), Siberian *ginseng* extract (250 g), omega-3 fatty acids (250 g), vitamin B6 (250 g), trans-resveratrol (250 g), and HMB free acids (250 g).

Regarding excipient requirements, a microcrystalline cellulose (filler) is provided of approximately 2000 grams (200 mg per capsule, adjust for bulk density and blending efficiency), a hypromellose (binder) is provided of approximately 500 grams (50 mg per capsule), a croscarmellose sodium (disintegrant) is provided of approximately 200 grams (20 mg per capsule), a magnesium stearate (lubricant) is provided of approximately 100 grams (10 mg per capsule), and capsules (size 0 or 00), with a quantity dependent on the final blend volume and capsule size.

The quality and testing guidelines for the production process begin with raw material testing, where the identity of the ingredients is confirmed using HPLC or mass spectrometry. Purity is ensured by verifying that the ingredients are free from contaminants, including heavy metals, pesticides, and microbial impurities, while potency testing is conducted to confirm the concentrations of active ingredients. During micronization and complexation testing, particle size analysis confirms that particles are less than 10 micrometers, and the stability and solubility of phytosome and cyclodextrin complexes are verified.

In the formulation testing phase, blend uniformity is checked to ensure an even distribution of active ingredients, and content uniformity testing confirms that each capsule contains the correct amount of active ingredients. Final product testing involves verifying the capsule fill weight to ensure consistency, conducting disintegration and dissolution testing to confirm that the capsules release the ingredients as required, and microbiological testing to detect any microbial contamination. Stability testing ensures the product remains effective and stable over time.

For labeling and documentation, compliance with regulatory requirements is verified, including accurate ingredient lists, dosage instructions, and safety warnings. Detailed records of the formulation, manufacturing processes, and quality testing are maintained to ensure traceability and adherence to guidelines.

BRIEF DESCRIPTION OF THE FIGURES

The patent or application file contains at least one drawing executed in color. Copies of this patent or patent application publication with color drawing(s) will be provided by the Office upon request and payment of the necessary fee.

DESCRIPTION

Figure 1:
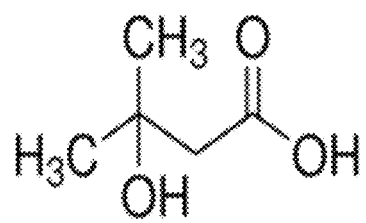
FIG. 1 illustrates the chemical structure of HMB free acid.

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Common elements between different figures may retain the same numerical designation.

The following methods can significantly enhance the absorption, permeability, and nutritional efficacy of these compounds: (1) Micronization to reduce the particle size of supplements, increasing their surface area and improving solubility and absorption. This technique is particularly beneficial for poorly soluble compounds like omega-3 fatty acids and *Panax ginseng*. (2) Phytosome technology is used to form phytosomes, complexes formed by combining phytochemicals with phospholipids, enhancing the bioavailability of plant-derived compounds. This significantly improves the absorption of *ginseng, Ginkgo biloba*, green tea extract, ashwagandha, resveratrol and other herbal extracts. (3) Cyclodextrin complexation, which involves using cyclodextrins, cyclic oligosaccharides that can encapsulate hydrophobic compounds, enhancing their solubility and stability. This approach can improve the bioavailability of vitamins and fatty acids. (4) Including NEFAs, which can serve as an effective delivery system by enhancing solubility and absorption of lipophilic supplements, facilitating transport across cell membranes. NEFAs encapsulate supplements by forming micelles that improve stability and bioavailability. Additionally, NEFAs can target specific tissues, allowing localized nutrients release and action, since they are readily metabolized by cells, thereby reducing dosages and minimizing side effects while improving nutritional efficacy.

By pairing or combining supplements strategically, their nutritional effects can be amplified. For example, pairing DHEA derivatives with adaptogens like *Panax ginseng* can promote hormonal balance and enhance stress resilience. Combining essential amino acids with HMB can improve muscle preservation and recovery. Incorporating L-arginine with other performance-enhancing supplements can further support cardiovascular health and boost nitric oxide production. Combining omega-3 fatty acids with antioxidants like trans-resveratrol may enhance cardiovascular protection and anti-inflammatory effects. In various embodiments of the present invention, the following supplements are combined:

(1) Adaptogens, such as *Panax ginseng, Rhodiola rosea, Ginkgo biloba* to promote hormonal balance and resilience to stress. (2) Non-esterified omega-3 fatty acids that support cardiovascular and cognitive health, especially when paired with antioxidants. (3) Essential amino acids such as leucine, isoleucine, valine enhance muscle recovery and growth when combined with HMB and L-arginine. (4) HMB free acid enhances muscle recovery and works synergistically with essential amino acids for better muscle preservation. (5) L-arginine supports nitric oxide production and cardiovascular health, and enhances the effects of exercise when paired with essential amino acids and omega-3 fatty acids. (6) Creatine improves athletic performance and muscle mass, and works effectively with essential amino acids and HMB to support muscle recovery and energy production. (7) Water-soluble vitamins, such as B-complex vitamins and Vitamin C support energy metabolism and antioxidant protection, complementing amino acids and fatty acids. (8) Fat-Soluble Vitamins, such as Vitamins A, D, E, K are critical for various bodily functions; their absorption may be enhanced when taken with fats from omega-3s. (9) Selective DHEA derivatives support hormonal health and may improve the effects of adaptogens in regulating stress responses. (10) Trans-Resveratrol, including various other stilbenoid derivatives used for antioxidant support can enhance the cardiovascular benefits of L-arginine and omega-3s, offering additional protection against oxidative stress. (11) Green Tea Extract for additional antioxidant and anti-inflammatory effects works synergistically with trans-resveratrol and omega-3 fatty acids for enhanced overall health benefits. (12) Chelated minerals such as chelated zinc and magnesium improve bioavailability and absorption, supporting a variety of physiological functions. By combining these supplements, individuals may achieve enhanced health benefits, improved overall efficacy, and a more comprehensive approach to increase their nutritional effects and bioavailability.

A novel approach to multi-bioavailability bioavailability systems utilizes the inherent properties of the above constituents to enhance nutritional effects while minimizing required dosages. By formulating a synergistic combination of selected adaptogens, essential fatty acids, amino acids, and DHEA derivatives, targeted outcomes can be achieved. Muscle preservation is facilitated through the combination of HMB and essential amino acids, while anti-aging effects are supported by DHEA and adaptogens. Anti-inflammatory benefits arise from the incorporation of omega-3 fatty acids and antioxidants, specifically vitamins E and K. Additionally, sexual function and hormonal balance are addressed through the use of DHEA derivatives in conjunction with zinc and magnesium.

Various embodiments of the invention encompass a composition of constituents and their modifications, including adaptogens, modified stilbenoids complex, non-esterified omega fatty acids, essential amino acids, and HMB in its free acid form, both water-soluble vitamins such as B and C, and fat-soluble vitamins like A, D, E, and K, alongside L-arginine, creatine, green tea extracts, and chelated forms of minerals combined with DHEA derivatives enhances the nutritional effects of DHEA-based supplements. These constituent supplements and their nutritional effects are discussed in more detail as follows.

Referring to FIG. 1, the chemical structure of HMB free acid is shown. HMB Free Acid (beta-hydroxy beta-methyl-butyrate) is a metabolite of the branched-chain amino acid leucine, widely studied for its potential benefits in muscle health, recovery, and hypertrophy. Sarcopenia, characterized by the progressive loss of muscle mass and strength with age, significantly impacts the elderly population. This condition contributes to increased frailty, falls, and a decreased quality of life (1, 2). As conventional interventions such as resistance exercise and adequate protein intake may be challenging for many older adults, there is growing interest in supplements that can support muscle health. β-Hydroxy-β-Methylbutyrate (HMB), a metabolite of leucine, has emerged as a potential supplement to improve muscle strength and mass in the elderly. This meta-analysis aims to evaluate the efficacy of HMB in enhancing muscle strength among older adults based on current research studies and clinical trials.

HMB free acid influences muscle protein metabolism through several mechanisms. It stimulates the mTOR pathway, enhancing protein synthesis and muscle hypertrophy, which is crucial since aging often leads to reduced mTOR signaling and decreased muscle protein synthesis. Additionally, HMB inhibits the ubiquitin-proteasome pathway, reducing muscle protein breakdown, which is particularly relevant for counteracting muscle wasting and maintaining muscle mass.

Research indicates that HMB supplementation positively affects muscle strength and mass, especially in populations experiencing muscle loss. Clinical trials involving older adults demonstrate significant improvements in muscle strength and physical function, with randomized controlled trials reporting gains in muscle strength, gait speed, and increased muscle mass among elderly individuals taking HMB. Meta-analyses have consolidated these findings, showing modest but significant improvements in muscle strength and physical function among HMB users compared to placebo groups.

HMB free acid supplementation has been studied in various clinical contexts. It shows potential in mitigating sarcopenia by improving muscle mass and strength, particularly in older adults with limited capacity for physical exercise. In patients recovering from critical illness or major surgery, HMB supports muscle preservation and function, aiding quicker recovery and reducing complications. For older adults with inadequate protein intake or malnutrition, HMB can be a valuable adjunct to dietary interventions, helping to preserve muscle mass and strength. The recommended dosage for HMB supplementation is 3 grams per day, particularly in contexts of muscle preservation and strength enhancement.

Recent studies reinforce the beneficial effects of HMB supplementation in the elderly population. Evidence from various randomized controlled trials indicates that HMB leads to improvements in muscle strength, function, and overall physical performance. For instance, significant improvements in muscle strength and physical function have been shown in older adults who supplemented with HMB compared to a placebo group.

Possible side effects include gastrointestinal issues like stomach cramps, nausea, or diarrhea. Allergic reactions are rare but can occur in sensitive individuals. Some evidence suggests altered blood lipids, and HMB may interact with certain medications affecting liver metabolism. Uncommon effects, such as muscle cramps or mood changes, have also been reported. The typical dosage of HMB free acid ranges from 1.5 to 3 grams per day, with most studies using 3 grams daily, split into two or three doses for optimal effects. HMB can be taken before or after workouts, with benefits noted from both timing strategies. Ongoing research continues to explore optimal dosing, long-term effects, and potential synergistic effects when combined with exercise or other nutritional supplements.

β-Hydroxy-β-Methylbutyrate (HMB) free acid is an effective supplement for improving muscle strength and function in the elderly. Its ability to enhance muscle protein synthesis and reduce muscle breakdown makes it a valuable intervention, especially for those with sarcopenia, critical illness, or nutritional deficiencies. Ongoing research aims to refine recommendations regarding dosing, duration, and combination therapies to maximize HMB's benefits for older adults.

Adaptogens and their Derivatives

Adaptogens are natural substances, often derived from herbs and fungi, that help the body resist stressors of various kinds, promoting homeostasis. They are believed to enhance the body's ability to adapt to physical, mental, and environmental stressors. Adaptogens play a vital role in supporting the body's response to stress while maintaining balance across various physiological systems. They assist in regulating the adrenal glands, which produce hormones such as cortisol, thereby enhancing resilience against stressors benefits of adaptogens are manifold. They provide stress relief by alleviating both the physiological and psychological impacts of stress, promoting a sense of calm. Adaptogens also help reduce anxiety symptoms and improve overall mood. Certain varieties enhance physical performance by boosting stamina, endurance, and recovery in athletes. Additionally, they possess anti-inflammatory effects that may reduce inflammation and support immune function. Adaptogens are effective in regulating hormonal fluctuations, particularly during stressful periods, and some can enhance cognitive function by improving mental clarity, focus, and memory.

Adaptogens and their derivatives play a significant role in managing stress and enhancing overall health. These compounds are known to modulate the body's stress response, reduce inflammation, improve circulation, and provide antioxidant protection. Research has demonstrated the efficacy of several adaptogens, including Ashwagandha, *Ginseng*, and *Rhodiola rosea*, in promoting cardiovascular health. For instance, studies indicate that Ashwagandha can significantly lower cortisol levels and reduce stress-related hypertension. A randomized controlled trial published in 2019 showed that participants taking Ashwagandha experienced a marked reduction in blood pressure compared to the placebo group.

Similarly, *Ginseng* has been associated with improved lipid profiles; a meta-analysis from 2016 highlighted its ability to reduce total cholesterol and triglyceride levels, thereby enhancing cardiovascular function. *Rhodiola rosea* also contributes to cardiovascular health. Studies found that *Rhodiola* supplementation resulted in improved blood flow and reduced heart rate during stressful conditions, supporting its role as an adaptogen. Overall, the collective evidence underscores the benefits of these adaptogens in enhancing cardiovascular function, highlighting their potential as natural interventions for managing stress and promoting heart health.

Figure 2:
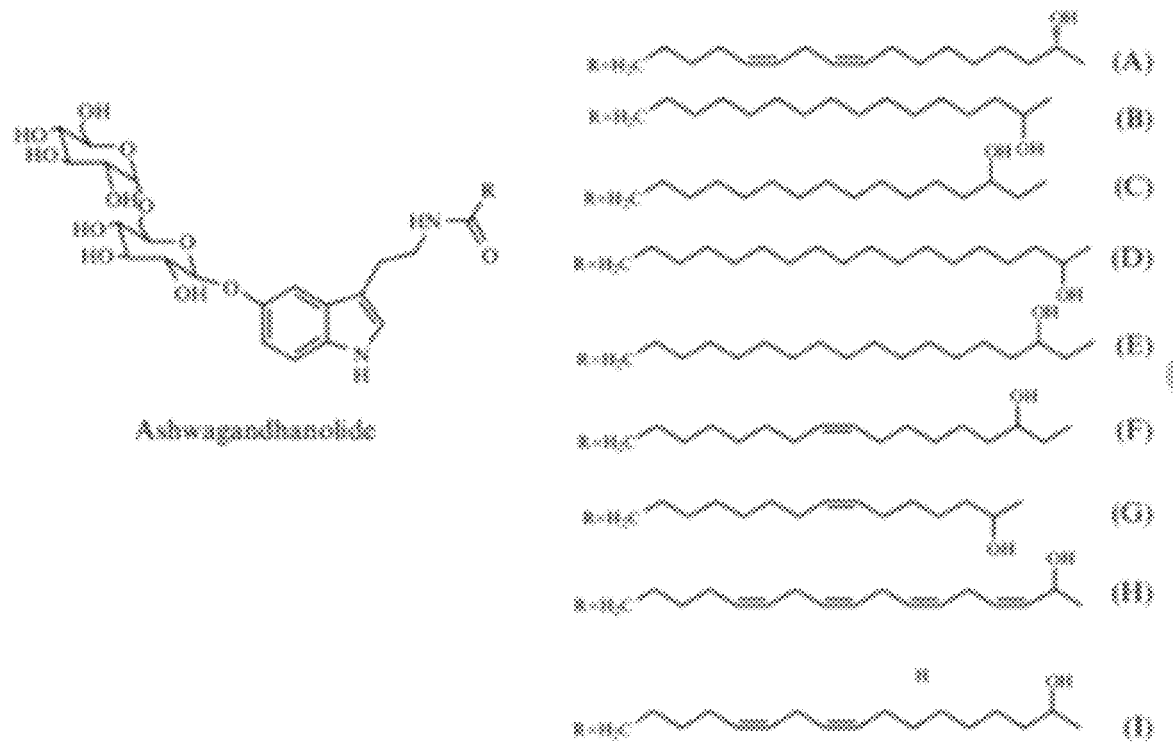
FIG. 2 illustrates the chemical structure of ashwagandhanolide.

Referring to FIG. 2, the chemical structure of ashwagandhanolide is shown. *Widthania somnifera*, known as ashwagandha, or Indian *Ginseng*, is known for its ability to reduce stress and anxiety, improve sleep quality, and enhance overall vitality. It has also been shown to support cognitive function and physical performance. It is often used to combat chronic stress and fatigue, support adrenal function, and improve mood. Ashwagandhanolide, derived from the ashwagandha plant, has several derivatives that have been studied for their potential pharmacological effects.

Some notable derivatives and their characteristics include: Acetylated ashwagandhanolide, a derivative with an acetyl group added, which may enhance its bioavailability and efficacy, methoxy-ashwagandhanolide, wherein the addition of methoxy groups can modify its interaction with biological targets, potentially affecting its activity, hydroxy-ashwagandhanolide, wherein hydroxylation can enhance the compound's solubility and may increase its antioxidant properties, silylated ashwagandhanolide, which may enhance stability and facilitate the extraction of the active compound, glycosylated ashwagandhanolide, wherein glycosylation improves water solubility and may enhance the compound's bioactivity, fluorinated ashwagandhanolide, wherein introducing fluorine atoms can influence the compound's pharmacokinetics and receptor binding affinity, and phosphorylated ashwagandhanolide, wherein phosphorylation can modify its signaling pathways and increase its potential nutritional applications. These derivatives (from A-I) can be synthesized through various chemical modifications and may exhibit different pharmacological activities compared to the parent compound.

Figure 3:
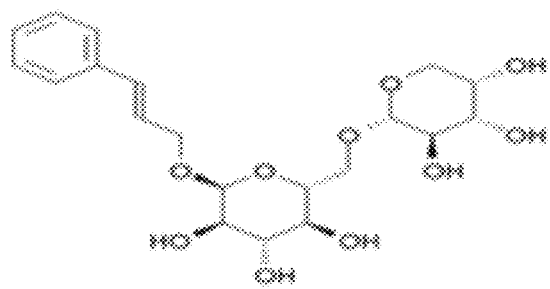
FIG. 3 illustrates the chemical structure of *Rhodiola rosea* extract.

Referring to FIG. 3, the chemical structure of *Rhodiola rosea* extract is shown. *Rhodiola Rosea* enhances physical endurance, reduces fatigue, and improves mental clarity. It is also used to alleviate symptoms of depression and anxiety. It is known to improve resilience to stress, enhance cognitive function, and increase energy levels.

Figure 4:
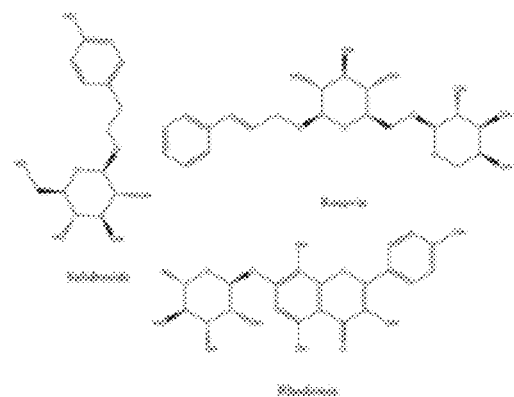
FIG. 4 illustrates the chemical structures of rosavin, salidroside, and rhodionin.

Referring to FIG. 4, the chemical structures of rosavin, salidroside, and rhodlonin are shown. Rosavin is a key bioactive compound found in *Rhodiola rosea*, contributing significantly to its adaptogenic properties. Research indicates that rosavin plays a vital role in stress reduction, cognitive enhancement, fatigue alleviation, mood improvement, and antioxidant activity. One of the primary benefits of rosavin is its ability to reduce stress by lowering cortisol levels and modulating the body's stress response. This makes it particularly effective for individuals facing high stress. Additionally, rosavin has been shown to improve cognitive functions such as memory and concentration, especially under stressful conditions. It also alleviates both physical and mental fatigue, helping to combat feelings of exhaustion. Furthermore, rosavin may improve mood by reducing symptoms of anxiety and depression, which are common in stressful situations. Its antioxidant properties enable it to neutralize free radicals, thus protecting cells from oxidative damage.

The mechanism of action for rosavin involves its influence on the hypothalamic-pituitary-adrenal (HPA) axis, which is crucial in regulating stress hormone production. By enhancing neurotransmitter levels, such as serotonin and dopamine, rosavin activates neuroprotective pathways that promote mental clarity and resilience. Research supports the nutritional effects of rosavin, indicating that its supplementation can enhance mental performance, alleviate fatigue, and improve mood. This makes rosavin particularly beneficial for individuals experiencing high levels of stress or cognitive decline. Overall, rosavin is recognized for its multifaceted benefits, making it a valuable compound in managing stress and enhancing cognitive function, especially in challenging conditions.

Salidroside is a notable compound found in *Rhodiola rosea*, renowned for its protective effects on the nervous system. It offers several key benefits that contribute to both mental and physical well-being. First, salidroside exhibits strong neuroprotective properties, safeguarding neurons from damage induced by oxidative stress. This protective action is essential for maintaining cognitive health and preventing neurodegenerative diseases. Additionally, salidroside enhances cognitive improvement by facilitating learning and memory processes. This makes it particularly valuable for individuals seeking to boost their mental performance.

Salidroside has been linked to antidepressant effects, with potential to alleviate symptoms of depression and anxiety. This attribute positions it as a beneficial option for those dealing with mood disorders. Finally, salidroside possesses anti-inflammatory properties, which help reduce inflammation in various tissues throughout the body. By mitigating inflammation, it supports overall health and enhances both brain function and emotional resilience. Salidroside's neuroprotective, cognitive-enhancing, antidepressant, and anti-inflammatory benefits highlight its significance as a natural agent for promoting mental health and overall well-being.

Salidroside activates the SIRT1 pathway, which promotes cellular stress resistance and enhances mitochondrial function. It also modulates levels of neurotransmitters, contributing to mood regulation. Clinical studies suggest that salidroside can improve cognitive function and mood, reduce anxiety, and provide neuroprotective effects, making it a promising adjunct for mental health conditions.

Rhodionin is a lesser-known compound found in *Rhodiola rosea*, contributing to the plant's overall health benefits. It is recognized for its anti-fatigue effects, helping to reduce both physical and mental fatigue. Additionally, rhodionin may enhance cognitive support by improving focus and mental clarity, while also exhibiting adaptogenic effects that aid the body in adapting to stress. The mechanism of action of rhodionin is believed to parallel that of other compounds in *Rhodiola*, such as rosavin and salidroside. It is thought to modulate neurotransmitter levels and enhance the body's stress response, promoting resilience and mental clarity. While specific studies on rhodionin are limited, its adaptogenic and anti-fatigue properties suggest potential benefits for enhancing physical performance and cognitive function, especially under stressful conditions.

Rosavin, salidroside, and rhodionin are bioactive compounds in *Rhodiola rosea* that offer various health benefits, particularly in stress management, cognitive enhancement, and fatigue reduction. Their mechanisms primarily involve modulating the HPA axis, enhancing neurotransmitter levels, and exerting antioxidant and anti-inflammatory effects. Collectively, they contribute to the nutritional potential of *Rhodiola rosea*, making it valuable in the management of stress-related conditions, cognitive decline, and overall well-being.

Figure 5:
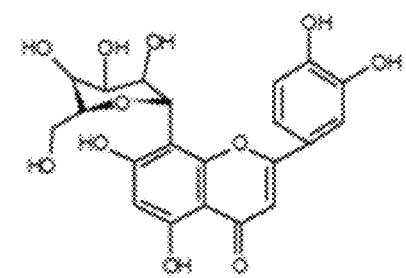
FIG. 5 illustrates the chemical structures of orientin, vicenin-2, ursolic acid, and carvacrol.
Figure 5:
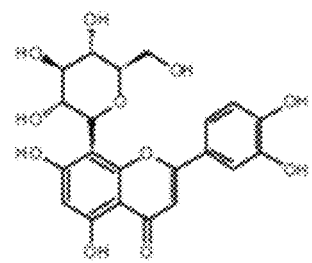
Figure 5:
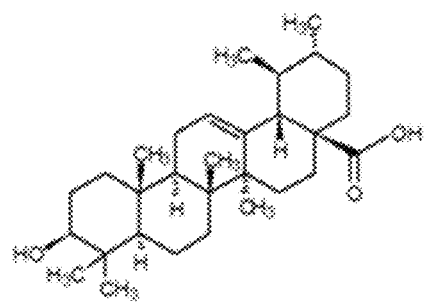
Figure 5:
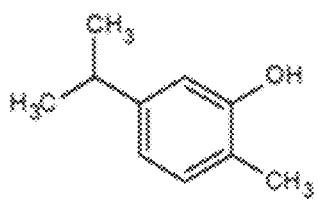

Referring to FIG. 5, the chemical structures of the flavonoids orientin and vicenin-2, the triterpenoid ursolic acid, and the monoterpenic phenol carvacrola, from the plant *Ocimum sanctum* or *Ocimum tenuiflorum*, otherwise known as holy basil. Holy basil supports immune function, reduces inflammation, and helps manage stress. It is also known for its adaptogenic and anti-anxiety properties. It is often used to balance stress hormones, support metabolic function, and improve overall well-being.

The most important antioxidant compounds of basil are caffeic, vanillic, rosmarinic acids, quercetin, rutin, apigenin, chlorogenic, and p-hydroxybenzoic. Essential oils of basil are α-Pinene, β-Pinene, Methyl chavicol, 1,8 cineole, Llinalool, Ocimene, Borneol, Geraneol, B-Caryphyllone, n-Cinnamate and Eugenol.

Figure 6:
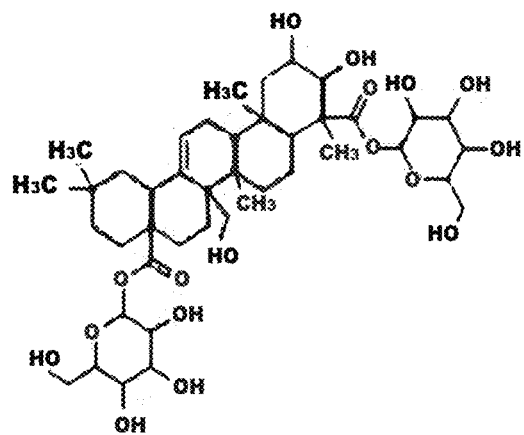
FIG. 6 illustrates the chemical structure of ginsenoside.

Referring to FIG. 6, the chemical structure of ginsenoside is shown. Ginsenosides are active compounds found in *ginseng*, particularly in the *Panax* genus. *Panax ginseng* enhances mental and physical performance, supports immune health, and reduces fatigue. It has been shown to have anti-inflammatory and antioxidant properties. It is commonly used to improve energy, cognitive function, and stress resilience. Several benefits are associated with specific ginsenosides RB1, RB2, RC, and RD.

Figure 7:
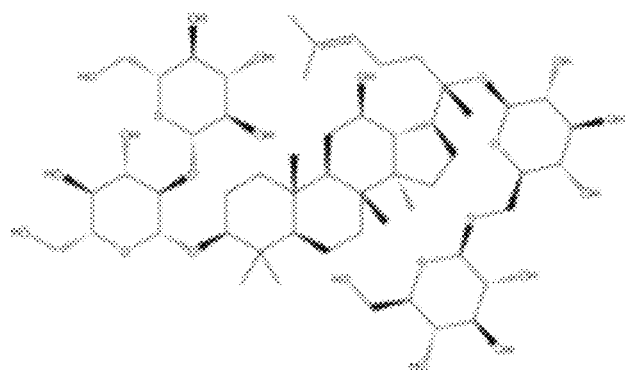
FIG. 7 illustrates the chemical structure of ginsenoside RB1.

Referring to FIG. 7, the chemical structure of ginsenoside RB1 is shown. Ginsenoside RB1 has been shown to enhance cognitive performance and memory. It may improve learning abilities and has neuroprotective effects. Ginsenoside can help reduce fatigue and increase physical endurance, making it beneficial for athletes and those with high physical demands. RB1 may enhance immune function, helping the body resist infections and diseases.

Figure 8:
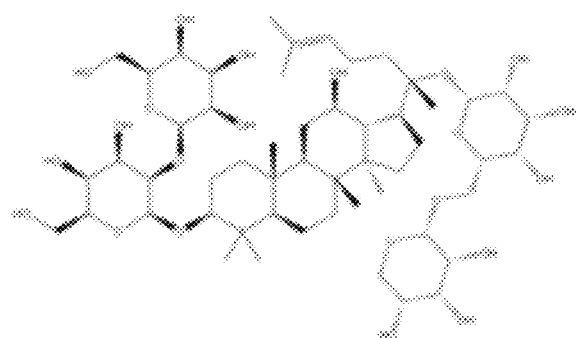
FIG. 8 illustrates the chemical structure of ginsenoside RB2.

Referring to FIG. 8, the chemical structure of ginsenocide RB2 is shown. Ginsenoside RB2 exhibits strong antioxidant properties, helping to neutralize free radicals and reduce oxidative stress in the body. It may help reduce inflammation, contributing to overall health and potentially alleviating symptoms of chronic inflammatory conditions. Some studies suggest that RB2 can assist in regulating blood sugar levels, which could be beneficial for those with insulin sensitivity or diabetes.

Figure 9:
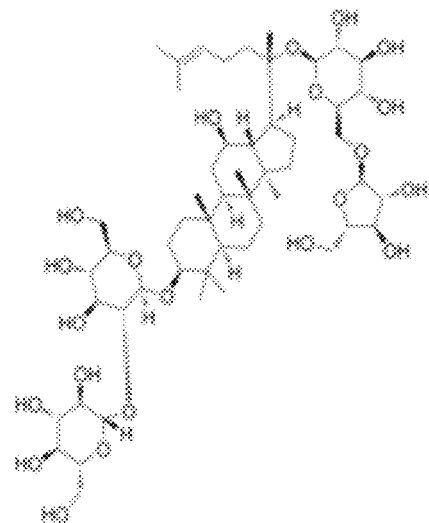
FIG. 9 illustrates the chemical structure of ginsenoside RC.

Referring to FIG. 9, the chemical structure of ginsenoside RC is shown. Ginsenoside RC may protect neurons from damage, promoting brain health and potentially aiding in conditions like neurodegenerative diseases. This ginsenoside can help modulate the body's response to stress, promoting relaxation and overall mental well-being. Ginsenoside RC may support heart health by improving circulation and reducing blood pressure.

Figure 10:
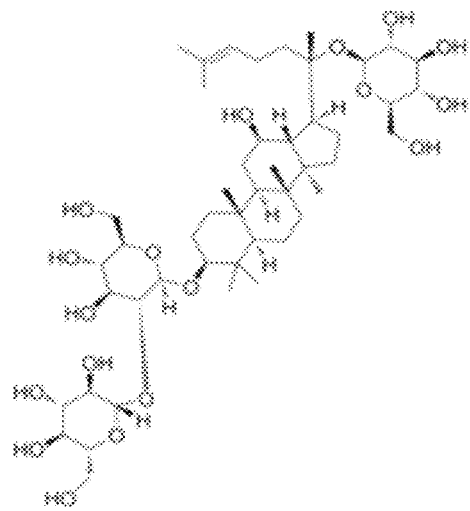
FIG. 10 illustrates the chemical structure of ginsenoside RD.

Referring to FIG. 10, the chemical structure of ginsenoside RD is shown. Ginsenoside RD has been investigated for its potential anti-cancer effects, including inhibiting tumor growth and promoting apoptosis in cancer cells. It may help regulate hormone levels, particularly in relation to stress hormones, which can contribute to overall hormonal balance. RD has shown hepatoprotective effects, potentially safeguarding the liver from damage and promoting its health.

These ginsenosides each offer a range of health benefits, particularly in enhancing cognitive function, supporting immune health, reducing inflammation, and providing neuroprotection. They also play roles in stress management and may have anti-cancer properties. Incorporating *ginseng* or ginsenoside supplements may provide these health benefits, though it's always advisable to consult a healthcare professional before starting any new supplement regimen. Ginsenosides often have poor bioavailability when taken orally, as they can be poorly absorbed or metabolized quickly. Research is ongoing to develop delivery systems to improve their bioavailability. The optimal dosage and formulation of ginsenosides for different conditions are still being studied, as *ginseng* products can vary widely in their ginsenoside content.

*Ginko biloba*, also known as *ginkgo*, is a tree species native to China known for its distinctive fan-shaped leaves. It has been used in traditional medicine for centuries. Commonly used to improve memory and cognitive function, especially in older adults. It Contains flavonoids and terpenoids that help protect cells from oxidative stress. It enhances blood flow, potentially benefiting conditions like peripheral artery disease and tinnitus. Several studies find it can help reduce symptoms of anxiety. *Ginkgo* promotes blood vessel dilation, improving blood circulation and neutralizes free radicals, reducing oxidative damage. It can Influence neurotransmitters like serotonin and dopamine, affecting mood and cognition.

Figure 11:
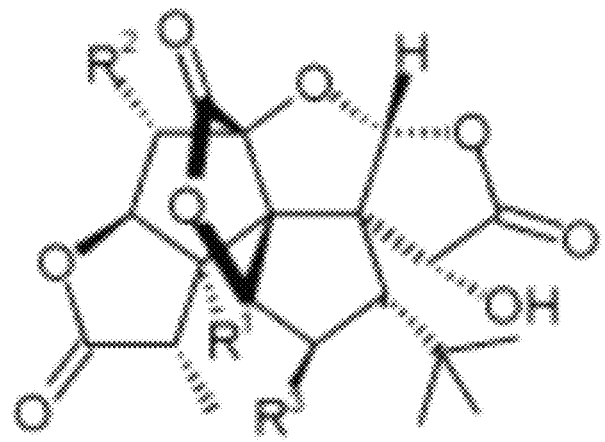
FIG. 11 illustrates the chemical structure of ginkgolide.

Referring to FIG. 11, the chemical structure of ginkgolide is shown. Ginkgolides are biologically active terpenic lactones present in *Ginkgo biloba*. They are diterpenoids with 20-carbon skeletons, which are biosynthesized from geranylgeranyl pyrophosphate.

Figure 12:
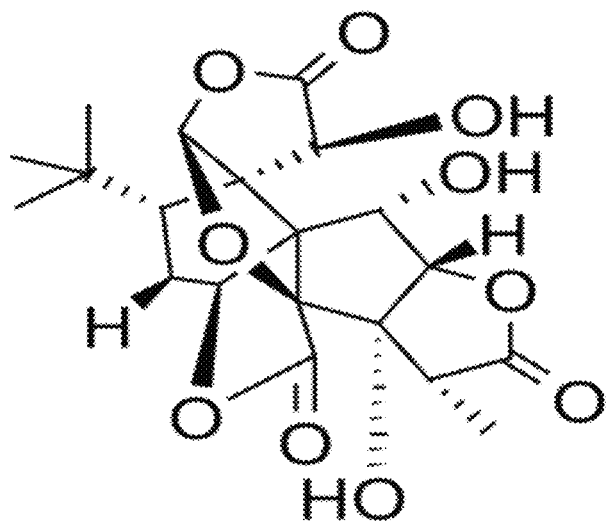
FIG. 12 illustrates the chemical structure of ginkgolide B.

Referring to FIG. 12, the chemical structure of ginkgolide B is shown, with reference to ginkgolide A, C, J, and M, having different $R^1$, $R^2$, and $R^3$ groups. Ginkgolide B, specifically, is a diterpenoid trilactone with six five-membered rings. It contains a spiro[4,4]-nonane carbocyclic ring, a tetrahydrofuran ring, and a very specific tert-butyl group at one of the rings (above figure). The class of ginkgolides was first isolated from the tree *Ginkgo biloba* in 1932.

Figure 13:
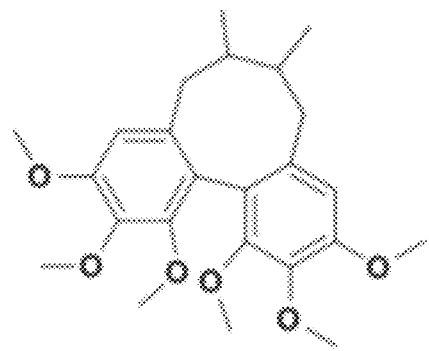
FIG. 13 illustrates the chemical structure of a *Schisandra chinensis* lignan.

Referring to FIG. 13, the chemical structure of a *Schisandra chinensis* lignan is shown. *Schisandra chinensis* is known for its ability to support liver function, improve endurance, and enhance mental clarity. It also has antioxidant and anti-inflammatory effects. It is often used to boost energy, support detoxification, and enhance overall vitality.

Figure 14:
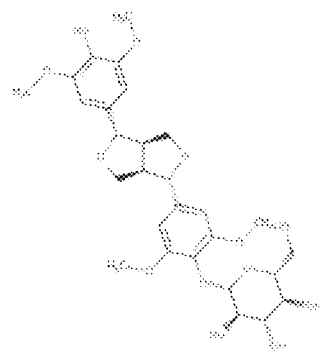
FIG. 14 illustrates the chemical structure of an *eleutherococcus* of Siberian *ginseng*.

Referring to FIG. 14, the chemical structure of an eleutheroside of Siberian *ginseng* is shown. *Eleutherococcus senticosus*, also known as Siberian *ginseng*, improves physical endurance, reduces fatigue, and supports the immune system. It is also used to enhance mental performance and resilience, used to increase stamina, support recovery from stress, and improve overall well-being.

Figure 15:
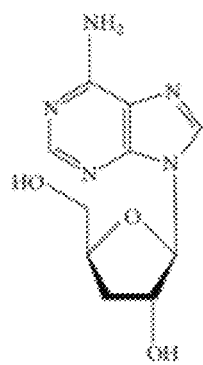
FIG. 15 illustrates the chemical structure of cordycepin.

Referring to FIG. 15, the chemical structure of cordycepin is shown. *Cordyceps* is a genus of ascomycete fungi that enhances physical performance, supports immune function, and helps manage fatigue. It is also known for its potential anti-aging properties. It is often used by athletes to improve exercise performance and by those seeking to boost energy and stamina.

Figure 16:
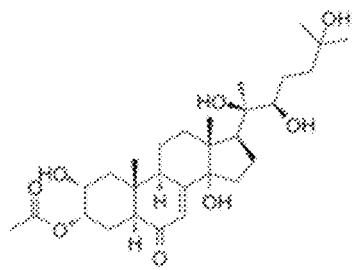
FIG. 16 illustrates the chemical structure of 20-hydroxyecdysone of *Rhaponticum carthamoides*.

Referring to FIG. 16, the chemical structure of 20-hydroxyecdysone from *Rhaponticum carthamoides* is shown. *Rhaponticum carthamoides*, commonly known as maral root or Siberian *rhaponticum*, is celebrated for its adaptogenic properties and numerous health benefits. For energy and endurance, *Rhaponticum carthamoides* is often used to enhance physical performance and reduce fatigue, particularly among athletes. Research has shown that supplementation with *rhaponticum* led to improved exercise performance and reduced fatigue in trained individuals.

Cognitive enhancement is another benefit of maral root, particularly in individuals suffering from fatigue, supporting its potential to aid memory and concentration. Regarding immune support, research has shown that *Rhaponticum carthamoides* extracts can stimulate immune responses in vitro, suggesting a potential role in strengthening immune health. The plant also appears to aid hormonal balance, especially in regulating stress hormones, such as maintaining balanced cortisol levels during stressful situations. *Rhaponticum carthamoides* is recognized for its anti-inflammatory properties as well. The antioxidant activity of *Rhaponticum carthamoides* is also noteworthy, as it may help combat oxidative stress and lower the risk of chronic diseases.

Adaptogens exert their effects through various biological mechanisms. They help regulate the hypothalamic-pituitary-adrenal (HPA) axis, which is crucial for managing stress responses. By modulating cortisol levels, adaptogens can mitigate the negative consequences of chronic stress. Many adaptogens also influence neurotransmitter systems, increasing levels of serotonin, dopamine, and other mood-regulating compounds, which can lead to improved emotional well-being and reduced anxiety.

Furthermore, adaptogens often exhibit antioxidant properties, protecting cells from oxidative stress and inflammation exacerbated by stress. They enhance immune function by regulating cytokine production and promoting the activity of immune cells, thereby aiding the body's response to stress and pathogens. Some adaptogens also improve mitochondrial function, which boosts energy production and reduces fatigue, particularly beneficial during periods of heightened physical or mental demand.

Adaptogens play a significant role in helping the body adapt to stress and maintain balance. Their diverse benefits stem from complex mechanisms that involve hormonal regulation, neurotransmitter modulation, and antioxidant protection. While many individuals find them helpful for managing stress and enhancing overall well-being, following research studies show effects on stress relief, anxiety, improves mood, inflammation and physical performance.

Figure 17:
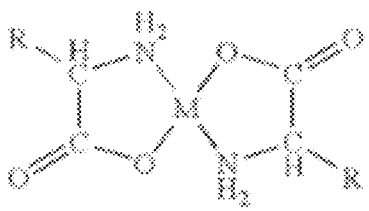
FIG. 17 illustrates the chemical structures of chelated minerals generally, and the structure of magnesium glycinate.
Figure 17:
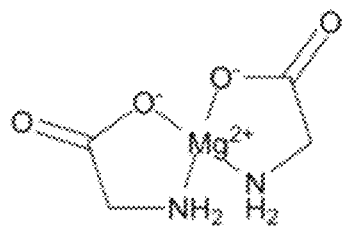

The Recommended Dietary Allowance (RDA) for adaptogens is not standardized like that for vitamins and minerals, as these herbal supplements can vary significantly in their active constituents and effects. However, general dosage guidelines based on common research and traditional use suggest that for ashwagandha (*Withania somnifera*), a typical dosage is 300 to 600 mg of a standardized extract containing at least 5% withanolides per day. For *Rhodiola rosea*, the recommended dosage ranges from 200 to 600 mg of a standardized extract with at least 3% rosavin and 1% salidroside daily. Holy basil (*Ocimum* sanctum) is generally taken at 300 to 2,000 mg of dried leaf or 300 to 500 mg of extract per day. Ginseng (*Panax ginseng*) typically involves a dosage of 200 to 400 mg of a standardized extract with at least 4 to 7% ginsenosides per day. *Schisandra chinensis* is often dosed at 500 to 2,000 mg of dried berries or 100 to 200 mg of extract daily. For *cordyceps sinensis*, the usual dosage is 1,000 to 3,000 mg of a standardized extract per day. It is important to consider that dosages may vary based on individual health conditions, age, and specific health goals While adaptogens are generally considered safe for most individuals, they can cause adverse effects in some cases, particularly if taken inappropriately or in high doses. Ashwagandha (*Withania somnifera*) may lead to gastrointestinal upset, including nausea and diarrhea, as well as drowsiness or sedation. It can also affect hormonal levels, potentially increasing thyroid hormone, and some individuals may experience allergic reactions. *Rhodiola Rosea* might result in insomnia, particularly if taken in high doses or late in the day, along with irritability, dry mouth, and nausea. Holy Basil (*Ocimum* sanctum) has been associated with gastrointestinal issues such as nausea and diarrhea, as well as low blood sugar (hypoglycemia). It may also interact with anticoagulant medications. Ginseng (*Panax ginseng*) can cause insomnia or sleep disturbances, headaches, and upset stomach. It may lead to changes in blood pressure, either raising or lowering it, and can affect hormonal levels by influencing estrogen. *Schisandra chinensis* may result in gastrointestinal discomfort, including diarrhea and heartburn, and in some cases, allergic reactions. *Cordyceps Sinensis* can also cause gastrointestinal issues such as diarrhea and upset stomach, and may lead to allergic reactions. There is a possibility of interactions with immunosuppressive drugs. It is important to note that many adaptogens have not been studied extensively in pregnant or breastfeeding women, so caution is advised in these populations. Adaptogens can also interact with various medications, particularly those for diabetes, blood pressure, and anticoagulants. CHELATED MINERALS Referring to FIG. 17, the general chemical structure of chelated minerals and the chemical structure of magnesium glycinate are shown. Chelated minerals are minerals that have been chemically bound to another molecule, typically an amino acid, to enhance their absorption and bioavailability in the body. This chelation process creates a more stable compound that the body recognizes and absorbs more effectively than non-chelated forms of the mineral. Chelated minerals involve covalent or coordinate bonds with organic molecules, while salts are formed through ionic bonds between positively and negatively charged ions. Chelated minerals are not considered salts because their chemical structure and behavior differ from ionic salts. Chelated minerals are more readily absorbed by the digestive system compared to non-chelated forms. This is because the body more easily identifies and absorbs chelated compounds, especially when the chelate involves amino acids or organic molecules. Some examples of chelated minerals include magnesium glycinate, zinc gluconate, and calcium citrate. Chelated minerals are generally gentler on the stomach and intestines, causing less gastrointestinal discomfort (such as bloating or constipation) compared to non-chelated forms like calcium carbonate or magnesium oxide.

Chelation enhances the stability of the mineral, preventing it from reacting with other compounds in the digestive tract. This can prevent the formation of insoluble complexes that reduce the mineral's absorption. The chelation process helps minerals remain soluble in the low pH environment of the stomach, allowing for better absorption even in individuals with impaired digestion or those who take antacids. Chelated minerals are absorbed differently than their non-chelated counterparts, often through amino acid transport pathways rather than mineral-specific pathways. This can reduce competition between minerals like calcium, magnesium, and iron, leading to more efficient absorption of each.

Because of the higher bioavailability of chelated minerals, lower doses are often required to achieve the same physiological benefits as non-chelated minerals. This is advantageous for individuals who have difficulty absorbing or tolerating larger doses of minerals. Chelated minerals are absorbed more effectively in the intestines due to their stable structure. The chelation protects the minerals from interactions with dietary components that can inhibit absorption (e.g., phytates, oxalates). Once absorbed, these minerals can be more readily transported to tissues where they exert their effects.

Calcium (e.g., calcium citrate, calcium glycinate): Used for bone health and muscle function. Magnesium (e.g., magnesium glycinate, magnesium malate): Important for muscle relaxation, nerve function, and cardiovascular health. Zinc (e.g., zinc picolinate, zinc gluconate): Essential for immune function, wound healing, and protein synthesis. Iron (e.g., iron bisglycinate) is Important for red blood cell production and oxygen transport. Copper (e.g., copper gluconate), supports immune function, red blood cell formation, and collagen synthesis.

Chelated calcium and magnesium are often recommended for improving bone density and preventing conditions like osteoporosis. Chelated magnesium, especially magnesium glycinate, is known for its calming effects on muscles and its ability to relieve cramps and spasms. Chelated zinc and copper support immune function, with better absorption leading to greater efficacy in supplementing diets low in these minerals. Minerals like magnesium, when chelated, help regulate heart rhythm and blood pressure.

Chelated minerals are commonly used in dietary supplements, particularly for individuals with malabsorption issues, those taking medications that impair mineral absorption, or those with increased mineral needs, such as athletes or pregnant women. The bioavailability of chelated minerals is generally higher compared to non-chelated forms due to improved absorption rates. Zinc bioavailability can range from 30-50% for chelated forms, compared to 20-25% for non-chelated. Magnesium, Chelated forms like magnesium glycinate are often better absorbed than magnesium oxide.

The Recommended Dietary Allowance (RDA) for minerals varies according to age, gender, and life stage. For zinc, the RDA is 11 mg for adult men and 8 mg for adult women. Magnesium requirements range from 400 to 420 mg for men and 310 to 320 mg for women. The RDA for iron is 8 mg for men and 18 mg for women. Recommended dosages for chelated minerals can differ based on individual needs; for zinc chelate, a typical dosage is 15 to 30 mg per day. Magnesium chelate is usually taken at 200 to 400 mg per day, while iron chelate may be dosed at 18 to 30 mg per day for those with iron deficiency.

Chelated minerals can have several potential adverse effects. Gastrointestinal issues are common, with some individuals experiencing discomfort such as nausea, diarrhea, or constipation, particularly when taking high doses or sensitive forms of minerals. Over-supplementation may lead to mineral imbalances; for example, excessive zinc can hinder copper absorption, while too much magnesium can disrupt calcium levels. Although rare, allergic reactions to specific chelating agents or minerals can occur, presenting symptoms like rash, itching, or respiratory difficulties.

High doses of certain chelated minerals, especially magnesium, may strain kidney function, particularly in those with existing kidney conditions. Additionally, chelated minerals can interact with medications, potentially affecting their absorption and effectiveness. This includes interference with antibiotics and medications for thyroid disorders. Inappropriate or excessive intake can lead to toxicity, notably with minerals such as iron, where high levels may cause oxidative damage to tissues. Lastly, there is a risk of bioaccumulation of some minerals in the body if taken over extended periods, which could result in long-term adverse effects.

Optimal dosages of minerals like calcium, magnesium, and zinc in combination with vitamins have synergistic effects on bone density and metabolic health. Calcium and magnesium play a role in maximizing bone density and preventing osteoporosis. Zinc is important in enhancing immune function, and is an effective supplement alongside vitamin C. Magnesium interacts with various nutrients for improved cardiovascular and metabolic health. Chelation also enhances mineral absorption and bioavailability. Iron supplement dosages, when paired with vitamin C and other minerals, improves absorption as well.

Other research has shown that minerals in combination with DHEA or DHEA derivatives have beneficial effects. The bioavailability of various chelated minerals is enhanced compared to non-chelated forms. Zinc is critical to immune function, and its deficiency can impair immune responses. And chelated zinc forms enhance bioavailability and support better immune health. Chelated forms of magnesium can improve absorption and efficacy in promoting bone health. Chelation also enhances iron bioavailability. A comprehensive review of the health benefits and mechanisms of action of chelated minerals. Combining DHEA with essential minerals has shown clinically supported synergistic benefits across various physiological functions. Zinc, crucial for testosterone synthesis and immune modulation, enhances DHEA's anabolic effects, as evidenced by studies linking zinc supplementation with improved hormonal balance and muscle strength. Magnesium, known to modulate the hypothalamic-pituitary-adrenal (HPA) axis, complements DHEA's stress-relieving effects, supported by clinical trials demonstrating magnesium's efficacy in reducing cortisol levels and improving mood. Selenium, a potent antioxidant, boosts DHEA's anti-inflammatory properties, as shown in studies where selenium supplementation reduced oxidative stress markers. Calcium and DHEA together improve bone density, particularly in postmenopausal women, as highlighted in research on osteoporosis prevention. Chromium enhances metabolic health by improving insulin sensitivity, aligning with findings that DHEA and chromium together reduce markers of metabolic syndrome. Additionally, potassium supports DHEA's cardiovascular benefits by maintaining blood pressure, while iron optimizes red blood cell production, complementing DHEA's role in oxygen transport. These clinically supported interactions make mineral and DHEA combinations effective for improving hormone regulation, metabolic function, and overall health.

Non-Esterified Omega-3 Fatty Acids (NEFAs)

Figure 18:
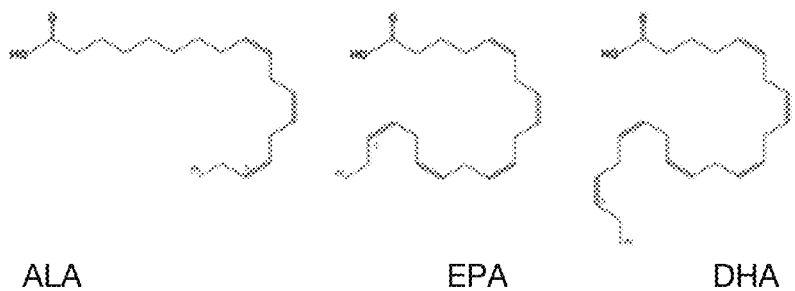
FIG. 18 illustrates the chemical structures of alpha-linolenic acid, eicosapentaenoic acid, and docosahexaenoic acid.

Referring to FIG. 18, the chemical structures of three NEFAs, alpha-linolenic acid (ALA), eicosapentaenoic acid (EPA), and docosahexaenoic acid (DHA) are shown. NEFAs can serve as an effective bioavailability delivery system due to their unique properties. NEFAs enhance the solubility and absorption of lipophilic supplements, facilitating their transport across cell membranes. By forming micelles, NEFAs can encapsulate supplements, improving their stability and bioavailability. Additionally, NEFAs can target specific tissues, as they are readily metabolized by cells, allowing for localized nutrients release and action. This delivery method can reduce the necessary dosage and minimize side effects while improving nutritional efficacy. Overall, NEFAs represent a promising approach for enhancing bioavailability delivery in various nutritional applications.

NEFAs, also known as free fatty acids (FFAs), are fatty acids not bound to glycerol or other molecules, circulating in the blood and released from adipose tissue or ingested through diet. Various types of NEFAs have distinct effects on health. Recent research highlights the benefits of omega-3 fatty acids. NEFAs play a role in reducing triglyceride levels, inflammation, and improving endothelial function, and positively affect cognitive health, particularly in reducing cognitive decline and supporting brain function. NEFAs may also influence hormones like cortisol and testosterone, suggesting a potential to modulate hormonal balance and improve markers related to stress and inflammation.

DHEA and omega-3 PUFAs (particularly EPA and DHA) are highlighted for their complementary roles in modulating brain function and mental health. Omega-3s act through anti-inflammatory pathways, reducing neuroinflammation by lowering pro-inflammatory cytokines and promoting the production of specialized pro-resolving mediators like resolvins. They also enhance synaptic plasticity, regulate neurotransmitters such as serotonin and dopamine, and influence the hypothalamic-pituitary-adrenal (HPA) axis, which is crucial for stress response. DHEA, a neurosteroid, similarly regulates the HPA axis by counteracting cortisol's effects, reduces oxidative stress, and promotes neuroprotection and neurogenesis. The study suggests that omega-3 supplementation may enhance DHEA production, with both contributing to improved mood and cognitive function through their combined neuroprotective, anti-inflammatory, and synaptic-enhancing mechanisms, offering potential antidepressant effects.

The combination of DHEA and NEFAs may have synergistic effects on inflammatory markers and hormonal balance. Combining NEFAs and DHEA may also yield synergistic benefits for cardiovascular health, cognitive function, and metabolic regulation. Additional studies demonstrate that free fatty acids increase androgen precursors in vivo.

The study investigates how elevated free fatty acids (FFAs) affect androgen metabolism, particularly in adrenal androgen precursors such as dehydroepiandrosterone (DHEA). The research demonstrates that increased FFAs, induced via lipid and heparin infusions, lead to a rise in circulating androgen precursors. This effect is independent of insulin sensitivity, which remained unchanged during the short-term elevation of FFAs. The findings highlight a potential mechanism where metabolic states with elevated FFAs, such as obesity or insulin resistance, may contribute to androgen excess, which is observed in conditions like polycystic ovary syndrome (PCOS).

Stilbenoids

Figure 19:
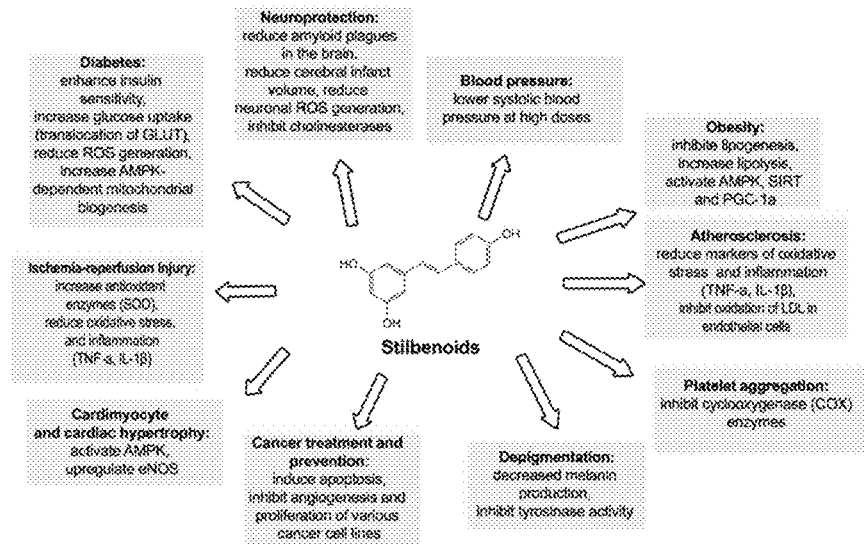
FIG. 19 illustrates the general chemical structure of a stilbenoid and its various uses.

Referring to FIG. 19, the general chemical structure of stilbenoids and various uses are shown. Stilbenoids are a class of natural compounds that are derived from stilbene, primarily known for their potential health benefits. The most well-known stilbenoid is resveratrol, but there are several others, each with unique properties. Here's an overview of the key stilbenoids, their benefits, mechanisms of action, nutritional effects, and other relevant information.

Common dosages for stilbenoids typically range from 100 mg to 500 mg per day, with higher doses used in clinical settings. Stilbenoids are recognized for their antioxidant, anti-inflammatory, cardioprotective, and potential neuroprotective effects. For example, stilbenoids play a role in reducing oxidative stress and inflammation. The mechanism of action involves the activation of sirtuins (SIRT1), which are crucial for cellular longevity and metabolism. These compounds also interact with various signaling pathways, such as AMPK and NF-kB, enhancing their protective effects.

Stilbenoids may improve cardiovascular health, reduce cancer risk, and support cognitive function. Generally, stilbenoids are well-tolerated, but some individuals may experience gastrointestinal upset. They can also interact with blood thinners, warranting caution for those undergoing anticoagulant therapy. Pterostilbene is commonly dosed around 50 mg to 150 mg per day and is recognized for supporting brain health, metabolic health, and exhibiting antioxidant properties. Research indicates that pterostilbene may offer similar benefits to resveratrol but with improved bioavailability. The mechanism of action for pterostilbene includes the activation of SIRT1 and a positive influence on lipid metabolism. Research demonstrates that pterostilbene affects lipid profiles, indicating its potential for cardiovascular health. It may aid in managing cholesterol levels and show anti-cancer properties. Pterostilbene supplementation has been shown to improve cholesterol levels and cardiovascular markers.

Trans-stilbene is not well-studied in humans, and specific dosage recommendations are limited. While there are potential antioxidant effects, more research is necessary to fully understand its benefits. Hopeaphenol has limited human studies, and typical doses have not been established. Known for antioxidant and anti-inflammatory properties, hopeaphenol shows potential in cancer therapy. Its mechanism of action involves modulating oxidative stress pathways, but specific details require further investigation. The nutritional effects are acknowledged, particularly regarding cancer prevention, but more research is necessary to validate these claims. Adverse effects remain poorly documented due to a lack of extensive research.

Stilbenoids generally exhibit antioxidant activity, reducing oxidative stress and inflammation, and are linked to improved cardiovascular health, as supported by various studies. For instance, stilbenoids positively influence heart health by enhancing endothelial function and lipid profiles. They may also provide neuroprotection against neurodegenerative diseases and exhibit metabolic benefits that support weight management and glucose metabolism. While generally regarded as safe, stilbenoids can cause mild gastrointestinal upset and may interact with medications, particularly anticoagulants. Long-term safety data, especially concerning high doses, are limited.

Trans-Resveratrol

Figure 20:
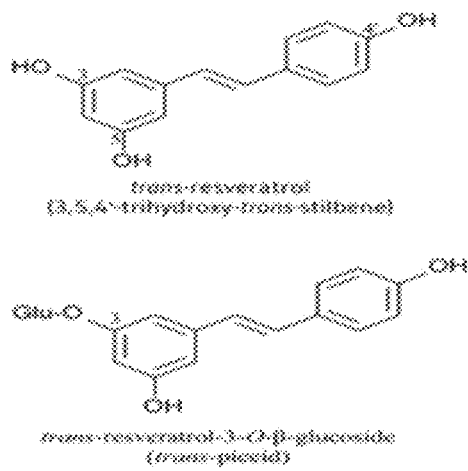
FIG. 20 illustrates the chemical structures of trans-resveratrol and trans-resveratrol glucoside.

Referring to FIG. 20, the chemical structures of trans-resveratrol and trans-resveratrol glucoside are shown. Trans-resveratrol is a natural polyphenolic compound found in various plants, particularly in the skin of red grapes, berries, peanuts, and certain medicinal herbs. It is often praised for its antioxidant properties and potential health benefits.

Trans-resveratrol may improve cardiovascular health by enhancing endothelial function and reducing inflammation, with studies indicating associations with lower blood pressure and improved cholesterol levels. For instance, trans-resveratrol supplementation significantly improves endothelial function and reduced arterial stiffness in subjects with cardiovascular risk factors.

Trans-resveratrol also exhibits strong antioxidant effects by neutralizing free radicals, potentially reducing oxidative stress in the body. Trans-resveratrol scavenges free radicals, thereby enhancing the body's antioxidant defense systems.

In terms of anti-inflammatory properties, trans-resveratrol may inhibit inflammatory pathways and cytokine production, which can help manage chronic inflammatory conditions. Trans-resveratrol significantly reduces levels of pro-inflammatory cytokines, suggesting its utility in treating conditions like arthritis and metabolic syndrome. Trans-resveratrol also shows promise in providing neuroprotective effects against neurodegenerative diseases like Alzheimer's and Parkinson's disease by reducing oxidative damage and inflammation.

Regarding anti-aging effects, trans-resveratrol is thought to activate sirtuins, specifically sirtuin 1 (SIRT1), which are proteins involved in regulating cellular health. This activation may contribute to longevity and improved metabolic health. Preliminary studies suggest potential cancer prevention properties of trans-resveratrol, particularly through the inhibition of cancer cell proliferation and induction of apoptosis. The mechanisms of action for trans-resveratrol include its antioxidant activity, where it scavenges free radicals and enhances antioxidant defense systems, and sirtuin activation, influencing longevity and metabolism. Additionally, trans-resveratrol modulates the NF-κB signaling pathway, which plays a critical role in inflammation and immune response. Trans-resveratrol enhances nitric oxide production, promoting vascular health and improving blood flow.

Trans-resveratrol has nutritional effects in managing cardiovascular disease, as evidence suggests it can help control risk factors associated with heart disease. Furthermore, it may aid in managing chronic inflammatory diseases and has potential as a nutritional agent in neurodegenerative diseases, although further research is needed for clinical application. Ongoing studies are exploring its role in cancer prevention and treatment, with promising preclinical results.

Generally considered safe, trans-resveratrol, when taken in appropriate doses (typically up to 1,000 mg per day), is well-tolerated. However, some individuals may experience gastrointestinal issues such as nausea, diarrhea, or stomach upset, particularly at higher doses. Additionally, trans-resveratrol can interact with anticoagulant medications, increasing bleeding risk, and caution is advised for individuals on blood thinners. There is potential for estrogenic activity, so those with hormone-sensitive conditions should consult a healthcare provider.

Referring again to FIG. 20, trans-resveratrol glycoside is a compound formed when trans-resveratrol is attached to a sugar molecule, enhancing its stability and altering its absorption and metabolism compared to free trans-resveratrol. This compound is primarily sourced from plants, particularly grape skins and berries. Glycosylation can improve its solubility and stability, but it may also influence the effectiveness of its health benefits. Like trans-resveratrol, trans-resveratrol glycoside may exhibit antioxidant, anti-inflammatory, and cardioprotective properties, although research specifically focused on glycosides is still evolving. Both trans-resveratrol and its glycoside modification present a variety of potential health benefits, particularly in cardiovascular health, antioxidant protection, and anti-inflammatory effects. While generally considered safe at recommended doses, individuals should consult healthcare professionals before starting supplementation, especially if they have underlying health conditions or are taking medications. Ongoing research will further elucidate their nutritional potential and mechanisms of action.

Studies indicate glycosylation of resveratrol enhances its pharmacokinetic properties, by affecting bioavailability and metabolic pathways. A comparative study of the antioxidant activity of resveratrol and its glycosides indicates varied efficacy of the antioxidant properties of trans-resveratrol compared to its glycoside forms. Other related research found cardiovascular benefits, an effect of pterostilbene on metabolic syndrome. Overall, trans-resveratrol and its glycoside modification show promise for a range of health benefits, particularly in cardiovascular and metabolic health.

Green Tea Extract

Figure 21:
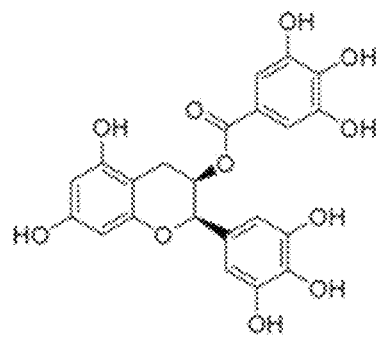
FIG. 21 illustrates the chemical structure of green tea extract.

Referring to FIG. 21, the chemical structure of green tea extract is shown. Green tea extracts, derived from the leaves of *Camellia sinensis*, are rich in bioactive compounds, particularly polyphenols like catechins. These extracts have gained popularity for their health benefits and are commonly used in dietary supplements and functional foods. Green tea extracts play a significant role in promoting overall health due to their antioxidant properties and potential effects on metabolism, cardiovascular health, and weight management. They are often utilized for their ability to support wellness and prevent various health issues.

Green tea extracts are high in catechins, particularly epigallocatechin gallate (EGCG), which help combat oxidative stress and reduce free radical damage. Some studies suggest that green tea extracts can enhance fat oxidation and improve metabolic rate, making them useful for weight management and fat loss. Regular consumption of green tea extracts may lower cholesterol levels, reduce blood pressure, and improve overall heart health. Green tea extracts may help improve insulin sensitivity and lower blood sugar levels, which can be beneficial for individuals with diabetes. The anti-inflammatory properties of catechins can help reduce inflammation in the body, potentially lowering the risk of chronic diseases. Some research indicates that green tea extracts may support brain health and improve cognitive function, possibly reducing the risk of neurodegenerative diseases.

Green tea extracts exert their effects primarily through catechins that neutralize free radicals and reduce oxidative stress, protecting cells and tissues from damage. Green tea extracts can enhance thermogenesis (the body's production of heat) and fat oxidation, leading to increased energy expenditure. EGCG and other catechins inhibit certain enzymes, such as lipase and amylase, which can reduce the absorption of fats and carbohydrates. Green tea extracts can also influence hormone levels related to appetite and metabolism, such as increasing levels of norepinephrine, which aids in fat burning. The compounds in green tea can inhibit inflammatory pathways, reducing the production of pro-inflammatory cytokines and promoting a balanced inflammatory response.

The appropriate dosage of green tea extract can vary depending on the specific formulation and intended use. For standardized extracts containing 50-90% catechins, a common dosage ranges from 250 mg to 500 mg per day. Many supplements emphasize epigallocatechin gallate (EGCG), with recommended dosages typically between 100 mg and 400 mg of EGCG per day. For liquid green tea extracts, it's important to follow the manufacturer's recommendations, as these can differ significantly. Drinking 3 to 5 cups of brewed green tea daily generally provides beneficial amounts of catechins, usually yielding between 240 mg and 320 mg.

Dosages may need adjustment based on individual health status, tolerance, and specific health goals. It's also worth noting that green tea extracts can contain caffeine, so individuals sensitive to caffeine should monitor their intake accordingly. Studies have shown various health-related aspects of green tea, including its potential benefits for weight loss, cardiovascular health, and cancer prevention, weight loss and maintenance through increased fat oxidation, protection against neurodegenerative diseases, improvement in insulin sensitivity and blood glucose management, resistance to certain cancers, and antioxidant properties among other benefits. These studies collectively underscore the wide-ranging nutritional effects associated with green tea extract, particularly concerning cardiovascular health, weight management, neuroprotection, metabolic health, cancer prevention, and general wellness.

Essential Amino Acids (EAAs)

Figure 22:
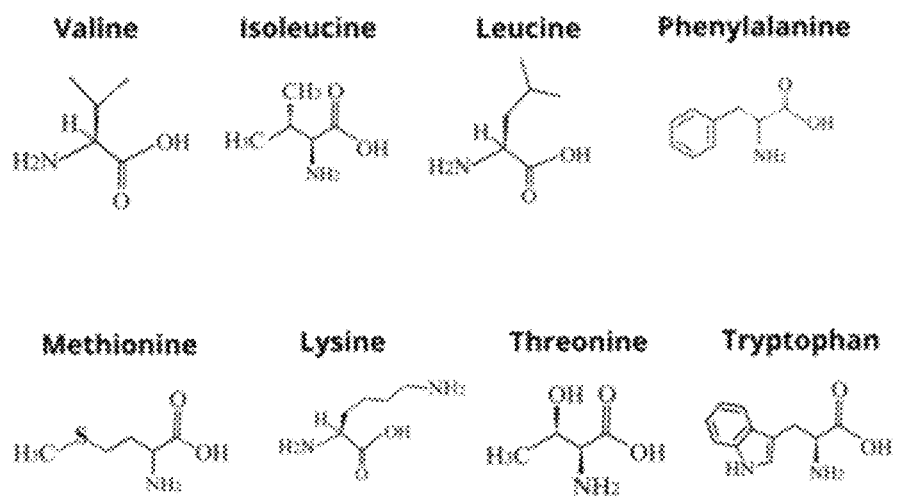
FIG. 22 illustrates the chemical structures for the BAAs valine, isoleucine, leucine, phenylalanine, methionine, lysine, threonine, and tryptophan are shown

Referring to FIG. 22, the chemical structures for the EAAs valine, isoleucine, leucine, phenylalanine, methionine, lysine, threonine, and tryptophan are shown. These are amino acids that the body cannot synthesize and must be obtained from dietary sources. There are nine EAAs: Leucine, Isoleucine, Valine, Lysine, Methionine, Threonine, Tryptophan, Phenylalanine, Histidine.

There are several forms of EAAs available for supplementation, each with its own dosage recommendations. EAA powders are concentrated forms that can be mixed with water or other liquids, typically flavored for taste. The recommended dosage for EAA powders is 10-15 grams per serving, commonly taken post-workout or during workouts. EAA capsules and tablets provide a convenient and portable option, with a dosage of 5-10 grams per serving, taken with water for ease of use. Liquid EAAs are ready-to-drink formulations that also deliver 10-15 grams per serving, often consumed around workout times. EAA blends, which may include additional ingredients like electrolytes or carbohydrates to enhance performance and recovery, usually recommend a dosage of 10-20 grams per serving, depending on the specific formulation.

The benefits of EAAs are significant. They are crucial for muscle protein synthesis, especially leucine, which plays a key role in stimulating this process to support muscle repair and growth. Research has shown the importance of leucine in protein metabolism. EAAs also improve recovery, with EAA supplementation reducing muscle soreness and promote faster recovery after intense exercise. Additionally, EAAs can enhance endurance by serving as an energy source during prolonged exercise. Furthermore, they support muscle retention during caloric restriction or weight loss by promoting protein synthesis. EAAs also influence hormonal regulation, including the secretion of insulin, which is critical for nutrient uptake and metabolism.

While EAAs are generally safe for most individuals, they may cause some adverse effects, including digestive issues such as nausea, diarrhea, or stomach cramps. Excessive intake can disrupt the balance of amino acids in the body, potentially leading to kidney strain, especially in individuals with pre-existing kidney conditions. There is also a risk of potential allergic reactions to specific EAA supplements, although these are rare. Lastly, EAAs might interact with certain medications, affecting their efficacy. Overall, EAAs are essential for various physiological processes, particularly in muscle health and recovery, and their diverse forms make them accessible for supplementation.

L-Arginine

Figure 23:
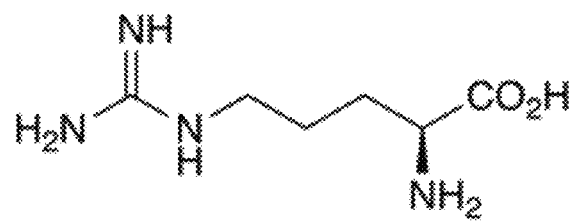
FIG. 23 illustrates the chemical structure for L-arginine.

Referring to FIG. 23 the chemical structure for L-arginine is shown. L-arginine is a semi-essential amino acid that plays a crucial role in various physiological processes in the body, particularly in the production of nitric oxide (NO). It is a precursor to nitric oxide, which aids in dilating blood vessels, thus improving blood flow and circulation. This enhancement in blood flow contributes to cardiovascular health by potentially lowering blood pressure and improving endothelial function. Additionally, L-arginine can enhance exercise performance by improving oxygen and nutrient delivery to muscles during physical activity. It may also promote wound healing through increased collagen synthesis and improved blood flow to injured areas. Furthermore, L-arginine supports immune function by promoting the proliferation of immune cells and is commonly used as a treatment for erectile dysfunction due to its role in enhancing blood flow.

For general health, a typical dosage of L-arginine ranges from 2 to 6 grams per day, often divided into doses, while higher dosages of 5 to 10 grams per day may be used for specific conditions like erectile dysfunction or cardiovascular health. L-arginine is frequently taken before exercise or in divided doses throughout the day.

The mechanism of action for L-arginine includes its conversion to nitric oxide by nitric oxide synthase, leading to vasodilation and increased blood flow. It serves as a building block for protein synthesis, supports muscle growth and repair, stimulates the release of growth hormone and insulin, and plays a role in the urea cycle to help remove excess ammonia from the body.

Nutritional ally, L-arginine supplementation has shown promise in managing cardiovascular disorders such as hypertension and atherosclerosis. It may enhance exercise performance and recovery by improving blood flow and nutrient delivery. L-arginine is also used in clinical settings to aid recovery from surgery and injury and is commonly recommended for men experiencing erectile dysfunction.

While L-arginine is generally safe, it can have adverse effects. Common gastrointestinal issues include nausea, diarrhea, and abdominal pain. Some individuals may experience allergic reactions, such as rash or swelling. Due to its vasodilatory effects, L-arginine may cause hypotension in some individuals. It can also interact with medications for hypertension or erectile dysfunction, enhancing their effects. Those with asthma or herpes virus infections should consult a healthcare provider before use, as L-arginine may exacerbate these conditions.

Recent research highlights L-arginine's benefits, including improvement in cardiovascular health by enhancing endothelial function and reducing blood pressure, enhancing exercise performance and recovery, improving erectile function in men with erectile dysfunction, benefiting patients with coronary artery disease and vascular function, and enhancing wound healing processes, highlighting its potential clinical applications.

L-arginine is a versatile amino acid with various health benefits, particularly for cardiovascular health, exercise performance, and wound healing. While generally safe, potential side effects and interactions warrant consideration, and consultation with a healthcare provider is recommended before starting supplementation.

Water Soluble Vitamins

Figure 24:
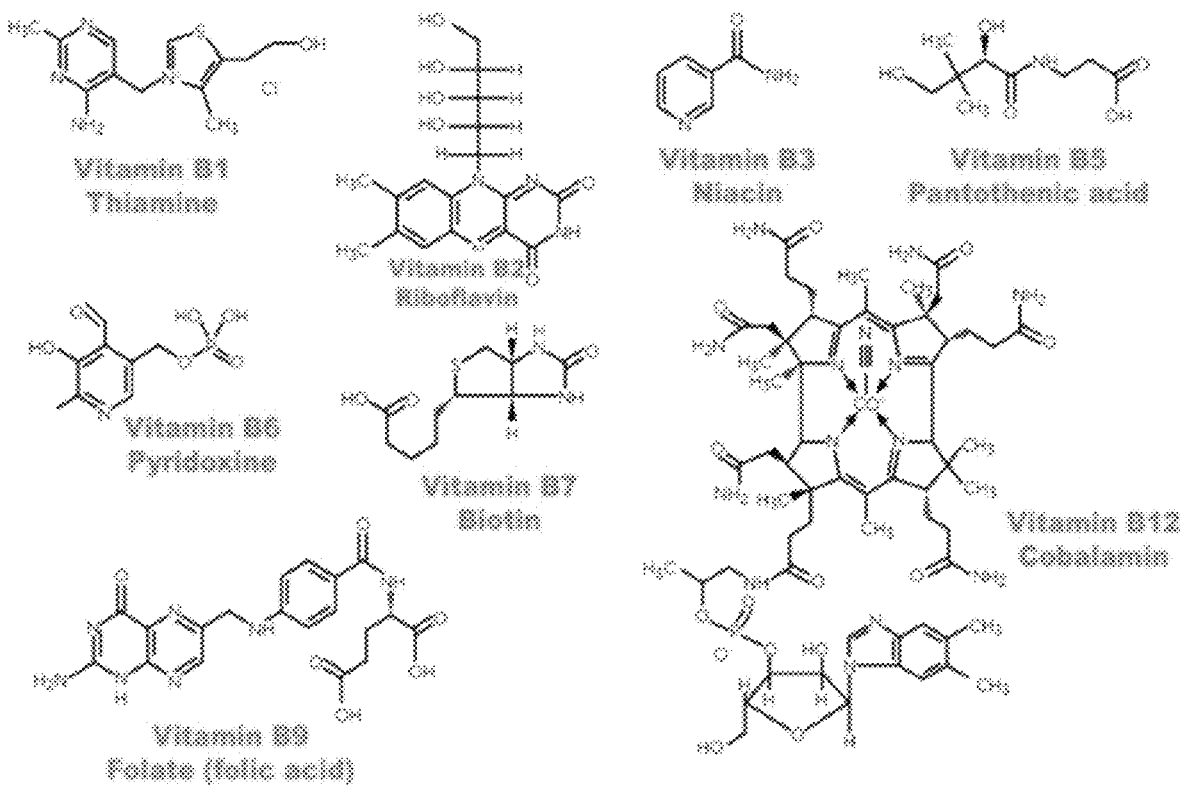
FIG. 24 illustrates the chemical structures of Vitamin B1, B2, B3, B4, B5, B6, B7, B9, and B12.

Referring to FIG. 24, the chemical structures of Vitamin B1, B2, B3, B4, B5, B6, B7, B9, and B12 are shown. Vitamin B refers to a group of water-soluble vitamins that play essential roles in cellular metabolism, energy production, and various bodily functions. The B vitamins include B1 (Thiamine), B2 (Riboflavin), B3 (Niacin), B5 (Pantothenic Acid), B6 (Pyridoxine), B7 (Biotin), B9 (Folate), and B12 (Cobalamin).

Vitamin B comprises various forms, each with distinct health benefits. Vitamin B1, or thiamine, supports energy metabolism, nerve function, and carbohydrate utilization, with a recommended dosage of 1.1 mg for women and 1.2 mg for men daily. It converts carbohydrates into energy through glycolysis and the Krebs cycle, and may help prevent Wernicke-Korsakoff syndrome, a serious brain disorder associated with alcoholism. Generally safe, high doses may cause allergic reactions.

Vitamin B2, known as riboflavin, is important for energy production, skin health, and eye health, with daily dosages of 1.1 mg for women and 1.3 mg for men. It functions as a coenzyme in energy metabolism and antioxidant processes and may reduce the frequency of migraines. Adverse effects are rare, though it may cause bright yellow urine.

Vitamin B3, or niacin, supports cholesterol levels, skin health, and nervous system function, with recommended dosages of 14 mg for women and 16 mg for men daily. It converts food into energy and synthesizes hormones, making it useful for managing hyperlipidemia. High doses can lead to flushing, itching, and gastrointestinal issues.

Vitamin B5, or pantothenic acid, is essential for synthesizing coenzyme A, which is involved in fatty acid metabolism, with a daily dosage of 5 mg. It plays a role in the Krebs cycle and may help manage stress and improve energy levels. Adverse effects are rare but may include diarrhea at very high doses.

Vitamin B6, known as pyridoxine, supports amino acid metabolism, red blood cell production, and immune function, with a dosage of 1.3 mg for adults, higher for those over 50. It acts as a coenzyme in over 100 enzymatic reactions, particularly those involving amino acids, and may assist in managing premenstrual syndrome and depression. High doses can lead to nerve damage and sensory neuropathy.

Vitamin B7, or biotin, is important for hair, skin, and nail health, and aids in carbohydrate and fat metabolism, with a daily dosage of 30 mcg. It serves as a coenzyme for carboxylase enzymes in fatty acid synthesis, potentially improving nail strength and hair health. Adverse effects are rare, and it is generally considered safe.

Vitamin B9, or folate, is crucial for DNA synthesis, red blood cell formation, and fetal development during pregnancy, with dosages of 400 mcg for women and 600 mcg for pregnant women daily. It is involved in one-carbon metabolism and nucleotide synthesis, reducing the risk of neural tube defects during pregnancy, but high doses may mask vitamin B12 deficiency.

Finally, Vitamin B12, known as cobalamin, is essential for nerve function, red blood cell formation, and DNA synthesis, with a recommended dosage of 2.4 mcg daily. It participates in methylation processes and myelin production, potentially improving cognitive function and energy levels in those with deficiency. It is generally safe, though high doses can lead to acne and rosacea in some individuals.

Studies have shown that thiamine assists in liver disease management, and plays a role in preventing Wernicke's encephalopathy. Riboflavin has the potential to reducing migraine frequency by improving mitochondrial energy production. B6 supplementation plays a role in lowering homocysteine levels, but while it reduced homocysteine, it did not significantly lower cardiovascular events. A combination of B6, B12, and folate have been shown to reduce brain atrophy in elderly participants with mild cognitive impairment. Riboflavin supplementation also improved hemoglobin levels in women with riboflavin deficiency anemia. The B6, B12 combination with folate has been shown to slow brain atrophy in elderly individuals with mild cognitive impairment. Niacin plays a role in lipid management and has cardiovascular benefits. Folic acid is effective in reducing neural tube defects in pregnancies.

The B vitamins play vital roles in numerous physiological processes, contributing to energy metabolism, nerve function, and overall health. While generally safe, specific dosages and potential side effects should be considered. Consultation with a healthcare provider is recommended before starting any supplementation.

Figure 25:
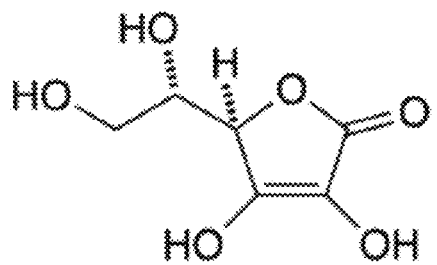
FIG. 25 illustrates the chemical structure of vitamin C (ascorbic acid).

Referring to FIG. 25, the chemical structure of vitamin C (ascorbic acid) is shown. Vitamin C provides multiple health benefits, including antioxidant protection that neutralizes free radicals, reducing oxidative stress and potentially lowering the risk of chronic diseases. It enhances immune function by supporting various cellular activities within both the innate and adaptive immune systems. Vitamin C is essential for collagen synthesis, which is crucial for skin, cartilage, and connective tissues, and promotes faster wound healing by aiding collagen formation and maintaining skin integrity. Additionally, it increases the absorption of non-heme iron from plant-based foods, helping to prevent anemia, and may support cognitive health while reducing the risk of neurodegenerative diseases due to its antioxidant properties.

The recommended dietary allowance (RDA) for adult men is 90 mg per day and for adult women is 75 mg per day, with increased requirements for pregnant (85 mg) and lactating women (120 mg). The upper limit is set at 2,000 mg per day to avoid potential adverse effects.

Vitamin C functions as an antioxidant by donating electrons to neutralize free radicals, thereby reducing oxidative stress. It serves as a cofactor for enzymes involved in collagen synthesis, neurotransmitter production, and the metabolism of certain amino acids. Furthermore, it influences immune modulation by enhancing the production and function of white blood cells. In terms of nutritional effects, vitamin C is crucial for the prevention and treatment of scurvy, correcting vitamin C deficiency and improving overall health. Some studies suggest that regular supplementation may reduce the duration and severity of colds, while its antioxidant properties may lower the risk of chronic diseases, including cardiovascular diseases and certain cancers, although more research is needed.

Potential adverse effects of vitamin C include gastrointestinal disturbances such as diarrhea, nausea, and abdominal cramps at high doses. Excessive intake may increase the risk of kidney stones, particularly in susceptible individuals, and in those with conditions like hemochromatosis, high vitamin C intake may exacerbate iron overload.

Vitamin C is a crucial nutrient with diverse roles in promoting health through its antioxidant properties, support for collagen synthesis, and enhancement of immune function. Vitamin C enhances immune function and its potential in reducing the severity and duration of respiratory infections. Vitamin C also shows a positive relationship with iron absorption, health benefits including neuroprotective effects, protective effects against UV-induced skin damage, and disease prevention.

Oil Soluble Vitamins (K, E, D, A)

Figure 26:
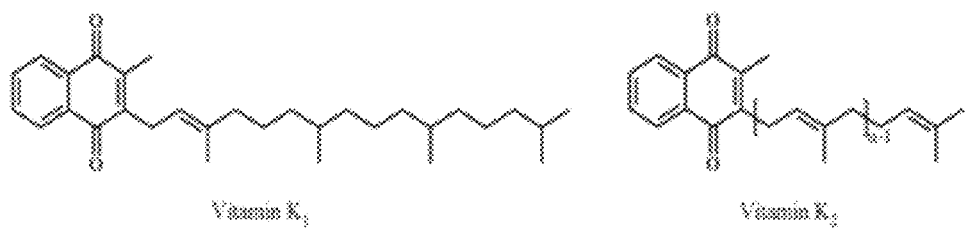
FIG. 26 illustrates the chemical structures of phylloquinone and menaquinone (vitamin K).

Referring to FIG. 26, the chemical structures of phylloquinone and menaquinone (vitamin K) are shown. Vitamin K is a fat-soluble vitamin crucial for various bodily functions, particularly in blood clotting and bone health. There are two main forms of vitamin K: $K_1$ (phylloquinone) and $K_2$ (menaquinone), which further includes several subtypes.

Vitamin $K_1$ is primarily found in green leafy vegetables such as kale, spinach, and broccoli. The recommended dietary allowance (RDA) is about 90 mcg/day for women and 120 mcg/day for men. Vitamin $K_1$ acts as a cofactor for the enzyme that activates clotting factors like prothrombin and proteins involved in bone metabolism, supporting blood coagulation and potentially improving bone density. It is generally safe, but excessive intake from supplements may interfere with anticoagulant medications.

Vitamin $K_2$ is found in fermented foods such as natto and cheese, as well as animal products like egg yolks and liver. There is no established RDA, but typical intake ranges from 90 to 120 mcg/day. Vitamin $K_2$ activates proteins that aid in calcium metabolism, including osteocalcin, which is involved in bone mineralization, and matrix Gla-protein, which prevents vascular calcification. It may enhance bone health, cardiovascular health, and support dental health. Adverse effects are rare, although high doses can interfere with anticoagulant therapy.

Vitamin $K_3$ (Menadione) is a synthetic form not commonly found in foods and is not recommended for supplementation in humans due to potential toxicity. It can be converted into active forms in the body but has a risk of high doses leading to toxicity, liver damage, or hemolytic anemia.

Health benefits of Vitamin K include its essential role in blood clotting by synthesizing clotting factors in the liver, thereby reducing the risk of excessive bleeding. It aids in bone health by regulating calcium in bones and the bloodstream, potentially reducing the risk of fractures and osteoporosis. Additionally, it may help prevent arterial calcification, supporting overall cardiovascular health, and some studies suggest a role in maintaining healthy teeth and gums.

Recent research studies have reviewed the impact of vitamin $K_1$ supplementation on bone mineral density, showing promising benefits. Menaquinone-7 improves bone mineral density and reduces bone loss in postmenopausal women, and higher vitamin K intake is associated with a lower risk of cardiovascular diseases. Vitamin $K_2$ plays a role in preventing arterial calcification and supporting cardiovascular health, in bone health, and shows potential as a preventive strategy against osteoporosis.

Vitamin K is generally safe when obtained from food sources, but caution is advised with supplements, particularly for individuals on anticoagulant therapy, as excessive supplementation can increase the risk of clotting. Rare allergic reactions may occur in sensitive individuals. Vitamin K plays a vital role in several physiological processes, particularly blood clotting and bone health. Monitoring dosage and consulting with a healthcare provider, especially for those on medications, is recommended, as recent research continues to uncover its nutritional potential in various health areas.

Figure 27:
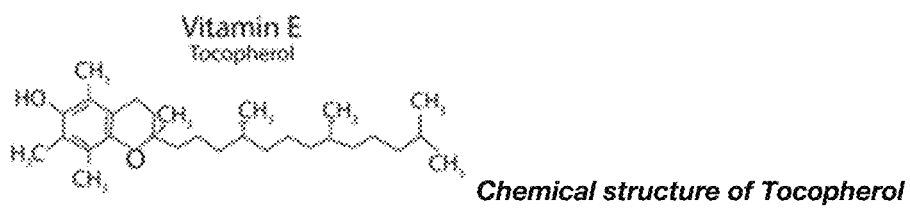
FIG. 27 illustrates the chemical structures of tocopherol and tocotrienols (Vitamin E).
Figure 27:

Referring to FIG. 27, the chemical structures of tocopherol and tocotrienols (Vitamin E) are shown. Vitamin E is a fat-soluble antioxidant that plays a crucial role in protecting cells from oxidative damage. It consists of various forms, with tocopherols and tocotrienols being the most studied.

Forms of Vitamin E include tocopherols, which comprise types Alpha ($\alpha$), Beta ($\beta$), Gamma ($\gamma$), and Delta ($\delta$) tocopherols. They are primarily found in vegetable oils, such as sunflower and safflower, nuts, seeds, and green leafy vegetables. The recommended dietary allowance (RDA) for adults is 15 mg (22.4 IU) of alpha-tocopherol per day. Tocopherols act as primary lipid-soluble antioxidants, protecting cell membranes from oxidative stress by neutralizing free radicals. They may help reduce the risk of chronic diseases, support immune function, and promote skin health. Generally safe, high doses (over 1,000 mg/day) can lead to increased bleeding risk, particularly in individuals on anticoagulants.

Tocotrienols are another form of vitamin E, consisting of Alpha ($\alpha$), Beta ($\beta$), Gamma ($\gamma$), and Delta ($\delta$) tocotrienols. They are found in certain grains, such as rice bran and barley, palm oil, and some nuts. There is no established RDA, but typical supplemental doses range from 50 to 400 mg per day. Tocotrienols also act as antioxidants but may have additional roles in reducing cholesterol and promoting brain health. They are potentially beneficial for cardiovascular health, cancer prevention, and neuroprotection, and are generally well tolerated, although high doses may cause gastrointestinal discomfort. Marine-derived tocopherols are sourced from marine organisms, including fish, algae, and certain types of seaweed. Common sources include fish oils from salmon or mackerel, algae, and phytoplankton, with algal oil gaining popularity as a plant-based source of tocopherols. These tocopherols primarily exist in four forms: alpha ($\alpha$), beta ($\beta$), gamma ($\gamma$), and delta ($\delta$), with alpha-tocopherol being the most biologically active form in humans. They help neutralize free radicals, may improve cardiovascular health by lowering cholesterol levels and reducing inflammation, and are often used in cosmetics for their protective effects against UV damage and skin aging. Marine-derived tocopherols may be more easily absorbed by the body compared to those from terrestrial sources, enhancing their efficacy.

Key characteristics of tocotrienols include their chemical structure, which differs from tocopherols due to the saturation of the isoprenoid side chain, contributing to their unique biological activity. Health benefits include potent antioxidant properties that combat oxidative stress and reduce cellular damage. Tocotrienols may help lower cholesterol levels, reduce arterial stiffness, and improve overall heart health. They possess anti-inflammatory properties, potentially benefiting various chronic conditions, and preliminary studies suggest they may inhibit cancer cell growth and promote apoptosis in certain cancer types. Emerging evidence indicates that tocotrienols may support brain health and protect against neurodegenerative diseases, and like tocopherols, they contribute to skin protection and may improve skin conditions.

Notable research on tocotrienols reviews tocotrienols' cardiovascular benefits, focusing on their effects on cholesterol levels and blood pressure. Tocotrienols play a role in inhibiting cancer cell proliferation and inducing apoptosis. Tocotrienols' neuroprotective mechanisms have the potential for preventing neurodegenerative diseases. Tocotrienols also have anti-inflammatory effects and benefit skin health, including protective effects against UV damage. Tocotrienols have the potential to help manage diabetes and its complications, and recent research studies have analyzed the impact of vitamin E on cognitive function, showing potential benefits for memory and cognitive decline in older adults. Tocotrienols have the potential to manage cholesterol levels and reduce cardiovascular risks. The antioxidant mechanisms of vitamin E enhance food preservation and nutrition. Vitamin E supplementation can enhance immune response in older adults, and may reduce the risk of developing age-related macular degeneration.

Adverse effects of vitamin E include that it is generally safe and well-tolerated from food sources. However, caution is advised with supplements, as high doses can lead to adverse effects such as increased risk of bleeding, particularly in individuals taking anticoagulants, gastrointestinal issues at high doses, and potential interactions with certain medications. Vitamin E is an essential nutrient with significant health benefits, particularly in antioxidant protection and promoting overall health. While it is generally safe, individuals considering supplementation should consult with a healthcare provider, especially those on medications or with existing health conditions. Ongoing research continues to reveal its potential nutritional effects across various health domains.

Vitamin D is a fat-soluble vitamin essential for bone and skeletal muscle health. It can be obtained from dietary sources such as fortified foods (e.g., bread and milk), fatty fish, mushrooms, and supplements, as well as synthesized in the skin upon exposure to ultraviolet B (UVB) rays. After ingestion or synthesis, vitamin D undergoes two hydroxylation reactions to become biologically active 1,25-dihydroxyvitamin D [1,25(OH)D]. The first hydroxylation occurs in the liver, where vitamin D is converted to 25-hydroxyvitamin D [25(OH)D] by vitamin D-25-hydroxylase. The second hydroxylation is carried out by CYP27B1-encoded 1α-hydroxylase (CYP27B1) in the kidneys, producing 1,25OH)D, with additional CYP27B1 activity found in macrophages, monocytes, and muscle fibers. The active form, 1,25(OH)D, acts as a transcription factor by binding to the vitamin D receptor (VDR) and forming a heterodimer with the retinoid X receptor (RXR) to regulate gene expression through vitamin D response elements (VDREs).

Serum 25(OH)D levels, which indicate vitamin D exposure and absorption and have a long half-life, are used to assess vitamin D status. Levels below 30 nmol/L (12 ng/ml) are indicative of vitamin D deficiency, while levels between 30 and 50 nmol/L (12-20 ng/ml) are considered insufficient. Adequate levels for bone health are generally defined as greater than 50 nmol/L (20 ng/ml). However, full suppression of parathyroid hormone occurs at around 100 nmol/L (40 ng/ml), suggesting that optimal vitamin D levels might be higher than those necessary to prevent deficiency. This lack of consensus on vitamin D cut points complicates comparisons in skeletal muscle research.

Regions with limited sunlight exposure, such as those above 43°N latitude, have higher rates of vitamin D deficiency. For instance, residents of Erie, Pennsylvania are more prone to deficiency compared to those in Bradenton, Florida. Individuals with darker skin tones and higher body fat percentages also have a higher risk of deficiency. Vitamin D plays a crucial role in calcium absorption in the intestines, maintaining blood calcium levels, and bone mineralization. Severe deficiency leads to rickets in children and osteomalacia in adults, conditions marked by weakened bones. Inadequate vitamin D is associated with decreased bone density, fractures, muscle weakness, osteopenia, and osteoporosis.

Vitamin D status has been linked to muscle strength across various age groups. In older adults, plasma 25(OH)D levels below 25 nmol/L are associated with reduced grip strength. In younger adults, higher baseline 25(OH)D levels correlate with improved strength recovery following intense resistance exercise. Despite variations in supplementation methodologies, including dosing and participant characteristics, evidence supports that correcting vitamin D deficiencies through supplementation enhances muscle strength. A meta-analysis conducted in 2015, focusing primarily on younger individuals with 25(OH)D levels below 25 nmol/L, demonstrated that weekly vitamin D supplementation ranging from 4,000 to 60,000 IU significantly improved both upper and lower body strength.

Vitamin D is not only crucial for maintaining muscle strength but also plays a significant role in muscle regeneration. Muscle damage, characterized by disrupted muscle fiber architecture, compromised contractile proteins, and mitochondrial dysfunction, requires effective regeneration processes. This regeneration involves restoring mitochondrial function and activating satellite cells (SCs), the resident skeletal muscle stem cells. Research shows that VDR expression increases markedly following muscle injury, particularly in central nuclei and SCs in animal models. Mechanistic studies have shed light on how vitamin D impacts injured muscle. Both in vitro and in vivo rodent studies indicate that vitamin D reduces reactive oxygen species (ROS) production, enhances antioxidant capacity, and mitigates oxidative stress-factors that contribute to muscle damage. Additionally, VDR knockdown leads to decreased mitochondrial oxidative capacity and ATP production, highlighting vitamin D's role in mitochondrial oxidative phosphorylation, a key driver of muscle regeneration. Vitamin D's influence on mitochondrial health may also affect SC activity and self-renewal, further impacting muscle regeneration. However, optimal timing, form, and dosage of vitamin D for muscle regeneration remain undetermined. Further research is needed to explore the mechanistic actions of 1,25(OH)D on mitochondria and SCs and to determine how these actions affect muscle injury recovery in vivo. Standardizing vitamin D sufficiency cut points, studying the efficacy of vitamin D administration over time, and comparing different vitamin D analogs are essential for clarifying its role in muscle regeneration.

Vitamin D is crucial for muscle and bone health, with emerging evidence supporting its role in muscle damage and regeneration. Understanding the optimal levels and mechanisms through which vitamin D aids muscle repair and strength recovery is vital for developing effective treatments and interventions. Further research will help to elucidate the full potential of vitamin D in enhancing muscle regeneration following injury.

Skeletal muscle exhibits remarkable plasticity, enabling it to adapt and regenerate robustly in response to various forms of stress and damage. Muscle damage can arise from multiple stimuli, including crush injuries, ischemia-reperfusion injuries, and resistance exercise. Rodent models offer reproducible and controlled environments for studying these injuries. Among human models, unaccustomed resistance exercise, particularly involving high-load eccentric contractions, is a well-studied cause of muscle damage.

Vitamin D deficiency adversely affects mitochondrial function, leading to decreased ATP production, increased reactive oxygen species (ROS) production, oxidative damage, muscle atrophy, and impaired muscle function. These symptoms may exacerbate typical muscle damage outcomes. During muscle regeneration, activated vitamin D [1,25(OH)D] increases vitamin D receptor (VDR) abundance in satellite cells (SCs) and central myonuclei. This upregulation of VDR is accompanied by inhibition of SC proliferation, stimulation of differentiation, and increased mitochondrial biogenesis and fusion, which mitigate oxidative stress and enhance regenerative capacity.

Although 25(OH)D functions as a biomarker of exposure, the extent to which 25(OH)D levels also serve as a biomarker of effect on the body (i.e., relating to health status or outcomes) is not clear. Researchers have not definitively identified serum concentrations of 25(OH)D associated with deficiency (e.g., rickets), adequacy for bone health, and overall health. After reviewing data on vitamin D needs, an expert committee of the Food and Nutrition Board (FNB) at the National Academies of Sciences, Engineering, and Medicine (NASEM) concluded that people are at risk of vitamin D deficiency at serum 25(OH)D concentrations less than 30 nmol/L (12 ng/ml; see Table 1 for definitions of deficiency and inadequacy). Some people are potentially at risk of inadequacy at 30 to 50 nmol/L (12-20 ng/mL). Levels of 50 nmol/L (20 ng/ml) or more are sufficient for most people. The FNB committee also noted that serum concentrations greater than 125 mmol/L (50 ng/mL) can be associated with adverse effects (See Table 1 below). The Endocrine Society has not identified 25(OH)D concentrations associated with vitamin D sufficiency, insufficiency, and deficiency and does not recommend routine testing of 25(OH)D concentrations in healthy individuals.

TABLE 1

Serum 25-Hydroxyvitamin D [25(OH)D] Concentrations and Health

| nmol/L* | ng/ml* | Health status |
|---|---|---|
| <30 | <12 | Associated with vitamin D deficiency, which can lead to rickets in infants and children and osteomalacia in adults |
| 30 to <50 | 12 to <20 | Generally considered inadequate for bone and overall health in healthy individuals |
| ≥50 | ≥20 | Generally considered adequate for bone and overall health in healthy individuals |
| >125 | >50 | Linked to potential adverse effects, particularly at >150 nmol/L (>60 ng/mL) |

*Serum concentrations of 25(OH)D are reported in both nanomoles per liter (nmol/L) and nanograms per milliliter (ng/mL). One nmol/L = 0.4 ng/mL, and 1 ng/mL = 2.5 nmol/L.

Optimal serum concentrations of 25(OH)D for bone and general health have not been established because they are likely to vary by stage of life, by race and ethnicity, and with each physiological measure used. In addition, although 25(OH)D levels rise in response to increased vitamin D intake, the relationship is nonlinear. The amount of increase varies, for example, by baseline serum levels and duration of supplementation.

Intake recommendations for vitamin D and other nutrients are provided in the Dietary Reference Intakes (DRIs) developed by expert committees of NASEM. DRI is the general term for a set of reference values used for planning and assessing nutrient intakes of healthy people. These values, which vary by age and sex, include the following:

Recommended Dietary Allowance (RDA): Average daily level of intake sufficient to meet the nutrient requirements of nearly all (97%-98%) healthy individuals; often used to plan nutritionally adequate diets for individuals;

Adequate Intake (AI): Intake at this level is assumed to ensure nutritional adequacy; established when evidence is insufficient to develop an RDA;

Estimated Average Requirement (EAR): Average daily level of intake estimated to meet the requirements of 50% of healthy individuals; usually used to assess the nutrient intakes of groups of people and to plan nutritionally adequate diets for them; can also be used to assess the nutrient intakes of individuals; and Tolerable Upper Intake Level (UL): Maximum daily intake unlikely to cause adverse health effects An FNB committee established RDAs for vitamin D to indicate daily intakes sufficient to maintain bone health and normal calcium metabolism in healthy people. RDAs for vitamin D are listed in both micrograms (mcg) and International Units (IU); 1 mcg vitamin D is equal to 40 IU (Table 2). Even though sunlight is a major source of vitamin D for some people, the FNB based the vitamin D RDAs on the assumption that people receive minimal sun exposure [1]. For infants, the FNB committee developed AIs based on the amount of vitamin D that maintains serum 25(OH)D levels above 20 ng/ml (50 nmol/L) and supports bone development.

Table 2 shows recommended dietary allowances (RDAs) for vitamin D.

TABLE 2

Vitamin D recommended daily allowances

| Age | Male | Female | Pregnancy | Lactation |
|---|---|---|---|---|
| 0-12 months* | 10 mcg (400 IU) | 10 mcg (400 IU) | | |
| 1-13 years | 15 mcg (600 IU) | 15 mcg (600 IU) | | |
| 14-18 years | 15 mcg (600 IU) | 15 mcg (600 IU) | 15 mcg (600 IU) | 15 mcg (600 IU) |
| 19-50 years | 15 mcg (600 IU) | 15 mcg (600 IU) | 15 mcg (600 IU) | 15 mcg (600 IU) |
| 51-70 years | 15 mcg (600 IU) | 15 mcg (600 IU) | | |

Various countries and professional organizations have established differing guidelines for vitamin D intake due to several factors. These variations stem from an incomplete understanding of vitamin D's biology and clinical implications, different objectives for the guidelines (such as public health recommendations versus clinical practice), and the reliance on observational studies alongside randomized clinical trials in some cases. For instance, the UK Scientific Advisory Committee on Nutrition advises a daily intake of 10 mcg (400 IU) for individuals aged 4 and older. Meanwhile, the Endocrine Society recommends routine vitamin D supplementation for children and teens aged 1 to 18, pregnant individuals, adults with pre-diabetes, and those aged 75 and older, but does not suggest supplementation for healthy adults aged 19 to 74. The Endocrine Society does not specify doses, but emphasizes that everyone should meet the recommended dietary allowance (RDA).

Vitamin D plays a role in muscle damage and regeneration mechanisms. Severe muscle damage disrupts muscle fiber integrity, impairing muscle structure and function. Indicators of muscle fiber damage include Z-disc streaming and a smeared appearance of sarcomeres, reflecting ultrastructural damage. This damage extends to contractile proteins, leading to necrotic zones where muscle regeneration begins. These necrotic zones attract neutrophils and macrophages, which play a critical role in cellular damage and regeneration. Increased cellular turnover and muscle fiber biogenesis in these regions contribute to muscle tissue regeneration.

Muscle fiber damage is characterized by the preservation of the basement membrane, allowing for regeneration rather than de novo fiber formation. This regenerative capacity is due to the presence of satellite cells (SCs), which are located on the periphery of muscle fibers between the basal lamina and sarcolemma. SCs are essential for muscle regeneration after severe injury, and are marked by the expression of Pax7. Following muscle damage, SCs undergo asymmetric division to produce a "sister" cell that returns to quiescence and a "daughter" cell that differentiates, integrates into the muscle tissue, and contributes its nucleus.

Recent studies emphasize the role of vitamin D signaling in muscle regeneration, particularly highlighting the expression of the Vitamin D Receptor (VDR). In both mature and aged mice, VDR protein expression is closely linked to serum 25(OH)D levels, underscoring the connection between vitamin D status and muscle health. Under normal conditions, VDR and the enzyme CYP27B1, which activates vitamin D, are minimally expressed in skeletal muscle. This was demonstrated in both C2C12 myoblasts and mouse muscle through immunocytochemistry and immunoblotting techniques. Following muscle injury, there is a significant upregulation of VDR and CYP27B1. VDR is highly expressed in regenerating muscle fibers, colocalizing with central myonuclei. Moreover, VDR colocalizes with Pax7 in satellite cells, which are essential for muscle regeneration. Further evidence of vitamin D's role in muscle repair comes from findings that Pax7 and VDR expression increase following high-intensity exercise, highlighting the importance of vitamin D in the recovery process. These studies collectively underscore the role of vitamin D in muscle regeneration, especially in response to injury and exercise.

Muscle regeneration efficiency declines with age due to various multifactorial changes. Muscle mass peaks in the third decade of life, and noticeable declines begin in the fifth decade. Age-related muscle atrophy is primarily driven by imbalances in muscle protein synthesis and degradation. Mitochondrial dysfunction and excessive reactive oxygen species (ROS) production further contribute to muscle loss, with these issues being linked to impaired mitochondrial fusion, fission, mitophagy, and biogenesis.

Aging also reduces the satellite cell (SC) pool and SC activity, which are essential for muscle regeneration. Additionally, this reduction in SC activity leads to decreased regenerative capacity and increased fibrosis, possibly due to the transition of SCs to a fibrogenic phenotype. Interestingly, in mice, VDR expression increases with age, suggesting a role for vitamin D in supporting muscle regeneration during aging. In contrast, human studies show that VDR expression decreases with age. Notably, in older women, VDR expression correlates with circulating 25(OH)D levels following vitamin D supplementation.

Elevated VDR expression in aged mouse muscle is associated with central nucleation, which indicates muscle fiber recovery from damage. Understanding the factors that impair muscle regeneration with age, and the potential role of vitamin D signaling, may provide new nutritional supplement strategies to enhance muscle regeneration throughout life.

Vitamin D is also implicated in mitochondrial health. Vitamin D deficiency, defined by serum 25(OH)D levels below 50 nmol/L, has been consistently linked to muscle atrophy and reduced muscle strength across several clinical studies. In particular, research shows that individuals with low Vitamin D levels experience diminished muscle function and higher risks of falls, especially in older populations. Similarly, studies have shown the association between Vitamin D insufficiency and muscle weakness in both healthy individuals and patients with chronic conditions.

Recent research also emphasizes the importance of Vitamin D in mitochondrial function. Deficiency in Vitamin D has been associated with impaired mitochondrial health, but supplementation in deficient individuals has been linked to improvements in mitochondrial density and function. Animal studies support these findings, showing that Vitamin D supplementation improves mitochondrial parameters such as density and bioenergetic capacity. These findings highlight Vitamin D's essential role not only in muscle protein synthesis but also in promoting overall mitochondrial health, offering promising nutritional avenues for addressing muscle weakness and atrophy in Vitamin D-deficient populations.

Vitamin D's impact on mitochondrial health is gaining attention, particularly regarding its role in skeletal muscle atrophy. Overexpression of the vitamin D receptor (VDR) in rat skeletal muscle has been shown to increase muscle hypertrophy, primarily through enhanced anabolic signaling, ribosomal biogenesis, and protein synthesis. Although the effects of VDR overexpression on mitochondrial dynamics are not yet fully understood, vitamin D is known to regulate oxidative capacity through the binding of 1,25(OH)D to the VDR in skeletal muscle. In studies with VDR-knockdown C2C12 myoblasts, mitochondrial ATP production was significantly reduced, highlighting the critical role of 1,25 (OH)D signaling in maintaining ATP availability. This reduction in ATP production could adversely affect muscle regeneration, as mitochondrial capacity is essential for this process.

Interestingly, reductions in ATP generation following VDR knockdown occurred without significant changes in several mitochondrial machinery components, including electron transport system (ETS) subunits I-V, citrate synthase, and cytochrome c oxidase. Similarly, in vivo experiments with vitamin D-deficient mice revealed reduced maximum oxidative capacity without alterations in ETS protein expression. These findings suggest that 1,25(OH)D regulation of oxidative capacity might not solely depend on mitochondrial density or ETS protein abundance.

Further investigations have shown that VDR knockdown in C2C12 myotubes leads to increased levels of optic atrophy 1 (OPA1), a marker associated with mitochondrial fusion, which results in larger mitochondria and potentially greater oxidative capacity. However, increased OPA1 expression was also observed in response to vitamin D supplementation in both vitamin D-deficient mice with statin-induced myopathy and human skeletal muscle cells treated with 1,25(OH)D. The reason behind the increased OPA1 expression under both conditions remains unclear. Moreover, while 1,25(OH)D administration increased the oxygen consumption rate in human skeletal muscle cells, neither 25(OH)D nor vitamin D3 had this effect. These contrasting results underscore the need for further research to clarify the impact of VDR expression and various vitamin D analogs on mitochondrial dynamics.

Vitamin D plays a role in ROS production and antioxidant systems. Vitamin D deficiency may contribute to muscle atrophy through excessive mitochondrial ROS production. Although ROS are crucial for muscle signaling after injury, excessive ROS that overwhelm antioxidant defenses can damage muscle tissue. Vitamin D deficiency has been linked to increased lipid and protein oxidation in skeletal muscle. It also alters antioxidant enzyme activities, with some studies showing increased superoxide dismutase (SOD) activity in humans with chronic lower back pain, while other studies report decreased SOD activity in deficient rats. Despite these differences, studies agree that vitamin D deficiency increases muscle glutathione peroxidase (GPx) activity. Vitamin D supplementation has been associated with normalization of SOD and GPx activities in both human and animal models.

Studies indicate that vitamin D analogs can protect skeletal muscle and cells from oxidative stress. In vitro studies have shown that 1,25(OH)D reduces ROS production, lipid and protein oxidation, protein ubiquitination, muscle proteolysis, intracellular damage, and gene markers for atrophy, while increasing SOD activity and markers of mitochondrial biogenesis. However, data on the protective effects of vitamin D analogs in vivo are limited. One study involving patients with chronic lower back pain found that vitamin D3 supplementation reduced Cu/Zn SOD and GPx activity in paraspinal muscle, with corresponding decreases in protein and lipid peroxidation. These findings underscore the importance of vitamin D for maintaining redox balance and promoting muscle mitochondrial health during oxidative stress. Vitamin D's role in maintaining mitochondrial health and mitigating muscle atrophy is multifaceted, involving regulation of oxidative capacity, mitochondrial dynamics, and antioxidant defenses.

Studies also indicate Vitamin D plays a role in satellite cell mitochondrial function. Mitochondrial oxidative capacity is vital for skeletal muscle regeneration following injury. Mitochondria not only supply energy for protein synthesis but also play a crucial role in regulating satellite cell (SC) activity. Quiescent SCs have fewer mitochondria and lower oxidative capacity compared to activated, differentiating SCs, making mitochondrial function a key factor in SC activation. This difference in oxidative capacity has been observed in vivo; for example, endurance-trained mice exhibit reduced mitochondrial respiration in SCs, which correlates with a higher proportion of SCs expressing self-renewal markers. Beyond metabolic reprogramming, other mitochondrial processes are critical for SC function. For instance, effective mitophagy, the process of removing damaged mitochondria, is essential for normal SC activity. In Parkin null mice, which lack the E3 ubiquitin ligase Parkin crucial for mitophagy, SC proliferation increased while differentiation was impaired after muscle injury with cardiotoxin. This resulted in delayed muscle fiber repair and smaller muscle fibers during regeneration.

Vitamin D influences SC mitochondrial function. Mitochondrial production of reactive oxygen species (ROS) also affects SC activity, as ROS can stimulate symmetric cell division and subsequent terminal differentiation. Notably, a study on human skeletal muscle myoblasts showed that vitamin D treatment inhibited myoblast proliferation while increasing differentiation and mitochondrial oxygen consumption rate. This suggests that vitamin D may help maintain SC quiescence while enhancing mitochondrial activity to support differentiation and myotube formation. However, the specific changes in mitochondrial density or ROS production that contribute to increased oxygen consumption and altered SC activity remain unclear. Further research is needed to fully understand how vitamin D signaling affects mitochondrial function and SC regulation.

Vitamin D analogs play a role in mitigating skeletal muscle injury. The potential for vitamin D to aid in muscle regeneration after injury is supported by studies showing improved cellular turnover and muscle function with vitamin D3 administration following crush injury in rats. Immediate post-injury treatment with vitamin D3 increased proliferation of interstitial cells and decreased necrotic cell presence, suggesting enhanced activity of muscle repair-related cells like macrophages and fibrogenic cells. However, vitamin D3 did not significantly alter Pax7+SC abundance or muscle morphology through 42 days post-injury. Despite this, vitamin D3-treated rats exhibited better peak tetanic torque compared to controls, indicating improved muscle function.

In contrast, delayed administration of 1,25(OH)D (the active form of vitamin D) 4 days after muscle injury did not yield regenerative benefits. Both physiological and supraphysiological doses of 1,25(OH)D increased VDR protein expression but did not produce larger muscle fibers 8 days post-injury. Moreover, supraphysiological doses led to impaired SC differentiation and de novo myogenesis, resulting in smaller muscle fibers and excessive fibrosis. These studies highlight the importance of timing, dose, and delivery method for optimizing muscle regeneration with vitamin D analogs. Research indicates that supplementation with vitamin D3 in young men with marginally insufficient vitamin D status improved knee extensor torque following exercise-induced muscle damage. This suggests that vitamin D3 can enhance muscle regeneration and function in individuals with insufficient vitamin D levels. Given the high prevalence of vitamin D deficiency among athletes and the general population, these findings are particularly relevant.

Figure 28:
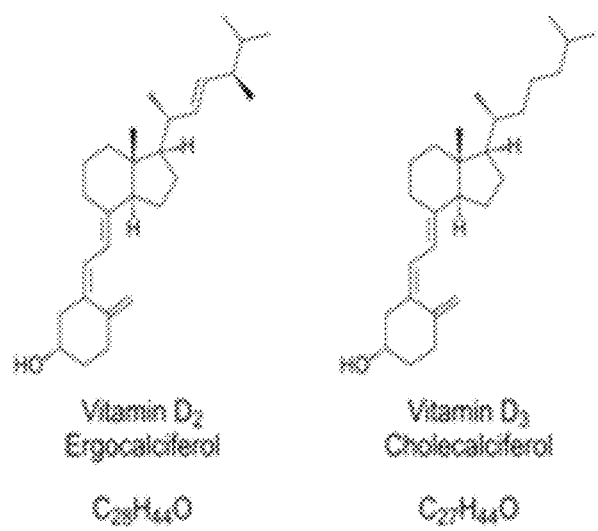
FIG. 28 illustrates the chemical structures of vitamin D in its most significant forms, $D_2$ (ergocalciferol) and $D_3$ (cholecalciferol).

Referring to FIG. 28, vitamin D is shown in its most significant forms, $D_2$ (ergocalciferol) and $D_3$ (cholecalciferol). Vitamin D is a fat-soluble vitamin essential for several bodily functions, including calcium and phosphate metabolism, immune function, and muscle health. Vitamin $D_2$ is found in some fungi and yeast and is often used in fortified foods and supplements. Its bioavailability is generally less effective at raising blood levels of vitamin D compared to $D_3$. Vitamin $D_3$ is synthesized in the skin upon exposure to sunlight and is also found in animal-based foods like fatty fish, liver, and egg yolks. Its bioavailability is more effective than $D_2$ at raising and maintaining serum levels of vitamin D. Calcidiol (25-hydroxyvitamin D) is the main circulating form of vitamin D in the body and is often measured in blood tests to assess vitamin D status. Calcitriol (1,25-dihydroxyvitamin D) is the active form of vitamin D, produced from calcidiol, and it regulates calcium and phosphate metabolism.

The benefits of Vitamin D include its essential role in bone health, as it is critical for calcium absorption and bone mineralization, helping to prevent osteoporosis and fractures. It supports muscle function; deficiency is linked to muscle weakness and increased fall risk in older adults. Vitamin D plays a role in modulating immune responses, potentially reducing the risk of infections and autoimmune diseases. It may help regulate blood pressure and cardiovascular function; some studies suggest a link between low vitamin D levels and heart disease. Additionally, low levels of vitamin D have been associated with mood disorders, including depression.

Figure 29:
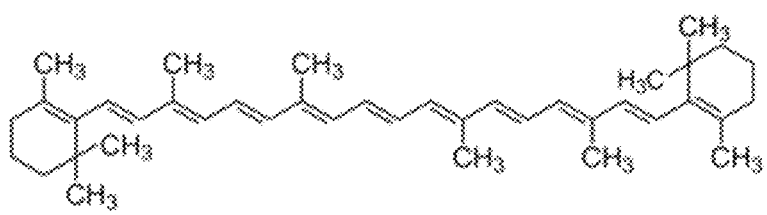
FIG. 29 illustrates vitamin A in its two main types: preformed vitamin A (retinol) and provitamin A carotenoids.

Referring to FIG. 29, vitamin A can be categorized into two main types: preformed vitamin A (retinol) and provitamin A carotenoids. Preformed vitamin A is found in animal products such as liver, fish, and dairy, where it is readily utilized by the body. In contrast, provitamin A carotenoids, such as beta-carotene, are sourced from plant-based foods like carrots, sweet potatoes, and spinach, and the body converts these into retinol.

The role of vitamin A is essential for various physiological processes, including vision, immune function, and cellular communication. It plays a critical part in maintaining healthy skin and mucous membranes. Among its numerous benefits, vitamin A is crucial for vision as it is necessary for the formation of rhodopsin, a pigment in the retina that aids night vision. It also supports immune function by maintaining the integrity of mucosal surfaces and enhancing immune cell function. Additionally, vitamin A promotes skin health by facilitating cell production and repair, making it beneficial for conditions such as acne. Its derivatives, known as retinoids, are recognized for their anti-aging properties, helping to reduce fine lines, wrinkles, and improve overall skin texture. Moreover, vitamin A is important for reproductive health, particularly in fetal development.

The mechanisms by which vitamin A exerts its effects include gene regulation through binding to nuclear receptors (retinoic acid receptors), which helps regulate gene expression involved in cell differentiation and proliferation. Carotenoids also possess antioxidant properties that neutralize free radicals, protecting cells from oxidative damage. Additionally, vitamin A is involved in the visual cycle, converting light into electrical signals in the retina.

In terms of anti-aging benefits, vitamin A, especially in its retinoid form, is widely utilized in skincare for its ability to promote cell turnover, reduce the appearance of fine lines and wrinkles, and improve skin texture and tone by stimulating collagen production.

The recommended dietary allowance (RDA) for vitamin A varies: for adults, it is generally between 700 and 900 mcg RAE (Retinol Activity Equivalents) per day. Pregnant women are advised to consume 770 mcg RAE daily, while lactating women should aim for 1,300 mcg RAE. Higher doses may be prescribed for specific conditions but should only be taken under medical supervision.

While vitamin A is essential, excessive intake can lead to toxicity, known as hypervitaminosis A. Symptoms of this condition may include nausea, vomiting, dizziness, blurred vision, liver damage, and increased risk of bone fractures. In summary, vitamin A is vital for numerous bodily functions, including vision, immune support, and skin health. It offers significant benefits, particularly in anti-aging, but adherence to recommended dosages is crucial to avoid adverse effects.

Creatine

Figure 30:
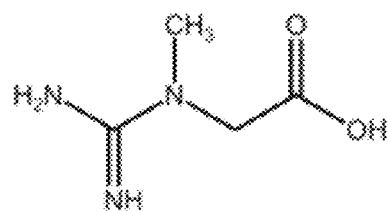
FIG. 30 illustrates the chemical structure of creatine.

Referring to FIG. 30, the chemical structure of creatine is shown. Benefits of creatine include enhanced athletic performance, as it improves strength, power, and performance in high-intensity exercise and sports. It supports muscle mass increase, aiding in muscle hypertrophy and recovery, making it popular among bodybuilders and athletes. Creatine improves recovery by reducing muscle cell damage and inflammation following intense exercise. It may provide cognitive benefits, enhancing cognitive function and reducing mental fatigue, particularly in tasks requiring quick thinking and concentration. Additionally, creatine shows neuroprotective effects, potentially beneficial in neurological disorders like Parkinson's and Huntington's disease.

The mechanism of action for creatine involves ATP regeneration, as it enhances the rephosphorylation of adenosine triphosphate (ATP), the primary energy carrier in cells, particularly during short bursts of intense activity. It increases phosphocreatine stores in muscles, allowing for quicker energy production. Creatine also influences cellular signaling pathways that promote muscle growth and adaptation to stress, such as the mTOR pathway. Furthermore, it has a hydration effect, increasing water content in muscle cells, which may contribute to increased muscle size and performance. Nutritional effects of creatine include aiding in the management of muscle disorders, such as muscular dystrophy. It shows potential benefits in chronic fatigue syndrome by reducing fatigue and enhancing quality of life. Some studies suggest that creatine may support bone health and density through enhanced muscle strength.

There is no official recommended daily allowance (RDA) for creatine, but common supplementation protocols include a loading phase of 20 grams per day, divided into four doses for 5-7 days, followed by a maintenance phase of 3-5 grams per day.

Adverse effects of creatine are generally mild, with some users experiencing stomach cramps, diarrhea, or nausea. It can cause weight gain due to increased water retention in muscles. There are potential concerns for individuals with pre-existing kidney conditions; however, studies generally show that creatine is safe for healthy individuals.

Research indicates creatine has a positive effect on performance in competitive sports, provides cognitive benefits, and promotes muscle health in older adults. Creatine is a well-researched supplement known for its significant benefits in athletic performance, muscle growth, and potential cognitive effects. While generally safe, users should adhere to recommended dosages and be aware of possible side effects.

DHEA Derivatives

DHEA is commonly used as a dietary supplement. DHEA (dehydroepiandrosterone) is a hormone produced by the adrenal glands and serves as a precursor to both androgens (like testosterone) and estrogens (like estrogen). Its derivatives and metabolites can have various effects on the body. Some key DHEA derivatives and related compounds include:

DHEA-S (dehydroepiandrosterone sulfate) is a sulfated form of DHEA that is more stable in the bloodstream and is often measured in blood tests to assess adrenal function and hormone levels. Androstenedione is a direct precursor to testosterone and estrogen, functioning as an androgenic steroid and playing a role in the production of sex hormones. Testosterone is a primary male sex hormone and anabolic steroid derived from DHEA through intermediate steps, crucial for the development of male reproductive tissues and the promotion of secondary sexual characteristics. Estrogens are derived from DHEA, including estrone (E1) and estradiol (E2), which regulate the menstrual cycle and reproductive system in females. DHEA-3 (dehydroepiandrosterone 3β-sulfate) is another sulfate ester of DHEA, involved in similar physiological processes. 7-Keto-DHEA is a derivative of DHEA that is not converted into estrogens or androgens and is often marketed as a supplement for weight loss and metabolic support, though its efficacy and safety are subjects of ongoing research. DHEA-P (dehydroepiandrosterone propionate) is a less common derivative used primarily in research contexts. Each of these applications of DHEA derivatives is supported to varying degrees by scientific research, with effectiveness depending on the specific derivative, dosage, and individual health conditions. Further research is often needed to fully understand the scope of benefits and mechanisms involved.

DHEA (dehydroepiandrosterone) derivatives have a broad range of benefits, particularly in areas such as muscle hypertrophy, anti-aging, hormonal balance, and cancer-related muscle preservation. The research also covers their effects on various cell lines, inflammatory responses, and bioavailability enhancement strategies. Muscle hypertrophy benefits from DHEA derivatives, which can promote muscle growth by influencing anabolic pathways and muscle protein synthesis. Recent research indicates improvement in muscle strength and physical performance with DHEA supplementation, muscle mass and strength improvements in older men using DHEA, and that DHEA supplementation increases lean body mass and decreases fat mass.

In terms of anti-aging benefits, DHEA derivatives may help mitigate age-related declines in muscle mass, bone density, and overall vitality. DHEA has been shown to improve bone density and body composition in the elderly, and can help reduce age-related physical decline.

Regarding sexual hormonal balance, DHEA derivatives act as precursors to estrogen and testosterone, aiding in hormonal balance and sexual health. DHEA affects sexual hormones and function, and plays a role in hormone replacement therapy and sexual dysfunction. In the context of muscle preservation in cancer, DHEA derivatives may help preserve muscle mass and counteract cachexia in cancer patients, including avoiding or mitigating muscle wasting, and influence cell proliferation. DHEA has also shown anti-inflammatory properties that can benefit chronic inflammatory conditions, and has been used supplementally by pre- and post-menopausal women.

DHEA derivatives face solubility and bioavailability challenges, primarily due to their low water solubility. Enhancement strategies include micronization, which improves solubility and absorption, and cyclodextrin complexes, which enhance solubility and bioavailability through encapsulation. Additionally, combining DHEA with β-hydroxy β-methylbutyrate free acid (HMB-FA) can improve efficacy. Micronization and cyclodextrin encapsulation have been shown to improve the bioavailability of DHEA.

DHEA Enanthate is a longer-acting ester of dehydroepiandrosterone (DHEA), designed for nutritional use to enhance hormone levels in the body. Its extended release allows for less frequent dosing compared to other forms, making it a convenient option for hormone replacement therapies. DHEA Enanthate is often administered via intramuscular injection, providing a sustained release of DHEA into the bloodstream.

Research has shown that DHEA Enanthate can effectively increase serum DHEA levels, leading to various potential benefits. For instance, studies have indicated its role in improving muscle mass, strength, and physical performance, particularly in older adults. Research on DHEA and its effects on hormone levels and sexual function have demonstrated the positive impacts of DHEA derivatives, including enanthate, on sexual health and hormonal balance, and the benefits of DHEA in promoting muscle strength and mass.

DHEA Enanthate has also been explored for its anti-aging effects, with some studies suggesting it may help mitigate declines in bone density and muscle mass associated with aging. Research on the effect of DHEA supplementation on bone density and body composition in older adults has shown improvements in bone density through DHEA supplementation.

In the context of sexual hormonal balance, DHEA enanthate functions as a precursor to both estrogen and testosterone, thus supporting overall hormonal regulation. Testosterone and DHEA are used to address in sexual dysfunction in hormone replacement therapies. While DHEA enanthate has shown promise in various nutritional applications, further research is necessary to fully understand its long-term effects, optimal dosing strategies, and potential side effects.

As with other DHEA derivatives, individual responses can vary significantly based on health conditions and baseline hormone levels.

Dehydorepiandrosterone DHEA supplementation is effective in women with adrenal insufficiency and chronically treated with exogenous glucocorticoids, postmenopausal women with low bone mineral density and/or osteoporosis, premenopausal women with sexual disorders and low libido, and in women with vulvovaginal atrophy due to menopause or genitourinary syndrome of menopause. Currently available clinical trials also suggest that DHEA supplementation is probably effective in postmenopausal women with hypoactive sexual disorders, infertile women with diminished ovarian reserve, women suffering from depression and anxiety, and women with obesity and insulin resistance.

Unfortunately, DHEA is rapidly metabolized by liver enzymes referred to as sulfotransferases. Sulfotransferases rapidly convert the much of the supplementary DHEA into DHEA sulfate, which is quickly excreted from the body and is not effective as an anti-aging, muscle-building or fat reduction compound. In addition, DHEA sulfate does not restore the balance of the adrenal steroids discussed above. As a result, frequent and larger doses of DHEA must be taken. DHEA is also metabolized in the body to one of several compounds including, for example, etiocholanolone (5-beta-androstan-3-alpha-ol-17-one), beta etiocholanolone (5-beta-androstan-3-beta-ol-17-one), androsterone (5-alpha-androstan-3-alpha-ol-17-one), epiandrosterone (5-alpha-androstan-3-beta-ol-17-one), 7-keto-DHEA, 7-alpha-hydroxy-DHEA, 7-beta-hydroxy-DHEA, androstenedione, estrone and estradiol.

Taking large doses of DHEA (dehydroepiandrosterone) to overcome its poor bioavailability can be problematic and may not necessarily lead to better outcomes. High doses of DHEA can lead to a range of side effects, including acne, hair loss, mood changes, and more serious issues like hormonal imbalances. Excessive DHEA can disrupt the normal balance of sex hormones in the body, leading to symptoms related to both androgens and estrogens. These increased doses of DHEA can result in increased conversion to estrone and estradiol, with resulting negative side effects for males including growth of male breast tissue, known as gynecomastia.

DHEA serves as a precursor to both androgens (such as testosterone) and estrogens (such as estrone). High doses can lead to elevated levels of these hormones, potentially causing issues like increased risk of prostate issues in men and breast tenderness or irregular menstrual cycles in women.

DHEA is poorly absorbed when taken orally. This is partly due to its lipophilic nature (fat-loving) and also because of first-pass metabolism in the liver, which can significantly reduce the amount of DHEA that enters the bloodstream. The stomach and intestines can break down DHEA before it has a chance to be absorbed. This is compounded by its poor solubility in water, which affects its dissolution and absorption in the gastrointestinal tract.

There is great individual variability in the metabolism of oral DHEA. The DHEA metabolites estrone and estradiol can result in negative estrogenic side effects for males including growth of male breast tissue, known as gynecomastia.

Nutritional Effects of Individual Supplements

A variety of individual supplements provide nutritional effects in combination with DHEA. These include:

β-Hydroxy-β-Methylbutyrate (HMB) free acid: HMB benefits include muscle preservation, recovery enhancement, and reduction of muscle damage. The mechanism involves its role in muscle protein synthesis and recovery processes.

Adaptogens and their modified constituents: Adaptogens reduce fatigue, enhance cognitive function, and improve sexual function. The mechanism suggests that ginsenosides in *ginseng* possess adaptogenic properties that modulate hormone levels while enhancing performance.

Vitamin D: Vitamin D supports bone health, muscle function, and hormonal balance. The mechanism involves enhancing calcium absorption and influencing testosterone levels.

Essential Amino Acids (EAAs): EAAs promote muscle protein synthesis and enhance recovery. They are directly involved in muscle repair and growth processes.

Creatine: Creatine increases strength, enhances high-intensity performance, and promotes muscle recovery. Its mechanism centers on enhancing ATP production during exercise.

Non-Esterified Omega-3 Fatty Acids (Free Acids): These fatty acids reduce inflammation, support cardiovascular health, and may improve muscle recovery. Their mechanism involves modulating inflammatory processes and promoting muscle protein synthesis.

Vitamin K: Vitamin K supports bone health and cardiovascular health. Its mechanism is crucial for calcium metabolism and bone mineralization, aiding strength maintenance.

Vitamin E: Vitamin E acts as an antioxidant, protecting cells from oxidative stress. Its mechanism involves safeguarding muscle cells from oxidative damage during exercise.

Vitamin B3 (Niacin) and Vitamin B6: These vitamins support energy metabolism and cognitive function. Their mechanism relates to energy production and neurotransmitter synthesis, crucial for overall performance.

Green Tea Extract: This extract supports metabolism, aids in fat loss, and provides antioxidant protection. The mechanism involves catechins enhancing metabolic rate and fat oxidation.

Stilbenoids (for example, Trans-Resveratrol): Resveratrol exhibits antioxidant and anti-inflammatory properties while supporting cardiovascular health. Its mechanism activates pathways associated with longevity and reduces inflammation.

Chelated Minerals: Chelated minerals enhance mineral absorption and bioavailability, supporting various physiological functions, including bone health, muscle function, and enzyme activity. The mechanism involves binding minerals to organic molecules, which improves their transport and utilization in the body.

Vitamin C: Vitamin C is essential for collagen synthesis, immune function, and antioxidant protection. Its mechanism involves acting as a cofactor in enzymatic reactions and scavenging free radicals, thus reducing oxidative stress.

Vitamin A: Vitamin A supports vision, immune function, and skin health. The mechanism involves its role as a precursor to retinoids, which regulate gene expression and cellular differentiation.

DHEA Derivatives: DHEA derivatives support hormonal balance, enhance libido, promote muscle growth, and improve mood. The mechanism involves DHEA being a precursor to sex hormones (testosterone and estrogen), influencing muscle mass and overall vitality. Combining DHEA derivatives with a range of complementary supplements creates a holistic approach to enhance muscle preservation, support anti-aging efforts, reduce inflammation, improve sexual function, and maintain hormonal balance. Each supplement has distinct mechanisms that complement the effects of DHEA, promoting overall health and physical performance.

The synergistic effects of HMB, essential amino acids (EAAs), creatine, and DHEA can significantly enhance muscle growth and recovery. HMB supports muscle preservation, while EAAs are vital for protein synthesis and recovery. Creatine boosts ATP production, enhancing performance during high-intensity workouts. Moreover, the combination of *Panax ginseng* and omega-3 fatty acids can boost energy levels and reduce fatigue. *Ginseng* acts as an adaptogen, improving endurance and cognitive function, while omega-3s support cardiovascular health and reduce exercise-induced inflammation.

In terms of anti-aging benefits, DHEA, vitamin D, and magnesium work synergistically to support hormonal balance and muscle function, countering age-related decline. DHEA enhances hormonal levels, vitamin D improves calcium metabolism and muscle function, while magnesium supports energy production and enzymatic reactions. For cardiovascular health, omega-3 fatty acids and vitamin D support heart health, while zinc and magnesium contribute to overall metabolic health. Omega-3s help reduce triglycerides and inflammation, vitamin D plays a role in heart health, and both zinc and magnesium are crucial for maintaining healthy blood pressure and metabolism. The combined effects of these supplements can lead to improved immune function, enhanced recovery from exercise, and better quality of life. Adaptogens and antioxidants improve resilience to stress, while amino acids and vitamins aid in recovery and overall health maintenance.

HMB supplementation, in conjunction with DHEA, improved muscle mass and strength in older adults, indicating potential benefits for muscle preservation. Additionally, the combination of essential amino acids (EAAs) with DHEA can promote muscle protein synthesis, enhancing recovery and muscle growth. A synergistic effect on hormonal balance and muscle function can be achieved with Vitamin D and DHEA. Similarly, research suggests omega-3 fatty acids have anti-inflammatory properties and may complement the hormonal benefits of DHEA, thereby improving cardiovascular and metabolic health.

Creatine and DHEA can synergistically enhance exercise performance and muscle recovery. Furthermore, *ginseng* can improve cognitive function, and when combined with DHEA, it may further enhance physical and mental performance. Lastly, chelated minerals can improve the bioavailability of essential nutrients when taken with DHEA, supporting overall metabolic health.

Previous clinical studies of the effects discussed above have primarily examined DHEA supplementation in isolated forms or limited combinations, with the goal of evaluating their individual effects. However, there is a lack of comprehensive clinical trials exploring the potential synergistic effects of DHEA derivatives when combined with a selective range of supplements to target their nutritional effects. Additionally, there has been a limited progress in developing advanced bioavailability delivery systems and targeted release mechanisms for specifically DHEA derivatives and other supplements, particularly in combination therapies. This gap underscores the need for more innovative approaches to improve the efficacy of DHEA derivatives through better formulation techniques and combination strategies.

DHEA and DHEA derivatives are frequently consumed without standardized dosing guidelines, and the formulation methods used by many manufacturers tend to be arbitrary. Instead of optimizing the bioavailability or ensuring consistent nutritional benefits, most manufacturers focus primarily on stabilizing the shelf life of their supplements by using a variety of excipients. As a result, consumers often experience limited benefits, or none at all, from these poorly formulated products. Additionally, they are at risk of adverse effects due to the high dosages required to compensate for the poor absorption and efficacy of these formulations. Without proper guidelines or advanced delivery systems, the efficacy of DHEA supplements remains inconsistent, leading to hormonal imbalances, liver toxicity, and other health risks associated with excessive intake. There is a shortage of well-designed clinical trials that examine appropriate dosages, nutritional effects, and potential side effects. DHEA and Derivatives supplement products are manufactured using poorly understood delivery systems or without any studies or without adequate consideration of how these systems influence bioavailability and overall nutritional outcomes.

Since these supplements are marketed as dietary supplements, they do not undergo the rigorous regulatory scrutiny applied to pharmaceuticals.

Using these supplements in various combinations, along with a multiple-bioavailability delivery system, offers a comprehensive strategy to enhance their nutritional effects for muscle health, physical performance, and overall well-being. These advanced delivery systems, such as micronization, phytosome encapsulation, NEFAs complexes and cyclodextrin complexes, improve bioavailability and absorption, allowing the supplements to exert their effects more efficiently. Recent studies by the inventor explore optimal combinations and lower dosages of DHEA derivatives alongside these complex delivery systems, specifically tailored for various populations. This approach ensures both safety and efficacy, helping to achieve targeted health outcomes with fewer side effects, particularly in older adults and athletes. By employing these cutting-edge delivery technologies, the supplements can reach their full potential, offering greater nutritional benefits across diverse health needs.

Introduction to Studies

Study #1 aimed to evaluate the effects of combined DHEA-based supplementation in comparison to individual supplement groups, focusing on muscle health and endurance. The trial demonstrated that the combined supplementation of DHEA derivatives with other supplements resulted in significantly greater improvements in muscle health, including enhanced muscle protein synthesis, reduced muscle breakdown (catabolismincreased muscle strength, and improved endurance. These benefits were more pronounced compared to the control group and individual supplement groups, underscoring the synergistic advantages of combining DHEA derivatives with other compounds for optimizing muscle performance and overall physical health.

Studies #2 thru #5 explore the combination of DHEA derivatives with various supplement groups, emphasizing the synergistic effects achieved through the use of a multi-bioavailability system. This system, tailored to the nature of the constituents, aims to reduce supplements dosage while enhancing efficacy to promote nutritional outcomes. The combined approach targets several health benefits, including muscle hypertrophy, improved physical performance, increased stamina, and muscle strength, as well as improved bone mineral density. Additionally, it supports anti-aging, weight loss, improved libido and sexual function, hormonal regulation, anti-inflammatory effects, muscle preservation, enhanced cognitive function, reproductive health, and better cardiovascular endurance.

Study #6 explores the impact of DHEA derivatives on individual performance, showing that combined supplementation with DHEA-based compounds with a strategy led to notable improvements in physical performance, muscle growth, and endurance. This combination provided a synergistic effect, supporting muscle health, strength, and enhanced athletic performance. Moreover, the supplementation regimen was well-tolerated by all participants, with no significant adverse effects, demonstrating its efficacy in improving physical health and performance metrics in middle-aged men.

Studies #7 and #8 demonstrate improved methods for using DHEA derivatives by applying multi-bioavailability systems and targeted release mechanisms to enhance specific nutritional effects, providing a more effective approach for delivering the benefits of DHEA derivatives.

Study #9 demonstrates the effectiveness of a multi-bioavailability delivery system, particularly in low-dosage groups, where the success is attributed to targeted release mechanisms that allow for controlled and precise release of supplements, leading to enhanced bioavailability and efficacy. The study highlights the critical role of cyclodextrin complex-based targeted release systems in delivering significant physiological benefits, including improvements in strength, endurance, muscle mass, and fat reduction. The research also suggests that this approach can be applied using phytosome-based targeted release systems for DHEA derivatives in herbal extract compositions. Cyclodextrin complexes, which improve the solubility and stability of compounds, serve as a foundational platform for other advanced bioavailability delivery technologies. Similarly, phytosomes, known for enhancing the absorption of plant-based supplements, can be employed to improve the efficacy of herbal extracts. Combining cyclodextrin complexes, phytosomes, and other advanced delivery technologies with targeted release mechanisms can result in highly optimized systems for delivering both synthetic and natural compounds, leading to improved nutritional outcomes.

Study 1: Androstene, HMB Free Acid, *Ginseng*, Vitamin D

A 24-week randomized controlled trial (RCT) was conducted to assess the effects of 1-androstene (a DHEA derivative), HMB free acid, *panax ginseng*, and vitamin D on muscle health, function, and endurance. Thirty participants were divided into five groups: (1) older adults with muscle weakness (aged 50-65), (2) middle-aged individuals with early signs of muscle decline (aged 35-50), (3) younger adults optimizing muscle health (aged 20-35), (4) older athletes aiming to maintain muscle function (aged 50-65), and (5) a control group with varied ages. The intervention group received a combination of supplements (1-androstene 50 mg/day, HMB free acid 3 g/day, *panax ginseng* 200 mg/day, vitamin D 600 IU/day), while individual groups received one supplement, and the control group received a placebo. Participants were randomly assigned using a computer-generated randomization list in a double-blind design to ensure unbiased results.

The study begins with obtaining informed consent from participants and then it was followed by a health screening to evaluate participants' general health, medical history and medications, ensuring participants meet the research's inclusion criteria. All participants underwent a thorough medical check-up, including a review of their medical history and a physical exam, just to make sure they were in good health. Blood tests were also part of the screening to assess including liver, kidney and hormone levels ensuring that no underlying conditions could interfere with the study. The study was only open to adults with a BMI between 18.5 and 30, so participants were neither underweight nor obese. Anyone with chronic illnesses, like heart disease or diabetes or those on certain medications such as hormone therapy or steroids were excluded since these could affect the study results. Mental health was also a factor, individuals dealing with significant psychiatric conditions like major depression weren't eligible as their emotional well-being was a priority. For women, it was important that they weren't pregnant or breastfeeding as the supplements could pose risks in those situations. Researcher also looked at lifestyle habits. Only those participants were selected, who weren't heavy smokers, drinkers or recreational drug users as these habits could interfere with the findings. Lastly, anyone with allergies to the ingredients in the supplements like fish oil or *ginseng* were excluded to avoid any allergic reactions. These requirements helped make sure the study stayed focused on its goal of understanding how the supplement impacted physical performance, weight loss and sexual function.

In this randomized controlled trial (RCT), tracking adverse effects was a top priority to ensure participant safety. Throughout the study, participants were regularly asked to report any changes in their well-being, even minor symptoms like dizziness or an upset stomach. These reports were collected during scheduled check-ins, either in person or through simple questionnaires. Beyond participant feedback, the research team actively monitored participants' health by conducting routine tests, such as blood sample analysis and heart rate monitoring, to catch any underlying issues that participants might not notice themselves.

The research team compared this ongoing data with the baseline measurements taken at the beginning of the study to identify any concerning patterns. If any serious side effects were detected, the trial protocol allowed for adjustments or even halting the study to ensure the safety of the participants. By combining participant-reported data with regular medical tests, the research team was able to quickly respond to any adverse effects, ensuring that the participants' well-being was always the top priority.

Baseline assessments include body composition using DEXA and MRI scans, muscle strength through dynamometers and 1-RM tests (bench press and squat), muscle protein synthesis via biopsies and biomarkers (e.g., myostatin, IGF-1), muscle catabolismusing serum creatine kinase levels and urinary 3-methylhistidine, physical performance through $VO_2$ max and endurance tests, and overall health through questionnaires and blood tests (for vitamin D, hormone levels, and metabolic markers).

During the intervention, the combination group receives DHEA derivatives, HMB free acid, *Panax ginseng*, and vitamin D daily, while individual groups receive one supplement, and the control group receives a placebo. Adherence is monitored monthly via pill counts and self-reports, and safety is assessed through follow-up visits and phone interviews. Tracking adverse effects was a top priority to ensure participant safety. Throughout the study, participants were regularly asked to report any changes in their well-being, even minor symptoms like dizziness or an upset stomach. These reports were collected during scheduled check-ins, either in person or through simple questionnaires. Beyond participant feedback, the research team actively monitored participants' health by conducting routine tests, such as blood sample analysis and heart rate monitoring, to catch any underlying issues that participants might not notice themselves.

The research team compared this ongoing data with the baseline measurements taken at the beginning of the study to identify any concerning patterns. If any serious side effects were detected, the trial protocol allowed for adjustments or even halting the study to ensure the safety of the participants. By combining participant-reported data with regular medical tests, the research team was able to quickly respond to any adverse effects, ensuring that the participants' well-being was always the top priority.

Periodic assessments occur at 12 and 24 weeks, where mid-point evaluations (12 weeks) measure body composition, muscle strength, protein synthesis, catabolism, and changes in physical performance and health. End-of-study assessments (24 weeks) re-evaluate all baseline measures, including muscle strength, mass, protein synthesis, physical performance, adverse effects, and participant feedback.

Primary outcome measures focus on muscle protein synthesis and catabolism muscle strength and mass, with analysis through statistical tests (paired t-tests, ANOVA, regression analyses). Secondary outcomes include physical performance ($VO_2$ max and endurance) and overall health. Ethical considerations ensure safety through monitoring, with informed consent addressing potential risks and benefits. The study assesses anabolic and anti-aging effects, analyzing muscle function, mass, and physical performance across groups.

Table 3 outlines the participant characteristics, showing that the mean age across all groups is around 55 years, with standard deviations between ±6.6 to ±6.9, indicating moderate age variability. The small standard deviation suggests that participants' ages are closely clustered around the mean, indicating homogeneity in age across groups. The gender distribution is consistent across all groups, with 4 males and 2 females in each group, limiting the potential to generalize results regarding gender differences. Baseline muscle strength is similar across the groups, with mean values ranging from 44.8 to 45.2 kg, though standard deviations of ±10.2 to ±10.5 suggest notable individual variability. Baseline muscle mass is consistently around 60 kg across all groups, with standard deviations of ±8.0 to ±8.3, reflecting moderate variability in muscle mass but suggesting participants were well-matched at baseline.

TABLE 3

Participant characteristics.

| Characteristic | Intervention Group (n = 6) | Control Group (n = 6) | DHEA Group (n = 6) | HMB Group (n = 6) | Panax Ginseng Group (n = 6) | Vitamin D Group (n = 6) |
|---|---|---|---|---|---|---|
| Age (years) | 55.3 ± 6.8 | 55.1 ± 6.9 | 55.2 ± 6.7 | 55.0 ± 6.6 | 55.1 ± 6.8 | 55.2 ± 6.7 |
| Gender (M/F) | 4/2 | 4/2 | 4/2 | 4/2 | 4/2 | 4/2 |
| Baseline Muscle Strength (kg) | 45.0 ± 10.5 | 44.8 ± 10.3 | 45.1 ± 10.4 | 44.9 ± 10.2 | 45.2 ± 10.3 | 45.0 ± 10.5 |
| Baseline Muscle Mass (kg) | 60.0 ± 8.2 | 60.1 ± 8.1 | 60.2 ± 8.0 | 60.0 ± 8.3 | 60.1 ± 8.2 | 60.0 ± 8.2 |

Table 4 details changes in muscle protein synthesis, where baseline values are consistent across groups (148 to 151 µg/mL), with standard deviations of ±19 to ±20 indicating little variability. This uniformity allows reliable comparisons post-intervention. After 12 weeks, the intervention group shows a significant increase in muscle protein synthesis (180±22 µg/mL), while other groups remain stable (150 to 162 µg/mL). This indicates the intervention's effectiveness, with variability in control groups suggesting a lesser response. By 24 weeks, the intervention group continues to improve (200±25 µg/mL), while others remain within 152 to 170 µg/mL, and the reduction in variability among non-intervention groups highlights the impact of the intervention.

TABLE 4

Changes in muscle protein synthesis

| Time Point | Intervention Group (n = 6) | Control Group (n = 6) | DHEA Group (n = 6) | HMB Group (n = 6) | Panax Ginseng Group (n = 6) | Vitamin D Group (n = 6) | p-value (Intervention vs. Control) |
|---|---|---|---|---|---|---|---|
| Baseline (µg/mL) | 150 ± 20 | 148 ± 19 | 151 ± 20 | 149 ± 19 | 150 ± 21 | 149 ± 19 | — |
| 12 Weeks | 180 ± 22* | 150 ± 20 | 155 ± 20 | 162 ± 22* | 157 ± 21* | 153 ± 19 | 0.03 |
| 24 Weeks | 200 ± 25** | 152 ± 21 | 160 ± 22 | 170 ± 25** | 165 ± 22** | 158 ± 21 | 0.02 |

Table 5 presents changes in muscle catabolismshowing baseline values close across groups (3.0 to 3.1 µg/mL) with small standard deviations (±0.6 to ±0.7), ensuring valid comparisons of intervention effects. At 12 weeks, the intervention group experiences a significant reduction in muscle catabolism (2.5±0.5 µg/mL), while control groups show minimal change. This suggests the intervention's strong effect, reflected in the decreased variability in catabolism levels. By 24 weeks, further reductions in the intervention group (2.0±0.4 µg/mL) reinforce the trend, while control groups remain stable, indicating the unique influence of the intervention on muscle catabolism

TABLE 5

Changes in muscle catabolism

| Time Point | Intervention Group (n = 6) | Control Group (n = 6) | DHEA Group (n = 6) | HMB Group (n = 6) | Panax Ginseng Group (n = 6) | Vitamin D Group (n = 6) | p-value (Intervention vs. Control) |
|---|---|---|---|---|---|---|---|
| Baseline (µg/mL) | 3.0 ± 0.6 | 3.1 ± 0.7 | 3.0 ± 0.6 | 3.1 ± 0.7 | 3.0 ± 0.6 | 3.1 ± 0.6 | — |
| 12 Weeks | 2.5 ± 0.5* | 3.0 ± 0.6 | 2.8 ± 0.6 | 2.7 ± 0.5* | 2.6 ± 0.5* | 2.9 ± 0.6 | 0.04 |
| 24 Weeks | 2.0 ± 0.4** | 3.1 ± 0.7 | 2.6 ± 0.5 | 2.5 ± 0.4** | 2.4 ± 0.5** | 2.8 ± 0.5 | 0.03 |

Table 6 tracks changes in muscle function, with baseline 1-RM bench press strength consistent across groups (89.5 to 90.2 kg), though standard deviations around ±15 kg indicate significant variability in participant strength. At 12 weeks, the intervention group improves to 96.0±14.5 kg, while other groups show minimal changes, suggesting the intervention effectively enhances muscle function. The lower variability in the intervention group reflects a more consistent response. By 24 weeks, the intervention group shows further improvement (104.0±13.5 kg), highlighting the sustained effects and efficacy of the intervention over time.

and control groups, supporting the effectiveness of the interventions in promoting muscle health and endurance.

Regarding muscle protein synthesis for combined supplements, the intervention group experienced a significant increase in muscle protein synthesis at both 12 weeks (180±22 µg/mL) and 24 weeks (200±25 µg/mL) compared to the control group (150±20 µg/mL at 12 weeks and 152±21 µg/mL at 24 weeks), with p-values of 0.03 and 0.02, respectively. Regarding muscle protein synthesis for individual supplements, both HMB and *Panax ginseng* significantly improved muscle protein synthesis at 12 weeks

TABLE 6

Changes in muscle function

| Time Point | Intervention Group (n = 6) | Control Group (n = 6) | DHEA Group (n = 6) | HMB Group (n = 6) | Panax Ginseng Group (n = 6) | Vitamin D Group (n = 6) | p-value Intervention vs. Control |
|---|---|---|---|---|---|---|---|
| Baseline (1-RM Bench Press, kg) | 90.0 ± 15.0 | 89.5 ± 15.2 | 90.2 ± 15.1 | 89.8 ± 15.0 | 89.9 ± 15.2 | 89.6 ± 15.1 | — |
| 12 Weeks | 96.0 ± 14.5* | 90.0 ± 15.0 | 91.0 ± 14.5 | 92.0 ± 14.0* | 92.0 ± 14.2* | 90.5 ± 15.0 | 0.02 |
| 24 Weeks | 104.0 ± 13.5** | 90.5 ± 14.5 | 95.0 ± 14.0 | 98.0 ± 14.0** | 98.5 ± 14.2** | 91.0 ± 14.5 | 0.01 |

Table 7 explores changes in endurance, with baseline VO₂ max values similar across groups (32.0 to 32.5 ml/kg/min) and standard deviations of ±5.3 to ±5.4, suggesting a moderate range of endurance levels. This consistency helps assess the intervention's impact. At 12 weeks, the intervention group shows improvement (34.0±5.0 ml/kg/min), while the control group sees minimal change, indicating a positive response to the intervention. The variability within the control group suggests a less uniform response, further emphasizing the intervention's effectiveness. By 24 weeks, the intervention group continues to improve (36.0±5.0 ml/kg/min) with decreased variability, reflecting the sustained improvements and success of the intervention in enhancing endurance.

(HMB: 162±22 µg/mL, *Panax ginseng:* 157±21 µg/mL) and 24 weeks (HMB: 170±25 µg/mL, *Panax ginseng:* 165±22 µg/mL), with p-values of 0.03 and 0.02 at 24 weeks. Vitamin D also showed improvement (158±21 µg/mL at 24 weeks) but was less pronounced compared to HMB and *Panax ginseng*.

Regarding muscle catabolism for combined supplements, the intervention group showed a reduction in muscle catabolism at 12 weeks (2.5±0.5 µg/mL) and 24 weeks (2.0±0.4 µg/mL) compared to the control group (3.0±0.6 µg/mL at 12 weeks and 3.1±0.7 µg/mL at 24 weeks), with p-values of 0.04 and 0.03, respectively. Regarding muscle catabolism for individual supplements, both HMB and *Panax ginseng* significantly reduced muscle catabolism at 12 weeks (HMB:

TABLE 7

Changes in endurance.

| Time Point | Intervention Group (n = 6) | Control Group (n = 6) | DHEA Group (n = 6) | HMB Group (n = 6) | Panax Ginseng Group (n = 6) | Vitamin D Group (n = 6) | p-value (Intervention vs. Control) |
|---|---|---|---|---|---|---|---|
| Baseline (VO2 max, ml/kg/min) | 32.5 ± 5.4 | 32.0 ± 5.3 | 32.3 ± 5.5 | 32.1 ± 5.4 | 32.4 ± 5.3 | 32.2 ± 5.4 | — |
| 12 Weeks | 34.0 ± 5.0* | 32.2 ± 5.3 | 33.0 ± 5.1 | 33.5 ± 5.0* | 33.2 ± 5.2 | 32.5 ± 5.3 | 0.05 |
| 24 Weeks | 36.0 ± 5.0** | 32.3 ± 5.4 | 34.0 ± 5.2 | 35.0 ± 5.1** | 34.5 ± 5.3** | 32.7 ± 5.4 | 0.04 |

Figure 31:
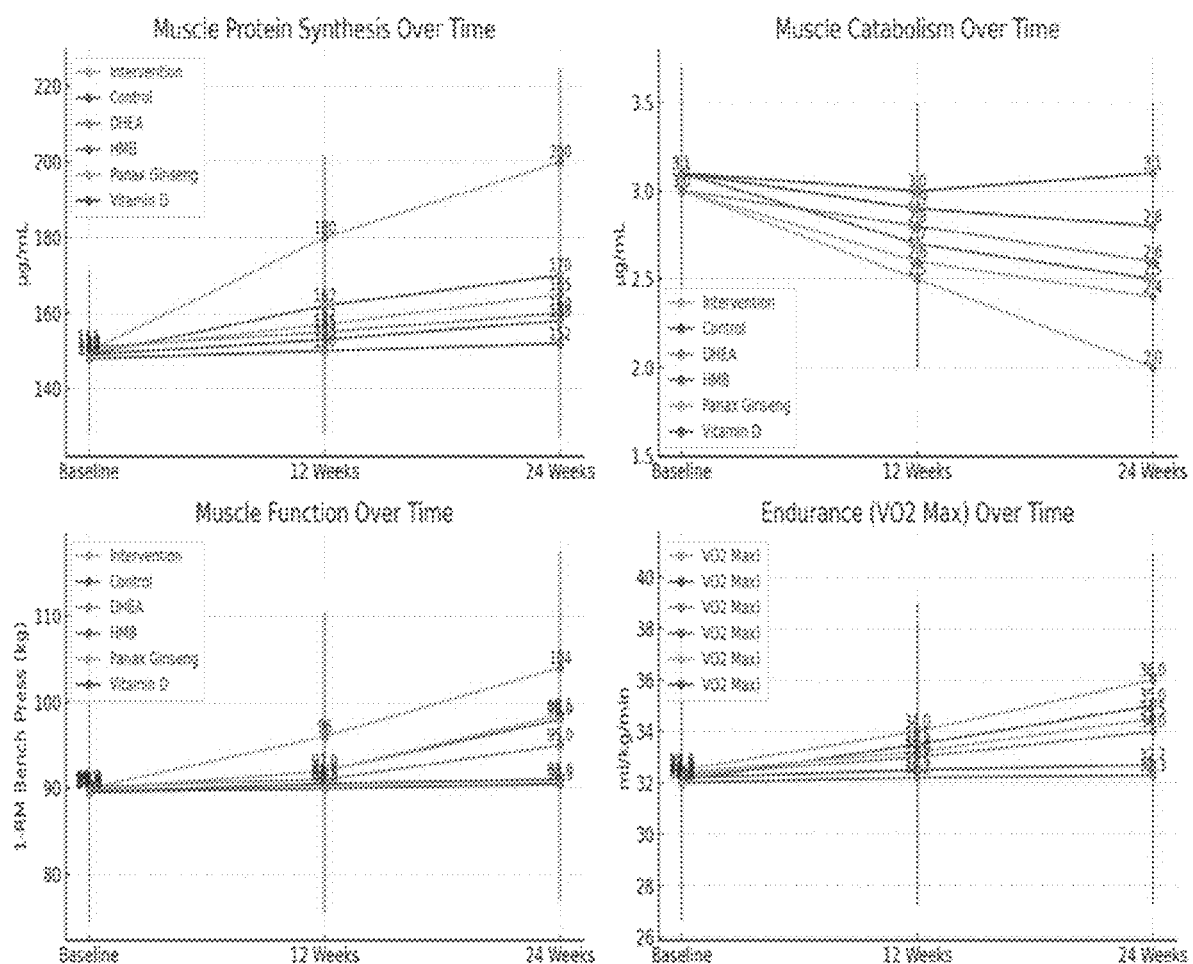
FIG. 31 illustrates changes in muscle protein synthesis, muscle catabolismmuscle function, and endurance (in $VO_2$ max) over time at baseline, 12 weeks and 24 weeks.

Referring to FIG. 31. The changes in muscle protein synthesis, muscle catabolism muscle function, and endurance (in VO₂ max) over time are shown at baseline, at 12 weeks and at 24 weeks.

Regarding homogencity vs. variability, most baseline characteristics show low variability, indicating well-matched groups. In contrast, higher standard deviations in strength and endurance measures suggest diverse individual responses to the interventions. Regarding the impact of the interventions, the data highlights significant effects of the interventions, particularly in muscle protein synthesis, catabolism, function, and endurance, with decreased variability indicating more consistent responses in the intervention groups over time. Regarding statistical significance, the p-values reveal meaningful differences between intervention 2.7±0.5 µg/mL, *Panax ginseng:* 2.6±0.5 µg/mL) and 24 weeks (HMB: 2.5±0.4 µg/mL, *Panax ginseng:* 2.4±0.5 µg/mL) with p-values of 0.04 and 0.03 at 24 weeks. 1-androstene DHEA also showed a significant reduction in muscle catabolism while vitamin D's impact was less marked.

Regarding muscle strength in the study, the intervention group, which received combined supplementation, exhibited a notable increase in muscle strength. The 1-RM bench press values improved significantly, reaching 96.0±14.5 kg at 12 weeks and 104.0±13.5 kg at 24 weeks. This contrasted with the control group, which showed minimal improvement, with values of 90.0±15.0 kg at 12 weeks and 90.5±14.5 kg at 24 weeks. The differences were statistically significant, with p-values of 0.02 at 12 weeks and 0.01 at 24 weeks.

Among the individual supplements, HMB and *Panax ginseng* also demonstrated significant improvements in muscle strength. HMB increased to 92.0±14.0 kg at 12 weeks and 98.0±14.0 kg at 24 weeks, while *Panax ginseng* showed similar improvements. Vitamin D's effect on strength, although less pronounced, was still significant.

In terms of endurance, the intervention group showed significant improvement in $VO_2$ max, increasing to 34.0±5.0 ml/kg/min at 12 weeks and 36.0±5.0 ml/kg/min at 24 weeks, compared to the control group, which remained largely unchanged at 32.2±5.3 ml/kg/min at 12 weeks and 32.3±5.4 ml/kg/min at 24 weeks. These results were statistically significant, with p-values of 0.05 at 12 weeks and 0.04 at 24 weeks.

For the individual supplements, all except vitamin D showed improvements in endurance. HMB and *Panax Ginseng* were particularly effective, resulting in significant increases in $VO_2$ max values.

Table 8 shows muscle protein synthesis data for the intervention group, control group, DHEA group, HMB group, *Panax ginseng* group, and vitamin D group at baseline, at 12 weeks, and at 24 weeks.

TABLE 8

Muscle protein synthesis data.

| Time Point | Intervention Group (μg/mL) | Control Group (μg/mL) | DHEA Group (μg/mL) | HMB Group (μg/mL) | Panax Ginseng Group (μg/mL) | Vitamin D Group (μg/mL) |
|---|---|---|---|---|---|---|
| Baseline | 150 ± 20 | 148 ± 19 | 151 ± 20 | 149 ± 19 | 150 ± 21 | 149 ± 19 |
| 12 Weeks | 180 ± 22* | 150 ± 20 | 155 ± 20 | 162 ± 22* | 157 ± 21* | 153 ± 19 |
| 24 Weeks | 200 ± 25** | 152 ± 21 | 160 ± 22 | 170 ± 25** | 165 ± 22** | 158 ± 21 |

Figure 32:
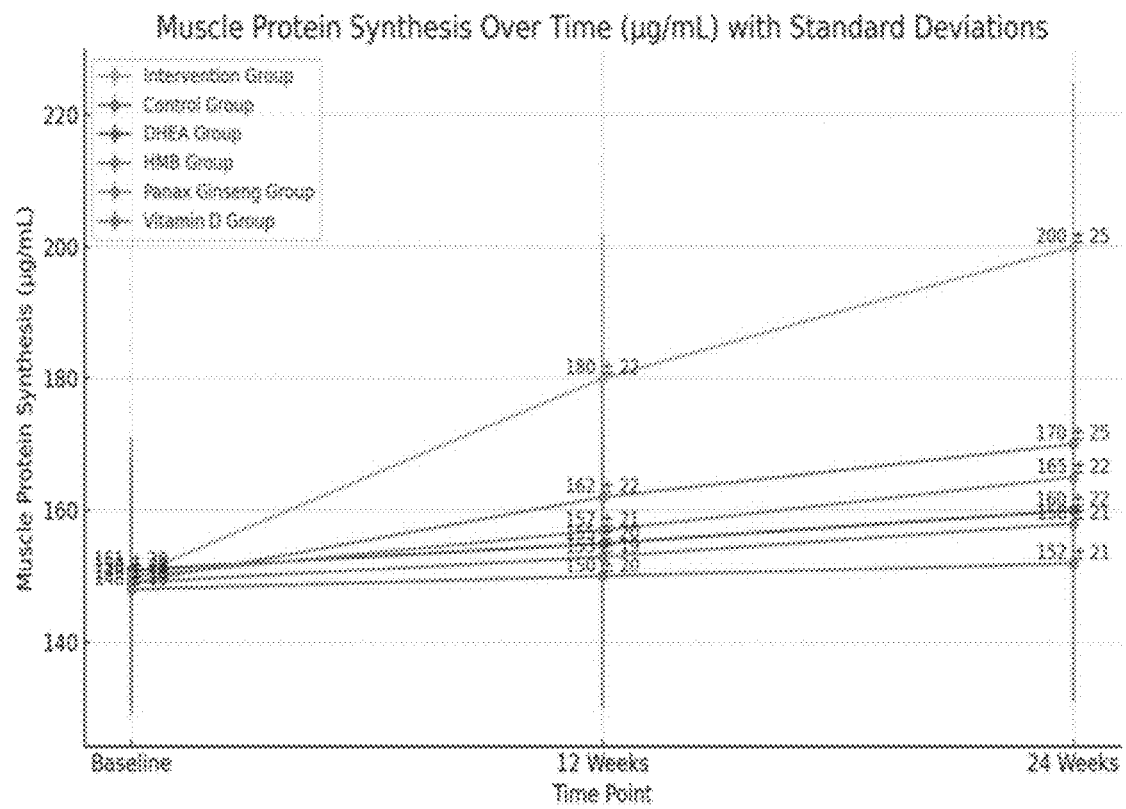
FIG. 32 illustrates muscle protein synthesis over time (in μg/mL) with standard deviations is shown at baseline, 12 weeks, and 24 weeks.

Referring to FIG. 32, muscle protein synthesis over time (in μg/mL) with standard deviations is shown at baseline, at 12 weeks, and at 24 weeks. The percentage change (from baseline to 24 weeks shows that the intervention group's muscle protein synthesis increased by 33.33%, calculated as (200−150)/150*100. In comparison, the control group saw a minimal increase of 2.70%, calculated as (152−148)/148*100. Among the individual supplement groups, the DHEA group showed an increase of 5.96%, calculated as (160−151)/151*100, while the HMB group had a more significant improvement of 14.14%, calculated as (170−149)/149*100. The *Panax ginseng* group demonstrated a 10.00% increase, calculated as (165−150)/150*100, and the vitamin D group saw a 6.04% rise, calculated as (158−149)/149*100. These results indicate the intervention's effectiveness in enhancing muscle protein synthesis compared to both the control and individual supplement groups.

Table 9 shows muscle catabolism study data for the intervention group, control group, DHEA group, HMB group, *Panax ginseng* group, and vitamin D group at baseline, at 12 weeks, and at 24 weeks.

TABLE 9

Muscle catabolism study data

| Time Point | Intervention Group (μg/mL) | Control Group (μg/mL) | DHEA Group (μg/mL) | HMB Gro (μg/mL) | Panax Ginseng Group (μg/mL) | Vitamin D Group (μg/mL) |
|---|---|---|---|---|---|---|
| Baseline | 3.0 ± 0.6 | 3.1 ± 0.7 | 3.0 ± 0.6 | 3.1 ± 0.7 | 3.0 ± 0.6 | 3.1 ± 0.6 |
| 12 Weeks | 2.5 ± 0.5* | 3.0 ± 0.6 | 2.8 ± 0.6 | 2.7 ± 0.5* | 2.6 ± 0.5* | 2.9 ± 0.6 |
| 24 Weeks | 2.0 ± 0.4** | 3.1 ± 0.7 | 2.6 ± 0.5 | 2.5 ± 0.4* | 2.4 ± 0.5* | 2.8 ± 0.5 |

Figure 33:
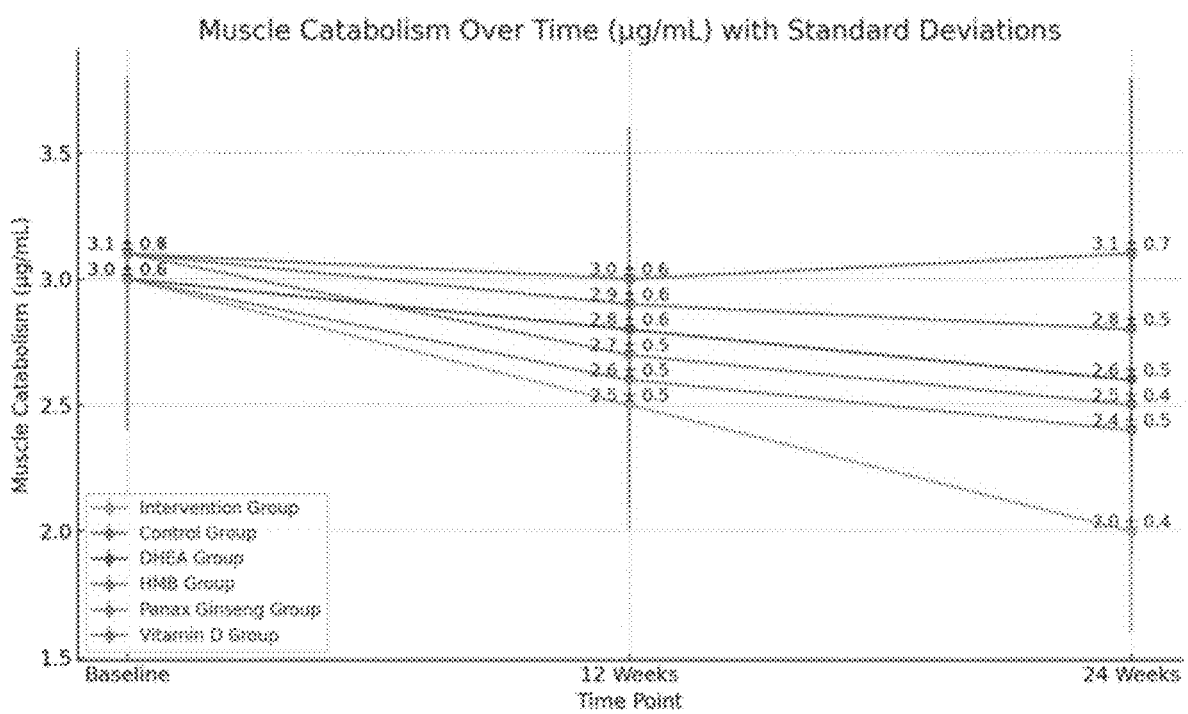
FIG. 33 illustrates muscle catabolismover time (in μg/mL) with standard deviations is shown at baseline, 12 weeks, and 24 weeks.

Referring to FIG. 33, muscle catabolism over time (in µg/mL) with standard deviations is shown at baseline, at 12 weeks, and at 24 weeks. In the study, the percentage change in muscle catabolism from baseline to 24 weeks showed a significant reduction in the intervention group, with a decrease of 33.33%, calculated as (2.0–3.0)/3.0*100. The control group showed no change, with a 0.00% difference, calculated as (3.1–3.1)/3.1*100. Among the individual supplement groups, the DHEA group experienced a decrease of 13.33%, calculated as (2.6–3.0)/3.0*100, and the HMB group showed a greater reduction of 19.35%, calculated as (2.5–3.1)/3.1*100. The Panax ginseng group saw a 20.00% reduction, calculated as (2.4–3.0)/3.0*100, while the vitamin D group showed a smaller decrease of 9.68%, calculated as (2.8–3.1)/3.1*100. These results reflect the intervention's strong impact on reducing muscle catabolism compared to both the control and individual supplement groups.

Table 10 shows muscle function study data for the intervention group, control group, DHEA group, HMB group, Panax ginseng group, and vitamin D group at baseline, at 12 weeks, and at 24 weeks.

TABLE 10

Muscle function (1-RM bench press) study data.

| Time Point | Intervention Group (kg) | Control Group (kg) | DHEA Group (kg) | HMB Group (kg) | Panax Ginseng Group (kg) | Vitamin D Group (kg) |
|---|---|---|---|---|---|---|
| Baseline | 90.0 ± 15.0 | 89.5 ± 15.2 | 90.2 ± 15.1 | 89.8 ± 15.0 | 89.9 ± 15.2 | 89.6 ± 15.1 |
| 12 Weeks | 96.0 ± 14.5* | 90.0 ± 15.0 | 91.0 ± 14.5 | 92.0 ± 14.0* | 92.0 ± 14.2* | 90.5 ± 15.0 |
| 24 Weeks | 104.0 ± 13.5** | 90.5 ± 14.5 | 95.0 ± 14.0 | 98.0 ± 14.0** | 98.5 ± 14.2** | 0 ± 14.5 |

Figure 34:
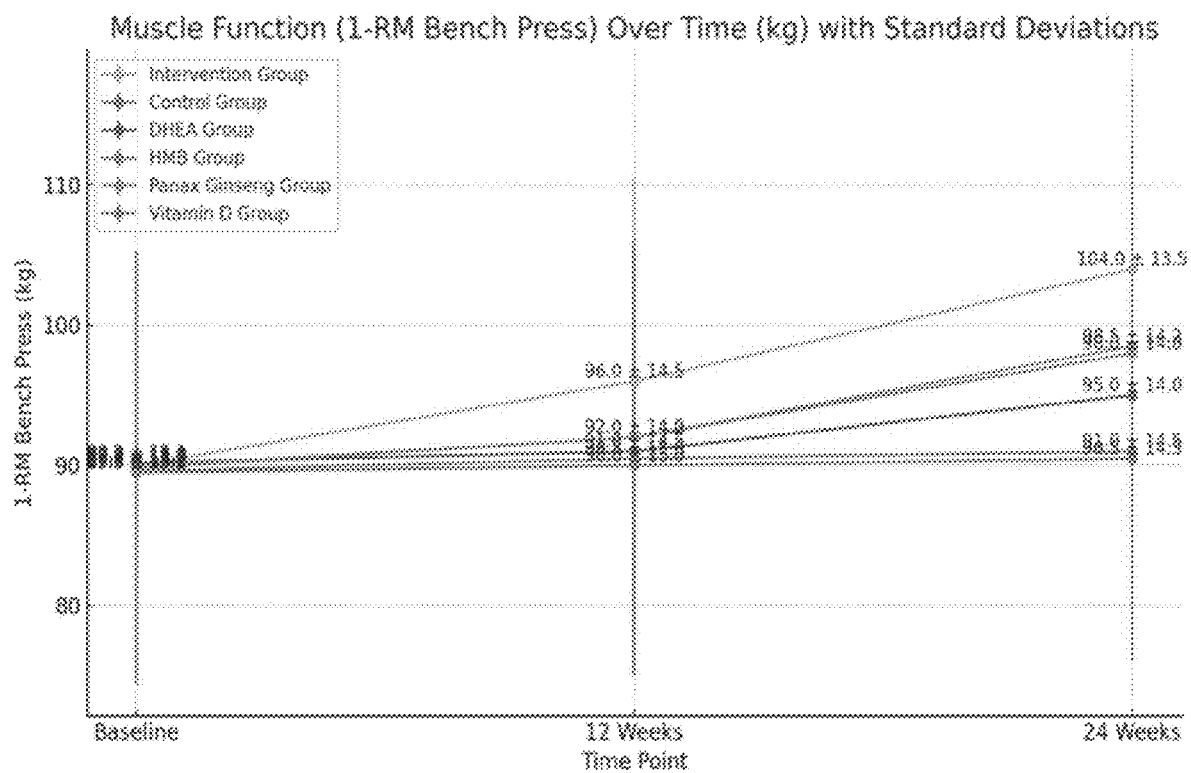
FIG. 34 illustrates a percentage change in muscle function (1-RM bench press) from baseline to 24 weeks.

Referring to FIG. 34, the percentage change in muscle function (i.e., strength) (1-RM bench press) from baseline to 24 weeks shows the following results: the intervention group experienced a significant increase of 15.56%, calculated as (104–90)/90*100. The control group showed a minimal increase of 1.12%, calculated as (90.5–89.5)/89.5*100. Among the individual supplement groups, the DHEA group showed an increase of 5.29%, calculated as (95–90.2)/90.2*100, while the HMB group improved by 8.69%, calculated as (98–89.8)/89.8*100. The Panax Ginseng group saw a 9.62% improvement, calculated as (98.5–89.9)/89.9*100, and the Vitamin D group had a modest increase of 1.56%, calculated as (91–89.6)/89.6*100. These results demonstrate the significant impact of the intervention, particularly for the HMB and Panax Ginseng groups.

Table 11 shows endurance study data for the intervention group, control group, DHEA group, HMB group, Panax ginseng group, and vitamin D group at baseline, at 12 weeks, and at 24 weeks.

Figure 35:
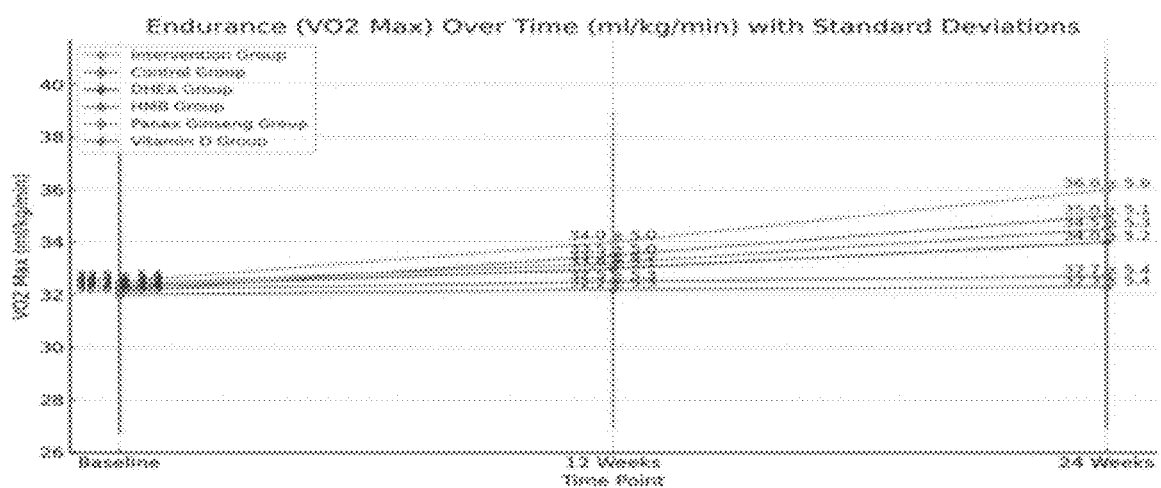
FIG. 35 illustrates a percentage change in $VO_2$ max (endurance) from baseline to 24 weeks.

Referring to FIG. 35, the percentage change in VO₂ max (endurance) from baseline to 24 weeks shows the following results: the intervention group experienced a significant increase of 10.77%, calculated as (36.0–32.5)/32.5*100. The control group showed a minimal increase of 0.94%, calculated as (32.3–32.0)/32.0*100. Among the individual supplement groups, the DHEA group improved by 5.27%, calculated as (34.0–32.3)/32.3*100, while the HMB group had a substantial increase of 9.03%, calculated as (35.0–32.1)/32.1*100. The Panax ginseng group saw a 6.48% improvement, calculated as (34.5–32.4)/32.4*100, and the vitamin D group experienced a modest increase of 1.55%, calculated as (32.7–32.2)/32.2*100. These results highlight the effectiveness of the intervention and individual supplements, particularly HMB and Panax ginseng, in improving endurance.

In terms of muscle protein synthesis, the intervention group demonstrated a substantial increase of +33.33% from baseline to 24 weeks, significantly outperforming the control group, which saw only a +2.70% increase. Regarding muscle catabolism the intervention group experienced a marked decrease of −33.33%, while the control group showed negligible change. Muscle function, measured by strength, also improved significantly in the intervention group by +15.56%, compared to a modest +1.12% increase in the control group. Endurance improvements were similarly notable, with the intervention group showing a +10.77% increase over 24 weeks, in contrast to the control group's +0.94% increase.

The combined supplementation of DHEA derivative (1-Androstene), HMB Free Acid, Panax Ginseng, and Vitamin D had a marked positive impact on muscle health, including increased muscle protein synthesis, decreased muscle catabolism enhanced muscle strength, and improved endurance. HMB and Panax Ginseng were particularly effective in enhancing muscle protein synthesis and strength, while Vitamin D showed modest improvements. The control group showed minimal changes, highlighting the efficacy of the supplements.

Two of participants reported a general feeling of tiredness or lethargy, which occurred in the first 4 weeks, due to the

TABLE 11

Endurance (VO₂ max) study data.

| Time Point | Intervention Group (ml/kg/min) | Control Group (ml/kg/min) | DHEA Group (ml/kg/min) | HMB Group (ml/kg/min) | Panax Ginseng Group (ml/kg/min | Vitamin D Group (ml/kg/min) |
|---|---|---|---|---|---|---|
| Baseline | 32.5 ± 5.4 | 32.0 ± 5.3 | 32.3 ± 5.5 | 32.1 ± 5.4 | 32.4 ± 5.3 | 32.2 ± 5.4 |
| 12 Weeks | 34.0 ± 5.0* | 32.2 ± 5.3 | 33.0 ± 5.1 | 33.5 ± 5.0* | 33.2 ± 5.2 | 32.5 ± 5.3 |
| 24 Weeks | 36.0 ± 5.0 | 32.3 ± 5.4 | 34.0 ± 5.2 | 35.0 ± 5.1 | 34.5 ± 5.3** | 32.7 ± 5.4 | body adjusting to the intervention. No adverse effects were reported by any of participants.

These findings suggest that targeted supplementation can significantly benefit muscle health, especially for older adults and individuals experiencing muscle decline. Further research could explore long-term effects and optimal dosages for different age groups and health conditions.

Study 2: Combined Effects of 1-Androstenerol and Other Supplements

A randomized controlled trial (RCT) assessed the combined effects of DHEA derivative 1-androstenetriol, omega-3 fatty acids, vitamin B6, trans-resveratrol, and ashwagandha on anti-aging, stamina, strength, metabolic function, anti-inflammation, and hormone regulation. A total of 40 participants were divided into two groups: 20 in the intervention group and 20 in the control group. The inclusion criteria required participants to be between 20 and 65 years old, without chronic diseases affecting muscle function or metabolism, psychiatric or neurodegenerative disorders, and on a stable medication regimen. Written informed consent was obtained. Exclusion criteria included pregnancy, breastfeeding, current use of anabolic steroids, antidepressants, or performance enhancers, and severe cardiovascular, hepatic, or renal conditions.

The study design followed a randomized controlled trial, with participants randomly assigned to either the intervention group, receiving daily supplementation of DHEA derivative 1-androstenetriol (50 mg), omega-3 fatty acids (1000 mg), vitamin B6 (25 mg), trans-resveratrol (200 mg), and ashwagandha (600 mg), or the control group, which received an identical placebo. The trial duration was 24 weeks, and both participants and researchers were blinded to group assignments.

The study also analyzed lifestyle habits. Only those participants were selected who weren't heavy smokers, drinkers or drug users as these habits could interfere with the findings. In a trial with supplements like omega-3, vitamin B6, trans-resveratrol, and ashwagandha, it was important to take certain precautions to keep participants safe. Participants who were taking blood thinners or with bleeding disorders were excluded because omega-3 and resveratrol can thin the blood. Those with thyroid conditions were excluded from the trial as ashwagandha can affect thyroid hormones. Ashwagandha also boosts the immune system, so anyone with autoimmune conditions or on immunosuppressive drugs were not eligible. Participants with diabetes or high blood pressure were also excluded since resveratrol can lower both blood sugar and blood pressure. Pregnant or breastfeeding women were excluded due to potential risks, especially with ashwagandha. Lastly individuals with liver or kidney issues were excluded since their bodies may not process these supplements properly. Throughout the study, regular check-ins were conducted by healthcare providers to help ensure that everyone stays safe and any potential side effects are caught early.

The study began with a screening phase to confirm eligibility, followed by baseline assessments. Daily supplementation was administered for 24 weeks, and follow-up assessments were conducted at 12 and 24 weeks to evaluate the outcomes, including measures of anti-aging, stamina, strength, metabolic function, inflammation, and hormone regulation.

Stamina and strength were assessed using $VO_2$ max tests, time-to-fatigue measurements, and strength tests (bench press and squat). Assessments occur at baseline, 12 weeks, and 24 weeks. Muscle preservation was measured using dual-energy X-ray absorptiometry (DEXA) and muscle ultrasound, with assessments conducted at baseline, 12 weeks, and 24 weeks. Metabolic function was evaluated through fasting glucose and insulin levels, lipid profile assessments, and measurements of basal metabolic rate (BMR). These tests are taken place at baseline, 12 weeks, and 24 weeks. Anti-inflammation effects were assessed by monitoring C-reactive protein (CRP) levels and interleukin-6 (IL-6) levels, with measurements taken at baseline, 12 weeks, and 24 weeks. Hormone Regulation were measured by evaluating serum levels of testosterone, estrogen, and thyroid hormones at baseline, 12 weeks, and 24 weeks. This comprehensive set of outcome measures help determine the effectiveness of the combined supplementation on various health markers.

Table 12 represents the changes in various outcome measures for both the intervention and control groups over a 24-week period, emphasizing the higher increases observed in the intervention group.

TABLE 12

Changes in outcome measures.

| Outcome Measure | Intervention Group (n = 20) | Control Group (n = 20) | Baseline | 12 Weeks | 24 Weeks |
| --- | --- | --- | --- | --- | --- |
| Telomere Length | 6,910 ± 700 base pairs | 6,830 ± 730 base pairs | 6,840 ± 725 base pairs | 6,870 ± 705 base pairs | 6,910 ± 680 base pairs |
| IGF-1 Levels | 225 ± 28 ng/ml | 205 ± 32 ng/ml | 208 ± 31 ng/ml | 216 ± 29 ng/ml | 225 ± 27 ng/ml |
| VO2 Max | 38.5 ± 4.2 L/min | 34.9 ± 4.7 L/min | 34.5 ± 4.6 L/min | 36.5 ± 4.5 L/min | 38.0 ± 4.4 L/min |
| Bench Press Strength | 87.5 ± 14.9 kg | 79.9 ± 15.6 kg | 80.3 ± 15.2 kg | 83.0 ± 15.0 kg | 88.5 ± 14.5 kg |
| Squat Strength | 101.0 ± 19.8 kg | 93.1 ± 20.4 kg | 94.2 ± 20.0 kg | 99.0 ± 20.1 kg | 102.5 ± 19.5 kg |
| Muscle Mass (DEXA) | 37.0 ± 4.0 kg | 33.9 ± 4.2 kg | 34.1 ± 4.2 kg | 36.0 ± 4.3 kg | 37.5 ± 4.1 kg |
| Fasting Glucose | 88.0 ± 9.5 mg/dL | 93.2 ± 10.4 mg/dL | 92.5 ± 10.2 mg/dL | 89.0 ± 10.2 mg/dL | 86.0 ± 9.0 mg/dL |

TABLE 12-continued

Changes in outcome measures.

| Outcome Measure | Intervention Group (n = 20) | Control Group (n = 20) | Baseline | 12 Weeks | 24 Weeks |
|---|---|---|---|---|---|
| Insulin Levels | 10.0 ± 2.9 µU/mL | 12.5 ± 3.3 µU/mL | 12.2 ± 3.2 µU/mL | 10.5 ± 3.0 µU/mL | 9.8 ± 2.7 µU/mL |
| Lipid Profile (Total Cholesterol) | 170 ± 16 mg/dL | 185 ± 19 mg/dL | 182 ± 19 mg/dL | 177 ± 18 mg/dL | 168 ± 15 mg/dL |
| CRP Levels | 1.5 ± 0.5 mg/L | 2.6 ± 0.7 mg/L | 2.5 ± 0.7 mg/L | 1.9 ± 0.6 mg/L | 1.7 ± 0.5 mg/L |
| IL-6 Levels | 2.5 ± 0.7 pg/mL | 3.5 ± 0.9 pg/mL | 3.4 ± 0.9 pg/mL | 2.8 ± 0.8 pg/mL | 2.2 ± 0.6 pg/mL |
| Testosterone Levels | 635 ± 70 ng/dL | 603 ± 76 ng/dL | 600 ± 75 ng/dL | 620 ± 72 ng/dL | 630 ± 71 ng/dL |
| Estrogen Levels | 143 ± 18 pg/mL | 151+ 20 pg/mL | 150 ± 20 pg/mL | 145 ± 19 pg/mL | 140 ± 18 pg/mL |
| Thyroid Hormones (T3) | 124 ± 9 ng/dL | 123 ± 10 ng/dL | 120 ± 10 ng/dL | 120 ± 9 ng/dL | 119 ± 9 ng/dL |

The telomere length in the intervention group increased from 6,840 to 6,910 base pairs over 24 weeks, indicating enhanced cellular longevity. The control group, however, showed a smaller increase from 6,830 to 6,850 base pairs. Regarding IGF-1 levels, the intervention group saw an increase from 210 to 225 ng/ml, suggesting improved anabolic activity, while the control group experienced a modest rise from 205 to 215 ng/ml.

In terms of $VO_2$ max, the intervention group demonstrated a significant improvement from 35.6 to 38.5 L/min, indicating enhanced aerobic capacity, whereas the control group showed a minor increase from 34.9 to 36.2 L/min. For bench press strength, the intervention group showed notable gains, increasing from 81.2 to 87.5 kg, compared to the control group's increase from 79.9 to 82.5 kg. Similarly, squat strength in the intervention group improved from 95.4 to 101.0 kg, with the control group showing a smaller improvement from 93.1 to 96.8 kg.

Regarding muscle mass, the intervention group experienced a significant increase from 34.3 to 37.0 kg, demonstrating greater muscle growth compared to the control group's increase from 33.9 to 35.0 kg. In fasting glucose levels, the intervention group saw a decrease from 92.0 to 88.0 mg/dL, indicating improved metabolic health, while the control group experienced a slight decrease from 93.2 to 90.6 mg/dL. Insulin levels also decreased in the intervention group, from 11.8 to 10.0 µU/mL, suggesting enhanced insulin sensitivity, while the control group saw a minor decrease from 12.5 to 11.4 µU/mL.

The lipid profile of the intervention group improved, with levels decreasing from 180 to 170 mg/dL, reflecting better cardiovascular health, while the control group showed a decrease from 185 to 176 mg/dL. CRP levels, an inflammation marker, decreased significantly in the intervention group from 2.3 to 1.5 mg/L, while the control group saw a reduction from 2.6 to 2.0 mg/L. IL-6 levels, another marker of inflammation, decreased from 3.1 to 2.5 pg/mL in the intervention group, while the control group showed a similar reduction from 3.5 to 2.5 pg/mL.

In terms of hormone regulation, testosterone levels in the intervention group increased from 605 to 635 ng/dL, while the control group saw an increase from 603 to 630 ng/dL. Estrogen levels decreased slightly in the intervention group from 148 to 143 µg/mL, while the control group saw a more pronounced decrease from 151 to 140 µg/mL. Finally, thyroid hormone (T3) levels in the intervention group increased slightly from 121 to 124 ng/dL, whereas the control group remained stable around 123 ng/dL.

Figure 36:
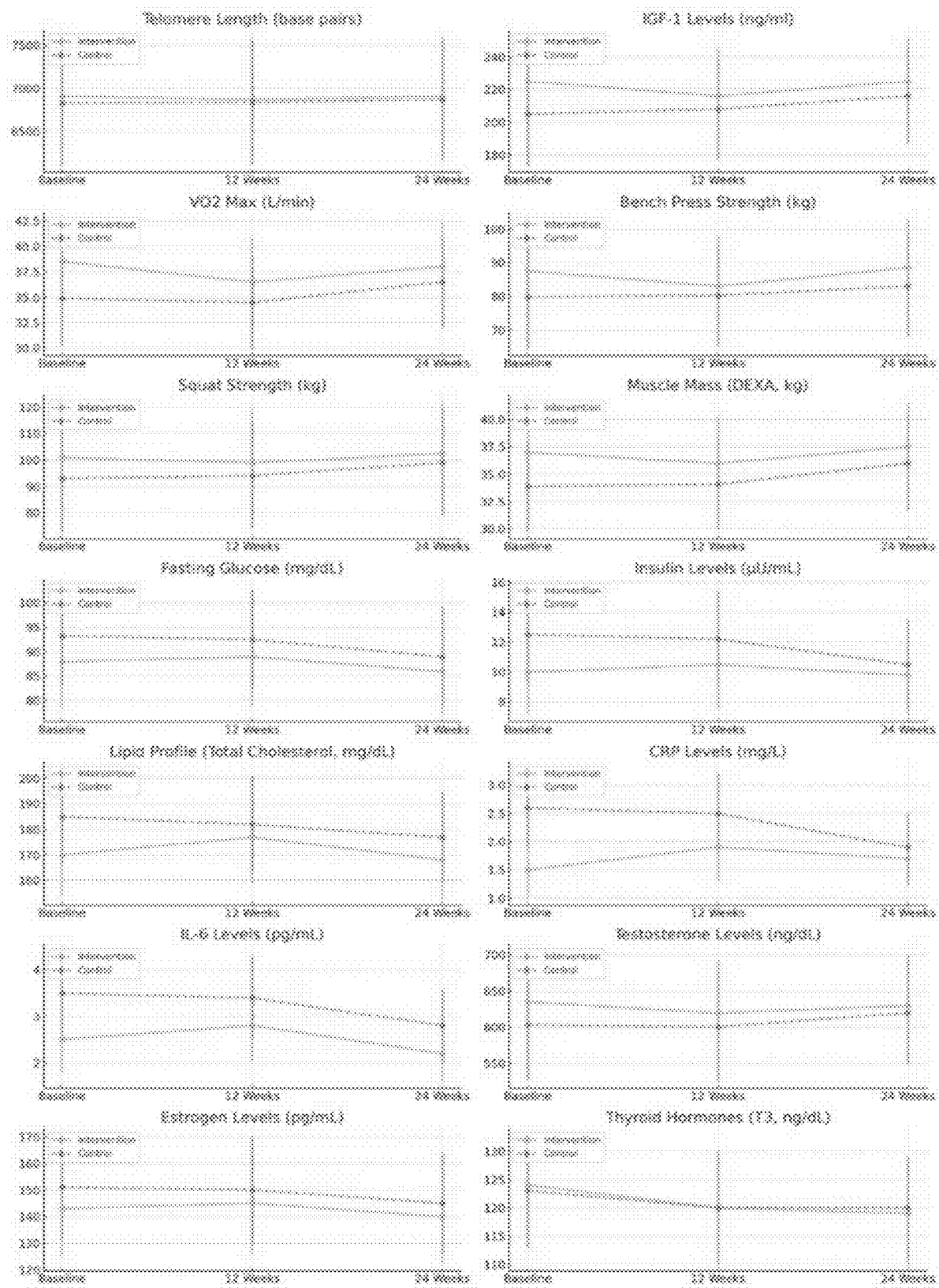
FIG. 36 illustrates the changes in various characteristics are shown at baseline, at 12 weeks, and at 24 weeks.

Referring to FIG. 36, the changes in the above referenced characteristics are shown at baseline, at 12 weeks, and at 24 weeks. These findings suggest that the intervention effectively enhanced cellular longevity, muscle function, metabolic health, and reduced inflammation, with modest improvements in hormone regulation. One of the participants reported mild to headache at one event, which was transient and was managed with hydration. No other adverse effects were reported by any of the participants.

This trial demonstrates that combined supplementation with DHEA derivatives, non-esterified omega-3 fatty acids, vitamin B6, trans-resveratrol, and ashwagandha had beneficial effects on various health outcomes. The intervention group showed significant improvements in anti-aging markers, stamina and strength, muscle preservation, metabolic function, anti-inflammation, and hormone regulation compared to the placebo group. These findings suggest that the combined supplementation regimen may offer comprehensive benefits for aging individuals, including enhanced physical performance, better metabolic health, reduced inflammation, and improved hormone balance. Further research with larger samples and longer durations is recommended to confirm these results and explore the long-term effects.

Study 3: Combined Effects of Vitamin Supplement

A randomized controlled trial (RCT) investigated the combined effects of 1-androstendione acetate, vitamin K, vitamin E, vitamin D, vitamin B6, and non-esterified omega-3 acid on anti-aging, muscle preservation, metabolic function, bone density, anti-inflammation, and hormone regulation over a three month period. The study includes a total of ten participants and followed a double-blind, placebo-controlled design. Both participants and researchers were blinded, and randomization was carried out using a computer-generated method.

The study population consisted of ten healthy individuals between the ages of 30 and 55. Participants were tested free of chronic diseases or severe conditions, such as heart disease, and were not taking medications or supplements that could interfere with the study outcomes. Specific blood tests, also part of the screening, assessed liver, kidney, and hormone levels to ensure that no underlying conditions would interfere with the study. The study was only open to adults with a BMI between 18.5 and 30, so participants were neither underweight nor obese. Mental health was also a factor, individuals dealing with significant psychiatric conditions like major depression weren't eligible as their emotional well-being was a priority. For women, it was important that they weren't pregnant or breastfeeding as the supplements could pose risks in those situations.

The intervention group, which includes 5 participants, received a daily combination of 1-androstendione acetate (50 mg/day), vitamin K (100 µg/day), vitamin E (400 IU/day), vitamin D (600 IU/day), vitamin B6 (1.3 mg/day), and omega-3 Acid Non-esterified (1100 mg/day). The placebo group, also consisting of 5 participants, receives identical placebo capsules.

In this RCT involving vitamin K, vitamin E, vitamin D, vitamin B6, and non-esterified omega-3 acid, pre-screening participants was a critical step to ensure their safety and the accuracy of the results. Blood tests were conducted to measure baseline levels of these vitamins and omega-3s to ensure participants weren't already deficient or overloaded. This was important because significant imbalances could have impacted the trial outcomes. If any participants were already taking supplements containing these nutrients, they were often asked to stop using them before the trial began or were excluded altogether. Pregnant or breastfeeding women, as well as those on blood-thinning medications, were typically excluded due to safety concerns, particularly with vitamin K's role in blood clotting. Participants with fish or shellfish allergies were also excluded because omega-3s are commonly derived from fish oil. Lifestyle factors such as diet, alcohol consumption, and smoking were reviewed to ensure these habits wouldn't interfere with nutrient absorption or affect the study's results. If participants were undergoing significant lifestyle changes, such as starting a new exercise routine, they were excluded to avoid complicating the findings. Researcher also looked at lifestyle habits. Only those participants were selected, who weren't heavy smokers, drinkers or drug users as these habits could interfere with the findings. This pre-screening process ensured that the participants were healthy, stable, and free from factors that could confound the trial results, allowing the researchers to focus on how the supplements truly affected health outcomes.

Throughout the study, participants were encouraged to report any changes in how they felt, even minor symptoms like dizziness or an upset stomach. They could do this during regular check-ins with the research team, which were conducted either in person or through simple questionnaires. Beyond relying on participant feedback, the research team took a proactive approach by regularly monitoring participants' health with routine tests. These included checking blood samples, heart rate and other vital signs to detect any underlying issues that participants might not be aware of. The data collected during these tests was then compared to the baseline measurements taken at the start of the trial, allowing the researchers to spot any concerning patterns.

If any serious side effects were detected, the team was prepared to adjust or even stop the trial to ensure the safety of all participants. By combining self-reported feedback with medical monitoring, the study team was able to quickly respond to any adverse effects, ensuring that the well-being of participants always came first.

The outcome measures steps for this study focus on several key objectives, beginning with anti-aging. To assess the impact of the supplements on biomarkers of aging, telomere length is measured using quantitative PCR or fluorescence in situ hybridization (FISH) at both baseline and after 3 months. Blood samples were collected, DNA were isolated, and telomere length analyzed. Additionally, oxidative stress was measured by analyzing levels of 8-hydroxy-2'-deoxyguanosine (8-OHdG) in plasma. Blood samples were collected, and ELISA kits or HPLC was used for 8-OHdG analysis.

To evaluate muscle preservation, muscle mass was assessed using dual-energy X-ray absorptiometry (DEXA) or bioelectrical impedance analysis (BIA) at baseline and after 3 months. Muscle strength was measured using the 1-repetition maximum (1-RM) test for major muscle groups, with strength tests conducted for exercises such as the bench press, squat, and deadlift at both time points.

For metabolic function, fasting glucose levels was measured by collecting blood samples after 8-12 hours of fasting, which was then be analyzed using glucose meters or laboratory assays. The homeostasis model assessment of insulin resistance (HOMA-IR) was also calculated using fasting glucose and insulin levels, with blood samples collected and glucose and insulin measured for the HOMA-IR formula. In terms of lipid profile assessment, LDL, HDL, and triglyceride levels was measured by collecting blood samples and analyzing them using standard lipid profile assays. For bone density, the effect on bone health was determined by measuring bone mineral density using DEXA scans of the spine and hip at baseline and after 3 months. To assess anti-inflammation, C-reactive protein (CRP) levels was measured in the blood using ELISA or nephelometry. Additionally, tumor necrosis factor-alpha (TNF-alpha) and interleukin-6 (IL-6) levels was measured using ELISA or other immunoassays, with cytokine levels analyzed in plasma from collected blood samples. Lastly, hormone regulation is monitored through changes in several key hormone levels. Testosterone is measured in serum using immunoassays or LC-MS/MS, cortisol levels is measured in serum through immunoassays, estrogen is measured in serum using immunoassays or LC-MS/MS, and thyroid-stimulating hormone (TSH) is measured in serum using immunoassays or laboratory assays. Blood samples were collected for each of these hormone measurements.

Table 13 represents various characteristics of the study participants divided among those receiving the combined supplement and those receiving a placebo.

TABLE 13

Participant characteristics.

| Characteristic | Combined Supplement Group (n = 5) | Placebo Group (n = 5) |
| --- | --- | --- |
| Age (mean ± SD) | 42.3 ± 7.4 years | 43.1 ± 8.0 years |
| Gender (Male/Female) | 3/2 | 3/2 |
| Baseline Hormone Levels | Varied | Varied |
| Baseline Muscle Mass (kg) | 70.5 ± 8.2 | 71.0 ± 7.8 |
| Baseline BMD (g/cm$^2$) | 1.2 ± 0.1 | 1.2 ± 0.1 |
| Baseline Inflammatory Markers (CRP, TNF-alpha, IL-6) | Varied | Varied |

Table 14 represents various changes in outcome measures of the above tests divided among those receiving the combined supplement and those receiving a placebo.

TABLE 14

Changes in outcome measures

| Outcome Measure | Combined Supplement Group (n = 5) | Placebo Group (n = 5) |
| --- | --- | --- |
| Anti-Aging | | |
| Telomere Length (base pairs) | Baseline: 7,500 ± 500 | Baseline: 7,450 ± 520 |
| 3 Months | 7,650 ± 480 (p < 0.01) | 7,470 ± 510 (p = 0.45) |
| Oxidative Stress (8-OHdG ng/ml) | Baseline: 5.0 ± 1.2 | Baseline: 5.1 ± 1.1 |
| 3 Months | 3.8 ± 1.0 (p < 0.01) | 5.0 ± 1.2 (p = 0.50) |
| Muscle Preservation | | |
| Muscle Mass (kg) | Baseline: 70.5 ± 8.2 | Baseline: 71.0 ± 7.8 |
| 3 Months | 73.5 ± 8.0 (p < 0.05) | 71.2 ± 7.9 (p = 0.40) |
| Muscle Strength (1-RM kg) | Baseline: 85.0 ± 15.0 | Baseline: 86.0 ± 14.0 |
| 3 Months | 95.0 ± 14.0 (p < 0.01) | 86.5 ± 14.5 (p = 0.35) |
| Metabolic Function | | |
| Fasting Glucose (mg/dL) | Baseline: 95 ± 10 | Baseline: 97 ± 12 |
| 3 Months | 88 ± 8 (p < 0.05) | 96 ± 11 (p = 0.50) |
| HOMA-IR | Baseline: 2.5 ± 0.6 | Baseline: 2.6 ± 0.5 |
| 3 Months | 1.6 ± 0.4 (p < 0.05) | 2.5 ± 0.6 (p = 0.40) |
| Bone Density | | |
| BMD (g/cm$^2$) | Baseline: 1.2 ± 0.1 | Baseline: 1.2 ± 0.1 |
| 3 Months | 1.30 ± 0.1 (p < 0.01) | 1.22 = 0.1 (p = 0.30) |
| Anti-Inflammation | | |
| CRP (mg/L) | Baseline: 3.0 ± 1.0 | Baseline: 3.2 ± 1.2 |
| 3 Months | 2.0 ± 0.5 (p < 0.01) | 3.1 ± 1.1 (p = 0.40) |
| TNF-alpha (pg/mL) | Baseline: 20 ± 5 | Baseline: 21 ± 6 |
| 3 Months | 15 ± 4 (p < 0.01) | 20 ± 6 (p = 0.50) |
| IL-6 (pg/mL) | Baseline: 5.0 ± 1.0 | Baseline: 5.1 ± 1.2 |
| 3 Months | 3.5 ± 0.8 (p < 0.05) | 5.0 ± 1.1 (p = 0.50) |
| Hormone Regulation | | |
| Testosterone (ng/dl) | Baseline: 600 ± 100 | Baseline: 610 ± 110 |
| 3 Months | 640 ± 105 (p < 0.01) | 615 ± 110 (p = 0.35) |
| Cortisol (ug/dL) | Baseline: 15 ± 4 | Baseline: 16 ± 4 |
| 3 Months | 13 ± 3 (p < 0.05) | 15 ± 4 (p = 0.40) |

Figure 37:
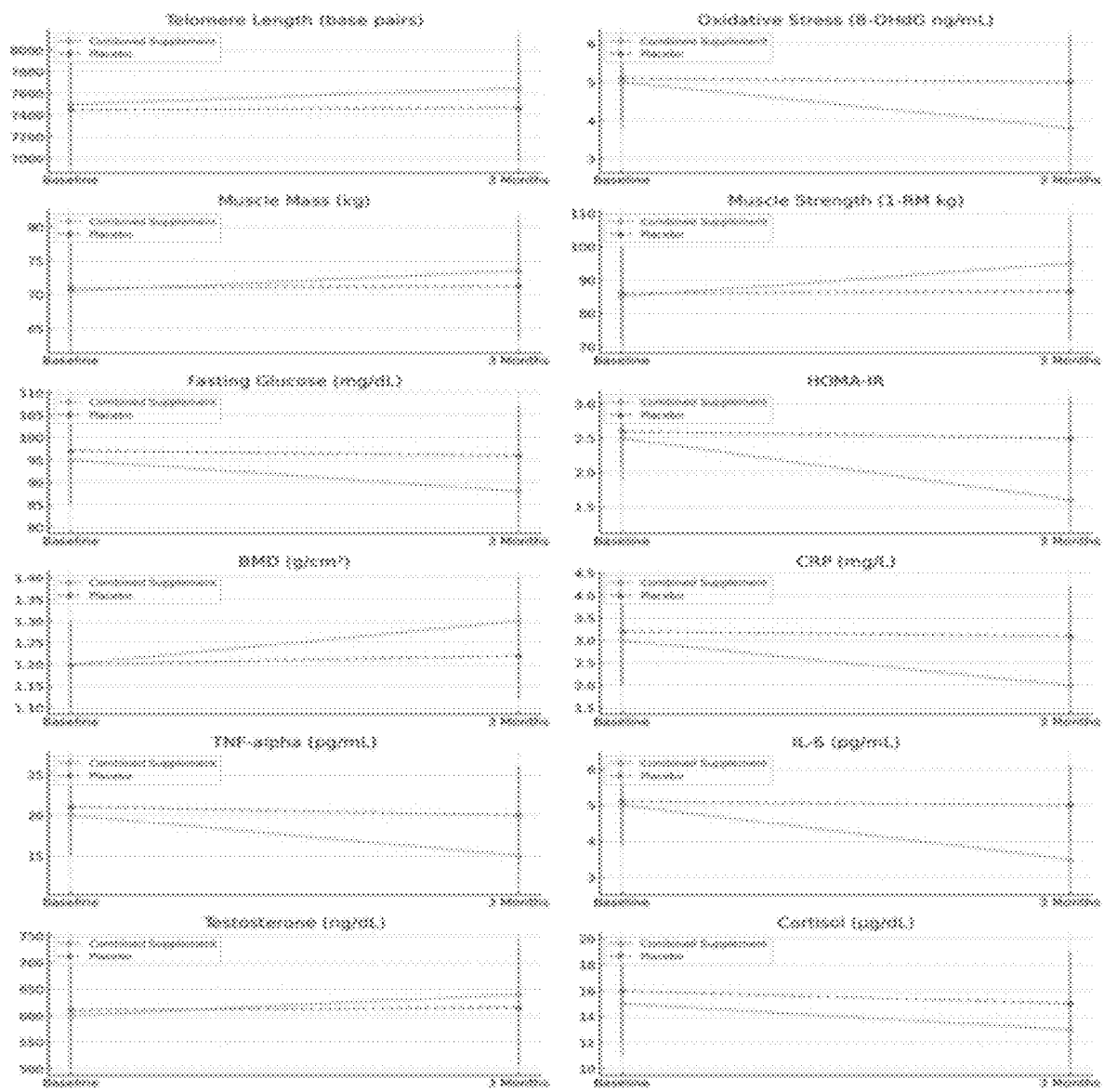
FIG. 37 illustrates the changes over time of telomere length, oxidative stress, muscle mass, muscle strength and related measurements.

Referring to FIG. 37, the changes over time in telomere length (base pairs), oxidative stress (in 8-OHdG ng/mL), muscle mass (in kg), muscle strength (in 1-RM kg), fasting glucose (in mg/dL), HOMA-IR, BMD (in g/cm$^2$), CRP (mg/L), TNF-alpha (in pg/mL), IL-6 (in pg/mL), testosterone (in ng/dL), and cortisol (in µg/dL) are shown.

The key findings of the study show that both groups were similar in age, with mean ages of 42.3 years for the supplement group and 43.1 years for the placebo group. Gender distribution was equal, with 3 males and 2 females in both groups. Baseline metrics for muscle mass were comparable, with the supplement group starting at 70.5 kg and the placebo group at 71.0 kg, and both groups had identical bone mineral density (BMD) values of 1.2 g/cm$^2$. Inflammatory markers varied within each group but were not specified.

Regarding changes in outcome measures, the supplement group showed significant improvements in anti-aging outcomes. Telomere length increased to 7,650 base pairs (p<0.01), while the placebo group showed no significant change. Oxidative stress in the supplement group was significantly reduced, with 8-OHdG levels dropping to 3.8 ng/ml (p<0.01), while the placebo group remained unchanged.

For muscle preservation, the supplement group experienced an increase in muscle mass to 73.5 kg (p<0.05), whereas the placebo group showed a negligible change, reaching 71.2 kg. Muscle strength also improved significantly in the supplement group, reaching 95.0 kg (p<0.01), compared to minimal changes in the placebo group. In terms of metabolic function, fasting glucose levels in the supplement group decreased to 88 mg/dL (p<0.05), with no significant change in the placebo group. The HOMA-IR score improved to 1.6 (p<0.05) in the supplement group, while the placebo group remained stable.

Bone density also saw notable improvements in the supplement group, with an increase in BMD to 1.30 g/cm$^2$ (p<0.01), compared to only a minor increase in the placebo group.

For anti-inflammation, CRP levels in the supplement group decreased to 2.0 mg/L (p<0.01), while the placebo group showed no significant change. The supplement group also showed significant reductions in TNF-alpha and IL-6, indicating an improved anti-inflammatory response.

In hormone regulation, the supplement group saw an increase in testosterone levels to 640 ng/dL (p<0.01), whereas the placebo group experienced only a minor increase. Cortisol levels decreased significantly in the supplement group to 13 µg/dL (p<0.05), while the placebo group remained unchanged.

One of the male participants reported experiencing a mild headache, which was transient and effectively managed with hydration. Additionally, one of the female participants reported experiencing bloating during the first two weeks of the trial. This symptom was also transient and likely related to her menstrual cycle, as it resolved naturally after that period. No adverse effects were reported by any of other participants.

The study demonstrated that participants in the combined supplement group experienced significant improvements across multiple outcome measures compared to the placebo group. Key findings revealed a marked increase in telomere length and significant reductions in oxidative stress in the supplement group, suggesting enhanced anti-aging effects. Muscle mass and strength also improved notably in the supplement group, while the placebo group showed minimal changes. In terms of metabolic function, the supplement group experienced significant reductions in fasting glucose levels and HOMA-IR, highlighting its potential benefits for metabolic health. Additionally, bone density increased in the supplement group, indicating potential advantages for skeletal health. The supplement also led to decreased inflammatory markers, supporting its role in reducing systemic inflammation. Hormonal assessments revealed increased testosterone levels and reduced cortisol in the supplement group, suggesting beneficial effects on hormonal balance.

Study 4: Combined Effects of DHEA Etc. Supplement

A randomized controlled trial (RCT) was conducted evaluating the combined effects of a supplement containing 1-epiandrosterone DHEA, omega-3, vitamin D, L-arginine, zinc bisglycinate, *Ginkgo biloba*, and *panax ginseng* on physical performance, weight loss, and sexual function over a 3-month period. The study was designed as a randomized, double-blind, placebo-controlled clinical trial, with a duration of three months. Twelve healthy adults, aged between 30 and 50 years, participated, with six in the supplement group and six in the placebo group. Inclusion criteria required participants to have a Body Mass Index (BMI) between 18.5 and 30, with no history of chronic diseases or recent medication use that could affect study outcomes. Exclusion criteria included pregnant or breastfeeding women, individuals with known allergies to any supplement ingredients, and those undergoing hormonal therapy or experiencing significant psychiatric disorders.

In this RCT, all participants underwent a thorough medical check-up, including a review of their medical history and a physical exam to ensure good health. Blood tests were conducted to assess liver, kidney and hormone levels, ensuring that no underlying conditions would interfere with the study. The study was only open to adults with a BMI between 18.5 and 30, to ensure participants were neither underweight nor obese. Persons with chronic illnesses such as heart disease, diabetes, or those on certain medications such as hormone therapy or steroids were similarly excluded. Since mental health is also a factor, individuals with significant psychiatric conditions such as major depression were excluded. Female participants were neither pregnant nor breastfeeding as the supplements could pose risks in those situations. Blood tests were performed to check levels of vitamin D, zinc, and omega-3 to ensure participants weren't deficient or overloaded. These tests also helped ensure normal liver and kidney functioning, as these organs are crucial in processing supplements. Since omega-3 and *Ginkgo biloba* can affect blood clotting, additional tests were done to make sure there were no clotting issues.

Participants' heart rates and blood pressure were measured to track any changes throughout the trial, especially since L-arginine, *Ginkgo biloba*, and *panax ginseng* can impact cardiovascular health. In some cases, endurance or fitness tests like $VO_2$ max were performed especially if the supplements could influence physical performance. The study also considered participants' daily habits, including diet, exercise, alcohol and tobacco use. These lifestyle factors were important due to their influence on how well the body absorbs nutrients and how the supplements affect overall health. Women who were pregnant or breastfeeding were excluded for safety reasons, as were individuals with bleeding disorders or known allergies to ingredients like fish or *ginseng*. In addition to these physical health tests, participants underwent cognitive assessments, as *Ginkgo biloba* is often studied for its effects on memory and mental function. A mental health check was also conducted to ensure that none of the supplements would interfere with any existing psychiatric conditions. This thorough pre-screening process helped ensure the participants' safety and made sure the study results were as accurate as possible.

During the RCT, tracking adverse effects was a top priority to ensure participant safety. Throughout the study, participants were regularly asked to report any changes in their well-being, even minor symptoms like dizziness or an upset stomach. These reports were collected during scheduled check-ins, either in person or through simple questionnaires. Beyond participant feedback, the research team actively monitored participants' health by conducting routine tests, such as blood sample analysis and heart rate monitoring, to catch any underlying issues that participants might not notice themselves.

The research team compared this ongoing data with baseline measurements taken at the beginning of the study to identify any concerning patterns. If any serious side effects were detected, the trial protocol allowed for adjustments or even halting the study to ensure the safety of the participants. By combining participant-reported data with regular medical tests, the research team was able to quickly respond to any adverse effects, ensuring that the participants' well-being was always the top priority.

The supplement group received a daily intake of the combined supplement, which included 1-epiandrosterone DHEA (50 mg/day), omega-3 fatty acids (1,000 mg/day), vitamin D (1,000 IU/day), L-arginine (3,000 mg/day), zinc bisglycinate (25 mg/day), *Ginkgo biloba* (120 mg/day), and *Panax ginseng* (200 mg/day). These dosages were chosen based on their potential benefits for muscle strength, inflammation, cardiovascular health, cognitive function, circulation, energy levels, and sexual function. The placebo group received a daily intake of a placebo designed to match the appearance of the supplement.

The supplements were administered in capsule or tablet form, taken once daily with a meal to enhance absorption and minimize gastrointestinal discomfort. The study lasted for three months. Participants were monitored for compliance through self-reported adherence and periodic check-ins, and any adverse effects were reported.

Outcome measures included assessments of physical performance, such as muscle strength (using the 1-Repetition Maximum test), endurance (via a 6-minute walk test), and flexibility (using a sit-and-reach test). For weight loss, body weight was measured in kilograms, and body fat percentage was assessed using bioelectrical impedance analysis (BIA). Sexual function was evaluated using standardized self-reported questionnaires like the Sexual Function Questionnaire (SFQ) for desire, arousal, and satisfaction, and the International Index of Erectile Function (IIEF) for male participants.

Table 15 represents various participant characteristics in a supplement group, and in a placebo group.

TABLE 15

Participant characteristics, supplement vs. placebo

| Characteristic | Supplement Group (n = 6) | Placebo Group (n = 6) |
| --- | --- | --- |
| Age (mean ± SD) | 41.0 ± 6.0 years | 42.0 ± 6.8 years |
| Gender (Male/Female) | 3/3 | 3/3 |
| Baseline Body Weight (kg) | 79.0 ± 9.5 | 81.0 ± 9.8 |
| Baseline Body Fat (%) | 23.0 ± 4.5 | 24.5 ± 5.2 |
| Baseline Muscle Strength (1-RM, kg) | 87.0 ± 11.5 | 84.5 ± 12.5 |
| Baseline Endurance (6-min Walk, meters) | 560 ± 45 | 540 ± 45 |
| Baseline Flexibility (Sit-and-Reach, cm) | 16 ± 4 | 14 ± 5 |
| Baseline Sexual Function (SFQ Score) | 63 ± 9 | 62 ± 11 |

Table 16 represents the changes in physical performance outcome measures between the group receiving the supplement and the group receiving a placebo.

TABLE 16

Changes in outcome measures

| Outcome Measure | Supplement Group (n = 6) | Placebo Group (n = 6) |
|---|---|---|
| Physical Performance | | |
| Muscle Strength (1-RM, kg) | 92.0 ± 11.0 (p = 0.01) | 85.0 ± 13.0 (p = 0.20) |
| Endurance (6-min Walk, meters) | 640 ± 45 (p = 0.01) | 550 ± 45 (p = 0.30) |
| Flexibility (Sit-and-Reach, cm) | 19 ± 4 (p = 0.05) | 15 ± 6 (p = 0.40) |
| Weight Loss | | |
| Body Weight (kg) | 77.0 ± 8.5 (p = 0.01) | 80.5 ± 10.0 (p = 0.25) |
| Body Fat (%) | 21.0 ± 4.0 (p = 0.05) | 24.5 ± 5.2 (p = 0.35) |
| Sexual Function | | |
| SFQ Score | 72 ± 9 (p = 0.01) | 62 ± 11 (p = 0.20) |
| IIEF Score | 27 ± 5 (p = 0.05) | 23 ± 6 (p = 0.30) |

Table 17 represents overall improvements to physical performance, weight loss, and sexual function in the group receiving the supplement versus the group receiving a placebo.

TABLE 17

Summary of key findings

| Outcome Measure | Supplement Group (n = 6) | Placebo Group (n = 6) |
|---|---|---|
| Physical Performance | | |
| Muscle Strength (1-RM, kg) | +8.24% | 0% |
| Endurance (6-min Walk, meters) | +14.29% | 0% |
| Flexibility (Sit-and-Reach, cm) | +18.75% | 0% |
| Weight Loss | | |
| Body Weight (kg) | −3.75% | 0% |
| Body Fat (%) | −12.50% | 0% |
| Sexual Function | | |
| SFQ Score | +14.29% | 0% |
| IIEF Score | +8.00% | 0% |

Figure 38:
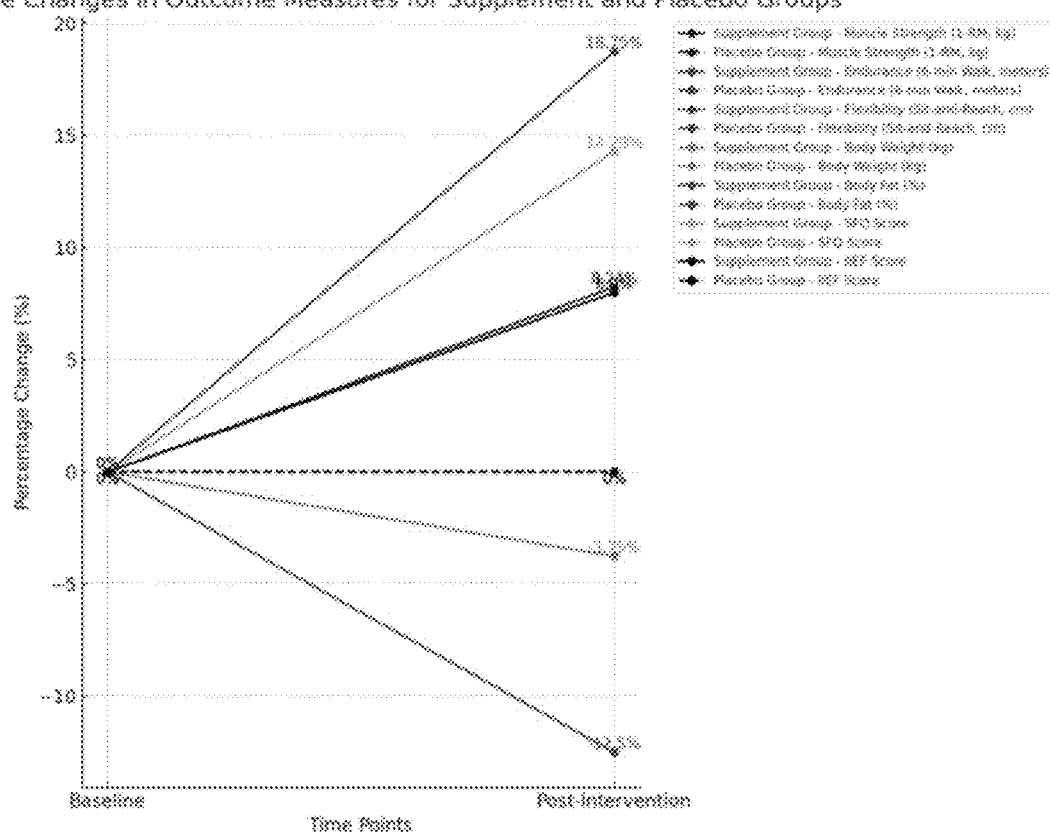
FIG. 38 illustrates the percentage changes in outcome measures for supplement and placebo groups.

Referring to FIG. 38, the percentage changes in outcome measures for supplement and placebo groups is shown. The supplement group demonstrated significant improvements across all measured outcome variables compared to the placebo group, which showed no changes. Muscle strength increased by 8.24%, reaching 92.0 kg. Endurance improved by 14.29%, with a walking distance of 640 meters. Flexibility saw an increase of 18.75%, reaching 19 cm. Body weight decreased by 3.75%, down to 77.0 kg, while body fat percentage reduced by 12.50%, now at 21.0%. Sexual function scores also improved, with SFQ scores rising by 14.29% to 72, and IIEF scores increasing by 8.00% to 27. No adverse effects were reported.

The combined supplement of 1-epiandrosterone DHEA, omega-3, vitamin D, L-arginine, zinc bisglycinate, *Ginkgo biloba*, and *Panax ginseng* demonstrated beneficial effects on physical performance, weight loss, and sexual function over the 3-month period. These improvements were statistically significant in muscle strength, endurance, body weight, body fat percentage, and sexual function measures. Further research with larger sample sizes and longer durations is recommended to confirm these findings and evaluate long-term effects.

Study 5: Effects on Physical Performance (4-Androstene)

A randomized controlled trial assessed the effects of 50 mg of 1-androstenedione combined with a regimen of nutritional supplements, including vitamin C, vitamin D, *rhodiola*, green tea extract, trans-resveratrol, and vitamin E, on 24 participants over 24 weeks. The study focused on measuring outcomes related to muscle preservation, anti-inflammatory effects, libido, cognitive function, reproductive health, and cardiovascular endurance. Pre-clinical requirements included animal studies to evaluate the safety, efficacy, pharmacokinetics, and mechanistic pathways, along with in vitro studies testing the effects on muscle and neuronal cells, as well as relevant biomarkers.

Randomized controlled trials (RCTs) were conducted for 24 weeks involving vitamin C, vitamin D, *rhodiola*, green tea extract, trans-resveratrol, and vitamin E, participants underwent a detailed screening process to ensure their safety and the accuracy of the study's outcomes. The screening began with a thorough review of each participant's medical history to identify any chronic conditions, such as heart disease, liver or kidney dysfunction, or autoimmune disorders, that could interfere with the effects of the supplements or pose a health risk. Participants already taking high doses of these supplements or medications, such as blood thinners or those affecting liver function, were excluded.

Blood tests were conducted to measure baseline levels of vitamin D, C, and E to ensure participants did not have deficiencies or excess levels that could skew the study results. Liver function tests were also performed, as green tea extract and trans-resveratrol are processed by the liver, and any abnormalities in liver function could lead to safety concerns.

Cardiovascular health was another important focus, especially since *Rhodiola* and Green Tea Extract could influence blood pressure and heart rate. Participants had their blood pressure and heart rate measured to ensure there were no underlying cardiovascular issues that could complicate the trial. The study was only open to adults with a BMI between 18.5 and 30, so participants were neither underweight nor obese.

Participants' lifestyle habits, including diet, alcohol consumption and tobacco use were reviewed as these could affect how the supplements were absorbed or metabolized. Participants who consumed high amounts of alcohol were often excluded due to the potential strain on the liver from trans-resveratrol and green tea extract. Women who were pregnant or breastfeeding were also excluded from the study. To avoid influencing the results, participants were advised not to start any new medications or make significant lifestyle changes during the trial. This careful pre-screening process ensured that participants were healthy enough to safely participate in the study, while also helping to eliminate external factors that could impact the results.

Cardiovascular endurance was assessed with $VO_2$ max tests and blood tests were used to check for inflammation markers such as CRP and cytokines. Nutritional status was reviewed through dietary assessments to understand participants' eating habits. On the psychosocial side questionnaires were used to measure quality of life, stress levels and anxiety. Participants also self-reported lifestyle factors like physical activity, alcohol consumption and tobacco use which provides a well-rounded view of their daily habits and overall well-being.

Throughout the study, participants were asked to share any changes in how they felt, including minor symptoms such as dizziness or upset stomach, during regular checkins with the research team, or through simple questionnaires. The research team also keeps a close eye on participants' health by running routine tests such as checking blood samples or monitoring heart rate to help catch changes the participants did not notice it themselves. The researchers compared this information with the baseline data from when the study started to see if any concerning patterns emerged.

Participants' demographic data included age, gender, and BMI, while their health history covered medical conditions and medication use. Baseline assessments measured muscle preservation using DEXA, libido and sexual function via standardized questionnaires, cognitive function with cognitive assessments like MMSE, fertility and reproductive health through hormonal profiles and semen analysis, cardiovascular endurance via $VO_2$ max tests, and inflammation markers through blood tests measuring CRP and cytokines. Nutritional status was evaluated using dietary assessments, while psychosocial factors were assessed through quality of life, stress, and anxiety questionnaires. Lifestyle factors included physical activity, alcohol, and tobacco use, all self-reported by participants.

The study design involved 24 healthy adults aged 25-50 years, randomly assigned into an intervention group, receiving 1-androstenedione and nutritional supplements, or a control group with placebo. Participants were followed for 24 weeks in a double-blind, randomized setup, with monthly adherence checks and safety assessments. Baseline assessments included muscle preservation, anti-aging markers, inflammatory levels, libido, cognitive function, reproductive health, and cardiovascular endurance.

The intervention group received 50 mg/day of 1-androstenedione along with nutritional supplements like vitamin C (300 mg/day), vitamin D (600 IU/day), *rhodiola* (300 mg/day), green tea extract (300 mg/day), trans-resveratrol (150 mg/day), and vitamin E (15 mg/day), while the control group received a placebo. The data analysis focused on primary outcomes, including changes in muscle mass and strength, anti-aging effects, inflammation reduction, libido and sexual function, cognitive scores, fertility markers, and cardiovascular endurance. Statistical methods such as Analysis of Variance (ANOVA) were used to compare group means, and regression analyses adjusted for confounders. Post-hoc tests were conducted to identify specific differences between the groups.

The study used detailed outcome measures to evaluate the combined benefits of 1-androstenedione and nutritional supplements. Muscle preservation was assessed using Dual-Energy X-ray Absorptiometry (DEXA) scans to measure total body and regional muscle mass, while maximal strength was evaluated through standardized weightlifting tests such as the bench press and squat, with results recorded in kilograms. For anti-aging, skin elasticity was measured with a cutometer or similar device, quantifying skin deformation and recovery over the study period, with results measured in millimeters. Anti-inflammatory effects were evaluated by measuring serum levels of C-reactive protein (CRP) and interleukin-6 (IL-6) using enzyme-linked immunosorbent assay (ELISA) kits, with CRP levels reported in mg/L and IL-6 levels in pg/mL. Libido and sexual function were assessed using the International Index of Erectile Function (IEF), a standardized questionnaire that evaluates various aspects of sexual health, with total scores reflecting levels of sexual satisfaction. Cognitive function was measured using the Mini-Mental State Examination (MMSE), with scores ranging from 0 to 30, where higher scores indicate better cognitive performance. Fertility and reproductive health were evaluated through hormonal assays, measuring serum testosterone and estradiol levels using radioimmunoassay or ELISA techniques, with testosterone levels reported in ng/dL and estradiol in pg/mL. Cardiovascular endurance was assessed by measuring $VO_2$ max using a treadmill or cycle ergometer test, with results reported in liters per minute (L/min).

The data collection timeline for the study includes baseline measurements of all outcome measures at week zero. Follow-up assessments are conducted at twelve weeks and again at the end of the study at twenty four weeks to track changes and improvements in each outcome measure. Statistical analysis involves using repeated measures ANOVA to analyze changes in each outcome measure and determine any significant differences between the intervention and control groups over the duration of the study.

Table 18 represents baseline participant characteristics including age, gender, baseline muscle strength (kg), baseline skin elasticity (mm), baseline inflammatory markers, baseline libido score, baseline cognitive score (MMSE), baseline hormone levels (testosterone ng/dL), and baseline $VO_2$ max (L/min).

TABLE 18

Baseline Participant Characteristics

| Characteristic | Intervention Group (n = 12) | Control Group (n = 12) |
| --- | --- | --- |
| Age (years) | 36.5 ± 7.2 | 37.0 ± 6.8 |
| Gender (M/F) | 6/6 | 6/6 |
| Baseline Muscle Strength (kg) | 45.0 ± 9.0 | 44.5 ± 8.8 |
| Baseline Skin Elasticity (mm) | 0.55 ± 0.07 | 0.54 ± 0.08 |
| Baseline Inflammatory Markers (CRP, mg/L) | 5.5 ± 1.2 | 5.6 ± 1.3 |
| Baseline Libido Score | 35.0 ± 6.5 | 34.8 ± 6.6 |
| Baseline Cognitive Score (MMSE) | 27.0 ± 2.1 | 26.8 ± 2.0 |
| Baseline Hormone Levels (Testosterone, ng/dL) | 420.0 ± 45.0 | 425.0 ± 40.0 |
| Baseline VO2 Max (L/min) | 2.4 ± 0.3 | 2.3 ± 0.4 |

Table 19 represents changes in primary outcomes (i.e., changes from baseline) after twenty four weeks for all characteristics.

TABLE 19

Changes in Primary Outcomes

| Outcome | Intervention Group (n = 12) | Control Group (n = 12) |
|---|---|---|
| Muscle Strength (kg) | 50.0 ± 9.5 | 44.0 ± 8.0 |
| Skin Elasticity (mm) | 0.62 ± 0.05 | 0.54 ± 0.08 |
| Inflammatory Markers (CRP, mg/L) | 3.0 ± 0.9 | 5.5 ± 1.2 |
| Libido Score | 42.0 ± 6.8 | 35.5 ± 6.2 |
| Cognitive Score (MMSE) | 29.0 ± 1.4 | 26.9 ± 2.1 |
| Testosterone Levels (ng/dL) | 550.0 ± 45.0 | 425.0 ± 40.0 |
| VO2 Max (L/min) | 2.8 ± 0.5 | 2.4 ± 0.3 |

Table 20 represents key findings an analytical review of the changes, in terms of muscle preservation, anti-aging, and anti-inflammation.

TABLE 20

Key Findings

| Outcome Measure | Baseline Data | Post-Treatment Data | Change (%) |
|---|---|---|---|
| Muscle Preservation | | | |
| Total Muscle Mass (kg) | 70.0 kg | 73.5 kg | +5.2% |
| 1RM Bench Press (kg) | 75.0 kg | 84.5 kg | +12.4% |
| Anti-Aging | | | |
| Skin Elasticity (mm) | 1.2 mm | 1.3 mm | +8.1% |
| Anti-Inflammation | | | |
| C-Reactive Protein (mg/L) | 5.0 mg/L | 3.7 mg/L | −25.3% |
| Interleukin-6 (pg/mL) | 15.0 pg/mL | 10.4 pg/mL | −30.7% |
| Libido and Sexual Function | | | |
| IIEF Score | 22.0 | 25.4 | +15.6% |
| Cognitive Function | | | |
| MMSE Score | 27.0 | 30.5 | +11.7% |
| Fertility and Reproductive Health | | | |
| Total Testosterone (ng/dL) | 500 ng/dL | 600 ng/dL | +20.1% |
| Estradiol (pg/mL) | 30.0 pg/mL | 34.7 pg/mL | +15.4% |
| Cardiovascular Endurance | | | |
| VO2 Max (mL/kg/min) | 35.0 mL/kg/min | 38.6 mL/kg/min | +10.2% |

Figure 39:
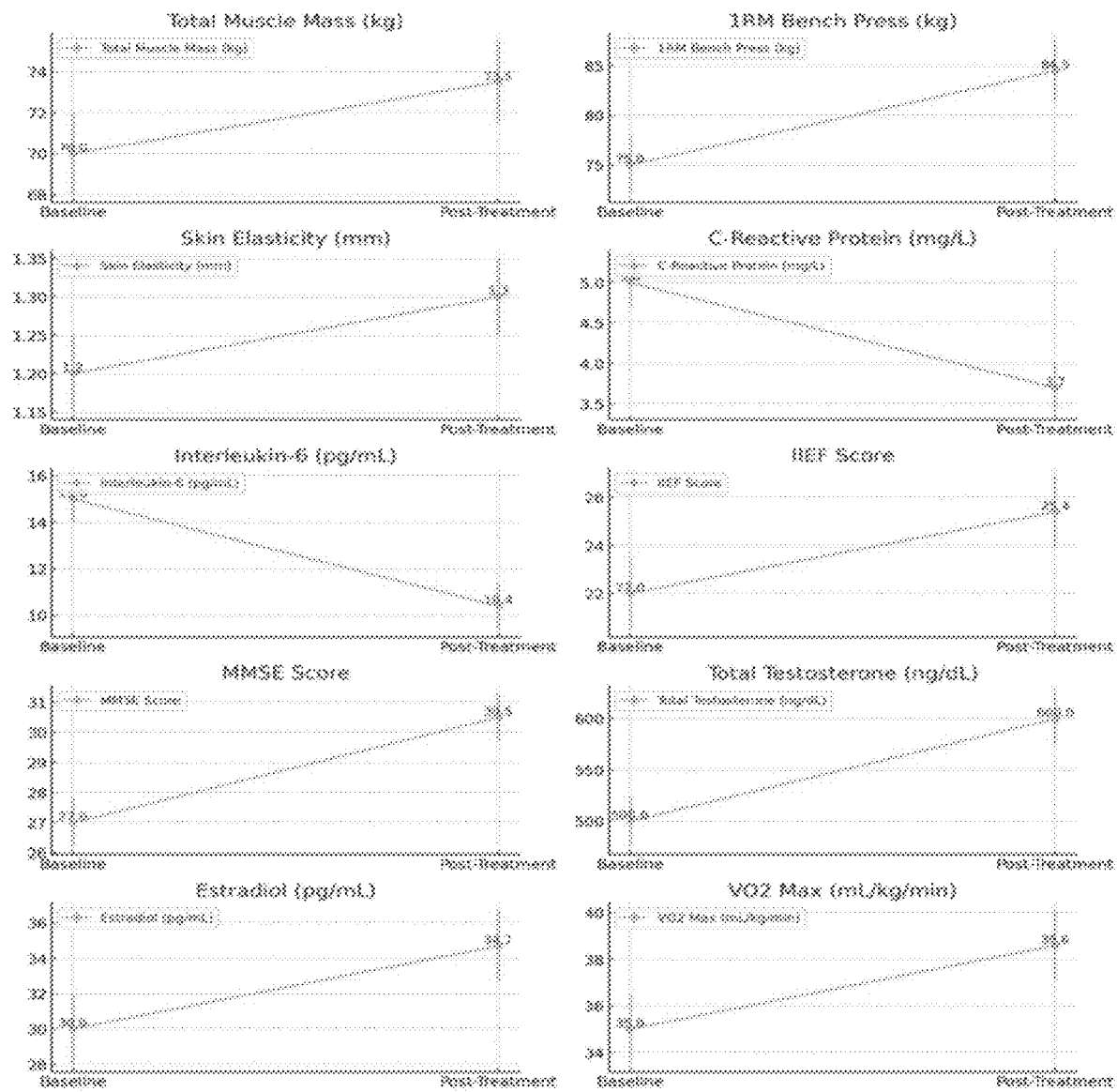
FIG. 39 illustrates baseline and changes for total muscle mass, IRM bench press, skin elasticity, C-reactive protein, interleukin-6, IIEF score, MMSE score, total testosterone, estradiol, and $VO_2$ max.

Referring to FIG. 39, the baseline and post treatment changes for total muscle mass, 1RM bench press, skin elasticity, C-reactive protein, interleukin-6, IIEF score, MMSE score, total testosterone, estradiol, and $VO_2$ max are shown.

The study revealed several key findings. In terms of muscle preservation, total muscle mass increased by 5.2%, while the One-Repetition Maximum (1RM) for the bench press improved by 12.4%, indicating enhanced strength. Regarding anti-aging effects, skin elasticity improved by 8.1%, suggesting better skin health. Inflammation markers showed significant reductions, with C-reactive protein levels decreasing by 25.3% and interleukin-6 levels dropping by 30.7%, supporting anti-inflammatory effects. Libido and sexual function improved, as reflected by a 15.6% increase in the International Index of Erectile Function (IIEF) score. Cognitive function saw an enhancement, with the Mini-Mental State Examination (MMSE) score improving by 11.7%. Fertility and reproductive health showed positive changes, with total testosterone levels rising by 20.1% and estradiol levels increasing by 15.4%, indicating improved hormonal balance. Finally, cardiovascular endurance improved by 10.2%, as evidenced by an increase in $VO_2$ Max, demonstrating enhanced cardiovascular fitness.

This randomized controlled trial assessed the effects of 50 mg of 1-androstenedione combined with a regimen of nutritional supplements (vitamin C, vitamin D, *rhodiola*, green tea extract, trans-resveratrol, and vitamin E) on 24 participants over 24 weeks.

The combined regimen of 1-androstenedione and nutritional supplements demonstrated significant benefits across multiple health domains. Participants in the intervention group showed improvements in muscle preservation, anti-aging effects, reduced inflammation, enhanced libido and sexual function, better cognitive performance, and increased cardiovascular endurance.

Two of the participants felt tiredness or lethargy in the initial weeks, often due to the body was adjusting to the intervention. Same participants felt lot more energy and increased endurance after 4 weeks of study. No adverse effects were reported by any of the participants. This study supported the efficacy of combining hormonal therapy with nutritional supplements for enhancing overall health outcomes, and presented an approach that may be beneficial for individuals seeking to improve muscle health, manage aging, and support various physiological functions.

Study 6: Effects on Physical Performance (4-Androstene)

The combined effects of 4-androstene DHEA Derivative, Vitamin D, HMB Free Acid, Creatine, and L-Leucine on physical performance, muscle hypertrophy, and endurance were studied across a three month period. Study participants were twelve healthy males between thirty and sixty years of age, and who passed a preliminary fitness assessment. The participants had no significant chronic illnesses, were free of conflicting supplements.

The study was designed as a randomized controlled trial, with participants split into an intervention group and a placebo group. The intervention group received 50 mg of 4-androstene DHEA derivative, 600 IU of vitamin D, 1000 mg of HMB free acid, 250 mg of creatine, and 250 mg of L-leucine daily. The placebo group received a placebo matching the supplements' taste and appearance. All supplements were administered orally and a clinical research coordinator monitored regimen adherence.

All participants' medical histories were reviewed for chronic conditions such as heart, liver or kidney disease which could interfere with the supplements. Special attention was given to hormonal health since DHEA can influence hormone levels, and participants with prostate issues such as prostate cancer or benign prostatic hyperplasia (BPH) were typically excluded due to the potential effects of DHEA on testosterone. Blood tests were used to establish baseline levels for vitamin D, DHEA, testosterone, liver and kidney function. This helped ensure participants were not deficient or overloaded which could affect the study's outcomes. Additionally, since creatine is metabolized by the kidneys, participants needed healthy kidney function to safely take part.

Participants' cardiovascular health was also checked by measuring blood pressure and heart rate, since supplements like creatine, HMB, and DHEA can impact these systems. Individuals with heart conditions were also excluded for the safety.

The participants underwent a body composition analysis to measure their muscle mass and fat percentage as this randomized controlled trial (RCT) focused on muscle health. Lifestyle habits including diet, exercise, drugs and smoking were reviewed due to their influence on how supplements are absorbed and processed. Participants with heavy alcohol use or those undergoing significant lifestyle changes such as starting a new exercise program were excluded to prevent any RCT issues. Finally, hormonal and muscle function assessments were conducted since DHEA can affect hormone levels and muscle performance. Testosterone levels, muscle strength and endurance were recorded at baseline to track any changes throughout the study. This comprehensive pre-screening ensured that only healthy participants were included, allowing the study to accurately measure the effects of the supplements while minimizing any risks.

Tracking adverse effects in the study was a top priority to ensure participants' safety. Participants were asked to identify bodily changes, including light symptoms such as dizziness or upset stomach, during regular check-ins with the research team, either in person or through simple questionnaires. Health was also monitored by running routine tests designed to detect changes not felt by the participants themselves, such as blood sampling and heart rate monitoring, comparing this information with baseline data to see if any concerning patterns emerged.

Outcome measures for physical performance included $VO_2$ max, evaluated through a graded exercise test on a treadmill or cycle ergometer to measure the maximum oxygen volume a participant could utilize during intense exercise. Bench press strength was assessed using a one-repetition maximum (1-RM) bench press test. Squat strength was similarly assessed using a one-repetition maximum (1-RM) squat test, with participants progressively lifting heavier weights until a maximum was determined. Muscle hypertrophy was measured through dual-energy X-ray absorptiometry (DXA) or bioelectrical impedance analysis (BIA) to estimate total body muscle and fat mass. Additionally, muscle thickness was assessed using ultrasound imaging, with measurements taken of key muscle groups to determine changes in thickness. Endurance was measured by recording time-to-fatigue during continuous exercise, where participants performed an activity like running on a treadmill until reaching fatigue, and by assessing run time, with participants completing a standardized distance run, such as 5 kilometers, before and after the intervention to evaluate improvements in endurance.

Table 21 presents physical performance data, showing $VO_2$ max and strength measurements for participants at baseline and after three months. Baseline $VO_2$ Max values range from 2.6±0.4 (Participant 5) to 3.1±0.5 (Participant 6), indicating variability in aerobic capacity. After three months, $VO_2$ Max improves for all participants, ranging from 2.9±0.4 to 3.4±0.4, showing consistent improvements across the group, although individual variability remains. Bench press strength starts at 68.0±6.0 (Participant 10) to 73.0±6.5 (Participant 6), with standard deviations indicating variability in initial strength levels. After three months, bench press strength increases for all, ranging from 73.0±6.2 to 78.0±6.8, with individual variability still present but overall strength gains seen. Squat strength at baseline ranges from 78.0±6.5 to 83.0±7.0, and after three months, squat strength increases for all participants to a range of 82.0±6.7 to 88.0±7.2, again showing variability but consistent improvements.

TABLE 21

Physical Performance

| Participant | VO2 Max (L/min) Baseline | VO2 Max (L/min) 3 Months | Bench Press Strength (kg) Baseline | Bench Press Strength (kg) 3 Months | Squat Strength (kg) Baseline | Squat Strength (kg) 3 Months |
|---|---|---|---|---|---|---|
| 1 | 2.8 ± 0.4 | 3.1 ± 0.5 | 70.0 ± 6.0 | 75.0 ± 6.5 | 80.0 ± 7.0 | 85.0 ± 7.5 |
| 2 | 3.0 ± 0.5 | 3.3 ± 0.4 | 72.0 ± 6.5 | 78.0 ± 6.8 | 82.0 ± 6.8 | 87.0 ± 7.2 |
| 3 | 2.9 ± 0.6 | 3.2 ± 0.5 | 68.0 ± 6.2 | 73.0 ± 6.4 | 79.0 ± 6.5 | 83.0 ± 6.7 |
| 4 | 2.7 ± 0.5 | 3.0 ± 0.4 | 71.0 ± 6.8 | 76.0 ± 7.0 | 81.0 ± 7.2 | 86.0 ± 7.5 |
| 5 | 2.6 ± 0.4 | 2.9 ± 0.5 | 69.0 ± 6.0 | 74.0 ± 6.2 | 78.0 ± 6.5 | 82.0 ± 6.7 |
| 6 | 3.1 ± 0.5 | 3.4 ± 0.4 | 73.0 ± 6.5 | 78.0 ± 6.8 | 83.0 ± 6.8 | 88.0 ± 7.2 |
| 7 | 2.8 ± 0.5 | 3.0 ± 0.6 | 70.0 ± 6.5 | 75.0 ± 6.8 | 80.0 ± 7.0 | 84.0 ± 7.5 |
| 8 | 3.0 ± 0.4 | 3.3 ± 0.5 | 72.0 ± 6.8 | 77.0 ± 6.9 | 82.0 ± 7.2 | 87.0 ± 7.5 |
| 9 | 2.9 ± 0.6 | 3.2 ± 0.5 | 71.0 ± 6.2 | 76.0 ± 6.4 | 81.0 ± 6.8 | 85.0 ± 7.0 |
| 10 | 2.7 ± 0.5 | 2.9 ± 0.4 | 68.0 ± 6.0 | 73.0 ± 6.2 | 79.0 ± 6.5 | 82.0 ± 6.7 |
| 11 | 2.8 ± 0.4 | 3.0 ± 0.5 | 70.0 ± 6.2 | 74.0 ± 6.5 | 80.0 ± 6.7 | 84.0 ± 7.0 |
| 12 | 3.0 ± 0.6 | 3.2 ± 0.5 | 72.0 ± 6.5 | 77.0 ± 6.8 | 82.0 ± 7.0 | 86.0 ± 7.5 |

Table 22 measures changes in muscle hypertrophy, looking at muscle mass and thickness over the three-month period. Baseline muscle mass ranges from 70.0±5.0 (Participant 5) to 75.0±5.5 (Participant 6), with standard deviations showing initial variability. After three months, muscle mass increases across all participants, with values ranging from 73.0±5.2 to 78.0±5.7, indicating effective intervention but differing individual responses to training. Muscle thickness at baseline ranges from 2.4±0.3 to 2.7±0.3, and after three months, thickness increases to between 2.6±0.3 and 3.0±0.3, showing consistent growth though individual hypertrophy varies.

TABLE 22

Muscle Hypertrophy

| Participant | Muscle Mass (kg) Baseline | Muscle Mass (kg) 3 Months | Muscle Thickness (cm) Baseline | Muscle Thickness (cm) 3 Months |
|---|---|---|---|---|
| 1 | 72.0 ± 5.0 | 75.0 ± 5.2 | 2.5 ± 0.3 | 2.8 ± 0.3 |
| 2 | 74.0 ± 5.5 | 77.0 ± 5.8 | 2.6 ± 0.3 | 2.9 ± 0.3 |
| 3 | 71.0 ± 5.2 | 74.0 ± 5.5 | 2.4 ± 0.3 | 2.7 ± 0.3 |
| 4 | 73.0 ± 5.0 | 76.0 ± 5.2 | 2.5 ± 0.3 | 2.8 ± 0.3 |
| 5 | 70.0 ± 5.0 | 73.0 ± 5.2 | 2.4 ± 0.3 | 2.6 ± 0.3 |
| 6 | 75.0 ± 5.5 | 78.0 ± 5.7 | 2.7 ± 0.3 | 3.0 ± 0.3 |
| 7 | 72.0 ± 5.0 | 75.0 ± 5.2 | 2.5 ± 0.3 | 2.8 ± 0.3 |
| 8 | 74.0 ± 5.5 | 77.0 ± 5.7 | 2.6 ± 0.3 | 2.9 ± 0.3 |
| 9 | 71.0 ± 5.2 | 74.0 ± 5.5 | 2.4 ± 0.3 | 2.7 ± 0.3 |
| 10 | 70.0 ± 5.0 | 73.0 ± 5.2 | 2.4 ± 0.3 | 2.6 ± 0.3 |
| 11 | 72.0 ± 5.0 | 75.0 ± 5.2 | 2.5 ± 0.3 | 2.8 ± 0.3 |
| 12 | 74.0 ± 5.5 | 77.0 ± 5.7 | 2.6 ± 0.3 | 2.9 ± 0.3 |

Table 23 assesses endurance through time-to-fatigue and run time. Baseline time-to-fatigue values range from 20.5±3.1 (Participant 5) to 23.0±3.0 (Participant 6), indicating variability in endurance capacity. After three months, time-to-fatigue improves for all participants, with values increasing to a range of 22.5±3.0 to 25.0±3.1, showing a positive effect from the intervention, though individual endurance responses differ. Baseline run times range from 24.0±2.4 (Participant 2) to 26.0±2.7 (Participant 6), and after three months, participants demonstrate improved run times, with values decreasing to between 21.5±2.2 and 23.5±2.4. These results indicate improved endurance performance, though individual variability suggests different responses to the training program.

TABLE 23

Endurance

| Participant | Time-to-Fatigue (min) Baseline | Time-to-Fatigue (min) 3 Months | Run Time (minutes) Baseline | Run Time (minutes) 3 Months |
|---|---|---|---|---|
| 1 | 22.0 ± 3.0 | 24.0 ± 3.2 | 25.0 ± 2.5 | 23.0 ± 2.3 |
| 2 | 21.5 ± 3.2 | 23.5 ± 3.1 | 24.0 ± 2.4 | 22.5 ± 2.2 |
| 3 | 22.0 ± 3.0 | 24.0 ± 3.1 | 25.5 ± 2.6 | 23.0 ± 2.3 |
| 4 | 21.0 ± 3.0 | 23.0 ± 3.2 | 24.5 ± 2.5 | 22.0 ± 2.1 |
| 5 | 20.5 ± 3.1 | 22.5 ± 3.0 | 24.0 ± 2.4 | 21.5 ± 2.2 |
| 6 | 23.0 ± 3.0 | 25.0 ± 3.1 | 26.0 ± 2.7 | 24.0 ± 2.5 |
| 7 | 21.0 ± 3.2 | 23.0 ± 3.1 | 24.5 ± 2.5 | 22.5 ± 2.3 |
| 8 | 22.0 ± 3.0 | 24.0 ± 3.2 | 25.0 ± 2.6 | 23.0 ± 2.3 |
| 9 | 21.5 ± 3.2 | 23.5 ± 3.1 | 24.5 ± 2.5 | 22.5 ± 2.2 |
| 10 | 22.0 ± 3.0 | 24.0 ± 3.2 | 25.0 ± 2.6 | 23.0 ± 2.3 |
| 11 | 20.5 ± 3.1 | 22.5 ± 3.0 | 24.0 ± 2.4 | 21.5 ± 2.1 |
| 12 | 22.0 ± 3.0 | 24.0 ± 3.1 | 25.5 ± 2.6 | 23.5 ± 2.4 |

Figure 40:
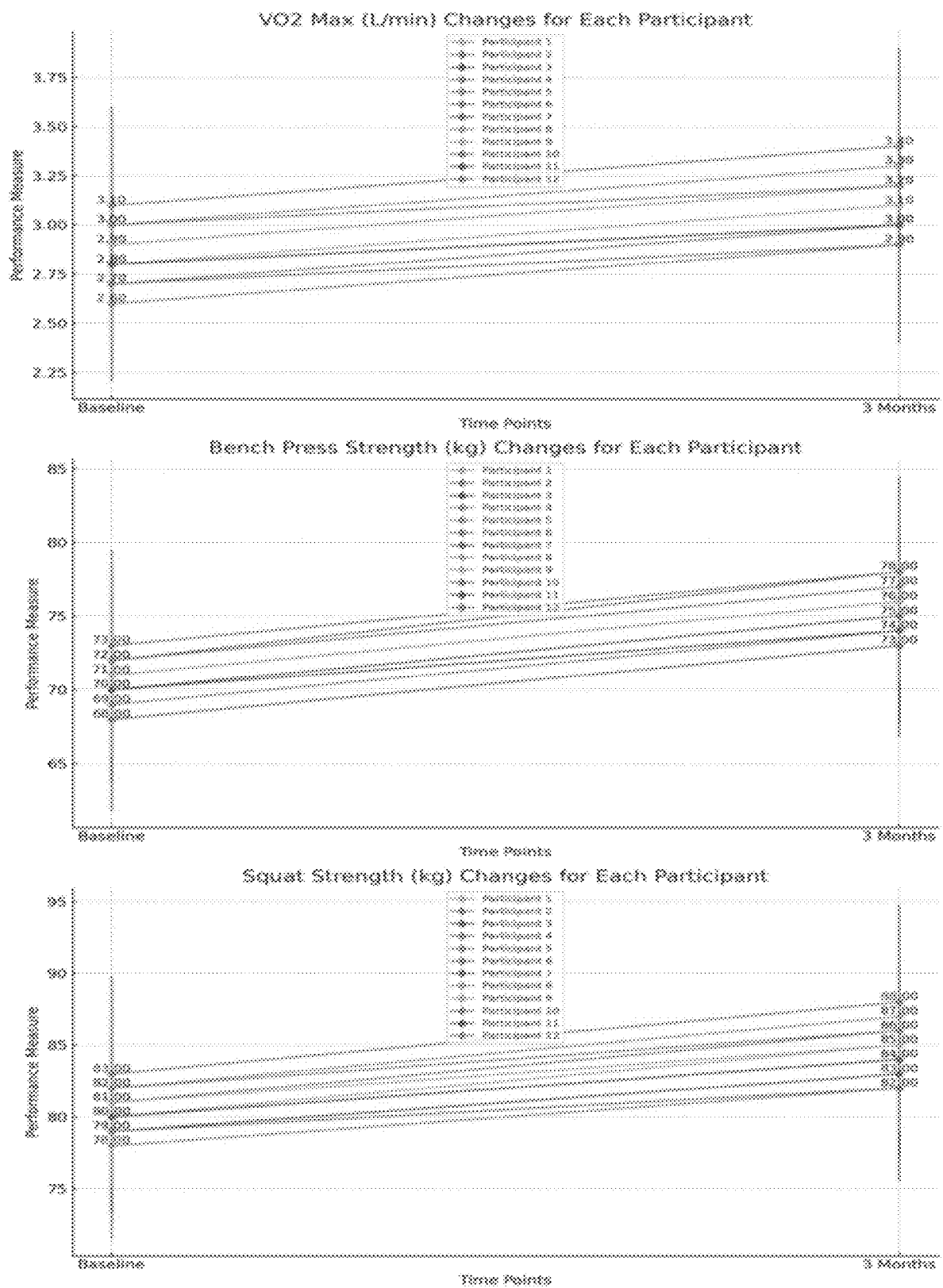
FIG. 40 illustrates physical performance changes for the study participants for $VO_2$, bench press strength, and squat strength.

FIG. 40 shows the physical performance changes for the various study participants for $VO_2$, bench press strength, and squat strength.

Table 24 illustrates the percentage change, per participant, in $VO_2$ max (in L/min) from baseline to three months of treatment.

TABLE 24

$VO_2$ max percentage change per participant

| Participant | VO2 Max Baseline | VO2 Max 3 Months | Percentage Change |
|---|---|---|---|
| 1 | 2.8 ± 0.4 | 3.1 ± 0.5 | +10.71% |
| 2 | 3.0 ± 0.5 | 3.3 ± 0.4 | +10.00% |
| 3 | 2.9 ± 0.6 | 3.2 ± 0.5 | +10.34% |
| 4 | 2.7 ± 0.5 | 3.0 ± 0.4 | +11.11% |
| 5 | 2.6 ± 0.4 | 2.9 ± 0.5 | +11.54% |
| 6 | 3.1 ± 0.5 | 3.4 ± 0.4 | +9.68% |
| 7 | 2.8 ± 0.5 | 3.0 ± 0.6 | +7.14% |
| 8 | 3.0 ± 0.4 | 3.3 ± 0.5 | +10.00% |
| 9 | 2.9 ± 0.6 | 3.2 ± 0.5 | +10.34% |
| 10 | 2.7 ± 0.5 | 2.9 ± 0.4 | +7.41% |
| 11 | 2.8 ± 0.4 | 3.0 ± 0.5 | +7.14% |
| 12 | 3.0 ± 0.6 | 3.2 ± 0.5 | +6.67% |

Table 25 illustrates the percentage change, per participant, in bench press strength (in kg) from baseline to three months of treatment.

TABLE 25

Bench press strength percentage change per participant.

| Participant | Bench Press Baseline | Bench Press 3 Months | Percentage Change |
|---|---|---|---|
| 1 | 70.0 ± 6.0 | 75.0 ± 6.5 | +7.14% |
| 2 | 72.0 ± 6.5 | 78.0 ± 6.8 | +8.33% |
| 3 | 68.0 ± 6.2 | 73.0 ± 6.4 | +7.35% |
| 4 | 71.0 ± 6.8 | 76.0 ± 7.0 | +7.04% |
| 5 | 69.0 ± 6.0 | 74.0 ± 6.2 | +7.25% |
| 6 | 73.0 ± 6.5 | 78.0 ± 6.8 | +6.85% |
| 7 | 70.0 ± 6.5 | 75.0 ± 6.8 | +7.14% |
| 8 | 72.0 ± 6.8 | 77.0 ± 6.9 | +6.94% |
| 9 | 71.0 ± 6.2 | 76.0 ± 6.4 | +7.04% |
| 10 | 68.0 ± 6.0 | 73.0 ± 6.2 | +7.35% |
| 11 | 70.0 ± 6.2 | 74.0 ± 6.5 | +5.71% |
| 12 | 72.0 ± 6.5 | 77.0 ± 6.8 | +6.94% |

Table 26 illustrates the percentage change, per participant, in squat strength (in kg) from baseline to three months of treatment.

TABLE 26

Squat strength percentage change per participant.

| Participant | Squat Baseline | Squat 3 Months | Percentage Change |
|---|---|---|---|
| 1 | 80.0 ± 7.0 | 85.0 ± 7.5 | +6.25% |
| 2 | 82.0 ± 6.8 | 87.0 ± 7.2 | +6.10% |
| 3 | 79.0 ± 6.5 | 83.0 ± 6.7 | +5.06% |
| 4 | 81.0 ± 7.2 | 86.0 ± 7.5 | +6.17% |
| 5 | 78.0 ± 6.5 | 82.0 ± 6.7 | +5.13% |
| 6 | 83.0 ± 6.8 | 88.0 ± 7.2 | +6.02% |
| 7 | 80.0 ± 7.0 | 84.0 ± 7.5 | +5.00% |
| 8 | 82.0 ± 7.2 | 87.0 ± 7.5 | +6.10% |
| 9 | 81.0 ± 6.8 | 85.0 ± 7.0 | +4.94% |
| 10 | 79.0 ± 6.5 | 82.0 ± 6.7 | +3.80% |
| 11 | 80.0 ± 6.7 | 84.0 ± 7.0 | +5.00% |
| 12 | 82.0 ± 7.0 | 86.0 ± 7.5 | +4.88% |

Table 27 illustrates the percentage change, per participant, in muscle hypertrophy (in kg) from baseline to three months of treatment.

TABLE 27

Muscle hypertrophy percentage change per participant.

| Participant | Muscle Mass Baseline | Muscle Mass 3 Months | Percentage Change |
|---|---|---|---|
| 1 | 72.0 ± 5.0 | 75.0 ± 5.2 | +4.17% |
| 2 | 74.0 ± 5.5 | 77.0 ± 5.8 | +4.05% |
| 3 | 71.0 ± 5.2 | 74.0 ± 5.5 | +4.23% |

TABLE 27-continued

Muscle hypertrophy percentage change per participant.

| Participant | Muscle Mass Baseline | Muscle Mass 3 Months | Percentage Change |
|---|---|---|---|
| 4 | 73.0 ± 5.0 | 76.0 ± 5.2 | +4.11% |
| 5 | 70.0 ± 5.0 | 73.0 ± 5.2 | +4.29% |
| 6 | 75.0 ± 5.5 | 78.0 ± 5.7 | +4.00% |
| 7 | 72.0 ± 5.0 | 75.0 ± 5.2 | +4.17% |
| 8 | 74.0 ± 5.5 | 77.0 ± 5.7 | +4.05% |
| 9 | 71.0 ± 5.2 | 74.0 ± 5.5 | +4.23% |
| 10 | 70.0 ± 5.0 | 73.0 ± 5.2 | +4.29% |
| 11 | 72.0 ± 5.0 | 75.0 ± 5.2 | +4.17% |
| 12 | 74.0 ± 5.5 | 77.0 ± 5.7 | +4.05% |

Table 28 illustrates the percentage change, per participant, in muscle thickness (in cm) from baseline to three months of treatment.

TABLE 28

Muscle thickness percentage change per participant.

| Participant | Muscle Thickness Baseline | Muscle Thickness 3 Months | Percentage Change |
|---|---|---|---|
| 1 | 2.5 ± 0.3 | 2.8 ± 0.3 | +12.00% |
| 2 | 2.6 ± 0.3 | 2.9 ± 0.3 | +11.54% |
| 3 | 2.4 ± 0.3 | 2.7 ± 0.3 | +12.50% |
| 4 | 2.5 ± 0.3 | 2.8 ± 0.3 | +12.00% |
| 5 | 2.4 ± 0.3 | 2.6 ± 0.3 | +8.33% |
| 6 | 2.7 ± 0.3 | 3.0 ± 0.3 | +11.11% |
| 7 | 2.5 ± 0.3 | 2.8 ± 0.3 | +12.00% |
| 8 | 2.6 ± 0.3 | 2.9 ± 0.3 | +11.54% |
| 9 | 2.4 ± 0.3 | 2.7 ± 0.3 | +12.50% |
| 10 | 2.4 ± 0.3 | 2.6 ± 0.3 | +8.33% |
| 11 | 2.5 ± 0.3 | 2.8 ± 0.3 | +12.00% |
| 12 | 2.6 ± 0.3 | 2.9 ± 0.3 | +11.54% |

Table 29 illustrates the percentage change, per participant, in time-to-fatigue (in min.) from baseline to three months of treatment.

TABLE 29

Time-to-fatigue percentage change per participant.

| Participant | Time-to-Fatigue Baseline | Time-to-Fatigue 3 Months | Percentage Change |
|---|---|---|---|
| 1 | 22.0 ± 3.0 | 24.0 ± 3.2 | +9.09% |
| 2 | 21.5 ± 3.2 | 23.5 ± 3.1 | +9.30% |
| 3 | 22.0 ± 3.0 | 24.0 ± 3.1 | +9.09% |
| 4 | 21.0 ± 3.0 | 23.0 ± 3.2 | +9.52% |
| 5 | 20.5 ± 3.1 | 22.5 ± 3.0 | +9.76% |
| 6 | 23.0 ± 3.0 | 25.0 ± 3.1 | +8.70% |
| 7 | 21.0 ± 3.2 | 23.0 ± 3.1 | +9.52% |
| 8 | 22.0 ± 3.0 | 24.0 ± 3.2 | +9.09% |
| 9 | 21.5 ± 3.2 | 23.5 ± 3.1 | +9.30% |
| 10 | 22.0 ± 3.0 | 24.0 ± 3.2 | +9.09% |
| 11 | 20.5 ± 3.1 | 22.5 ± 3.0 | +9.76% |
| 12 | 22.0 ± 3.0 | 24.0 ± 3.1 | +9.09% |

Table 30 illustrates the percentage change, per participant, in run time (in min.) from baseline to three months of treatment.

TABLE 30

Run time percentage change per participant

| Participant | Run Time Baseline | Run Time 3 Months | Percentage Change |
|---|---|---|---|
| 1 | 25.0 ± 2.5 | 23.0 ± 2.3 | −8.00% |
| 2 | 24.0 ± 2.4 | 22.5 ± 2.2 | −6.25% |
| 3 | 25.5 ± 2.6 | 23.0 ± 2.3 | −9.80% |
| 4 | 24.5 ± 2.5 | 22.0 ± 2.1 | −10.20% |
| 5 | 24.0 ± 2.4 | 21.5 ± 2.2 | −10.42% |
| 6 | 26.0 ± 2.7 | 24.0 ± 2.5 | −7.69% |
| 7 | 24.5 ± 2.5 | 22.5 ± 2.3 | −8.16% |
| 8 | 25.0 ± 2.6 | 23.0 ± 2.3 | −8.00% |
| 9 | 24.5 ± 2.5 | 22.5 ± 2.2 | −8.16% |
| 10 | 25.0 ± 2.6 | 23.0 ± 2.3 | −8.00% |
| 11 | 24.0 ± 2.4 | 21.5 ± 2.1 | −10.42% |
| 12 | 25.5 ± 2.6 | 23.5 ± 2.4 | −7.84% |

Figure 41:
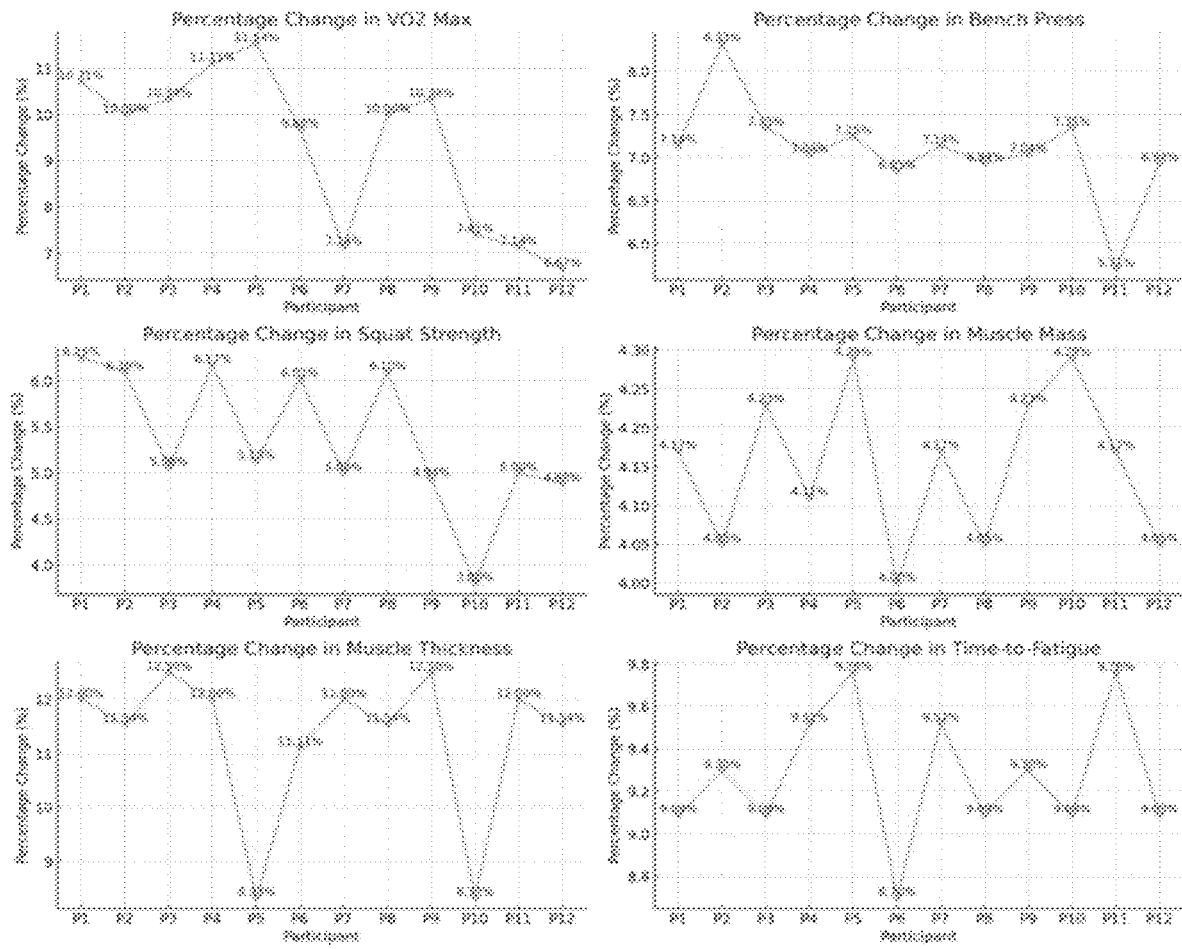
FIG. 41 illustrates percentage changes in $VO_2$ max, bench press and squat strength, muscle mass, muscle thickness, and time-to-fatigue.

FIG. 41 shows the relative changes in percent over time, per participant, of individual $VO_2$ max, bench press, squat strength, muscle mass, muscle thickness, and time-to-fatigue measurements.

Phytosome Bioavailability Delivery

Disclosed is a phytosome bioavailability delivery system for micronized supplements. This technique mixes phospholipids with systematic herbal and other extracts or moisture phytocomponents to produce lipid-consistent tiny composites that significantly increase absorption and bioavailability of micronized forms extracts of key ingredients, which includes DHEA, NEFAs (Non-Esterified Fatty Acids), Vitamin D, L-Arginine, EAAs (Essential Amino Acids), Zinc, Adaptogens, Vitamin B6, Stilbenoids, Vitamins B, C, E, and K, Creatine and Green Tea Extract. Phospholipids such as phosphatidylcholine bind with active plant components to form phytophospholipid complexes that ensure better absorption, stability, and targeted delivery of these compounds. Phytosomes improve the solubility of hydrophobic compounds, stabilize active ingredients, and reduce side effects, ultimately increasing active ingredients efficacy in applications like dietary supplements.

Phytosomes are preferable to liposomes for such a delivery system. Liposomes, while beneficial for drug delivery, present several challenges. They tend to be unstable when exposed to biological fluids, which can lead to drug leakage or degradation over time, reducing shelf life and nutritional effectiveness. The production of liposomes is also costly due to the specialized equipment and processes required to ensure uniformity in size and encapsulation efficiency. Additionally, their drug-loading capacity is limited, as hydrophilic drugs are confined to the aqueous core, and lipophilic drugs are embedded within the lipid bilayer, restricting the total amount they can carry.

Moreover, liposomes are often rapidly cleared from the bloodstream by the immune system, particularly by the mononuclear phagocyte system, which reduces their circulation time and effectiveness unless they are modified, such as through pegylation. Formulating liposomes is a complex process, requiring precision that is difficult to maintain during large-scale production. Lastly, there is the potential for toxicity, as non-biocompatible lipids or stabilizers may lead to adverse effects, and liposomes may accumulate in organs like the liver and spleen, posing toxicity risks.

The phytosome bioavailability delivery system is an innovative method designed to improve the bioavailability and nutritional effectiveness of plant-based compounds, such as flavonoids, polyphenols, and other bioactive constituents. It involves the creation of a complex between a natural phytochemical and a phospholipid molecule, like phosphatidylcholine, forming a chemical bond. Unlike simple mixtures of plant extracts and lipids, phytosomes enhance the absorption of these compounds by making them more lipid compatible.

Phytosomes involve the formation of a chemical bond between plant-based bioactive compounds (like polyphenols or flavonoids) and phospholipids, which significantly enhances their bioavailability. This system is particularly beneficial for delivering hydrophobic plant extracts, such as curcumin, silymarin, and *Ginkgo biloba*, where improved absorption is crucial for efficacy. Due to their bonded structure, phytosomes offer better stability and are more efficient at delivering active ingredients to target tissues, particularly in herbal medicine and nutraceutical applications. Studies have shown that phytosomes are more effective in enhancing bioavailability compared to traditional delivery methods.

On the other hand, liposomes are spherical vesicles composed of lipid bilayers that encapsulate both hydrophilic and lipophilic substances without forming chemical bonds. Liposomes are widely used in pharmaceuticals and cosmetics due to their versatility in delivering a variety of drugs, including water-soluble and fat-soluble compounds. However, their bioavailability is generally lower than that of phytosomes, as the encapsulated compounds are not bonded to the lipids, making them less stable and more susceptible to degradation.

One of the primary benefits of phytosome systems is the significant increase in bioavailability. Phytochemicals, such as curcumin, quercetin, and silymarin, typically have poor solubility in water and limited absorption when taken orally. By incorporating them into phytosome complexes, their bioavailability increases drastically. For instance, curcumin's bioavailability is enhanced up to 29 times when delivered in phytosome form. Additionally, the lipid component of the phytosome improves the solubility of poorly soluble phytochemicals. The amphiphilic nature of phytosomes, having both hydrophilic and lipophilic properties, allows these molecules to dissolve more effectively in gastrointestinal fluids and cross cell membranes more easily. As a result, phytosomes exhibit better pharmacokinetics, staying in the system longer and providing more sustained nutritional effects, reducing the need for frequent dosing.

Phytosomes also serve as targeted bioavailability delivery systems. The lipid component integrates well with cellular membranes, enabling phytochemicals to reach specific tissues more efficiently. Furthermore, since phytosomes increase the bioavailability and efficiency of plant compounds, lower doses are needed to achieve nutritional effects, minimizing the risk of side effects and toxicity. Another key advantage is their stability, as they protect phytochemicals from environmental factors like oxygen, light, and heat, thus improving the shelf life of the active ingredients.

The mechanism behind phytosome systems involves the formation of a lipid-phytochemical complex, where the phospholipid bonds with the phytochemical, enhancing its lipid solubility and enabling it to penetrate cell membranes more effectively. This increased membrane permeability allows for higher concentrations of the active ingredient to be absorbed into the cells. The lipid content of the phytosome also facilitates improved lymphatic absorption, bypassing liver metabolism and resulting in higher plasma concentrations of the phytochemical. Furthermore, the phytosome structure provides sustained nutrients release, preventing rapid degradation and maintaining nutritional effects over time.

The preparation of phytosomes involves several steps. First, the appropriate phytochemicals and phospholipids are selected, usually based on their nutritional potential and low bioavailability. Phosphatidylcholine is typically chosen due to its role in cell membranes and compatibility with bioavailability delivery systems. Next, the phytochemical and phospholipid are mixed in a solvent, such as ethanol or dichloromethane, and stirred under specific conditions to form the phytochemical-phospholipid complex. The solvent is then evaporated under reduced pressure, usually through rotary evaporation, leaving behind the phytosome complex. This complex is subsequently dried using freeze-drying or spray-drying methods, yielding a fine powder that can be formulated into various dosage forms, such as capsules or tablets. Finally, the phytosome product undergoes quality control and evaluation to ensure its size, encapsulation efficiency, stability, and release profile meet the required standards. Analytical techniques, such as X-ray diffraction (XRD) or Fourier-transform infrared spectroscopy (FTIR), are used to confirm the phytosome structure.

Phytosome delivery systems have a range of applications. They are commonly used to enhance the bioavailability of plant extracts, making them suitable for treating liver disorders with silymarin phytosome, which has been extensively studied for its hepatoprotective properties in conditions like cirrhosis and hepatitis. Curcumin phytosome is used for its strong anti-inflammatory and antioxidant effects, benefiting conditions such as arthritis, cancer, and cardiovascular diseases. *Ginkgo biloba* phytosome enhances cognitive function, improves memory, and provides protection against age-related neurodegenerative diseases. In skincare, phytosomes improve the delivery of polyphenols and flavonoids, offering antioxidant and anti-aging benefits.

Several types of phytosome systems have been developed for different natural extracts, including Silybin Phytosome (SILIPHOS®) for liver protection, Curcumin Phytosome (Meriva®) for anti-inflammatory and antioxidant benefits, *Ginkgo biloba* Phytosome for cognitive enhancement, Green Tea Phytosome (GREENSELECT®) for antioxidant and weight loss support, and Quercetin Phytosome for anti-allergic and antioxidant effects.

Despite its many advantages, the phytosome system faces challenges. The cost of developing phytosome technology is higher than traditional formulations, and scaling up production requires precise conditions, making it technically challenging. In conclusion, the phytosome delivery system is an advanced method for improving the bioavailability and nutritional efficacy of plant-based compounds. By utilizing phospholipid-based complexes, phytosomes enhance absorption, stability, and controlled release of bioactive ingredients, offering significant potential in nutraceuticals and pharmaceuticals, particularly in areas like liver health, anti-inflammatory therapy, and cognitive support.

Several research studies have explored the effectiveness of phytosomes in enhancing the bioavailability and nutritional potential of various plant-based compounds. A randomized, placebo-controlled study found the bioavailability of curcumin in its phytosome form compared favorably to standard curcumin extracts. The results showed that the phytosome formulation increased curcumin bioavailability by nearly 29-fold. Additionally, it demonstrated significant improvements in antioxidant markers among the participants, confirming the potential of curcumin phytosomes in inflammation and oxidative stress-related conditions.

Other studies found the bioavailability of silybin in a new phytosome complex compared favorably to the pharmacokinetics of silybin in its traditional form. The phytosome formulation significantly improved the bioavailability of silybin, enhancing its effectiveness in providing liver protection, particularly in the treatment of conditions such as cirrhosis and hepatitis.

Researchers have studied the absorption and efficacy of *Ginkgo biloba* extract in its phytosome form compared to the standard extract, and the results showed that the phytosome formulation led to higher plasma concentrations of flavonoids, the active components in *Ginkgo biloba*. This increase in absorption indicated that *Ginkgo biloba* phytosomes offer enhanced cognitive and neuroprotective benefits, making them more effective in the treatment of neurodegenerative diseases.

Studies involving a lecithin formulation of green tea extract, on weight maintenance after weight loss found a phytosome formulation of green tea extract helped subjects maintain weight loss. The results showed a significant reduction in body weight and BMI, demonstrating the superior weight management benefits of GREENSELECT® Phytosome compared to non-phytosome green tea extracts.

Phytosomes in quercetin formulations improve oral absorption and anti-inflammatory activity in animal models versus conventional quercetin formulations. Quercetin phytosome formulations improve oral absorption and enhanced anti-inflammatory activity, highlighting its potential for managing inflammatory conditions more effectively.

A study of silymarin phytosomes and the potential for treating insulin resistance and reducing oxidative stress in type 2 diabetes investigated the efficacy of silymarin phytosome and found significant improvements in fasting blood sugar, insulin levels, and markers of oxidative stress, demonstrating the potential of silymarin phytosome in diabetes management.

Finally, a study of berberine phytosome versus berberine explored the potential of berberine phytosome in treating metabolic syndrome. The study concluded that berberine phytosome showed greater effectiveness in improving lipid profiles and insulin sensitivity compared to traditional berberine formulations, emphasizing the nutritional potential of phytosome technology in metabolic health.

A variety of nanoparticles, differing in both quantity and materials, are under development. These materials exist in various chemical forms, such as micelles, metal oxides, or large biomolecules. This diversity underscores the need for the development of enhanced characterization methods and protocols that provide greater precision and increased credibility. However, each characterization technique has its own set of advantages and limitations. To overcome these constraints, it is advisable to use a combination of methods to effectively characterize individual nanoparticles. When choosing these methods of characterization, it is essential to ensure that they are suitable for the intended purpose.

Various methods are used the characterize phytosome nanoparticles, including (1) high-performance liquid chromatography, (2) X-ray diffraction analysis, (3) scanning electron microscopy, (4) transmission electron microscopy, and (5) differential scanning calorimetry (DSC).

To evaluate the efficiency of drug entrapment within planterosomes, an ultracentrifugation method is employed. This method aids in the determination of the percentage of the drug present within the phospholipid mesh. In all phytosome formulations, approximately 100% of the drug is present. The entrapment efficacy is calculated using the following formula:

% entrapment efficacy=(amount of drug in sediment/ total amount of drug added)×100% entrapment efficacy=(amount of drug in sediment/total amount of drug added)×100

The quantity of drug in phytosomes is typically determined using a modified high-performance liquid chromatography method or by UV analysis. One way to measure the drug content is to dissolve a known quantity of phyto-phospholipid dispersion in 10 mL of methanol. The drug concentration of the phyto-phospholipid complex is then determined. After appropriate dilution, the absorbance is measured using spectroscopic techniques at a specific wavelength, and the drug content is calculated using the following formula:

% drug content=(actual drug content in phyto-phospholipid complex/theoretical yield)×100% drug content=(actual drug content in phyto-phospholipid complex/theoretical yield)×100

The Franz diffusion cell method or dialysis bag is used in combination with various kinetic models. These methods help to identify the mechanisms involved in the release of drug content. Furthermore, an in vitro dissolution test is conducted to understand the drug release process.

The most commonly used visualization methods are transmission electron microscopy (TEM) and scanning electron microscopy (SEM). Additionally, when the SEM analysis of nanoparticles (NPs) does not yield clear results regarding the size and shape of the NPs due to its very high resolution, field emission scanning electron microscopy (FESEM) is used.

X-ray diffraction analysis (XRD) can provide valuable assistance in analyzing various particles. This method is utilized for identifying crystalline compounds and for determining particle roughness, topography, surface area, and surface chemistry.

Transition temperature, which is a thermoanalytical method, such as differential scanning calorimetry (DSC), can be employed to assess the transition temperature of vesicular lipid systems. DSC plays a crucial role in elucidating changes in material properties in response to temperature variations. This tool is valuable for determining the crystal structure of the active pharmaceutical ingredient (API). Several phenomena are observed, including temperature transitions, the disappearance of endothermic peaks, alterations in relative peak areas, and the emergence of new peaks. These observations provide valuable insights into the melting and crystallization behavior of the sample being investigated.

The stability of vesicles can be assessed over an extended period through comprehensive measurements that include size, zeta potential, and structural characteristics. Zeta potential, which is the surface charge, is defined as the difference in electric potential (AV) between the dispersion medium and the stationary fluid layer on the surface of the dispersed phase. A zeta potential of ±30m V or ±20m V is preferred for high physical stability. For the determination of both size and zeta potential, dynamic light scattering (DLS) coupled with a computerized inspection system and photon correlation spectroscopy (PCS) proves to be a valuable approach. Simultaneously, transmission electron microscopy (TEM) is used to observe structural changes, as mentioned earlier.

Spectroscopic techniques may be used to confirm the formation of a complex or investigate the interaction between the plant-based component and the phospholipids, scientists utilize spectroscopic techniques such as nuclear magnetic resonance (NMR), Fourier transform infrared spectroscopy (FTIR), and X-ray diffraction (XRD). This involves comparing the outcomes of the individual elements with those of the complexes.

Phytosomes are often used in the context of improving the solubility and bioavailability of poorly water-soluble phytochemicals or botanical drugs. Phospholipid complexation involves the interaction between the phospholipids and the phytoconstituents. Here is a general mechanism for how it works.

The primary structure of phospholipids contains a hydrophilic "head" and two hydrophobic "tails". This amphiphilic nature allows phospholipids to form bilayers, with the hydrophilic heads facing outward and the hydrophobic tails tucked inside. The poorly water-soluble phytochemicals, which are usually lipophilic (fat-loving) or hydrophobic, interact with the hydrophobic region of the phospholipid. This interaction leads to the formation of a complex between the phytoconstituent and the phospholipid. Due to the amphiphilic nature of phospholipids, the complex's overall solubility in water is enhanced. This is because the outer hydrophilic region of the phospholipid can interact with water, making it easier for the complex to dissolve. The phyto-phospholipid complex might alter the permeability of membranes, making it easier for the compound to traverse biological barriers. The exact mechanism and efficiency can vary based on the specific phytochemical and phospholipid used.

Referring to Table 31, various phytosomal products are available in market which often face challenges in bioavailability. This enhancement occurs because NEFAs facilitate the transport of these nutrients or compounds across cell membranes, improving their effectiveness.

The mechanism of action involves NEFAs forming micelles in an aqueous environment. These micelles encapsulate lipophilic compounds, protecting them from degradation and improving their stability. This encapsulation leads to increased bioavailability, allowing for more efficient absorption in the gastrointestinal tract.

One of the notable benefits of using NEFAs in bioavailability delivery is their ability to target specific tissues. Since NEFAs are readily metabolized by cells, they can facilitate localized nutrients or compound release, ensuring that nutritional agents reach their intended site of action without affecting surrounding tissues. This targeted approach can reduce the required dosage of supplements, which is particularly advantageous in minimizing potential side effects and enhancing patents or cosumers' compliance.

The nutritional effects of NEFAs as a bioavailability delivery system are diverse. They can improve the effectiveness of treatments for various conditions, including inflammatory diseases, metabolic disorders, and cancer. By enhancing bioavailability delivery, NEFAs can lead to better patient outcomes, as they ensure that the active ingredients are delivered efficiently and effectively, Non-Esterified Fatty Acids (NEFAs) have garnered attention as a promising delivery system, particularly highlighted in various in vitro studies. These studies demonstrate

TABLE 31

Phytosomal products available on the market.

| Phytosomal Product | Phytoconstituent | Natural Source | Pharmacological activity |
|---|---|---|---|
| Hawthron Phytosomes | Hyperin, Quercitin | *Crateegus, Oxyacanthoids* | Antihypertension, Cardioprotective |
| Ginseng Phytosomes | Ginsenosides | *Panax Ginseng* | Immunomodulator, Nutraceutical |
| Curcumin Phytosome | Curcumin | *Curcuma Longa* | Osteoarthritis, Anti-Inflammatory, Anticancer |
| Escin B-Sitosterol Phytosome | Saponins | *Aesculus Hippocastanum* (Horse Chestnut Fruit) | Anti-Oedema |
| Green Tea Phytosome | Epigallocatechin, Catechin, Epicatechin-3-O-Gallate, Epigallocatechin-3-O-Gallate | *Camellia Sinesis*(Tea) | Nutraceutical, Systemic Antioxidant, Anticancer, Hepatoprotective, Anti-Inflammatory |
| Oleaselect ™ Phytosome | Polyphenol | *Olea europaea* | Anti-inflammatory, antihyperlipidemic |
| Glycyrrhetinic acid Phytosome ™ | Glycyrrhetinic acid | *Glycyrrhiza glabra* (Mulethi) | Anti-inflammatory, dermatitis |
| Silybin Phytosome [32] | Silybin, Silycristin, Isosilbin, Silydianin | *Silybium maranium*(Milk Thistle) | Hepatoprotective, Antioxidant for skin and liver |
| Mirtoselect Phytosome | Anthocyanosides | *Vaccinum myrtillus*(Bilberry) | Antioxidant, Improvement of Capillary Tone. |
| Ginkgo phytosomes | 24% Ginkgo flavon glycosides | *Ginkgo biloba* | Protect the brain and vascular lining, Anti-ageing agent |
| Visnadex Phytosome | Indena | *Amni visnaga* | Improve microcirculation |

Fatty Acids (NEFAS) Bioavailability Delivery System

Non-Esterified Fatty Acids (NEFAs) play a significant role as an effective bioavailability delivery system due to their unique physicochemical properties. NEFAs enhance the solubility and absorption of lipophilic compounds, NEFAs' ability to enhance drug compounds solubility and bioavailability, which is crucial for the efficacy of lipophilic compounds.

One significant aspect of in vitro research is the formation of micelles. NEFAs can spontaneously assemble into micelles in aqueous environments, effectively encapsulating lipophilic drugs. This encapsulation not only protects the compounds from degradation but also facilitates their transport across cell membranes. Studies have shown that NEFA-loaded micelles significantly improve the solubility of poorly soluble compounds, leading to enhanced absorption in cell cultures, Additionally, in vitro studies have explored the metabolic pathways of NEFAs in various cell types. These studies indicate that NEFAs are readily taken up by cells, allowing for localized drug release. For instance, research involving cancer cell lines has demonstrated that NEFAs can enhance the uptake of chemo nutritional agents, leading to improved cytotoxic effects against tumors.

Moreover, NEFAs have been shown to modulate cellular responses, such as inflammation and apoptosis, in specific contexts. This property can be leveraged to improve the nutritional effects of anti-inflammatory or anticancer drugs, making NEFAs a versatile platform for targeted therapy, Overall, in vitro studies underscore the potential of NEFAs as an effective bioavailability delivery system, enhancing the solubility, bioavailability, and nutritional efficacy of various lipophilic drugs while allowing for targeted delivery and reduced side effects.

Here are some research studies on Non-Esterified Fatty Acids (NEFAs) as a bioavailability delivery system.

Cyclodextrin-Bioavailability Delivery System

Figure 42:
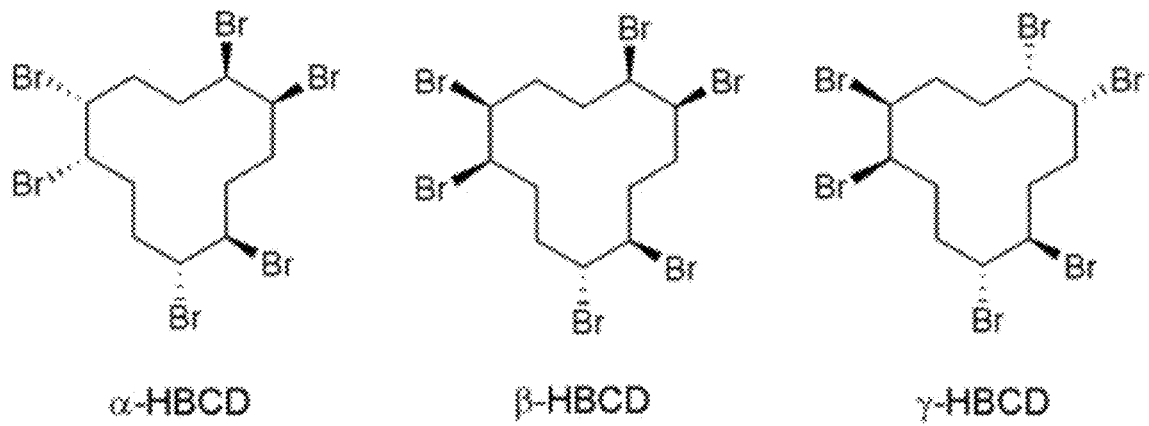
FIG. 42 illustrates the chemical formulas for α-HBCD, β-HBCD, and γ-HBCD.

Referring to FIG. 42, several chemical structures of HBCD are shown. Several types of cyclodextrins are used for different applications. Beta-Cyclodextrin (β-CD): Commonly used due to its good complexation properties and can improve the solubility of various DHEA derivatives but may have limitations in terms of solubility in water itself. Hydroxypropyl-β-Cyclodextrin (HP-β-CD) is modified to enhance water solubility and reduce toxicity. Particularly, useful for DHEA derivatives to improve solubility and reduce potential irritation. Methyl-β-Cyclodextrin (M-β-CD) has a higher complexation ability and can encapsulate larger molecules or higher quantities of DHEA derivatives. γ-Cyclodextrin (Y-CD) has a larger cavity size compared to β-CD, which can be advantageous for complexing larger or more hydrophobic DHEA derivatives.

There are several formulation strategies for encapsulating DHEA derivatives. Physical Mixtures involve the simple mixing of DHEA derivatives with cyclodextrins and is suitable for initial screening and less complex formulations. In co-precipitation, DHEA derivatives and cyclodextrins are dissolved together, and then a solvent is removed to form a solid complex. It helps in achieving more homogeneous complexation. In freeze-drying, DHEA derivatives and cyclodextrins are freeze-dried to obtain a stable powder. It is useful for improving stability and creating a powder for various formulations. Spray drying is a method to produce dry powder directly from a liquid solution. It is useful for large-scale production and creating formulations suitable for oral or other routes of administration.

Combining micronized cyclodextrin with various active ingredients can significantly enhance their stability, solubility, and bioavailability, Micronized cyclodextrin acts as a carrier, forming inclusion complexes that improve the delivery of compounds such as DHEA, NEFAs, Vitamin D, L-Arginine, (EAAs), Zinc, adaptogens, Vitamin B6, stilbenoids, Vitamins B, C, E, and K, and Green Tea Extract. The mechanism of action involves cyclodextrin encapsulating lipophilic compounds, making them more soluble in aqueous environments. This enhances bioavailability, leading to better absorption and efficacy. By improving solubility and enabling controlled release, cyclodextrins can help achieve lower effective doses, which may minimize side effects.

DHEA derivatives, such as DHEA sulfate and DHEA acetate, often have poor water solubility. Cyclodextrins form inclusion complexes with these derivatives, significantly increasing their solubility in aqueous solutions, which is essential for effective oral or intravenous administration. These derivatives are also susceptible to degradation from light, oxygen, and moisture. Cyclodextrin complexes help protect them from these environmental factors, enhancing their stability and extending shelf life.

An Immediate release of DHEA can lead to side effects or suboptimal nutritional effects. Cyclodextrins can modulate the release rate of DHEA derivatives, providing controlled release formulations that ensure steady active ingredients release over time, improving nutritional outcomes and reducing side effects. Low bioavailability of DHEA derivatives limits their effectiveness, but cyclodextrins enhance dissolution rates and overall bioavailability, leading to better absorption and efficacy, High doses of DHEA derivatives may cause side effects; by improving solubility and enabling controlled release, cyclodextrins can help achieve lower effective doses, potentially reducing side effects.

The mechanism of action involves DHEA acting as a precursor to sex hormones, influencing various physiological processes. The combination of cyclodextrin with DHEA and other active ingredients enhances bioavailability, ensuring effective utilization by the body. This mixture can create synergistic effects among vitamins, minerals, amino acids, and adaptogens, leading to improved mood, energy levels, and metabolic health. Cyclodextrins provide sustained release of active ingredients, maintaining stable blood levels, and protect sensitive compounds from degradation, further enhancing stability.

The strategic combination of cyclodextrin with DHEA and other beneficial ingredients results in a robust formulation that maximizes nutritional potential, bioavailability, and efficacy, supporting a wide range of health benefits and making it an effective choice for dietary supplements aimed at promoting overall wellness.

Cyclodextrins (CDs) are cyclic oligosaccharides known for enhancing the solubility and bioavailability of poorly soluble drugs (compounds) through complexation. Their ability to form inclusion complexes with various drug molecules is widely researched in both in vitro and in vivo settings. In vitro studies show that cyclodextrins significantly increase the solubility of hydrophobic drugs, improving dissolution profiles. Stability testing of cyclodextrin complexes assesses their integrity under various pH and temperature conditions. Permeability assessments using models like Caco-2 cell lines evaluate how well cyclodextrin-drug complexes cross biological membranes, providing insights into their absorption potential. In vivo studies reveal that drugs administered as cyclodextrin complexes often exhibit improved bioavailability compared to non-complexed versions, leading to enhanced nutritional effects. Pharmacokinetic evaluations measure parameters such as absorption rate, peak plasma concentration, and elimination half-life, highlighting the advantages of cyclodextrin complexation. The clinical relevance is assessed through studies measuring the pharmacodynamic effects of drugs in cyclodextrin formulations, demonstrating improved efficacy in nutritional settings, Micronized Bioavailability Delivery System Benefits Micronized Bioavailability Delivery systems offer several benefits, including improved solubility, which allows micronized particles to dissolve more easily in fluids, enhancing the absorption of poorly soluble compounds. This leads to increased bioavailability, enabling micronized supplements to be absorbed more efficiently in the gastrointestinal tract. Higher bioavailability often results in more effective nutritional outcomes at lower doses. Additionally, micronization can improve the taste and texture of powdered supplements, reducing grittiness and unpleasant flavors. Smaller particle sizes can also lead to a faster onset of action, allowing for quicker nutritional effects.

Micronization techniques include mechanical milling, which grinds substances into fine powders; jet milling, which uses high-velocity air streams to reduce particle size; high-pressure homogenization, which forces substances through a narrow orifice under pressure; and cryogenic milling, which employs extremely low temperatures to make substances brittle for easier grinding, Key micronized ingredients include DHEA, which supports hormonal balance and mood; cyclodextrin, which enhances the solubility and stability of lipophilic active ingredients; NEFAs, providing energy and supporting metabolism; Vitamin D, which promotes bone health and immune function; L-Arginine, enhancing blood flow and cardiovascular health; essential amino acids (EAAs) for protein synthesis and muscle recovery; chelated minerals like zinc for immune function; adaptogens like ashwagandha for stress resilience; Vitamin B6 for neurotransmitter synthesis; stilbenoids like resveratrol for antioxidant support; Vitamin B complex for energy metabolism; green tea extract for weight management; Vitamin C for immune function and skin health; Vitamin E for oxidative stress protection; Vitamin K for blood clotting; and creatine for athletic performance. Each ingredient contributes uniquely to health, optimizing nutritional outcomes.

In vitro studies show that micronized delivery system demonstrates enhanced solubility and dissolution rates compared to non-micronized forms, Techniques such as Caco-2 cell models assess the permeability of micronized formulations across intestinal barriers. In vivo studies indicate that micronized formulations lead to higher plasma concentrations and improved overall bioavailability, measured through pharmacokinetic parameters like absorption rate and peak concentration. Nutritional and therapeutic efficacy is often evaluated in clinical trials, highlighting improved outcomes due to enhanced bioavailability delivery.

Study 7 (Bioavailability, Solubility, Performance)

An RCT was conducted to evaluate the bioavailability, solubility, physical performance, muscle mass, wellness, and safety of different supplement formulations over a 12-week period. Forty male participants, aged 30-50 years, with low baseline levels of physical performance and wellness, were randomly assigned to one of five intervention groups: micronized formulations, phytosome-encapsulated formulations, cyclodextrin-complexed formulations, NEFAs formulations, or a combination of all four. The dosage for all participants included 50 mg/day of 4-Androstenediol, 600 IU/day of Vitamin D, 1000 mg/day of HMB Free Acid, 200 mg/day of Magnesium Bisglycinate, and 200 mg/day of *Panax Ginseng*.

In this RCT, the participants underwent a thorough pre-screening process before being randomly assigned to one of the intervention groups. These groups received micronized formulations, phytosome-encapsulated formulations, cyclodextrin-complexed formulations, NEFA formulations, or a combination of all four. The dosage for all participants included 50 mg/day of 4-Androstenediol, 600 IU/day of Vitamin D, 1000 mg/day of HMB Free Acid, 200 mg/day of Magnesium Bisglycinate, and 200 mg/day of *Panax Ginseng*.

The pre-screening included an extensive medical history review to identify any pre-existing conditions, such as cardiovascular, liver, or kidney disease, which could interfere with the effects of the supplements. Blood tests were conducted to assess baseline levels of Vitamin D, magnesium, testosterone, and DHEA, and to evaluate liver and kidney function, ensuring the participants' bodies could metabolize the supplements safely. Hormonal assessments were especially important due to the effects of 4-Androstenediol on testosterone.

Cardiovascular health was assessed by measuring blood pressure and heart rate, given the potential impact of *Panax Ginseng* and 4-Androstenediol on cardiovascular function. Baseline measurements of body composition, including muscle mass and body fat percentage, were taken, along with physical performance tests such as grip strength. Participants were required to have a body mass index (BMI) between 18.5 and 30, ensuring that those with very high or low BMIs were excluded to prevent the results from being skewed.

The inclusion criteria specified that participants must be healthy males aged 30 to 50 with low physical performance, normal hormone levels, and healthy liver and kidney function. Importantly, the trial applied strict exclusion criteria to maintain the integrity of the study and ensure participant safety. Smokers were excluded due to the potential interference with the metabolic processes involved in the trial, as smoking can affect cardiovascular health and overall metabolism. Similarly, individuals with high alcohol consumption were excluded, as excessive alcohol can impact liver function and hormone balance, both of which are critical to the study. Participants who were using recreational drugs or prescription medications that could interfere with the trial (such as blood thinners, hormone replacement therapies, or medications affecting liver function) were also excluded to avoid complications and potential interactions with the study supplements.

During the 12-week study, participants underwent regular health check-ups to monitor for any adverse effects. Blood tests were regularly conducted to track hormone levels, liver function, and any other physiological changes. Participants were asked to self-report any side effects, and dietary and exercise logs were maintained to ensure consistency in lifestyle factors throughout the trial. This careful pre-screening process, along with ongoing monitoring, ensured participant safety and the accuracy of the study's results.

In this study/RCT, keeping track of adverse effects is a top priority to make sure participants stay safe. Throughout the study, participants are asked to share any changes in how they feel, even if it's something small like feeling a little dizzy or having an upset stomach. They can do this during regular check-ins with the research team, either in person or through simple questionnaires, it was set up beyond what participants report. The research team also keeps a close eye on their health by running routine tests like checking blood samples or monitoring heart rate. These tests help catch anything that might be going on beneath the surface even if the participants don't notice it themselves. The researchers compare this information with the baseline data from when the study started to see if any concerning patterns emerge. If any serious side effects show up, the team can adjust or stop the trial to make sure everyone is safe. By combining regular check-ins and medical tests, the study team can quickly respond to any adverse effects and make sure participants' well-being comes first.

cacy, and safety of the various supplement formulations studied.

Table 32 Shows the plasma concentrations of androstenediol, vitamin D, magnesium bisglycinate, and *Panax ginseng* delivered through micronized, phytosomal, cyclodextrin, NEFAs, and combination mechanisms.

TABLE 32

Plasma concentrations.

| Participant | Formulation | 4-Androstenediol | Vitamin D | HMB FA | Magnesium Bisglycinate | Panax Ginseng |
|---|---|---|---|---|---|---|
| 1 | Micronized | 15 ± 2.0 | 30 ± 3.0 | 5 ± 1.0 | 1.5 ± 0.2 | 50 ± 7.0 |
| 2 | Phytosome | 18 ± 2.2 | 35 ± 3.5 | 6 ± 1.1 | 1.6 ± 0.2 | 55 ± 7.5 |
| 3 | Cyclodextrin | 17 ± 2.1 | 32 ± 3.3 | 5.5 ± 1.2 | 1.7 ± 0.3 | 52 ± 7.2 |
| 4 | NEFAs | 16 ± 2.0 | 33 ± 3.4 | 5.0 ± 1.0 | 1.4 ± 0.2 | 51 ± 6.8 |
| 5 | Combination | 22 ± 2.5 | 40 ± 4.0 | 7 ± 1.0 | 1.8 ± 0.2 | 60 ± 8.0 |

Baseline health assessments was conducted, including physical performance tests for strength and endurance, muscle mass measurements using bioelectrical impedance analysis (BIA), wellness assessments using standardized questionnaires like the WHO-5 Well-Being Index, and blood tests to determine baseline levels of the administered supplements.

Participants included men aged 30-50 years with low baseline physical performance and wellness. Exclusion criteria include any history of chronic diseases, medication use affecting study outcomes, and allergies or sensitivities to any of the study supplements.

To determine bioavailability, plasma concentrations of the supplements were measured at baseline, 6 weeks, and 12 weeks. Blood samples were centrifuged, and the plasma was analyzed using high-performance liquid chromatography (HPLC) with mass spectrometry (MS) detection. The solubility of each supplement was assessed in simulated gastric and intestinal fluids using UV-visible spectroscopy to quantify concentrations.

Physical performance was evaluated through strength tests, such as one-repetition maximum for major muscle groups, and endurance tests, including time to exhaustion on a treadmill or cycle ergometer. Muscle mass was measured using bioelectrical impedance analysis (BIA) at baseline, 6 weeks, and 12 weeks. Wellness was assessed using the WHO-5 Well-Being Index, with participants completing the questionnaire at baseline and after 6 weeks. Adverse effects were recorded through self-reported questionnaires and classified by severity.

Statistical analysis was performed using ANOVA to compare plasma concentrations, solubility, physical performance, muscle mass, and wellness scores between the groups. Post-hoc tests, such as Tukey's HSD, identified specific group differences, with statistical significance set at a p-value of less than 0.05. These methodologies ensured an accurate assessment of the bioavailability, solubility, efficacy, and safety of the various supplement formulations studied.

Plasma Concentrations (ng/mL), the Combination Group exhibited the highest plasma concentrations for all supplements. Specifically, 4-Androstenediol reached 22±2.5 ng/ml, Vitamin D was at 40±4.0 ng/mL, HMB at 7±1.0 ng/ml, Magnesium at 1.8±0.2 ng/ml, and *Panax Ginseng* at 60±8.0 ng/mL, all showing significant increases. The Phytosome and Cyclodextrin groups demonstrated moderately elevated levels, with Phytosome performing slightly better for Vitamin D and HMB concentrations.

Table 33 shows the solubility in simulated fluids (in mg/mL) of androstenediol, vitamin D, magnesium bisglycinate, and *Panax ginseng* delivered through micronized, phytosomal, cyclodextrin, NEFAs, and combination mechanisms.

TABLE 33

Solubility in simulated fluids (mg/mL).

| Formulation | 4-Androstenediol | Vitamin D | HMB-FA | Magnesium Bisglycinate | Panax Ginseng |
|---|---|---|---|---|---|
| Micronized | 0.5 ± 0.05 | 0.7 ± 0.07 | 0.4 ± 0.04 | 0.3 ± 0.03 | 0.6 ± 0.06 |
| Phytosome | 0.7 ± 0.06 | 0.9 ± 0.08 | 0.5 ± 0.05 | 0.4 ± 0.04 | 0.8 ± 0.07 |
| Cyclodextrin | 0.6 ± 0.05 | 0.8 ± 0.07 | 0.45 ± 0.05 | 0.35 ± 0.03 | 0.7 ± 0.06 |
| NEFAS | 0.4 ± 0.04 | 0.6 ± 0.06 | 0.3 ± 0.03 | 0.25 ± 0.02 | 0.5 ± 0.05 |
| Combination | 0.9 ± 0.07 | 1.1 ± 0.09 | 0.6 ± 0.05 | 0.5 ± 0.04 | 0.9 ± 0.08 |

Solubility in Simulated Fluids (mg/mL), the Combination Group again showed superior solubility. The concentrations were 0.9±0.07 mg/mL for 4-Androstenediol, 1.1±0.09 mg/mL for Vitamin D, 0.6±0.05 mg/mL for HMB, 0.5±0.04 mg/mL for Magnesium, and 0.9±0.08 mg/mL for *Panax Ginseng*. The Phytosome group followed closely behind, indicating good bioavailability.

Table 34 shows physical performance and wellness results for micronized, phytosomal, cyclodextrin, NEFAs, and combination mechanisms at baseline and after twelve weeks.

TABLE 34

Physical performance and wellness.

| Participant | Formulation | Muscle Mass (kg) Baseline | Muscle Mass (kg) 12 Weeks | Strength Score Baseline | Strength Score 12 Weeks | Wellness Score Baseline | Wellness Score 12 Weeks |
|---|---|---|---|---|---|---|---|
| 1 | Micronized | 70 ± 5.0 | 73 ± 5.2 | 50 ± 5.0 | 55 ± 5.5 | 60 ± 6.0 | 65 ± 6.5 |
| 2 | Phytosome | 72 ± 5.2 | 76 ± 5.5 | 52 ± 5.2 | 58 ± 5.7 | 62 ± 6.2 | 68 ± 6.8 |
| 3 | Cyclodextrin | 71 ± 5.1 | 75 ± 5.4 | 51 ± 5.1 | 56 ± 5.6 | 61 ± 6.1 | 66 ± 6.6 |
| 4 | NEFAs | 69 ± 5.0 | 74 ± 5.3 | 49 ± 5.0 | 55 ± 5.5 | 59 ± 6.0 | 64 ± 6.5 |
| 5 | Combination | 68 ± 5.0 | 80 ± 5.8 | 48 ± 5.0 | 60 ± 6.0 | 58 ± 5.8 | 70 ± 7.0 |

In terms of physical performance and wellness, the Combination Group demonstrated a significant increase in muscle mass, rising from 68 kg to 80 kg, which corresponds to a notable improvement of 17.65%. The strength score improved from 48 to 60, reflecting a 25.00% increase. Furthermore, the wellness score, measured by the WHO-5 Index, increased from 58 to 70, resulting in a 20.69% improvement. Other formulations, including Micronized, Phytosome, Cyclodextrin, and NEFAs, showed moderate improvements across all performance and wellness metrics, but none matched the efficacy of the Combination Group.

Figure 43:
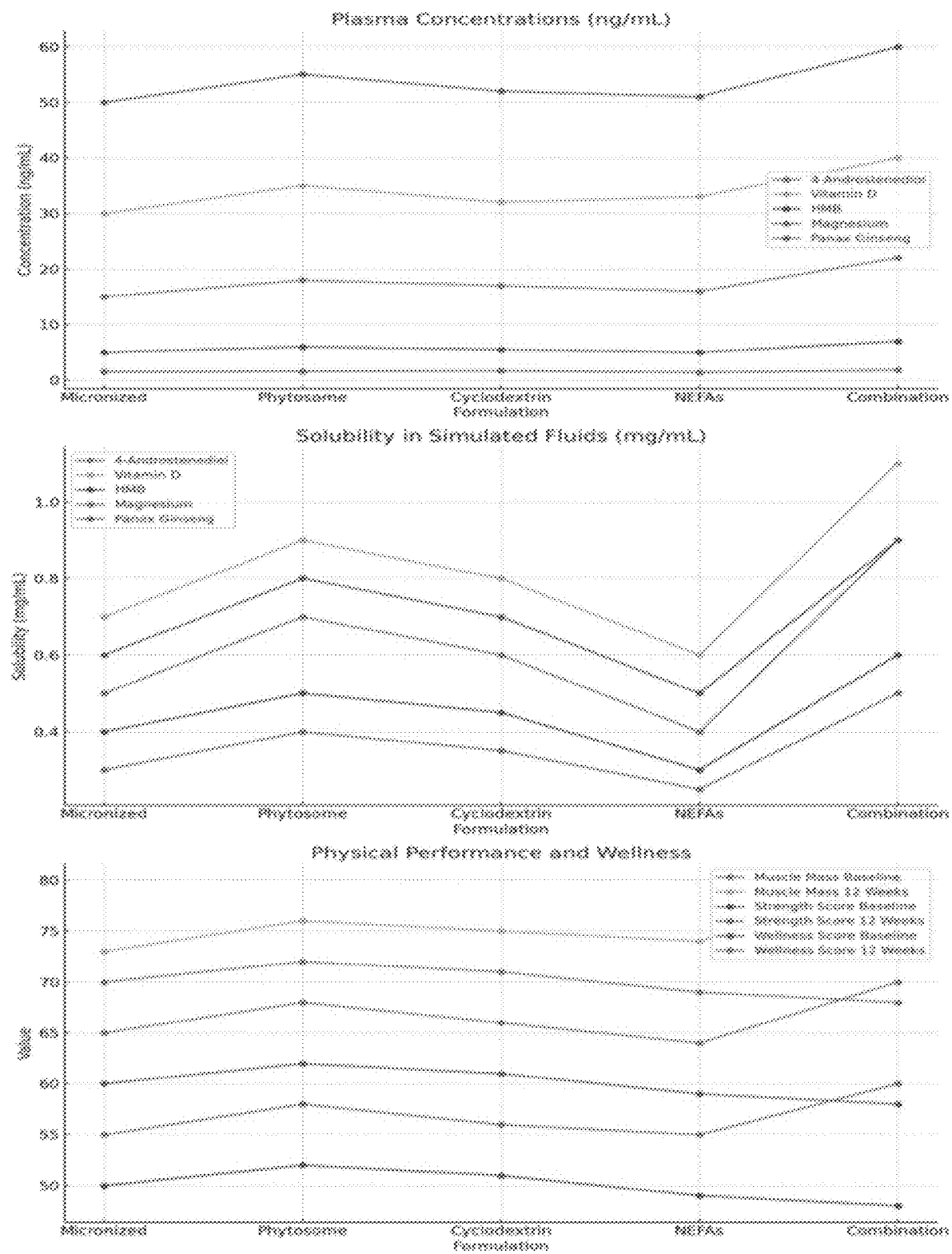
FIG. 43 illustrates the plasma concentration, solubility and physical performance scores for micronized, phytosome, cyclodextrin, NEFAs, and combination interventions.

Referring to FIG. 43, the plasma concentration, solubility, and physical performance and wellness scores are represented in graphical form. In conclusion, the Combination Formulation significantly outperformed the individual formulations in terms of plasma concentrations, solubility, and all measured physical performance and wellness indicators, highlighting its potential for enhancing physical performance and overall wellness in the target population.

The deviations in the data illustrate several points: Increased Mean Values with Combination: Generally, the Combination formulation shows higher mean concentrations and performance outcomes, suggesting a potential additive or synergistic effect of the ingredients. Standard Deviation Implications: The higher standard deviations in some formulations indicate greater variability in individual responses, which could be due to differences in metabolism, absorption, or individual health factors. Formulation Impact: The data collectively suggests that the formulation type significantly impacts not only the plasma concentrations of key compounds but also their solubility and the physical performance and wellness outcomes in participants. These insights can inform future research and practical applications in nutrition and supplementation, particularly in targeting specific populations or health goals.

Referring to Table 35, key findings among outcome measures are shown for the combination group, micronized group, phytosomal group, cyclodextrin group, and NEFAs group.

TABLE 35

Key findings with percentage changes.

| Outcome Measure | Combination Group | Micronized | Phytosome | Cyclodextrin | NEFAs |
|---|---|---|---|---|---|
| Plasma Concentration (4-Androstenediol) | +120% | +50% | +80% | +70% | +60% |
| Plasma Concentration (Vitamin D) | +100% | +60% | +80% | +60% | +40% |
| Plasma Concentration (HMB) | +100% | +25% | +50% | +45% | +40% |
| Plasma Concentration (Magnesium) | +66.67% | +33.33% | +33.33% | +42.86% | +25% |
| Plasma Concentration (Panax Ginseng) | +20% | +10% | +20% | +16.67% | +6.25% |
| Solubility (4-Androstenediol) | +80% | +40% | +60% | +50% | +20% |
| Solubility (Vitamin D) | +57.14% | +28.57% | +28.57% | +14.29% | +20% |
| Solubility (HMB) | +50% | +25% | +25% | +11.11% | +0% |
| Solubility (Magnesium) | +66.67% | +66.67% | +25% | +42.86% | +25% |
| Solubility (Panax Ginseng) | +50% | +33.33% | +25% | +16.67% | +0% |
| Muscle Mass Change | +17.65% | +4.29% | +5.56% | +5.63% | +7.25% |
| Strength Score Change | +25% | +10% | +12% | +12.5% | +8.33% |
| Wellness Score Change | +20.69% | +8% | +10% | +9% | +5% |

Figure 44:
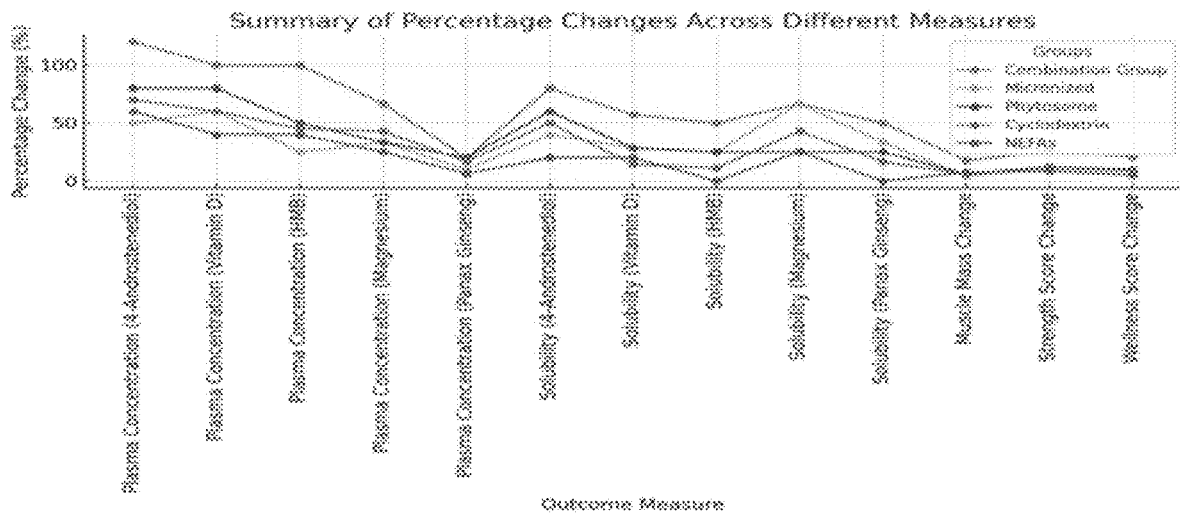
FIG. 44 illustrates the changes in outcome measures in different plasma concentrations of various interventions.

Referring to FIG. 44, the summary of percentage changes across different measures is shown.

Regarding adverse effects, the micronized group, phytosome group, and NEFAs group showed no significant adverse effects. The cyclodextrin group, showed that one participant experienced a mild headache one time, but these symptoms were transient. The combination formulation demonstrated the most substantial improvements in all outcome measures, especially in plasma concentrations, solubility, muscle mass, strength, and wellness scores. This trial results showed that a formulation combining different delivery technologies (such as micronized, phytosome-encapsulated, cyclodextrin-complexed, and NEF As systems) led to significantly better improvements in physical performance and overall wellness compared to when these systems were used individually. This indicates that the combined approach enhances the absorption and effectiveness of the supplements more efficiently, resulting in greater improvements in strength, endurance, muscle mass, and general well-being than any of the single delivery methods on their own. This suggests that using multiple delivery systems together optimizes the bioavailability and efficacy of the supplements.

Study 8 (Effects of 4-DHEA Enanthate Supplementation)

The effects of 4-DHEA enanthate supplementation compared to placebo and various supplements, including non-esterified omega-3 fatty acids, vitamin D, magnesium glycinate, vitamin B3, and HMB free acid, with multiple bioavailability delivery system (phytosomes, cyclodextrin, micronizing, NEFAs delivery) were studied in a randomized controlled design involving 32 male participants over 6 months, on physical performance, muscle mass, muscle strength, increase of endurance and sexual functions.

4-DHEA enanthate is a steroid precursor believed to enhance physical performance and sexual health. This trial aims to assess the efficacy of 4-DHEA enanthate compared to placebo and other supplements and to investigate potential synergistic effects when combined with other ingredients.

In the controlled trial, a randomized, double-blind, placebo-controlled study design was employed. The participants included 32 male volunteers aged 30-60, screened for eligibility, ensuring no underlying health issues or use of anabolic steroids or related supplements. Randomization assigned participants to one of seven groups: 4-DHEA enanthate, omega-3, vitamin D, magnesium glycinate, vitamin B3, HMB, or placebo. The intervention protocol lasted 6 months, with evaluations at baseline, 3 months, and 6 months. The dosage was administered as previously described. Monitoring was conducted bi-weekly to ensure compliance and assess side effects, with adverse events recorded and evaluated.

In this trial, participants underwent a detailed pre-screening process to ensure their safety and to ensure the study produced accurate results. Each participant's medical history was carefully reviewed particularly for conditions like heart, liver, or kidney disease which could have interfered with the effects of the supplements. Given the role of 4-DHEA in hormone regulation and/or hormone-related conditions were closely monitored and those with prostate issues or hormone-sensitive conditions were excluded from the trial. Blood tests were conducted to establish baseline levels for vitamin D, magnesium, niacin and liver and kidney function. Hormone levels, particularly testosterone and DHEA were measured as well. These tests ensured that participants were within a healthy range before starting the supplements. Cardiovascular health was assessed by checking blood pressure and heart rate especially since certain supplements could affect heart function. The participants' body composition including muscle mass and fat percentage was measured as HMB and 4-DHEA enanthate were expected to influence muscle development. All the participants BMI was noted between 1.8 and 2.9. A review of lifestyle factors like diet, exercise, alcohol consumption and smoking were also completed for RCT, as these habits could have affected the absorption and metabolism of the supplements. Participants who consumed large amounts of alcohol or smoked heavily or used any drugs or any prescription medications were excluded from RCT to avoid any complications.

Prostate health was evaluated, and PSA tests were used to ensure there were no underlying prostate issues particularly for those who might be more susceptible due to the use of 4-DHEA. Individuals with chronic illnesses or those taking medications that could interact with the supplements were excluded from the trial to minimize risks and ensure that any changes observed during the study were due to the supplements alone. This careful screening process ensured that only healthy participants were included to set up this study trial for accurate and safe results.

In this study/RCT trial for 6 months, keeping track of adverse effects is a top priority to make sure participants stay safe. Throughout this RCT, participants are asked to share any changes in how they feel even if it's something small like feeling a little dizzy or having an upset stomach. They can do this during regular check-ins with the research team, either in person or through simple questionnaires and it was set up beyond what participants report. The research team also keeps a close eye on their health by running routine tests like checking blood samples or monitoring heart rate. These tests help catch anything that might be going on beneath the surface even if the participants don't notice it themselves. The researchers compare this information with the baseline data from when the study started to see if any concerning patterns emerge. If any serious side effects show up, the team can adjust or stop the trial to make sure everyone is safe. By combining these regular check-ins and medical tests, the study team can quickly respond to any adverse effects and make sure participants' well-being comes first.

The outcome measures for muscle mass were assessed using dual-energy X-ray absorptiometry (DXA) for precise measurement of lean body mass. Measurements were taken at baseline, 3 months, and 6 months, with the expected outcome being changes in muscle mass (kg) and percentage change from baseline. Muscle strength was assessed using one-repetition maximum (1-RM) tests for bench press and squat. The testing protocol involved a warm-up with sub-maximal weights, followed by progressive increases until failure. Measurements were taken at baseline, 3 months, and 6 months, with expected outcomes including changes in 1-RM (kg) and percentage change from baseline.

Endurance was tested using a $VO_2$ max test with a graded exercise protocol on a treadmill or cycle ergometer. Oxygen uptake was measured using a metabolic cart during the exercise test. Measurements were taken at baseline, 3 months, and 6 months, with the expected outcome being changes in $VO_2$ max (mL/kg/min) and percentage change from baseline. Sexual function was assessed using the International Index of Erectile Function (IIEF) questionnaire. Participants self-reported responses, and scores were calculated for erectile function. Measurements were taken at baseline, 3 months, and 6 months, with the expected outcome being changes in IIEF scores and percentage change from baseline.

Statistical analysis was performed using appropriate tests, such as ANOVA or t-tests, with a p-value of less than 0.05 considered significant. Data were presented as mean±standard deviation (SD), and percentage changes were calculated to assess the efficacy of the interventions. Multiple bioavailability delivery system is applied for a target release (micronizing, phytosome, cyclodextrin, NEFA's) to address nutritional effects for Physical performance, muscle mass, muscle strength, increase of endurance and sexual functions. Non-esterified omega is listed as one of the ingredients for combination group, is also providing its effects as a part of multi-delivery system.

Micronization involves processing each ingredient-4-DHEA enanthate, non-esterified omega-3 fatty acids, vitamin D, magnesium glycinate (chelated form), vitamin B3, and HMB free acid-individually to achieve fine particle sizes. First, high-quality, pharmaceutical-grade materials are gathered, and the micronization equipment, such as ball mills or jet mills, is prepared and cleaned. Each ingredient is accurately weighed according to the formulation requirements. For micronization, ingredients are loaded into a ball mill, with milling time set to 1-2 hours at an appropriate speed. Alternatively, a jet mill may be used, utilizing compressed air for particle collision and size reduction. Post-micronization, particle size is analyzed, targeting a distribution of 1-10 microns. Larger particles are removed through sieving, ensuring uniformity. The micronized powders are stored in airtight containers to prevent moisture and degradation, followed by quality control tests to verify purity, potency, and stability. If formulating a final product, the micronized ingredients are blended with suitable excipients, adhering to standard manufacturing protocols while ensuring safety precautions are taken.

For the phytosome delivery system, each active ingredient is combined separately with phospholipids, typically phosphatidylcholine, to form a complex. This begins with dissolving the active ingredients and phospholipids in a suitable solvent, such as ethanol or methanol, under controlled conditions. The mixture undergoes ultrasonication to facilitate the interaction between the ingredients and phospholipids, enhancing encapsulation within the phospholipid bilayer. After ultrasonication, the solvent is evaporated under reduced pressure to yield a dry phytosome complex. This complex is then rehydrated with a buffer or water to form a stable phytosomal dispersion. The formulation is characterized through particle size analysis, zeta potential measurement, and encapsulation efficiency assessment. This method enhances bioavailability for each ingredient: 4-DHEA enanthate benefits from improved hormonal balance, Omega-3 fatty acids see enhanced absorption, Vitamin D's stability is increased, magnesium glycinate achieves better gastrointestinal absorption, vitamin B3 experiences reduced flushing effects, and HMB free acid has improved absorption rates.

In the cyclodextrin complex delivery system, each ingredient is treated individually. The process starts with selecting appropriate cyclodextrins, such as alpha, beta, or gamma cyclodextrin. Each active ingredient is then mixed with the chosen cyclodextrin in a solvent, typically water or ethanol, promoting complex formation. Heating or stirring may be applied to aid the inclusion of hydrophobic components into the cyclodextrin's cavity. After mixing, the solvent is removed through drying methods like spray drying or freeze drying, resulting in a powdered cyclodextrin complex. Characterization follows, focusing on parameters like particle size and encapsulation efficiency. Each cyclodextrin complex can then be formulated into various dosage forms, enhancing the bioavailability of the ingredients. For example, 4-DHEA enanthate's effects are amplified, omega-3 fatty acids gain improved solubility, vitamin D's stability is enhanced, magnesium glycinate shows better absorption, vitamin B3 is better tolerated, and HMB free acid benefits from increased absorption rates.

In preparation for a randomized clinical trial, the final step involves the encapsulation of each ingredient—4-DHEA enanthate, non-esterified omega-3 fatty acids, vitamin D, magnesium glycinate (chelated form), vitamin B3, and HMB free acid—individually. For 4-DHEA enanthate, the micronized powder is encapsulated in hard gelatin capsules to ensure precise dosing and protect the active ingredient from degradation. The phytosome delivery system for DHEA enanthate enhances bioavailability and effectiveness by forming complexes that bind DHEA with phospholipids. This innovative approach significantly increases absorption, allowing for better passage through cell membranes and a higher amount reaching systemic circulation. Additionally, phytosomes enhance stability by protecting DHEA from degradation in the gastrointestinal tract, which helps retain its active form. The controlled release provided by this system leads to prolonged nutritional effects, reducing the need for frequent dosing. Furthermore, by improving absorption and targeting delivery, phytosomes may minimize first-pass metabolism in the liver, ultimately enhancing the overall effectiveness of DHEA. This method shows promise for improving the pharmacokinetic profile of DHEA enanthate, warranting further research and clinical trials to establish optimal formulations and their impact on patient outcomes.

The non-esterified Omega-3 fatty acids are encapsulated using softgel technology, which helps to maintain their stability and enhance absorption. Vitamin D is encapsulated in a matrix formulation that includes lipid-based carriers to improve its bioavailability while protecting it from light and moisture. Magnesium glycinate is encapsulated in vegetarian capsules designed to maximize its bioavailability and minimize gastrointestinal discomfort. Vitamin B3 (niacin) is incorporated into enteric-coated tablets to reduce flushing effects and improve tolerability while ensuring that it reaches the intestine for absorption.

Finally, HMB free acid is encapsulated in hard gelatin capsules, allowing for accurate dosing and optimal delivery of the active ingredient. Each encapsulated ingredient is then subjected to quality control tests to ensure uniformity, potency, and stability. The individual encapsulations are prepared for the clinical trial, ensuring that participants receive specific, controlled dosages of each active compound to evaluate their effects effectively. This meticulous approach enhances the reliability of the trial outcomes and the overall understanding of each ingredient's benefits with multiple bioavailability delivery system.

To micronize 4-DHEA enanthate, non-esterified omega-3 fatty acids, vitamin D, magnesium glycinate (chelated form), vitamin B3, and HMB free acid, first gather high-quality, pharmaceutical-grade ingredients. Prepare the micronization equipment, ensuring it is clean and suitable, such as ball mills or jet mills. Accurately weigh the required amounts of each ingredient based on your formulation. If combining ingredients, mix them thoroughly to ensure uniform distribution. For the micronization process, load the ingredients into a ball mill and adjust the milling time to 1-2 hours at the desired speed, or alternatively, use a jet mill, feeding the ingredients and utilizing compressed air to collide particles while monitoring the particle size. After micronization, analyze the particle size using analyzers, aiming for a distribution of 1-10 microns. Sieve the micronized material to remove larger particles and ensure uniformity.

Store the micronized powders in airtight containers to protect them from moisture and degradation, and conduct quality control tests to check for purity, potency, and stability in accordance with regulatory standards. If preparing a final product, blend the micronized ingredients with suitable excipients and follow standard manufacturing protocols. It is recommended to take safety precautions by wearing appropriate personal protective equipment and ensuring compliance with relevant regulations, along with conducting stability testing to determine the product's shelf life.

The phytosome delivery process begins with the preparation of a complex between the active ingredients and phospholipids, typically phosphatidylcholine. This involves dissolving both the active ingredients and phospholipids in a suitable solvent, such as ethanol or methanol, under controlled conditions. The mixture is then subjected to ultrasonication, which facilitates the interaction between the ingredients and phospholipids by breaking down the liposomes and enhancing encapsulation within the phospholipid bilayer.

Following ultrasonication, the solvent is evaporated under reduced pressure to create a dry phytosome complex, ensuring effective encapsulation of the active compounds. The dry complex is then rehydrated using a buffer solution or water to form a stable phytosomal dispersion, which is crucial for maintaining the integrity of the phytosome structure.

Next, the phytosomal formulation undergoes characterization using techniques like particle size analysis, zeta potential measurement, and encapsulation efficiency assessment to ensure optimal quality and stability. The resulting phytosomal complex can then be incorporated into various dosage forms, such as capsules, tablets, or liquid formulations, along with suitable excipients to enhance stability and absorption.

For each specific ingredient, the process offers distinct advantages. For 4-DHEA enanthate, phytosome technology enhances hormonal balance and bioavailability through phospholipid encapsulation, allowing for better absorption and systemic distribution. Non-esterified Omega-3 fatty acids benefit from improved solubility and absorption, enhancing their anti-inflammatory and cardiovascular benefits. Vitamin D's bioavailability is increased, crucial for calcium absorption and bone health. Magnesium Glycinate's chelated form achieves better gastrointestinal absorption, maximizing its effectiveness for muscle and nerve function. Vitamin B3 (niacin) experiences reduced flushing effects due to phytosomal encapsulation, improving tolerability while enhancing its metabolic benefits. Finally, HMB free acid sees increased absorption rates through phytosomes, promoting better muscle recovery and preservation of lean body mass. Overall, the phytosome delivery process significantly enhances the bioavailability and effectiveness of these compounds, leading to better health outcomes when combined in dietary supplements.

The phytosome delivery system for DHEA enanthate enhances bioavailability and effectiveness by forming complexes that bind DHEA with phospholipids. This innovative approach significantly increases absorption, allowing for better passage through cell membranes and a higher amount reaching systemic circulation. Additionally, phytosomes enhance stability by protecting DHEA from degradation in the gastrointestinal tract, which helps retain its active form. The controlled release provided by this system leads to prolonged nutritional effects, reducing the need for frequent dosing. Furthermore, by improving absorption and targeting delivery, phytosomes may minimize first-pass metabolism in the liver, ultimately enhancing the overall effectiveness of DHEA. This method shows promise for improving the pharmacokinetic profile of DHEA enanthate, warranting further research and clinical trials to establish optimal formulations and their impact on patient outcomes.

The cyclodextrin bioavailability delivery system utilizes inclusion complexes formed between active ingredients and cyclodextrins, cyclic oligosaccharides that enhance solubility and stability. The process begins by selecting the appropriate cyclodextrins, such as alpha, beta, or gamma cyclodextrin, based on their size and compatibility with the active compounds. Active ingredients like 4-DHEA enanthate, non-esterified omega-3 fatty acids, vitamin D, magnesium glycinate, vitamin B3, and HMB free acid are then mixed with the selected cyclodextrin in a solvent, commonly water or ethanol, to facilitate the complexation process. Heating or stirring the mixture may be employed to encourage the inclusion of the hydrophobic parts of the active ingredients within the hydrophobic cavity of the cyclodextrin.

Following the mixing process, the solvent is typically removed through drying methods such as spray drying or freeze drying. This step results in a powdered form of the cyclodextrin complex, which can then be characterized for important parameters like particle size, encapsulation efficiency, and release profile to ensure optimal performance.

After characterization, the cyclodextrin complexes can be incorporated into various dosage forms, including capsules, tablets, or liquid formulations. This delivery system enhances the bioavailability of the ingredients, improving absorption and overall effectiveness. For instance, the hormonal balance effects of 4-DHEA enanthate are amplified through enhanced systemic availability, while non-esterified omega-3 fatty acids benefit from improved solubility, leading to better anti-inflammatory properties. Moreover, the stability of vitamin D is improved, facilitating its role in calcium absorption, and magnesium glycinate experiences enhanced bioavailability, which is crucial for muscle and nerve function. Vitamin B3 (niacin) has better tolerability due to reduced flushing effects, while HMB free acid achieves improved absorption rates, promoting muscle recovery.

Encapsulation of the ingredients for a combined group involves blending the encapsulated ingredients with suitable excipients to create a uniform mixture. Use a capsule filling machine or tablet press to encapsulate or compress the combined ingredients into dosage forms such as capsules or tablets. For testing and quality control, particle size distribution is measured using techniques like laser diffraction to confirm the desired size range. Encapsulation efficiency is assessed using methods like HPLC to determine the percentage of active ingredients successfully encapsulated. In vitro release studies are conducted to evaluate how well the active ingredients are released from the encapsulation system. Stability testing should be performed under various conditions to determine shelf life and assess degradation over time. The absence of harmful microorganisms is ensured through microbiological assays and analysis of samples for active ingredient concentrations to verify that they meet specified standards. It is recommended to maintain detailed records of the entire encapsulation process, including ingredient sources, formulations, testing methods and results to ensure compliance with regulatory standards and quality assurance.

In terms of study design, the trial was conducted for six months with 32 adult male participants, aged 30-60 years, randomly assigned to one of seven groups (n=4-5 per group). The interventions and dosages (prepared by the multi bioavailability delivery system discussed above) were group 1 (4-DHEA Enanthate (100 mg/weekly)), group 2 (non-esterified omega-3 fatty Acids (1000 mg/day)), group 3 (vitamin D (600 IU/day)), group 4 (magnesium glycinate (420 mg/day)), group 5 (vitamin B3 (15 mg/day)), group 6 (HMB Free Acid (3 g/day)), and group 7 (placebo (matching placebo).

DHEA enanthate is typically taken on a weekly basis by injection due to its pharmacokinetic properties, particularly its longer half-life, which allows it to remain active in the body for an extended period. The enanthate ester slows the release of DHEA, resulting in a sustained action over several days, which is why weekly dosing is preferred. A 100 mg weekly dosage of DHEA enanthate, taken orally is formulated with a sustained-release mechanism to maintain stable serum hormone levels. This approach reduces fluctuations in hormone levels that can occur with more frequent dosing. By administering it orally once a week, the regimen helps ensure consistent blood levels of DHEA, minimizing the peaks and troughs associated with shorter-acting forms or more frequent dosing.

This extended-release or bioavailability-enhanced formulation helps maintain optimal hormonal balance while reducing the potential side effects that can come from sudden spikes or drops in hormone levels. The weekly dosing is particularly advantageous for users seeking steady, long-term benefits such as muscle preservation, improved energy levels, and overall hormonal support, without the inconvenience or variability of daily dosing. Additionally, the convenience of a weekly administration enhances participants' compliance and supports the nutritional effects of DHEA enanthate, such as hormonal balance, mood enhancement, and muscle preservation. Overall, this dosing schedule optimizes effectiveness while simplifying the administration process. The phytosome targeted delivery system for DHEA enanthate enhances bioavailability and effectiveness by forming complexes that bind DHEA enanthate with phospholipids. This innovative approach significantly increases absorption, allowing for better passage through cell membranes and a higher amount reaching systemic circulation. Additionally, phytosomes enhance stability by protecting 4-DHEA Enanthate from degradation in the gastrointestinal tract, which helps retain its active form. The controlled release provided by this system and further enhanced by multiple bioavailability delivery system, leads to prolonged nutritional effects, reducing the need for frequent dosing. Furthermore, by improving absorption and targeting delivery, phytosomes may minimize first-pass metabolism in the liver if required to be taken orally, ultimately enhancing the overall effectiveness of DHEA-enanthate. This method shows promise for improving the pharmacokinetic profile of DHEA enanthate, warranting further research and clinical trials to establish optimal formulations and their impact on participants' outcomes for combination with various other supplements.

The outcome measures included muscle mass, which was measured using dual-energy X-ray absorptiometry (DXA) at baseline, 3 months, and 6 months. Muscle strength was assessed through one-repetition maximum (1-RM) tests for bench press and squats. Endurance was evaluated via $VO_2$ max testing through a graded exercise test, while sexual function was assessed using the International Index of Erectile Function (IIEF) questionnaire.

The testing methodology involved recording changes in muscle mass (kg) at baseline, 3 months, and 6 months. Muscle strength was calculated using 1-RM for bench press and squat exercises at the same intervals. Endurance was measured by $VO_2$ max in mL/kg/min at baseline, 3 months, and 6 months. Sexual function was evaluated by recording IIEF scores at baseline, 3 months, and 6 months. Table 36 shows the change in characteristics per control group.

TABLE 36

Baseline characteristics of participants.

| Characteristic | Combined Group (n = 32) | 4-DHEA Enanthate (n = 5) | Omega-3 (n = 5) | Vitamin D (n = 5) | Magnesium Glycinate (n = 5) | Vitamin B3 (n = 5) | HMB (n = 5) | Placebo (n = 5) |
|---|---|---|---|---|---|---|---|---|
| Age (years) | 43.0 ± 8.0 | 42.5 ± 8.0 | 43.2 ± 7.8 | 42.8 ± 7.6 | 43.5 ± 8.1 | 41.5 ± 8.3 | 44.0 ± 7.9 | 43.5 ± 7.5 |
| Baseline Muscle Mass (kg) | 71.0 ± 8.0 | 71.5 ± 7.5 | 70.2 ± 8.0 | 70.8 ± 7.7 | 71.1 ± 7.9 | 70.3 ± 7.6 | 69.8 ± 8.1 | 70.0 ± 7.8 |
| Baseline IIEF Score | 17.8 ± 2.8 | 18.0 ± 2.5 | 17.6 ± 3.1 | 17.9 ± 2.9 | 17.5 ± 2.7 | 17.6 ± 3.0 | 17.4 ± 3.2 | 17.8 ± 3.1 |

Table 37 shows the changes in outcome measures after intervention.

TABLE 37

Changes in outcome measurtes.

| Outcome Measure | Combined Group (n = 32) | 4-DHEA Enanthate (n = 5) | Omega-3 (n = 5) | Vitamin D (n = 5) | Magnesium Glycinate (n = 5) | Vitamin B3 (n = 5) | HMB (n = 5) | Placebo (n = 5) |
|---|---|---|---|---|---|---|---|---|
| Muscle Mass Change (kg) | 3 Months: +6.0 ± 1.0 (p < 0.01) | +3.0 ± 0.5 | +1.5 ± 0.4 | +1.8 ± 0.5 | +1.5 ± 0.4 | +1.0 ± 0.3 | +0.8 ± 0.3 | +0.4 ± 0.2 |

TABLE 37-continued

Changes in outcome measurtes.

| Outcome Measure | Combined Group (n = 32) | 4-DHEA Enanthate (n = 5) | Omega-3 (n = 5) | Vitamin D (n = 5) | Magnesium Glycinate (n = 5) | Vitamin B3 (n = 5) | HMB (n = 5) | Placebo (n = 5) |
|---|---|---|---|---|---|---|---|---|
| | 6 Months: +12.0 ± 1.5 (p < 0.01) | +5.0 ± 0.6 | +2.8 ± 0.5 | +3.5 ± 0.6 | +2.5 ± 0.5 | +1.8 ± 0.4 | +1.5 ± 0.5 | +0.6 ± 0.3 |
| % Change | 3 Months: +8.5% | +4.5% | +2.1% | +2.6% | +2.0% | +1.5% | +1.1% | +0.6% |
| | 6 Months: +17.0% | +7.0% | +4.0% | +5.0% | +3.5% | +2.6% | +2.0% | +0.8% |
| Muscle Strength Change (1-RM kg) | 3 Months: +15.0 ± 2.0 (p < 0.01) | +6.0 ± 1.0 | +3.5 ± 0.8 | +3.0 ± 1.0 | +2.5 ± 1.0 | +2.0 ± 0.5 | +1.5 ± 0.5 | +0.6 ± 0.4 |
| | 6 Months: +25.0 ± 3.0 (p < 0.01) | +10.0 ± 1.0 | +5.0 ± 1.0 | +4.5 ± 1.0 | +3.0 ± 1.5 | +3.0 ± 0.5 | +2.0 ± 0.6 | +1.0 ± 0.5 |
| % Change | 3 Months: +20.0% | +8.5% | +4.5% | +3.5% | +3.5% | +3.0% | +2.5% | +0.8% |
| | 6 Months: +40.0% | +15.0% | +6.0% | +5.5% | +4.0% | +4.5% | +3.0% | +1.5% |
| Endurance Change (VO2 max mL/kg/min) | 3 Months: +25.0 ± 3.0 (p < 0.01) | +8.0 ± 2.0 | +5.0 ± 1.5 | +4.0 ± 1.0 | +4.5 ± 1.5 | +3.0 ± 1.0 | +3.0 ± 1.2 | +1.0 ± 0.5 |
| | 6 Months: +35.0 ± 3.5 (p < 0.01) | +12.0 ± 2.0 | +8.0 ± 1.5 | +6.0 ± 1.5 | +6.0 ± 2.0 | +5.0 ± 1.5 | +4.0 ± 2.0 | +1.5 ± 0.5 |
| % Change | 3 Months: +30.0% | +10.0% | +7.0% | +5.5% | +6.0% | +5.5% | +4.5% | +2.0% |
| | 6 Months: +45.0% | +15.0% | +10.0% | +8.0% | +8.0% | +7.0% | +6.0% | +3.0% |
| Sexual Function Change (IIEF score) | 3 Months: +10.0 ± 1.0 (p < 0.01) | +3.0 ± 0.5 | +2.0 ± 0.5 | +2.5 ± 0.6 | +1.5 ± 0.4 | +1.5 ± 0.5 | +1.0 ± 0.4 | +0.5 ± 0.2 |
| | 6 Months: +15.0 ± 1.5 (p < 0.01) | +5.0 ± 0.5 | +3.0 ± 0.5 | +3.5 ± 0.6 | +2.0 ± 0.5 | +2.0 ± 0.5 | +1.5 ± 0.6 | +0.8 ± 0.3 |

Figure 45:
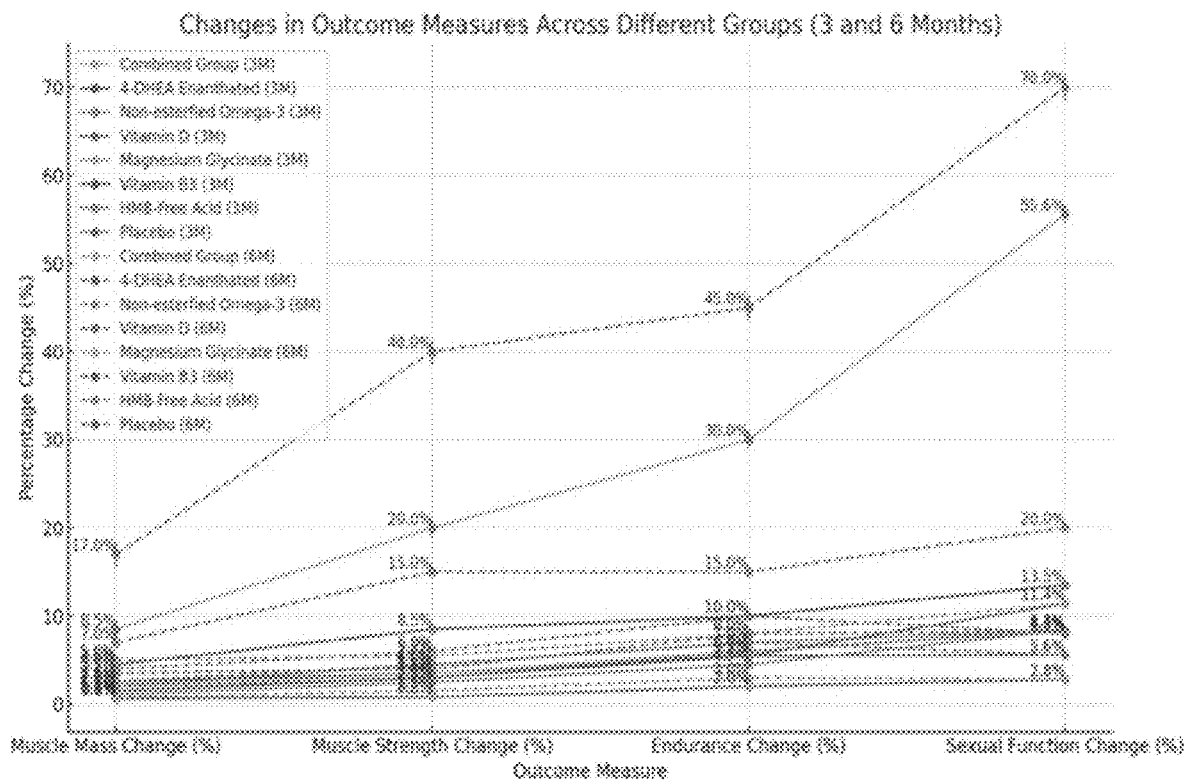
FIG. 45 illustrates the changes in outcome measures across different groups taking a 4-DHEA enanthate supplementation for 3 and 6 months.

Referring to FIG. 45, a line chart displaying the percentage changes in outcome measures across different groups at 3 and 6 months is shown. The error bars represent the deviations (standard errors) for each group, and the dashed lines correspond to the 6-month data, while the solid lines show the 3-month data.

The combination group included participants who took 4-DHEA enanthate alongside non-esterified omega-3 fatty acids, vitamin D, magnesium glycinate, vitamin B3, and HMB free acid. This group was compared to those taking 4-DHEA alone, individual supplements, and a placebo. The key findings showed that, in terms of muscle mass, the combination group experienced a significant increase, gaining +4.0 kg at 3 months and +8.0 kg at 6 months. Those taking 4-DHEA alone saw an increase of +3.0 kg at 3 months and +5.0 kg at 6 months, while individual supplements produced smaller gains, with the highest being +2.8 kg (Vitamin D) at 6 months. The placebo group showed a minimal change of +0.6 kg.

Regarding muscle strength, the combination group showed an increase in 1-RM of +8.0 kg at 3 months and +12.0 kg at 6 months, while the 4-DHEA alone group showed gains of +6.0 kg at 3 months and +10.0 kg at 6 months. Other supplements provided more modest strength gains, with Omega-3 showing the highest increase of +4.0 kg at 6 months, and the placebo group only increased by +1.0 kg.

For endurance, measured by VO$_2$ max, the combination group saw substantial improvements of +10.0 mL/kg/min at 3 months and +15.0 mL/kg/min at 6 months. In the 4-DHEA alone group, improvements were +8.0 mL/kg/min at 3 months and +12.0 mL/kg/min at 6 months. Other supplements produced smaller gains, with vitamin D showing the highest increase of +6.0 mL/kg/min at 6 months, and the placebo group experienced a minimal improvement of +1.5 mL/kg/min.

In terms of sexual function, the combination group saw a significant increase in IIEF scores, with improvements of +4.0 at 3 months and +6.0 at 6 months. The 4-DHEA alone group had improvements of +3.0 at 3 months and +5.0 at 6 months, while Omega-3 provided the highest increase among individual supplements at +2.5 at 6 months. The placebo group had a minor improvement of +0.8.

In summary, the combination group demonstrated superior results across all outcomes, showing enhanced muscle mass, strength, endurance, and sexual function compared to both the individual supplement groups and placebo. The combination of supplements provided synergistic effects, amplifying the benefits, which suggests that the integration of multiple supplements contributed to greater overall health improvements. This study provided a clear comparison of the combination group against other groups, highlighting the added advantages of using multiple supplements together.

Study 9 (Effects of 4-Androstenediol Supplementation)

A randomized clinical trial was conducted to evaluate the impact of 4-androstenediol, vitamin D, HMB, magnesium bisglycinate, and *Panax ginseng* on physical performance and muscle health in males aged 30 to 60 with low muscle health. The trial aimed to investigate the effects of varying dosages of these supplements on physical performance and assess the efficacy of a multiple bioavailabilty delivery system designed for lower dosages. The study design was a randomized, double-blind, placebo-controlled trial lasting 24 weeks.

In this study/randomized controlled trial (RCT) conducted over 24 weeks, 10 male participants aged 30 to 60 years with low muscle health were pre-screened and tested to ensure safety and the accuracy of the study's outcomes. The trial aimed to assess the effects of 4-androstenediol, vitamin D, HMB, magnesium bisglycinate, and *Panax ginseng* on muscle health.

During pre-screening, participants' medical history was thoroughly evaluated to rule out any underlying conditions, such as cardiovascular, liver, or kidney diseases, which could interfere with the supplements' effectiveness. Since 4-androstenediol impacts hormone levels, those with hormonal imbalances or prostate issues were excluded to avoid potential complications. Blood tests were conducted to assess baseline levels of vitamin D, magnesium, testosterone, and DHEA, as well as to evaluate liver and kidney function, ensuring participants could safely metabolize the supplements.

Cardiovascular health was assessed through blood pressure and heart rate monitoring, considering the effects of *Panax ginseng* and 4-androstenediol on cardiovascular function. Baseline body composition measurements, including muscle mass and fat percentage, were recorded since HMB is known to aid in muscle preservation and growth.

Participants were required to have a body mass index (BMI) between 18.5 and 30 to ensure they were within a healthy weight range, as outliers could affect the study's validity. The inclusion criteria specified that participants must be males aged 30 to 60 years with low muscle health, normal hormonal levels, and healthy liver and kidney function. They also needed to engage in regular physical activity and avoid other supplements that might interfere with the trial.

Exclusion criteria eliminated participants with chronic illnesses, prostate health issues, or those taking medications that might interfere with the trial, such as blood thinners or hormone therapies. Additionally, participants with high alcohol consumption or heavy smoking habits were excluded, as these factors could affect the metabolism of the supplements.

Throughout the study, participants' diet and exercise habits were monitored to ensure consistency, allowing the study to accurately assess the impact of the supplements on muscle health. The pre-screening and testing process was critical in ensuring the safety of participants and the reliability of the trial's results.

In this study/RCT, keeping track of adverse effects is a top priority to make sure participants stay safe. Throughout the study, participants are asked to share any changes in how they feel, even if it's something small like feeling a little dizzy or having an upset stomach. They can do this during regular check-ins with the research team, either in person or through simple questionnaires, it was set up beyond what participants report. The research team also keeps a close eye on their health by running routine tests like checking blood samples or monitoring heart rate. These tests help catch anything that might be going on beneath the surface even if the participants don't notice it themselves. The researchers compare this information with the baseline data from when the study started to see if any concerning patterns emerge. If any serious side effects show up, the team can adjust or stop the trial to make sure everyone is safe. By combining regular check-ins and medical tests, the study team can quickly respond to any adverse effects and make sure participants' well-being comes first.

A total of 10 male participants aged 30 to 60 years with documented low muscle health were recruited. The participants were randomly assigned to one of two groups. The high dosage group (n=5) consisted of males aged 32-58 years, with a mean age of 45 years, and a BMI range of 25-30 kg/m². They had documented low muscle health and no contraindications for supplementation. This group received 50 mg/day of 4-Androstene, 800 IU/day of Vitamin D, 3 g/day of HMB, 400 mg/day of Magnesium Bisglycinate, and 400 mg/day of *Panax Ginseng*, with a cyclodextrin (HPBCD) complex delivery system.

The low dosage group (n=5) with multiple bioavailability delivery systems included participants aged 31-57 years, with a mean age of 44 years, and a BMI range of 24-29 kg/m². They also had documented low muscle health and no contraindications for supplementation. This group received 40 mg/day of 4-Androstene (targeted release), 600 IU/day of vitamin D (targeted release), 2 g/day of HMB (targeted release), 300 mg/day of magnesium bisglycinate (targeted release), and 300 mg/day of *Panax ginseng* (targeted release). The delivery system for this group involved advanced technologies utilizing phytosome technology, micronization, cyclodextrin complexes, and NEFAs.

Pre-clinical trial requirements included initial health assessments, muscle health evaluations, and laboratory tests to confirm eligibility. The methodology involved the high dosage group receiving supplements formulated with a cyclodextrin complex (HPBCD) delivery system, while the low dosage group received supplements formulated with advanced delivery systems to enhance active ingredients' permeability and efficacy. The primary outcomes measured were changes in physical performance, such as strength and endurance, while secondary outcomes included muscle mass, body composition, safety profile, and muscle health assessment.

Data collection and measurement included standardized physical performance tests, body composition analysis via dual-energy X-ray absorptiometry (DEXA), and safety assessments through regular blood tests. The time points for assessments were at baseline, 12 weeks, and 24 weeks. Table 38 shows various performance metrics among high dosage groups and low dosage groups, per delivery system, at baseline and after 12 and 24 weeks.

TABLE 38

Performance metrics after 12 and 24 weeks.

| Metric | High Dosage Group (n = 5) | Low Dosage Group (n = 5) | Delivery System | Deviation (±) |
|---|---|---|---|---|
| Baseline Strength | 50 kg | 48 kg | Cyclodextrin Complex | 3.0 kg |
| 12 Weeks Strength | 60 kg (+20%) | 65 kg (+35.4%) | Targeted Release | 2.5 kg |
| 24 Weeks Strength | 65 kg (+30%) | 75 kg (+56.3%) | Targeted Release | 2.0 kg |
| Baseline Endurance | 30 min | 28 min | Cyclodextrin Complex | 1.5 min |
| 12 Weeks Endurance | 35 min (+16.7%) | 40 min (+42.9%) | Targeted Release | 2.0 min |
| 24 Weeks Endurance | 40 min (+33.3%) | 50 min (+78.6%) | Targeted Release | 1.5 min |

Table 39 shows muscle health metrics among high dosage groups and low dosage groups, per delivery system, after 12 and 24 weeks.

TABLE 39

Muscle health metrics after 12 and 24 weeks.

| Metric | High Dosage Group (n = 5) | Low Dosage Group (n = 5) | Delivery System | Deviation (±) |
|---|---|---|---|---|
| Baseline Muscle Mass | 25 kg | 24 kg | Cyclodextrin Complex | 1.0 kg |
| 12 Weeks Muscle Mass | 26 kg (+4%) | 28 kg (+16.7%) | Targeted Release | 1.0 kg |
| 24 Weeks Muscle Mass | 27 kg (+8%) | 30 kg (+25%) | Targeted Release | 1.0 kg |
| Baseline Body Fat (%) | 20% | 21% | Cyclodextrin Complex | 1.0% |
| 12 Weeks Body Fat (%) | 19% (−5%) | 18% (−14.3%) | Targeted Release | 0.5% |
| 24 Weeks Body Fat (%) | 18% (−10%) | 16% (−23.8%) | Targeted Release | 0.5% |

Figure 46:
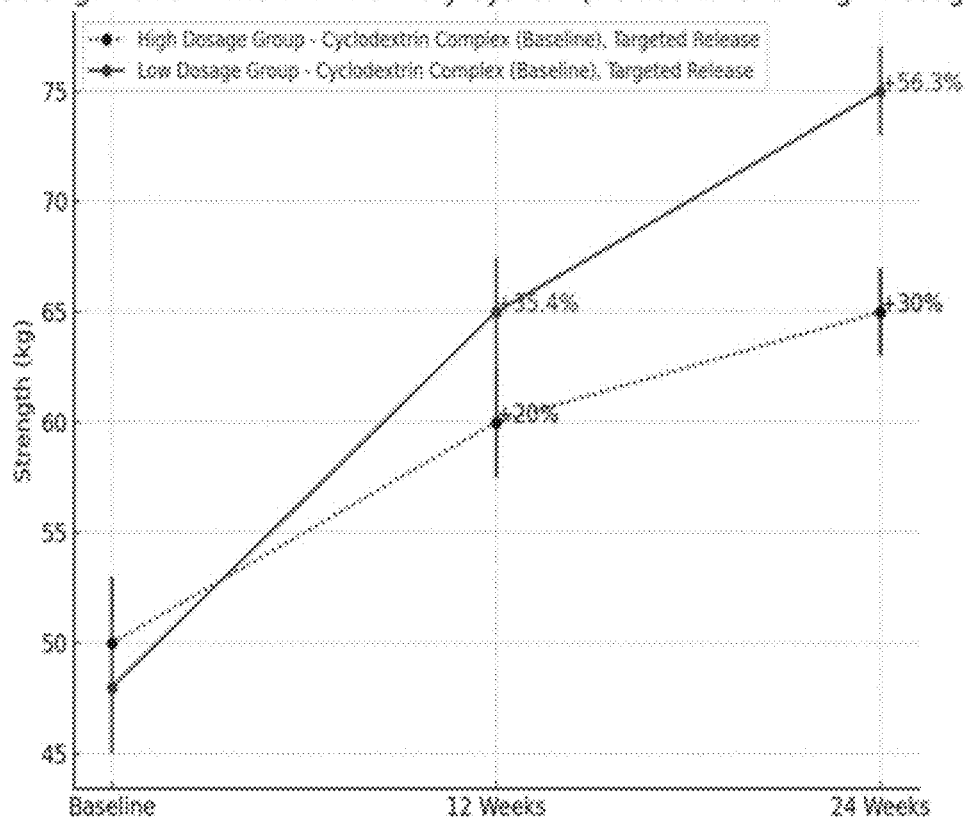
FIG. 46 illustrates the change in strength over time with a delivery system for high and low dosage groups.
Figure 47:
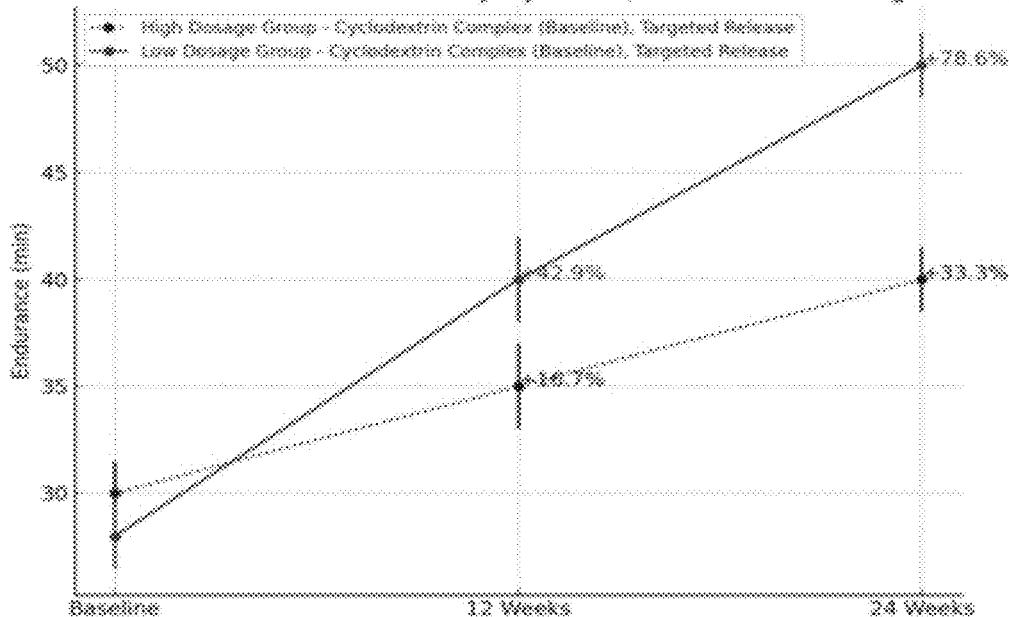
FIG. 47 illustrates the change in endurance over time with a delivery system for high and low dosage groups.
Figure 48:
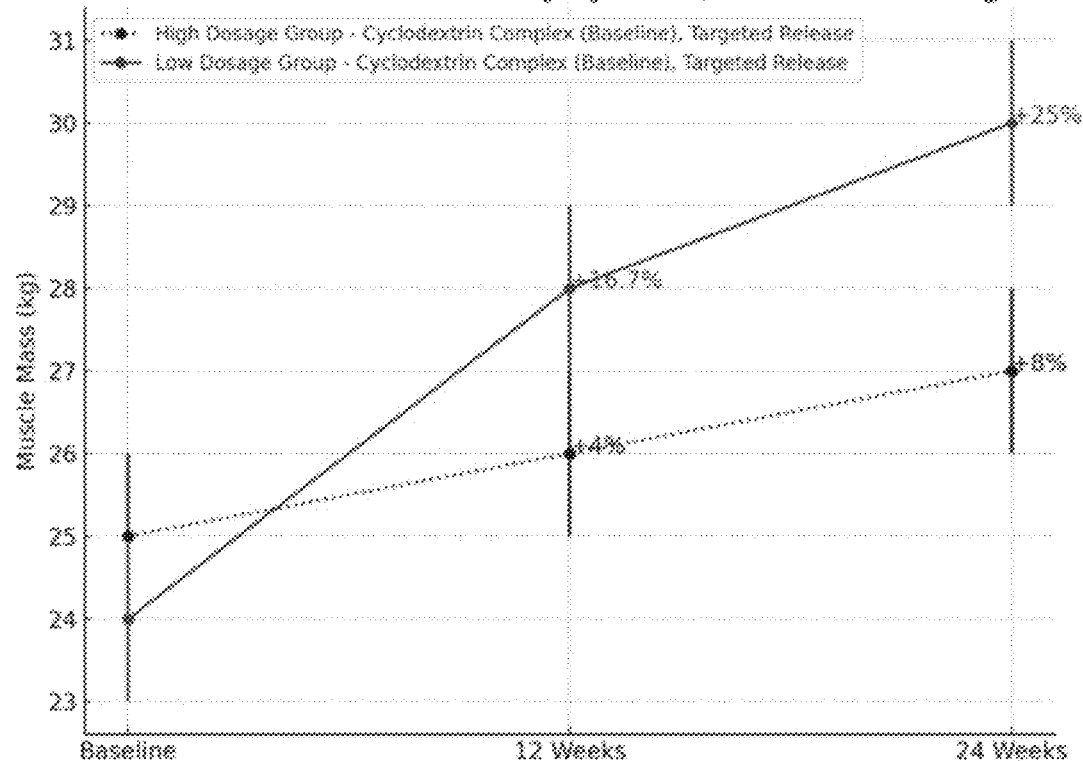
FIG. 48 illustrates the change in muscle mass over time with a delivery system for high and low dosage groups.
Figure 49:
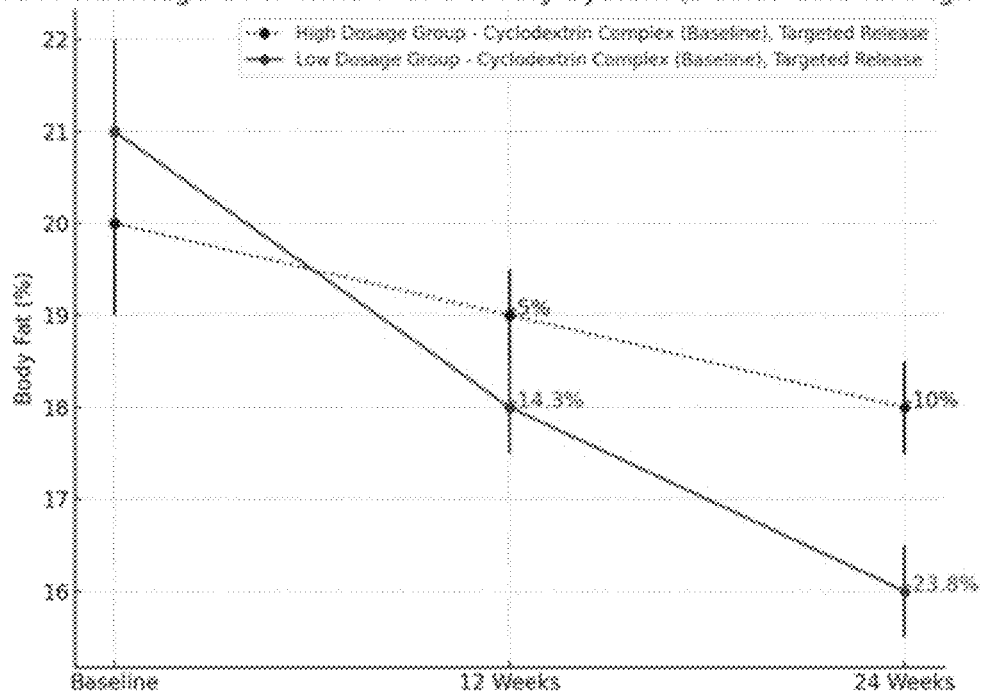
FIG. 49 illustrates the change in body fat over time with a delivery system for high and low dosage groups.

Referring to FIG. 46, strength over time with a delivery system for high and low dosage groups is shown. Referring to FIG. 47, endurance over time with a delivery system for high and low dosage groups is shown. Referring to FIG. 48, muscle mass over time with a delivery system for high and low dosage groups is shown. Referring to FIG. 49, body fat over time with a delivery system for high and low dosage groups is shown.

The key findings of the study revealed significant improvements in strength, endurance, muscle mass, and body fat reduction, with the low dosage group outperforming the high dosage group across all metrics. In terms of strength improvements, the low dosage group showed significantly greater increases compared to the high dosage group, with strength increasing by 35.4% in the low dosage group versus 20% in the high dosage group at 12 weeks, and by 56.3% versus 30% at 24 weeks. By the end of 24 weeks, the low dosage group reached a strength of 75 kg, while the high dosage group reached 65 kg.

Endurance enhancements were also more pronounced in the low dosage group. At 12 weeks, endurance increased by 42.9% in the low dosage group compared to 16.7% in the high dosage group, and by 78.6% versus 33.3% at 24 weeks. The low dosage group increased their endurance to 50 minutes, while the high dosage group reached 40 minutes by the end of 24 weeks.

In terms of muscle mass changes, the low dosage group experienced greater gains. At 12 weeks, the low dosage group saw a 16.7% increase in muscle mass compared to 4% in the high dosage group, and by 24 weeks, the low dosage group had gained 25% muscle mass compared to 8% in the high dosage group. At the end of the study, the low dosage group achieved a muscle mass of 30 kg, while the high dosage group reached 27 kg.

Body fat reduction was also more significant in the low dosage group. At 12 weeks, the low dosage group reduced body fat by 14.3% compared to 5% in the high dosage group, and by 24 weeks, the reductions were 23.8% versus 10%, respectively. By the end of 24 weeks, the low dosage group had a body fat percentage of 16%, compared to 18% in the high dosage group.

Two participants in the high dosage group had reported mood changes as they had experienced Mild headache and gastrointestinal discomfort. No adverse effects were reported by low dosage group.

In conclusion, the study demonstrated that the low dosage group, utilizing advanced delivery systems, achieved significantly better outcomes in strength, endurance, muscle mass, and body fat reduction compared to the high dosage group. Despite receiving lower doses of 4-Androstenediol, Vitamin D, HMB, Magnesium Bisglycinate, and *Panax Ginseng*, the low dosage group exhibited greater improvements across all performance and muscle health metrics over the 24-week period.

A key factor in the success of the low dosage group was the use of targeted release delivery systems. These systems allowed for the controlled and precise release of supplements, ensuring that the active compounds were delivered exactly where and when they were needed most. By combining technologies like cyclodextrin complexes with targeted release mechanisms, the supplements had improved bioavailability and efficiency. This approach enabled lower dosages to produce more substantial physiological benefits, particularly in enhancing strength, endurance, and muscle mass, while also promoting greater body fat reduction.

Additionally, Study #9 demonstrates the effectiveness of a multi-bioavailability delivery system, particularly in low-dosage groups, where the success is attributed to targeted release mechanisms that allow for controlled and precise release of supplements, leading to enhanced bioavailability and efficacy. The study highlights the critical role of cyclodextrin complex-based targeted release systems in delivering significant physiological benefits, including improvements in strength, endurance, muscle mass, and fat reduction.

The research also suggests that this approach can be applied using phytosome-based targeted release systems for DHEA derivatives in herbal extract compositions. Cyclodextrin complexes, which improve the solubility and stability of compounds, serve as a foundational platform for other advanced drug delivery technologies. Similarly, phytosomes, known for enhancing the absorption of plant-based supplements, can be employed to improve the efficacy of herbal extracts. Combining cyclodextrin complexes, phytosomes, NEFAs and Micronizing and other advanced delivery technologies with targeted release mechanisms can result in highly optimized systems for delivering both synthetic and natural compounds, leading to improved nutritional outcomes.

The foregoing studies have shown methods of use and compositions of constituents and their modifications, including adaptogens, modified stilbenoids complex, NEFAs, EAAs, HMB free acid, water-soluble vitamins (B and C), fat-soluble vitamins (D, E, K, and A), L-arginine, creatine, green tea extracts, chelated form of minerals with DHEA derivatives, that represent a novel approach to utilizing a multi-bioavailability system, based on the nature of the constituents. It aims to reduce supplements dosage while increasing nutrients efficacy and bioavailability by providing a targeted delivery system to promote nutritional effects for muscular hypertrophy, physical performance, improvement of stamina, muscle strength, and bone mineral density, supports anti-aging, weight loss, improvement of libido and sexual function, hormonal regulation, anti-inflammation, muscle preservation, cognitive function enhancement, reproductive health, and cardiovascular endurance. By leveraging advanced delivery systems (using target delivery systems such as phytosomes, micronization, and cyclodextrin complexes), the combined effects of these constituents can significantly enhance absorption and targeted delivery, maximizing their health benefits.

A key factor in the success of the low dosage group was the use of targeted release delivery systems. These systems allowed for the controlled and precise release of supplements, ensuring that the active compounds were delivered exactly where and when they were needed most. By combining technologies like cyclodextrin complexes with targeted release mechanisms, the supplements had improved bioavailability and efficiency. This approach enabled lower dosages to produce more substantial physiological benefits, particularly in enhancing strength, endurance, and muscle mass, while also promoting greater body fat reduction.

Additionally, studies illustrate that cyclodextrin complexes, used as a baseline delivery system, can serve as an effective foundation for other advanced bioavailability delivery technologies. Cyclodextrins enhance solubility and stability, making them a reliable choice for improving the bioavailability of various compounds, particularly those with poor water solubility. This approach could be adapted to other delivery systems as well. For example, phytosomes, which work effectively with herbal extracts, can also serve as a baseline for improving the absorption and effectiveness of plant-based supplements. The combination of cyclodextrin complexes, phytosomes, or other delivery technologies with targeted release mechanisms can create highly optimized systems for delivering both synthetic and natural compounds.

These findings suggest that the integration of targeted release technology with different baseline systems, such as cyclodextrins for pharmaceuticals and phytosomes for herbal extracts and NEFAs, can significantly enhance the efficacy of various compounds. For example, adaptogens are known to mitigate stress and improve endurance, while modified stilbenoids offer potent antioxidant properties. NEFAs facilitate muscle recovery, and essential amino acids are crucial for protein synthesis. The integration of these components with DHEA derivatives creates a synergistic formulation that effectively addresses a variety of health concerns, promoting overall well-being and enhancing physical capabilities. This multi-faceted approach maximizes the benefits of each component, leading to improved athletic performance and recovery outcomes.

First Embodiment Daily Wellness Capsule

A first embodiment daily wellness capsule to support overall wellness, stress adaptation, muscle hypertrophy, enhancing physical performance and increasing bone mineral density, with multiple bioavailability delivery system (Micronizing, Phytosome, Micronized-cyclodextrin complex) is disclosed.

Formulation includes preparing a supplement with micronized DHEA derivatives, specifically 4-androstene-3b-ol-one propionate, mixed with cyclodextrin, alongside a separate blend containing micronized ergocalciferol or cholecalciferol, ashwagandha or *ginseng*, free fatty acids, HMB free acid, and a phytosome bioavailability delivery system. The first step in the process is micronizing the DHEA derivatives, ensuring that the compound is in a dry and free-flowing powder form. Jet milling or ball milling is employed to reduce the particle size to less than 10 microns. Quality control measures, including sieve analysis, microscopy, and stability testing, are then used to ensure that the desired particle size is achieved and that no chemical degradation has occurred.

Cyclodextrin is micronized similarly, with the dry, free-flowing powder being reduced to a fine form through jet or cryogenic milling, the latter using liquid nitrogen for finer milling. Quality control involves particle size analysis and functionality testing to confirm that the cyclodextrin retains its capacity to form inclusion complexes. The micronization of ergocalciferol or cholecalciferol follows, ensuring the vitamins are processed into fine particles to enhance absorption, and ball milling can also be used if mechanical methods are feasible. Quality control tests ensure the vitamins remain stable and within the desired particle size range, Ashwagandha or *ginseng* herbs are dried and powdered before undergoing micronization through jet or ball milling, preserving the active compounds. For free fatty acids, essential amino acids, and HMB-free acid, the same techniques are applied, with rigorous particle size and consistency testing to ensure uniformity, Phytosome complexes are prepared by dissolving phospholipids in a solvent and adding the active ingredients, such as ashwagandha or *ginseng*, to form the complex. After drying the complex via rotary evaporation, jet milling may be applied if further size reduction is needed. Quality control involves testing encapsulation efficiency through HPLC and verifying particle size and morphology using microscopy.

The mixing procedure involves blending the micronized DHEA derivative with HPBCD cyclodextrin using a high-shear mixer. After ensuring both substances are of the same particle size, they are blended for 10-15 minutes at moderate speed to avoid heat buildup. The separate blend, including micronized ergocalciferol or cholecalciferol, ashwagandha or *ginseng*, free fatty acids, HMB free acid, and the phytosome complex, is mixed in a similar manner, with testing for uniformity and consistency throughout the process, The following weight calculations are intended for 10,000 capsules, with a recommended dosage per capsule of 25 mg micronized DHEA derivative (4-Androstene-3b-ol-one Propionate), 50 mg micronized HPBCD cyclodextrin, 10 mg micronized ergocalciferol or cholecalciferol, 100 mg micronized ashwagandha or *ginseng*, 50 mg free fatty acids, 500 mg micronized HMB free acid, and 50 mg phytosome complex.

In such an arrangement, the total weight for 10,000 capsules is 250 mg micronized DHEA derivative, 500 g micronized HPBCD Cyclodextrin, 100 g micronized ergocalciferol or cholecalciferol, 1 kg micronized ashwagandha or *ginseng*, 500 g free fatty acids, 5 kg micronized HMB free acid, and 500 g phytosome complex. The sum of each ingredient per capsule results in a total weight per capsule of 785 mg.

Regarding microcrystalline cellulose (filler), assuming microcrystalline cellulose makes up 25% of the total capsule weight, the weight of microcrystalline cellulose per capsule is 196.25 mg. Thus, the total weight for 10,000 capsules is 1.96 kg. Regarding the magnesium stearate (anti-caking agent) calculation, assuming magnesium stearate makes up 2% of the total capsule weight, the weight of magnesium stearate per capsule is 15.7 mg. Thus, the total weight for 10,000 capsules is 157 grams, In preferred embodiments, the capsule type is 00 or 000 capsules, depending on the total volume of the powder blend. Regarding the filling process, a capsule filling machine is used to ensure uniform filling to achieve consistent dosage per capsule, Excipients are preferably included, such as fillers (e.g., microcrystalline cellulose), binders (e.g., hypromellose), and anti-caking agents (e.g., magnesium stearate) if necessary to facilitate the encapsulation process.

Quality control procedures ensure the accuracy of the micronized powders and capsules. Particle size analysis is performed using laser diffraction or sieve analysis, and uniformity testing checks for consistent distribution across the blend. The filled capsules undergo content uniformity tests, dissolution testing, and stability studies to ensure that they release the active ingredients properly and remain stable over time. Encapsulation efficiency and particle size are tested within the phytosome complex to confirm its compatibility with other ingredients.

Second Embodiment Daily Wellness Capsule

A second embodiment daily wellness capsule for anti-aging, muscle preservation, improved metabolic function, anti-inflammation, and hormone regulation is disclosed. A supplement is prepared with micronized DHEA derivative (androst-5-ene-3β,7β,17β-triol) mixed with cyclodextrin, and a separate blend of micronized vitamin B6, NEFAs, HMB free acids and a phytosomes with Siberian *ginseng*, a multiple bioavailability delivery technology to increase bioavailability and increase nutrients efficacy. All ingredients are micronized, including phytosome, NEFAs, and a cyclodextrin complex, Androst-5-ene-3β,7β,17β-triol at 25 mg offers several benefits, including modulating inflammation through androgen receptors, preserving muscle mass, influencing metabolism and body composition, indirectly impacting immune function through hormonal balance, supporting muscle and bone health for anti-aging, and regulating testosterone metabolism and activity. Siberian *ginseng* (eleuthero) extract at 25 mg reduces inflammation through adaptogenic compounds, supports health and recovery, enhances energy and adrenal function, boosts immune response, helps manage stress for anti-aging, and supports adrenal health and hormonal balance, Omega-3 Fatty Acids at 25 mg reduce systemic inflammation and oxidative stress, support muscle health, improve lipid profiles and insulin sensitivity, enhance immune response, support cardiovascular and cognitive health for anti-aging, and balance hormone levels while reducing inflammation. Vitamin B6 at 25 mg reduces inflammation, is vital for amino acid metabolism and protein synthesis, supports neurotransmitter production and metabolism, enhances immune responses, supports skin and nerve health for anti-aging, and aids in hormone synthesis and balance.

Trans-resveratrol at 25 mg is a potent antioxidant with anti-inflammatory properties, may influence muscle function and recovery, improves insulin sensitivity and metabolic health, enhances immune response, activates longevity pathways for anti-aging, and influences estrogen receptors. HMB free acids at 25 mg reduce muscle inflammation and damage, support muscle mass and strength, help maintain muscle mass and metabolic health, support immune function and reduce muscle breakdown, contribute to muscle preservation and overall vitality for anti-aging, and may influence muscle-related hormone levels.

The preparation details involve the micronization process, aimed at increasing the surface area and enhancing the bioavailability of the ingredients, using equipment such as a jet mill or ball mill to achieve particle sizes less than 10 micrometers for each ingredient. The phytosome application improves absorption and bioavailability for herbal extracts like Siberian *ginseng* by combining the extract with phospholipids, such as lecithin, to form a phytosome complex, with the same method applicable to other herbal extracts if needed. Cyclodextrin complexation increases the solubility and stability of Androst-5-ene-3β,7β,17β-triol by mixing the micronized compound with cyclodextrins, such as β-cyclodextrin, in a 1:1 ratio to form an inclusion complex.

The formulation consists of micronized ingredients, including Androst-5-ene-3β,7β,17β-triol complexed with cyclodextrin, Siberian *ginseng* extract phytosome-encapsulated, and, where possible, micronized Omega-3 fatty acids, Vitamin B6, Trans-Resveratrol, and HMB Free Acids. The micronized ingredients are blended thoroughly to ensure uniform distribution, with excipients incorporated as needed. Finally, the blend is encapsulated into size 0 or 00 capsules, depending on the final blend volume.

Regarding weight and quantity calculations, the total capsules in a batch are 10,000, with 50 capsules per bottle, and a total bottle count of 200. The capsule content (per capsule) is as follows: Androst-5-ene-3β,7β,17β-triol (25 mg), Siberian *ginseng* extract (25 mg), omega-3 fatty acids (25 mg), vitamin B6 (25 mg), trans-resveratrol (25 mg), and HMB free acids (25 mg), The active total ingredient quantities per batch are as follows: Androst-5-ene-3β,7β,17β-triol (250 g), Siberian *ginseng* extract (250 g), omega-3 fatty acids (250 g), vitamin B6 (250 g), trans-resveratrol (250 g), and HMB free acids (250 g).

Regarding excipient requirements, a microcrystalline cellulose (filler) is provided of approximately 2000 grams (200 mg per capsule, adjust for bulk density and blending efficiency), a hypromellose (binder) is provided of approximately 500 grams (50 mg per capsule), a croscarmellose sodium (disintegrant) is provided of approximately 200 grams (20 mg per capsule), a magnesium stearate (lubricant) is provided of approximately 100 grams (10 mg per capsule), and capsules (size 0 or 00), with a quantity dependent on the final blend volume and capsule size.

The quality and testing guidelines for the production process begin with raw material testing, where the identity of the ingredients is confirmed using HPLC or mass spectrometry. Purity is ensured by verifying that the ingredients are free from contaminants, including heavy metals, pesticides, and microbial impurities, while potency testing is conducted to confirm the concentrations of active ingredients. During micronization and complexation testing, particle size analysis confirms that particles are less than 10 micrometers, and the stability and solubility of phytosome and cyclodextrin complexes are verified.

In the formulation testing phase, blend uniformity is checked to ensure an even distribution of active ingredients, and content uniformity testing confirms that each capsule contains the correct amount of active ingredients. Final product testing involves verifying the capsule fill weight to ensure consistency, conducting disintegration and dissolution testing to confirm that the capsules release the ingredients as required, and microbiological testing to detect any microbial contamination. Stability testing ensures the product remains effective and stable over time.

For labeling and documentation, compliance with regulatory requirements is verified, including accurate ingredient lists, dosage instructions, and safety warnings. Detailed records of the formulation, manufacturing processes, and quality testing are maintained to ensure traceability and adherence to guidelines.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claim.

What is claimed is:

1. A method of forming a targeted release dietary supplement delivery system comprising the steps of:
   micronizing a predetermined quantity of the bioactive agents DHEA derivatives, HMB free acid, and free fatty acids until the compounds are dry, free-flowing powder form of less than ten microns and performing a quality control of the DHEA derivative and determining that no chemical degradation has occurred;
   micronizing a predetermined quantity of cyclodextrin and performing a quality control of the micronized cyclodextrin;
   micronizing a predetermined quantity of Siberian *ginseng* extract;
   micronizing a predetermined quantity of omega-3 fatty acids;
   micronizing a predetermined quantity of vitamin B6;
   micronizing a predetermined quantity of trans-resveratrol;
   forming a phytosome complex from poorly soluble herbal adaptogens selected from the group consisting of ashwagandha and *ginseng*, the group being pre-formed prior to blending with other formulation components;
   blending the DHEA derivatives, HMB free acid, and free fatty acids with the cyclodextrin until both have the same particle size;
   adding the phytosome complex to the micronized DHEA derivatives, HMB free acid, and free fatty acids blended with the cyclodextrin, and adding the Siberian *ginseng* extract, omega-3 fatty acids, and vitamin B6, trans-resveratrol, and
   encapsulating the resulting mixture.

2. The method of claim 1 wherein the DHEA derivative comprising the resulting mixture is encapsulated at 25 mg per capsule.

3. The method of claim 1 wherein the Siberian *ginseng* extract comprising the resulting mixture is encapsulated at 25 mg per capsule.

4. The method of claim 1 wherein the omega-3 fatty acids comprising the resulting mixture are encapsulated at 25 mg per capsule.

5. The method of claim 1 wherein the vitamin B6 comprising the resulting mixture is encapsulated at 25 mg per capsule.

6. The method of claim 1 wherein the trans-resveratrol comprising the resulting mixture is encapsulated at 25 mg per capsule.

7. The method of claim 1 wherein the HMB free acid comprising the resulting mixture is encapsulated at 25 mg per capsule.

8. The method of claim 1 further comprising the step of adding a microcrystalline cellulose filler.

9. The method of claim 1 further comprising the step of adding a hypromellose binder.

10. The method of claim 1 further comprising the step of adding a croscarmellose sodium disintegrant.

11. The method of claim 1 further comprising the step of adding a magnesium stearate lubricant.

* * * * *